US011823089B2

(12) United States Patent
Gunther

(10) Patent No.: US 11,823,089 B2
(45) Date of Patent: Nov. 21, 2023

(54) SYSTEM AND METHOD FOR MANAGING TRANSACTIONS IN DYNAMIC DIGITAL DOCUMENTS

(71) Applicant: Christian Gunther, Basel (CH)

(72) Inventor: Christian Gunther, Basel (CH)

(73) Assignee: Christian Günther, Basel (CH)

( * ) Notice: Subject to any disclaimer, the term of this patent is extended or adjusted under 35 U.S.C. 154(b) by 0 days.

(21) Appl. No.: 17/143,535

(22) Filed: Jan. 7, 2021

(65) Prior Publication Data

US 2021/0201328 A1 Jul. 1, 2021
US 2023/0045774 A9 Feb. 9, 2023

Related U.S. Application Data

(63) Continuation-in-part of application No. 16/125,522, filed on Sep. 7, 2018, now Pat. No. 10,984,016, which
(Continued)

(51) Int. Cl.
*G06Q 40/06* (2012.01)
*G06Q 30/018* (2023.01)
(Continued)

(52) U.S. Cl.
CPC ....... *G06Q 30/018* (2013.01); *G06F 9/45516* (2013.01); *G06F 16/27* (2019.01);
(Continued)

(58) Field of Classification Search
CPC .................... G06Q 40/06; G06Q 2220/00
See application file for complete search history.

(56) References Cited

U.S. PATENT DOCUMENTS 10,984,016 B2  4/2021 Gunther
2015/0348192 A1  12/2015 Broder
(Continued)

FOREIGN PATENT DOCUMENTS

WO  WO-2018002830 A1 *  1/2018  ............ G06Q 20/02
WO  WO 2018/100567 A3  6/2018

*Primary Examiner* — Philip C Lee
(74) *Attorney, Agent, or Firm* — Caesar Rivise, PC

(57) ABSTRACT

A system software and method which relates to the field of computing technology or business process models or computer systems or distributed computer systems or computer networks relating to general purpose devices that can be programmed to carry out a set of data table or hash table updates, validations or modifications supporting, enabling or executing public and private services, financial transactions and commercial applications. More specifically, the present invention is directed to distributed and decentralized computing in which said distributed network is supported and encrypted by cryptographic technology, hash functions and distributed public or private keys or other related technology. System and methods for managing dynamic electronic documents on a private distributed ledger comprise establishing a dynamic electronic document comprising a first state object, wherein the state object references a prior approved first transaction; proposing a second transaction comprising as an input the first state object and as an output a transaction command to alter the state object as well as what parameters are required to validate the second transaction; validating the proposed second transaction; and updating the state object on a private distributed ledger to reference the second transaction.

38 Claims, 90 Drawing Sheets

Related U.S. Application Data is a continuation-in-part of application No. PCT/IB2018/000178, filed on Sep. 7, 2018, and a continuation-in-part of application No. 15/368,221, filed on Dec. 2, 2016.

(60) Provisional application No. 62/556,283, filed on Sep. 8, 2017.

(51) Int. Cl.

| | |
|---|---|
| *G06F 16/27* | (2019.01) |
| *G06F 9/455* | (2018.01) |
| *G06Q 10/10* | (2023.01) |
| *G06Q 20/38* | (2012.01) |
| *G06Q 40/04* | (2012.01) |
| *G06Q 50/18* | (2012.01) |
| *H04L 9/30* | (2006.01) |
| *G06Q 50/00* | (2012.01) |
| *G09B 5/02* | (2006.01) |

(52) U.S. Cl.
CPC .......... *G06Q 10/10* (2013.01); *G06Q 20/389* (2013.01); *G06Q 40/04* (2013.01); *G06Q 40/06* (2013.01); *G06Q 50/18* (2013.01); *H04L 9/3073* (2013.01); *G06Q 50/01* (2013.01); *G06Q 2220/00* (2013.01); *G06Q 2220/10* (2013.01); *G09B 5/02* (2013.01)

(56) References Cited

U.S. PATENT DOCUMENTS

| | | |
|---|---|---|
| 2016/0092988 A1 | 3/2016 | Letourneau |
| 2016/0162897 A1 | 6/2016 | Feeney |
| 2017/0017936 A1 | 1/2017 | Bisikalo et al. |
| 2017/0161829 A1 | 6/2017 | Mazier |
| 2017/0206604 A1 | 7/2017 | Al-Masoud |
| 2017/0243286 A1 | 8/2017 | Castinado et al. |
| 2017/0330174 A1 | 11/2017 | Demarinis et al. |
| 2017/0352012 A1* | 12/2017 | Hearn ............ G06Q 20/02 |
| 2017/0352116 A1* | 12/2017 | Pierce ............ H04L 63/10 |
| 2018/0158142 A1 | 6/2018 | Gunther |
| 2021/0201328 A1* | 7/2021 | Gunther ............ G06Q 40/06 |

* cited by examiner

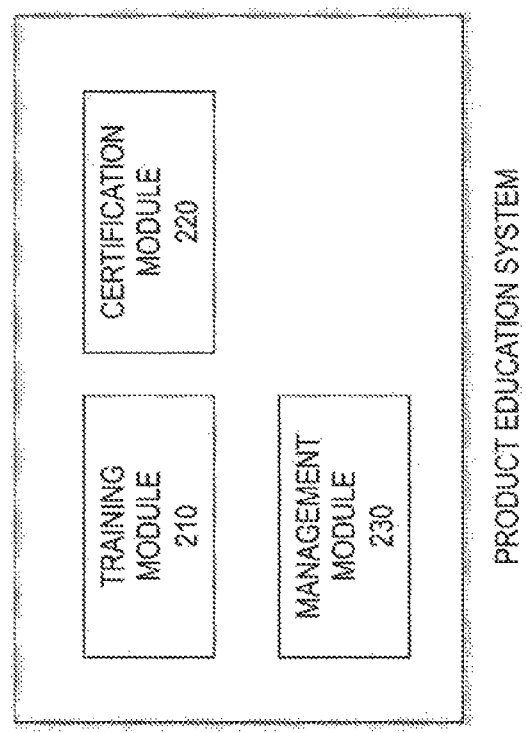

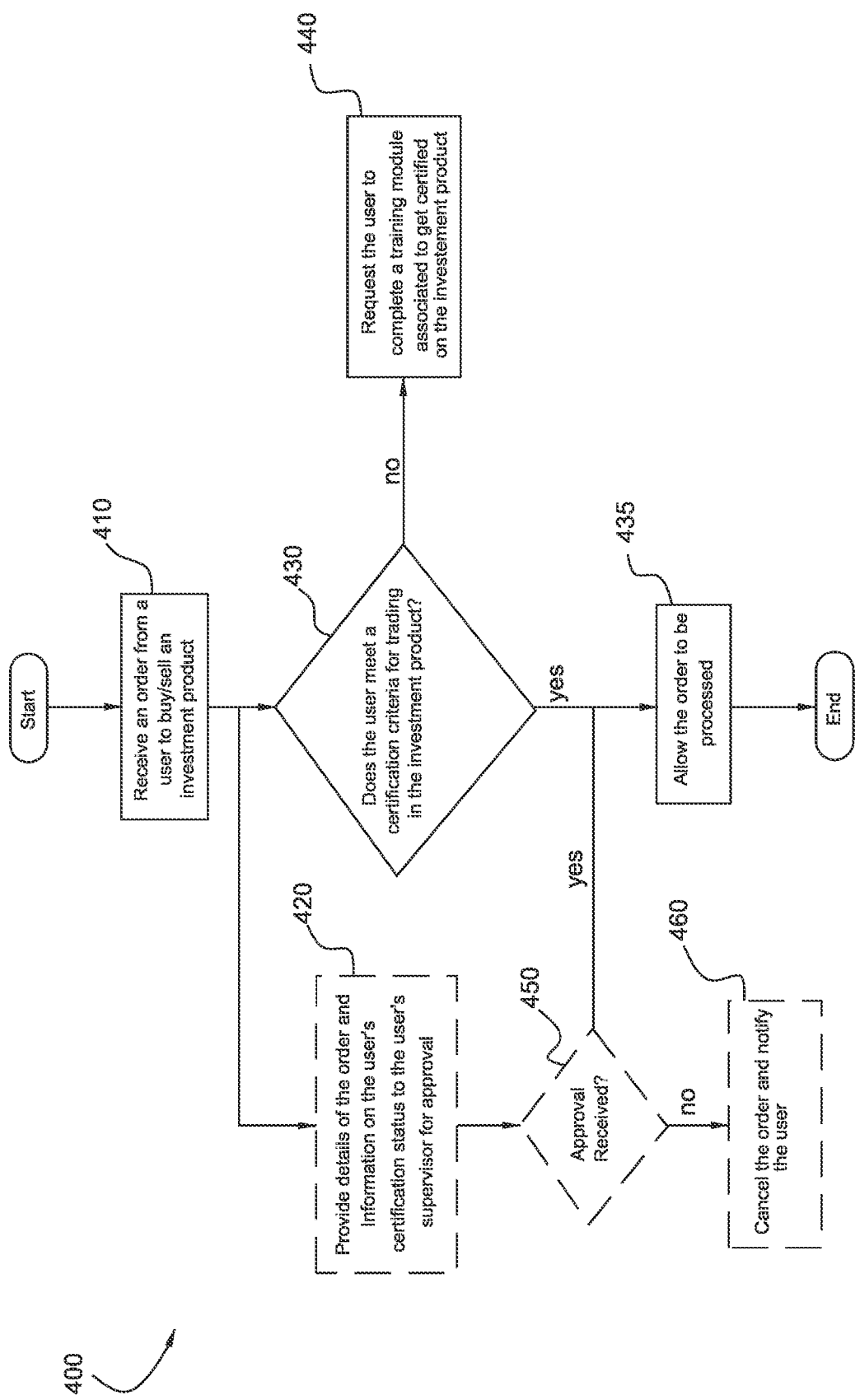

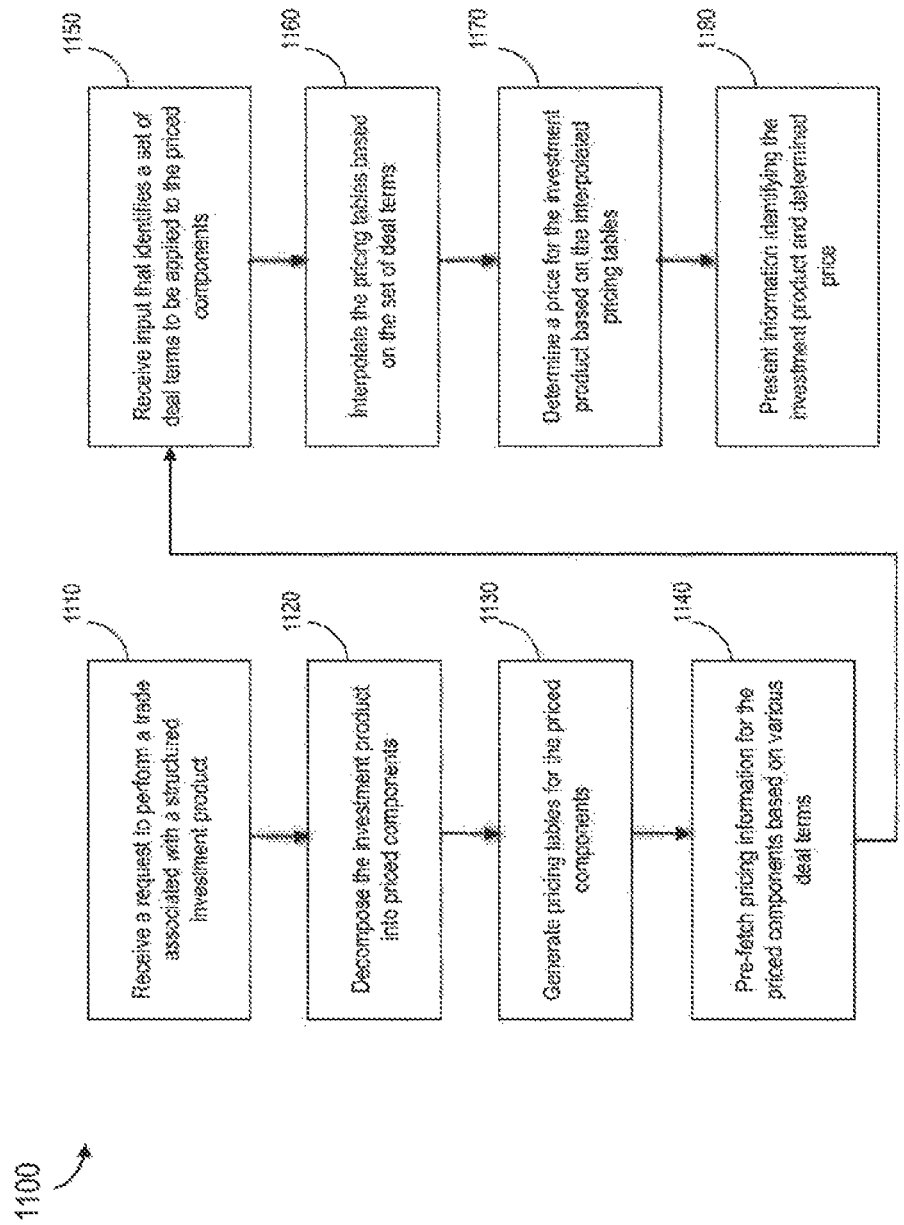

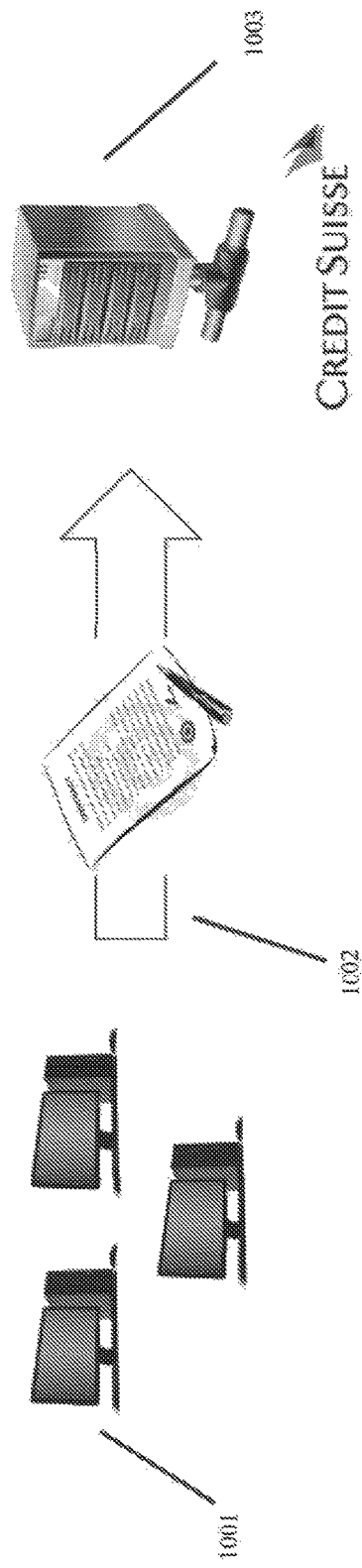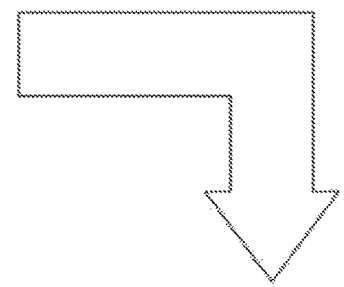
Fig. 22

Functional Design— Function catalog

1022 — ■ Development of Payoff-profile, modify, combine (largely graphically)
1023 — ■ Support clients with their tool related work (a.o. Live-Chat or Hotline)
1024 — ■ Based on the overall payoff-profile
  — Suggesting (almost) matching existing structured products
  — Submission of new arrangement for a structured product by the client possible, if arrangement hasn't been denied to date

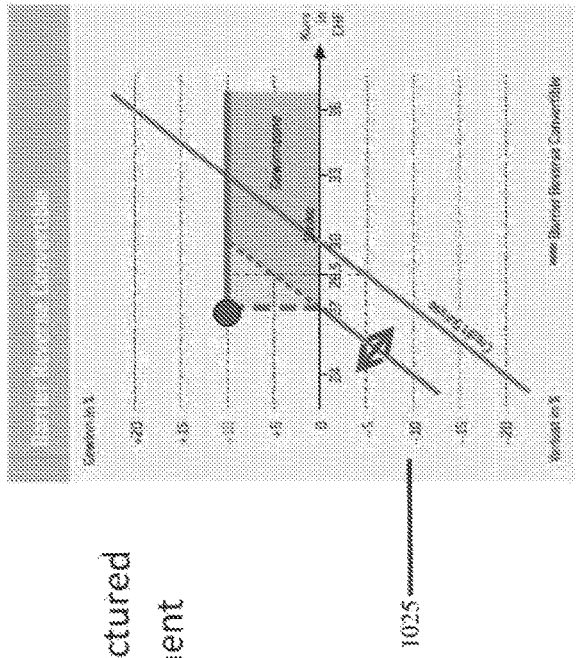

Inline Derivative Language

1st Step: Choosing which kind of product: (Capital Protection CP, Yield Enhancement YE, Participation P, Leverage L ...)

[ CP ]
user: christian.guenther, sp_id 345

2nd Step: Choosing the underlying asset: (Stock S, Interest Rate IR, Treasury Note TN, Foreign Exchange FX, Index IN, Bond B, Commodity CO,...)

[ CP — TN — ZCB ]
user: christian.guenther, sp_id 345

2nd .1 Step: Choosing the notional amount (N) : [INT or FLOAT]

[ CP — TN — ZCB — 1000 ]
user: christian.guenther, sp_id 345

Fig. 31

InLine Derivative Language

1st Step: Choosing which kind of product: (Capital Protection CP, Yield Enhancement YE, Participation P, Leverage L...)

[ CP ↑ ]
user: christian.guenther. sp_id 345

2nd Step: Choosing the underlying asset: (Stock S, Interest Rate IR, Treasury Note TN, Foreign Exchange FX, Index IN, Bond B, Commodity CO,...)

[ CP ↑ — TN ↑ — ZCB ↑   corn ↑ ]
user: christian.guenther. sp_id 345

2nd .1 Step: Choosing the notional amount (N) : [INT or FLOAT]

[ CP ↑ — TN ↑ — ZCB ↑   1000 ↑ ]
user: christian.guenther. sp_id 345

2nd .2 Step: Choosing the currency (CCY) : (USD|CHF|JPY|EUR|SGD|HKD...)

[ CP ↑ — TN ↑ — ZCB ↑   1000 ↑   USD ↑ ]
user: christian.guenther. sp_id 345

Fig. 32

Inline Derivative Language

3rd Step: Determine Issue Date ID, Strike Date SD, Expiry Date ED, Maturity Date MD ....

[CP] [TN] [ZCB] [1000] [USD] [ID: May 30 2014]

X th Step: Selecting and Choosing every other structured product related term necessary in the same fashion { Ticker, Tenor, Basket, Basket of Tickers, Basket of Basket, Worst of/ Best of Basket, Coupon Type (Float,...), Float Coupon Parameter (Accrual Start, Accrual End), cliquet option resetting frequency, XVA inline calculation (CVA, KVA, DVA, FVA, Cost of Margin, Collateral Cost, Overhead Cost, Cost of Transaction Tax, Product Cost), Pricing of XVA [Americas (into product price), Asia-Pacific(separate)], LIBOR|JIBOR|EURIBOR, Rainbow/Lookback IDL (Inline derivative language) theme ... }

Closing Step: Create New Product -> Online-Platform checks if input valid or parameter for structured product missing

[CP] [TN] [ZCB] [1000] [USD]     Create new Structured Note user: christian guenther sp id 135

Fixing and Execution/Trading: If all components are green Button 'Create new Structured Note/Product' changes to 'TRADE'

Fig. 34

SYSTEM AND METHOD FOR MANAGING TRANSACTIONS IN DYNAMIC DIGITAL DOCUMENTS

RELATED APPLICATIONS

This application claims priority to U.S. patent application Ser. No. 15/368,221, entitled, Electronic Platform for Managing Investment Products, filed on Dec. 2, 2016. U.S. patent application Ser. No. 16/125,522, entitled, Apparatuses. Systems And Methods For Processing, Acknowledging. Transferring And Custody Of Assets Or Rights On A Distributed Ledger, filed on Sep. 7, 2018, and Patent Cooperation Treaty Application PCT/IB18/00178, entitled, Electronic Platform for Managing Investment Products, filed on Feb. 2, 2018, the disclosures of which are incorporated herein by reference.

TECHNICAL FIELD

This application is related to electronic platforms, and, more specifically, to systems, methods, and devices for managing investment products, including customizable structured products requiring real time certification, education, market factors and market builders.

The present disclosure is related to dynamic electronic transactions and more particularly to providing secure and immutable copies of dynamic electronic transactions between two or more parties.

BACKGROUND

An array of financial products is available in the financial marketplace for investment. One set of examples of financial products that are available to investors are structured products. Structured products offer investors potential returns tied to the performance of underlying derivatives such as indices, a basket of securities, a single security, options, commodities, foreign currencies, etc. Structured product offerings have defined levels of risk, return and maturity and are often used as a portfolio diversification strategy to include exposure to desired asset classes without direct investment on those asset classes. Consider a structured product in the form of a structured note with a notional face value of $1,000 and a maturity of 3 years that is linked to the performance of the Dow Jones U.S. Select REIT (Real Estate Investment Trust) index. The structured note combines two components: a zero coupon bond and a derivative component (e.g., a call option on the index). Most of the principal is put in the zero coupon bond, which is designed to give a return equal to the initial investment (i.e., $1000) at maturity. The rest of the money is put in the derivative component (e.g., a call option on the S&P 500 index). At maturity, the investor receives the principal ($1,000) regardless of whether the underlying index moves up or down. Moreover, if the value of the underlying index rises during the period of time between the issue and the maturity, the investor typically receives an additional return. For example, if the value of the underlying index rises 40% during the period, the investor can receive 40% of $1000, or $400, assuming a 100% participation rate. Besides providing the benefits of capital protection and potential income, structured products can also provide the benefit of portfolio diversification. For example, instead of buying a portfolio of commercial real estates, which can be difficult to find or even expensive to do, the investor can buy the example structured product linked to the REIT index to get exposure to the commercial real estate marker.

While the benefits of structured products are clear, many investors as well as financial advisors typically shy away from structured products because of a lack of understanding of how the structured products work, a lack of liquidity and a lack of transparency in how these products are priced, among other reasons.

Current state of the art software platforms employ certain architectural elements and techniques inspired by decentralized ledgers, such as the blockchain design of Bitcoin as well as other related systems. Some commentary suggests that these blockchain technologies could have transformational impact in multiple industries. However, it is not immediately known that traditional blockchain architectures such as those underpinning Bitcoin and Ethereum, which are designed for a threat model focused on censorship-resistance in a permissionless environment, are directly transferrable to industries and problems that do not share Bitcoin's and Ethereum's assumptions or requirements. The common design of an open shared ledger with global replication of data presents problems with scalability, transaction confidentiality, and interoperability, particularly in the context of systems that deliver consistent views of data to multiple, possibly untrusting parties.

A system that presents certain defining characteristics of blockchain platforms that are relevant and valuable to untrusting commercial entities is desirable and may include interoperability between mutually untrusting actors, which brings parties to shared facts to consensus as to the details of those facts and their evolution over time. In this regard, in many aspects, it is the parties to an agreement, and only the parties to an agreement that need to come to consensus on the state of that agreement and the shared facts relating to it. Traditional blockchain architectures and implementations do not provide a workable solution for limiting access to the terms and conditions of an agreement, contract, or other dynamic document on the distributed ledger. Instead, blockchain implementations have preferred global replication of every transaction to ensure all parties with access to the ledger, but not necessarily involved in any one transaction, have current and immutable information.

Banks were amongst the earliest adopters of information technology, automating previously manual processes and in digitising previously physical processes. However, there are significant opportunities to improve the cost and efficiency of the digital and system architectures that emerged.

For example and with regard to firm-level banking architecture—each bank has its own ledgers, which record that firm's view of its agreements and positions with respect to its customer set and its counterparts—and its counterparts, in turn, maintain their views. This duplication, whilst robust, may and often does lead to inconsistencies, and it drives a need for costly matching, reconciliation and fixing of errors by and among the various parties to a transaction. To the extent that differences remain between two firms' views of the same transaction, this is also a source of risk, some of it potentially systemic.

And with regard to existing market solutions—they are often digital analogues of their physical predecessors. A visitor from 1900 would have no trouble understanding how securities trades are settled today, how global trade is financed and how payments via correspondent banks are processed: we have removed cost and optimized processes but whereas the web has given us a shared platform for the exchange of information, no equivalent integration has been achieved in the realm of financial transactions.

These phenomena impose operational burdens on banks, who must maintain countless integrations with market infrastructure providers and with each other, and who must run complex processes to ensure assets are where they need to be, with implications for liquidity and for operational risk. And they impede regulatory imperatives, particularly around transparency and timely access to information.

Additionally, these phenomena share a common feature: whilst the plurality of financial service providers drives competition and choice, the plurality of technology platforms upon which they rely drives complexity and creates operational risk. Until recently, this was unavoidable: there were few effective ways to consolidate technology across firms without also consolidating the firms themselves.

With the maturation of cryptographic techniques, exemplified in part by blockchain technology and other distributed ledger technologies, a new opportunity is presented with the possibility of authoritative systems of record that are securely shared between firms. This provides the opportunity to transform the economics of financial firms, for example in post-trade services, by implementing a new shared platform for the recording of financial events and processing of business logic: one where a single global logical ledger is authoritative for all agreements between firms recorded on it, even though the relationships and obligations recorded may remain between those firms.

Indeed, a shared platform that allows parties to an agreement to maintain a shared understanding as to the state of that agreement without (1) massive replication of data structures unrelated to the parties and (2) robust encryption between firms or competitors to ensure privacy, would be desirable, as would a system that overcomes other disadvantages discussed above.

SUMMARY

Present governmental, cooperation, industries, financial entities and commercial operations are mostly based upon and accompanied by single centralized or separate databases or data tables. This leads to double spending, double accounting and record keeping apart from other efforts and cost for every party involved in a transaction or business. The present inventive technology promotes, enables and facilitates dramatic cost and time savings and reduces settlement and systemic risk apart from other risks and complexity regarding financial transactions or basically any other private business or public activity by exchanging information in a controlled and permissioned or non-permissioned manner depending on the applicable business process and privacy or confidentiality needed.

Example embodiments of the present invention are directed to an integrated system for and methods performed thereon for identifying customized structured investment products, certifying users to use and sell such customized structured products, selling and trading such customized structured products, and monitoring the performance of the customized structured products. The customized structured products are built from real time market data, client specific data, and/or performance metrics of other customized structured products.

In an example embodiment of the present invention an electronic platform residing at one or more servers that communicate with client devices associated with one or more users of the electronic platform, comprises: a product generation system that generates tradable investment products in response to product request information received from a user of the electronic platform; a product education system that provides online courses associated with the tradable investment products to the user of the electronic platform; and a product exchange system that establishes an information exchange environment between the user of the electronic platform and other users of the electronic platform.

In other example embodiments of the present invention the electronic platform may include one or more of the following features. The product generation system generates builds tradable investment products for the user after the user of the electronic platform has completed at least one online course associated with the tradable investment products provided by the product education system. The product education system provides online courses associated with the tradable investment products to the user of the electronic platform after determining the user of the electronic platform is nor certified to trade investment products generated by the product generation system. The product generation system builds investment products using a decision tree analysis of information provided by the user the of the electronic system, the information including: information associated with a user's investment criteria, information associated with a user's risk tolerance, information associated with a user's investment horizon, information associated with a user's desired investment market, information associated with a user's level of investment protection, and information associated with real-time or near real-time conditions of the investment market. The product education system provides at least one online course to the user of the electronic platform that includes a first course section that presents information to the user based on investment products of interest to the user and capable of being generated by the product generation system and a second course section that presents a quiz to the user that is based on the information presented to the user. The product exchange system that establishes a social network service between the user of the electronic platform and other users of the electronic platform, the social network service facilitating a sharing of information between users that includes information identifying one or more investment products generated for the user by the product generation system. The product exchange system that establishes a product trading marketplace between the user of the electronic platform and other users of the electronic platform, the product trading marketplace facilitating a trading of generated investment products between users of the electronic platform.

In yet another example embodiment of the present invention, a method performed by an electronic platform of generating a tradable investment product comprises: receiving input from a user via a product generation interface of the electronic platform, the input including a selection of one or more investment product categories of interest to the user; before generating an investment product for the user that is based on the selected one or mom investment product categories of interest to the user; launching an online seminar via an education interface of the electronic platform for the user; and upon receiving an indication that the user has completed the online seminar via the education interface provided by the electronic platform, generating one or more investment products within the selected one or more invest product categories via the product generation interface of the electronic platform.

Example embodiments of the present invention include one or more of the following features. After generating one or more investment products within the selected one or more invest product categories via the product generation interface of the electronic platform, establishing, via an information exchange interface provided by the electronic platform, a social network service between the user of the electronic platform and other users of the electronic platform, the social network service facilitating a sharing of information between users that includes information identifying one or more investment products generated for the user by the product generation system. After generating one or more investment products within the selected one or more invest product categories via the product generation interface of the electronic platform, establishing, via an information exchange interface provided by the electronic platform, a product trading marketplace between the user of the electronic platform and other users of the electronic platform, the product trading marketplace facilitating a trading of generated investment products between users of the electronic platform.

In still another example embodiment of the present invention a non-transitory computer-readable medium whose contents, when executed by an electronic platform provided by one or more servers, cause the electronic platform to perform operations for providing a computing environment for trading structured investment products, comprises: generating tradable investment products in response to product request information received from a user of the electronic platform; providing online courses associated with the tradable investment products to the user of the electronic platform based on credentials assigned to the user of the electronic platform; and establishing information exchange events between the user of the electronic platform and other users of the electronic platform that are associated with tradable investment products generated for the user of the electronic platform.

In yet a further example embodiment a method performed by an electronic platform residing at one or more servers that communicate with client devices associated with one or more users of the electronic platform, comprises: receiving a request from a user to trade an investment product; identifying a training module associated with a certification program provided by the electronic platform and associated with trading the investment product via the electronic platform; presenting the training module to the user; determining whether the user has completed the training module; when the determining indicates that the user has completed the training module, identifying a test corresponding to the training module; presenting the test to the user; determining whether the user has passed the test; when the determining indicates that the user has passed the test, certifying the user to trade the investment product.

And in another example embodiment of the present invention, a method, performed by an electronic platform residing at one or more servers that communicate with client devices associated with one or more users of the electronic platform, of selecting a structured investment product for a user of the electronic platform, comprises: receiving, via a graphical user interface provided by the electronic platform, information from a user, the information including; information associated with a user's investment criteria; information associated with a user's risk tolerance; information associated with a user's investment horizon; information associated with a user's desired investment market; or information associated with a user's level of investment protection; and then determining real-time or near real-time conditions of the investment market; and selecting one or more structured investment products based on the information received from the user and based on the real-time or near real-time conditions of the investment marker.

Still another example embodiment of the present invention is directed to a method, performed by an electronic platform residing at one or more servers that communicate with client devices associated with one or more users of the electronic platform, of presenting a tradable structured investment product to a user of the electronic platform, comprising: receiving, via an interface provided by the electronic platform, a request from the user of the electronic platform to perform a trade associated with a structured investment product; decomposing the structured investment product into two or more priced components of the structured investment product; generating pricing tables for each of the two or more priced components of the structured investment product; pre-fetching, from pricing servers located on an information exchange network that includes the electronic platform, pricing information for the two or more priced components based on a variety of different deal terms; receiving, via the interface provided by the electronic platform, input from the user of the electronic platform that identifies a set of deal terms to be applied to the two or more priced components when performing the trade of the structured investment product; interpolating the pricing tables based on the set of deal terms associated with the two or more priced components and provided by the user of the electronic platform; determining a price for the structured investment product that is based on the interpolated pricing tables for the two or more priced components; and presenting, via the interface of the electronic platform, information identifying the structured investment product and information identifying the determined price for the structured investment product.

A further still example embodiment of the present invention is directed to a method, performed by an electronic platform residing at one or more servers that communicate with client devices associated with one or more users of the electronic platform, of presenting information associated with a structured investment product that is available for trading via the electronic platform, the method comprising: receiving, via an interface provided by the electronic platform, a selection of a structured investment product generated by the electronic platform: performing a backtesting analysis for the selected structured investment product, the analysis include a comparison of a theoretical performance of the selected structured investment product to theoretical performances of other structured investment products generated by the electronic platform; and presenting, via the interface provided by the electronic platform, a result of the performed analysis.

And in yet another example embodiment of the present invention, a method of managing a certification program for a financial product, comprises: receiving a request from a user to complete the certification program for the financial product; identifying a training module associated with the certification program; presenting the training module to the user; determining whether the user has completed the training module; and when the determining indicates that the user has completed the training module, identifying a test corresponding to the training module: presenting the test to the user; determining whether the user has passed the test; when the determining indicates that the user has passed the test, certifying the user on the financial product; and informing the user that the user has completed the certification program and is permitted to trade the financial product; and when the determining indicates that the user has failed the test, informing the user that the user is not permitted to trade the financial product.

Further example embodiments of the present invention may include one or more of the following features. The training module includes videos or articles for the user's review. The determining indicates that the user has not completed the training module, informing the user of the user's current progress in completing the training module. The certification program is administered online and accessible through a web interface. The user is a financial advisor. The financial product is a leveled asset, a growth product, or an income product. The method further comprises informing a manager of the user of completion of the certification program for the financial product.

In even an even further example embodiment a system for managing trading requests, comprises: at least a processor and memory, cooperating to function as: a receiving component configured to receive a request from a user to trade a financial product; a determining component configured to determine whether the request is to be approved based on a certification status of the user on the financial product; an approving component configured to, when the determining component determines that the request is to be approved, approve the request and inform the user that the trade will be processed; and a disapproving component configured to, when the determining component determines that the request is not to be approved, deny the request and inform the user that the user needs to complete a certification program for the financial product.

Further example embodiments of the present invention may include one or more of the following features. The approving component is further configured to process the trade after approving the request. The system further comprises a maintaining component configured to maintain certification status information in a database, wherein the determining component obtains the certification status of the user on the financial product from the database and determines whether the request is to be approved in accordance with the obtained certification status. The system further comprises a presenting component configured to present the certification status of the user on the financial product to a second user; and an accepting component configured to accept an approval or denial from the second user of the request based on the presented certification status, wherein the determination component determines whether the request is to be approved in accordance with the acceptance or denial of the request. The first user is a financial advisor, and the second user is a manager of the first user.

Another example embodiment of the present invention is directed to a computer-readable storage medium whose contents are capable of causing a computer device with a processor and memory to perform a method of implementing a management dashboard for presenting training and certification metrics associated with a plurality of users for trading on financial products, the method comprising: including a first section in the management dashboard which displays a list of the plurality of users and a summary of training and certification metrics associated with each user; including a second section in the management dashboard which displays a list of requests by at least some of the users for trading financial products and allows a manager of the at least some of the users to approve or deny each of the requests; and including a third section in the management dashboard which displays a list of recent training or certification activities performed by any of the plurality of users. The first section allows the manager to select a user from the plurality of users and obtain details of training and certification metrics associated with the selected user. The listing displayed by the third section includes, for each activity, descriptions of a nature, a status, and a name of the user performing the activity.

And another example embodiment of the present invention is directed a method for evaluating a request to trade on a financial product, comprising: receiving the request to trade on the financial product, the request being submitted by a user via a web-based interface accessed using a client device, determining whether the user is certified for the financial product: when the user is certified for the financial product, automatically approving the request for processing: when the user is not certified for the financial product, automatically rejecting the request and requesting the user to get certified for the financial product by consuming relevant training content and taking a test based on the consumed training content; and providing an indication of the approval or rejection of the request to the user via the web-based interface. The financial product is a structured investment product or an over-the-counter derivative product. The method further comprises providing the indication of the approval or rejection of the request for display on a management dashboard accessible to an administrator user. The method further comprises monitoring consumption of each item of the relevant training content by the user; and providing information from the monitoring for display on a management dashboard accessible to an administrator user. The method further comprises determining, based on the monitoring, that the user has consumed all items of the relevant training content; in response to the determining, presenting the test including a set of questions to the user and receiving responses to the set of questions from the user; and determining whether to certify the user for the financial product based on the received responses.

In still a further example embodiment of the present invention, a method of enabling a user to identify financial products of interest based on a plurality of financial product classifications, each associated with one or more financial product classes: receiving a request from a user to find a financial product; obtaining a current list of financial products; initializing a moving list of financial products to the current list; repeating the following steps until a threshold condition is satisfied; selecting one of the financial product classifications that has not been considered; determining whether the financial products on the moving list belong to at least the predetermined number of financial product classes associated with the one financial product classification; and when the determining result indicates that the financial products belong to at least a predetermined number of financial product classes, presenting to the user a question corresponding to the one financial product classification and a plurality of answers corresponding to the at least the predetermined number of financial product classes: receiving a choice of one of the answers from the user corresponding to one of the financial product classes; and removing from the moving list financial products that do not belong to the one financial product class; and displaying the moving list of financial products to the user.

Example embodiment of the present invention may include one or more of the following features. The method further comprises obtaining current pricing data associated with the financial products on the moving list; and before the presenting, customizing one or more financial products on the moving list based on the current pricing data. The threshold condition indicates that the number of financial products on the moving list is smaller than a specific number or that the number of financial product classes to which the financial products on the moving list belong is smaller than the predetermined number. The selecting is performed randomly. The selecting is performed based on a predetermined order for the plurality of financial product classifications. The selecting is performed based on how evenly the financial products on the moving list are distributed into the financial product classes associated with each financial product classification that has not been selected. The plurality of financial classifications are based on one or more of an investment objective, a level of investment risk tolerance, an investment horizon, an equity market preference, a yearly investment return, a level of downside protection, and an overall investment return. The method further comprises displaying a backtesting feature and a future scenario analysis feature to the user that can be applied to each of the financial products on the moving list. The current list of financial products includes a structured product.

In another example embodiment of the present invention, a system for enabling a user to identify financial products of interest based on a plurality of financial product classifications, each associated with one or more financial product classes; a processor and memory, cooperating to function as; a receiving unit configured to receive a request from a user to find a financial product; an obtaining unit configured to obtain a current list of financial products; an initializing unit configured to initialize a moving list of financial products to the current list; a repeating unit configured to repeatedly invoke the following units until a threshold condition is satisfied; a selecting unit configured to select one of the financial product classifications that has not been considered; a determining configured to determine whether the financial products on the moving list belong to at least a predetermined number of financial product classes associated with the one financial product classification; a presenting unit configured to, when the determining result indicates that the financial products belong to at least the predetermined number of financial product classes, present to the user a question corresponding to the one financial product classification and a plurality of answers corresponding to the at least the predetermined number of financial product classes; a receiving unit configured to receive a choice of one of the answers from the user corresponding to one of the financial product classes; and a removing unit configured to remove from the moving list financial products that do not belong to the one financial product class; and a displaying unit configured to display the moving list of financial products to the user.

Further example embodiments may include one or more of the following features. A second obtaining unit configured to obtain current pricing data associated with the financial products on the moving list; and a customizing unit configured to, before the displaying unit displays the moving list, customize one or more financial products on the moving list based on the current pricing data. The threshold condition indicates that the number of financial products on the moving list is smaller than a specific number or that the number of financial product classes to which the financial products on the moving list belong is smaller than the predetermined number. The selecting unit randomly select one of the financial product classifications. The selecting unit selects one of the financial product classifications based on a predetermined order for the plurality of financial product classifications. The selecting unit selects one of the financial product classifications based on how evenly the financial products on the moving list are distributed into the financial product classes associated with each financial product classification that has not been selected. The plurality of financial classifications are based on one or more of an investment objective, a level of investment risk tolerance, an investment horizon, an equity market preference, a yearly investment return, a level of downside protection, and an overall investment return. Displaying the moving list includes displaying a backtesting feature and a future scenario analysis feature that can be applied to each of the financial products on the moving list. The current list of financial products includes a structured product.

And in still another example embodiment of the present invention, a computer-readable storage medium whose contents are capable of causing a computer device with a processor and memory to perform a method of enabling a user to identify financial products of interest based on a plurality of financial product classifications, each associated with one or more financial product classes, the method comprising: receiving a request from a user to find a financial product; obtaining a current list of financial products; initializing a moving list of financial products to the current list; repeating the following steps until a threshold condition is satisfied; selecting one of the financial product classifications that has not been considered; determining whether the financial products on the moving list belong to at least a predetermined number of financial product classes associated with the one financial product classification; when the determining result indicates that the financial products belong to at least the predetermined number of financial product classes, presenting to the user a question corresponding to the one financial product classification and a plurality of answers corresponding to the at least the predetermined number of financial product classes; receiving a choice of one of the answers from the user corresponding to one of the financial product classes; and removing from the moving list financial products that do nor belong to the one financial product class; and displaying the moving list of financial products to the user.

Embodiments disclosed herein address the above stated needs by providing systems and methods that allow parties to an agreement to maintain a shared understanding as to the state of that agreement.

In an example embodiment of the present invention an electronic agreement between two parties to a shared distributed ledger, comprises: a database comprising a contract code file, wherein the contract code includes machine readable instructions defining permissible actions to which the electronic agreement may be associated with and a hash identifying the contract code. A database comprising a legal prose document, wherein the legal prose document includes human readable text describing obligations of each party and a hash identifying the legal prose document. Parameters specific to the electronic agreement defining a state of the agreement. And a verified acknowledgement of the electronic agreement by the two or more parties that confirms the parties' understanding of the state of the electronic agreement.

In another example embodiment of the present invention, a method of creating a state object describing an electronic agreement between two parties to a distributed ledger, comprises: establishing, by a processor at first node of a distributed ledger network, a database for storing state objects; storing, by the processor, a legal prose document comprising human readable text describing rights and/or obligations of each party and a hash identifying the legal prose document, wherein the legal prose document includes one or more fields of undefined value, said value to be defined by a parameters document; storing, by the processor, a contract code comprising machine readable instructions defining permissible actions to which the electronic agreement may be associated with and a hash identifying the contract code, wherein said permissible actions are defined in the legal prose document; storing, by the processor, parameters specific to the electronic agreement defining a state of the agreement, wherein the parameters include values defining one or more of the undefined fields in the legal prose; and receiving, by the processor, at least one electronic signature of a party to the electronic agreement, and establishing, by the processor a state object comprising the legal prose document, the contract code, the agreement parameters, the electronic signature.

In still another example embodiment of the present invention, A non-transitory computer-readable medium having stored thereon a set of instructions that are executable by a processor of a first host computer system at a first node of a distributed ledger network to carry out a method of establishing dynamic electronic agreement states comprising: storing, by the processor, a legal prose document comprising human readable text describing obligations of each party and a hash identifying the legal prose document, wherein the legal prose document includes one or more fields of undefined value, said value to be defined by a parameters document; storing, by the processor, a contract code comprising machine readable instructions defining permissible actions to which the electronic agreement may be associated with and a hash identifying the contract code, wherein said permissible actions are defined in the legal prose document; storing, by the processor, parameters specific to the electronic agreement defining a state of the agreement, wherein the parameters include values defining one or more of the undefined fields in the legal prose; receiving, by the processor, at least one electronic signature of a party to the electronic agreement; and establishing, by the processor, a state object comprising the legal prose document, the contract code, the agreement parameters, the electronic signature.

Further example embodiments of the present invention may include one or more of the following features. The contract code file further comprises one or more rules relating to the holding of an asset, obligation, or agreement by one or both of the parties. The contract code file further comprises a rule relating to an obligation of one or both parties, said obligation expressed in the legal prose document. The contract code include machine readable instructions that cause actions or enforce obligations for which the parties are responsible, as defined in the legal prose. The legal prose includes one or more blank fields upon which the contract code and parameters may supply the value. The blank fields comprise one or more of the following categories; currency type, asset type, value of currency, amount of asset, party to be paid, location of asset, security information, balance of asset, or balance of currency. The blank fields may represent any value or identifier that may be determined at a later date without changing the underlying rights or obligations of the parties to the state object or transaction. The parameters include at least one defined value related to one or more of the blank fields included in the legal prose document.

In one aspect of the present invention, a method for managing states of a dynamic electronic document, comprises the steps of: recording a dynamic electronic document establishing a first content state; proposing changes to the electronic document altering the first content state; verifying the proposed changes as valid; receiving the proposed changes; accepting the proposed changes; updating the dynamic electronic document having a second content state; and inputting the dynamic electronic document to a private distributed ledger.

In another aspect of the present invention, a method for validating and communicating changes to a dynamic electronic document between a first and second user or party, comprises the steps of: accessing a dynamic electronic document comprising a state object, proposing a first transaction comprising the state object, a transaction command; and validation protocols wherein the state object represents the current version of the dynamic electronic document as represented on a private distributed ledger, the transaction command represents the proposed changes to the state object, and/or, one or more parties to receive the first transaction; receiving the first transaction and accepting the transaction command; and updating the state object of the dynamic electronic document to reflect the accepted proposed first transaction and recording the updated state object on a private distributed ledger. Recording the updated state object includes recording a new state object having a new state or properties. The new state object may be recorded on a private distributed ledger or other data store attributed to each party to the transaction.

In yet another aspect of the invention a method for validating and communicating changes to dynamic electronic documents between multiple users, comprises the following steps: establishing a dynamic electronic document comprising a first state object, proposing a transaction comprising as an input the first state object and as an output a transaction command to alter the state object resulting in an output of a new state object, as well as what parameters are required to validate the transaction; validating the proposed transaction; and updating the state object on a private distributed ledger to reference the transaction, wherein the only individuals having access to the state object after approval of the transaction are the individuals referenced in the transaction.

In a further aspect of the invention, a method of validating the state of a dynamic electronic document, comprises the following steps: establishing a first transaction comprising a state object; in a second transaction, referencing the state object and first transaction, wherein a date-time stamp is affixed to the state object and the second transaction; in a third transaction, referencing the state object and the first transaction, wherein a date-time stamp is affixed to the state object and the second transaction; determining the uniqueness of the second and third transactions by comparing the date-time stamps of the second and third transactions, and assigning priority to the earliest date-time stamp, thereby validating the earliest of the second or third transaction and creating a uniqueness validated transaction; and permitting further processing of the uniqueness validated transaction; prohibiting further processing of the non-uniqueness validated transaction; and updating the state object on a private distributed ledger to reference the uniqueness validated transaction. In alternate embodiments a digital signature or other authentication certificate may be in conjunction with or as a substitute to the date-time stamp.

Additional aspects of the present invention may include one or more of the following features or steps. The dynamic electronic document comprises a state object having contract code based on legal prose. Changes to the electronic document impose a performance obligation to a first party. Proposed changes to the dynamic electronic document represent a proposed transaction between two parties having access over a network to the dynamic electronic document. Verification of the proposed changes to the dynamic electronic document comprises authenticating the current state of the dynamic electronic document and validating the source or content of the proposed changes. The dynamic electronic document comprises a state object identified by cryptographic hash. Proposed changes are received over a network by a party to the dynamic electronic document, and wherein the proposed changes include metadata that authenticates the source and/or content of the proposed changes. Upon receiving the proposed changes to the dynamic electronic document reference is made to the contract code in the input state objects to validate the proposed transaction. Alternatively reference may be made to the contract code from any state object, including input state object and output state objects. The private distributed ledger is accessible only to the parties identified in the first and second state of the dynamic electronic document. Transactions are identified with a cryptographic hash. Validation of the earliest priority of a second or third transaction comprises attaching a uniqueness certificate or signature to the transaction. A state object comprises a data field identifying a uniqueness service. Uniqueness validation of a second and third transaction does not occur and a uniqueness conflict certificate may be issued to the second and third transaction. Transactions and state objects further comprise metadata tags associated with content types within the state object or transaction commands. Selected information based on the metadata tags is shared with a third party. Selected information based on metadata tags of content in the state object or transaction is used to provide uniqueness verification of one or more transactions. The updated state object is assigned additional metadata tags associated with the most recent transaction. Aspects described herein may be written as program steps and stored on a computer readable medium.

In an even further still example embodiment of the present invention, a method of executing a transaction relating to an electronic agreement comprises: storing multiple state objects in a database at a node of a distributed ledger network; proposing a transaction between two parties that alters the state of a first state object; verifying that the proposed transaction is a valid transaction according to the rules of the first state object for example by reference to machine readable code in the first state object; executing the proposed transaction by altering the state of the first state object; and storing the altered first state object in the database at a node of a distributed ledger; wherein the first state object and the altered first state object are shared between the parties of the transaction and stored in the database while preventing access to such state objects by unrelated parties having access to the database.

And in an additional example embodiment of the present invention, a method of finalizing an electronic transaction between two parties comprises: storing at one or more nodes of a distributed ledger one or more input state objects; proposing a transaction relating to the one more input state objects, wherein the transaction comprises an input state object, a command, and an output state object; validating the proposed transaction, wherein validation comprises running the contract code for each type of contract referenced by the state objects in the transaction; and confirming electronic signatures for the input state object(s) and transaction; assigning a uniqueness identification to the transaction; verifying that the input state object(s) has not previously been consumed by a prior transaction; recording in a database the consumption of the input state object(s); verifying to one or more nodes in the distributed ledger that the transaction is finalized; and storing an output state object reflecting the outcome of the transaction.

Various example embodiments of the present invention may comprise one or more of the following features. The state object comprises a legal prose document, contract code, parameters, and a digital signature. The process of validating the proposed transaction is performed using a sub-process comprising: confirming by a party to the transaction that the transaction conforms with the contract code, signing by electronic signature the transaction after confirming the transaction is valid. The process of validating the proposed transaction is performed using a sub-process comprising: screening privacy data from the transaction and input state objects, wherein privacy data includes party identity or other data marked as private; wherein and signing the transaction by the validating smart notary and establishing that the proposed transaction is valid. The uniqueness identification is a date time stamp. The method further comprises assigning a uniqueness identification. The method further comprises submitting the transaction to a date time service, wherein the date time service functions as an notary to the distributed ledger. The step of verifying the uniqueness of the transaction further comprises: submitting the proposed transaction to a notary configured to: compare the input state object of the transaction to a database of consumed state objects; determine whether the input state object has been previously consumed; record that the input state object is consumed by the proposed transaction; and electronically sign the transaction establishing that the transaction is verified. Prior to submitting the transaction to the notary, the transaction is stripped of privacy data such that the notary is prevented from accessing privacy data associated with the transaction or the input state object. The step of verifying to one or more nodes of the distributed ledger that the transaction has been finalized comprises an electronic signature from a notarizing service.

Additional example embodiments of the present invention are directed to a system for finalizing an electronic transaction comprising: a distributed ledger subsystem for recording object states, wherein each object state comprises a legal prose document, contract code, a parameters document, and at least one electronic signature; a transaction subsystem for proposing a transaction comprising an input object state, a command, and an output object state; a validation subsystem for confirming the command of the proposed transaction conforms with the parameters and contract code of the input object state; contract code is executed for all contracts referenced by state objects whether they are input or output state objects; commands signify intention of the party constructing the transaction (ISSUE, TRANSFER, etc.) and map to the corresponding parts of the contract code which require executing to validate the transaction in question, a verification subsystem for verifying that the input object state has not been previous consumed by a prior transaction.

Still another example embodiment of the present invention is directed to an electronic transaction processing system, comprising: a database comprising one or more state objects, each state object comprising a legal prose document having an identifying hash, contract code having an identifying hash, a parameters document having an identifying hash, and at least one electronic signature of a party to the state object; a processor configured for receiving a transaction, the transaction comprising a command and identifying an input state object stored in the database; a processor configured to include a validation module, the validation module confirming the command of the transaction conforms with the contract code referenced by each of the contract types in the transaction; a processor configured to include a verification module, the verification module confirming that the input state object has not been previously consumed by a prior transaction; and a processor configured to create an output state object from the validated and verified transaction and record the output state object to the database.

In some embodiments the process of validation refers confirmation that the transaction conforms with the contract types identified in the transaction. In some embodiments, the process of verification determines whether a state object is a unique input or whether the state object has been consumed. Verification can be from a notary service, as described herein.

In some embodiments, validation of the transaction comprises gaining consensus between the parties that the proposed transaction is permissible by reference to the rules expressed in the contract code referenced by each of the contract types referenced in the transaction. Validation of the transaction may also include confirmation or gaining consensus that all necessary signatures associated with proposed transaction are present.

And yet another example embodiment of the present invention is directed to an electronic transaction comprising: an input state object comprising a contract code, a parameters document, and at least one electronic signature; a command establishing the desired processing of the input object code, the command further comprising an electronic signature; and an output object state comprising a contract code, a parameters document, and at least one electronic signature.

Further example embodiments of the present invention may additionally include one or more of the following features. The validation subsystem comprises a consensus protocol configured to confirm that the conformance of each of the contract code reference by each of the contract types referenced in the transaction; and to electronically sign the transaction to confirm the transaction is validated. A transaction uniqueness identification subsystem or notary service configured to assign a unique identification including a date time stamp to the proposed transaction. The notary service further comprises a notary protocol configured to identify the input state object, compare the input state object to a database of consumed state objects, verify that the input state object is available for consumption, apply a digital signature to the transaction establishing that the transaction is verified, recording the input state object in the database of consumed state objects. A privacy preserving service for screening private data associated with the transaction or the input state object from any third party or third party oracle that may not be a party to the transaction. The privacy preserving service references state objects or data within state objects by cryptographic hash to preserve privacy. The privacy preserving service may incorporate merkle tree logic structure.

Aspects of the present invention may realize one or more of the following advantages. Parties to an agreement may agree upon changes to the agreement. Privacy and confidentiality of an agreement may be maintained between two parties. Parties may avoid unnecessary global sharing of data. Only parties with a legitimate need to know are permitted to see data within an agreement. Work flow between firms may be choreographed without a central controller. Consensus between firms is achieved at the level of individual deals instead of at the system level. Supports, facilitates, and enables regulatory and supervisor observer nodes. Transactions are validated by parties to the transaction rather than a broader pool of unrelated validators. Allows recordation of an explicit link between human language legal prose documents and smart contract code built on industry-standard tools.

BRIEF DESCRIPTION OF THE DRAWINGS

Various embodiments of the electronic platform ("electronic platform"), including product education systems, product generation systems, and product exchange systems, are disclosed in the following detailed description and accompanying drawings.

FIG. 2 is a block diagram illustrating components of a product education system.

FIG. 4 is a flow diagram illustrating a method for performing a trade of an investment product based on credentials attributed to a user of the electronic platform.

FIG. 11 is a flow diagram illustrating a method for building a customized investment product for a user of the electronic platform.

FIG. 22 illustrates the inventive platform and type of client devices needed for access and usage of the platform.

FIGS. 25-26 illustrate payoff diagrams.

FIGS. 29-35 illustrate investment criteria managed by the user of the inventive platform.

DETAILED DESCRIPTION

Overview

Figure 1A:
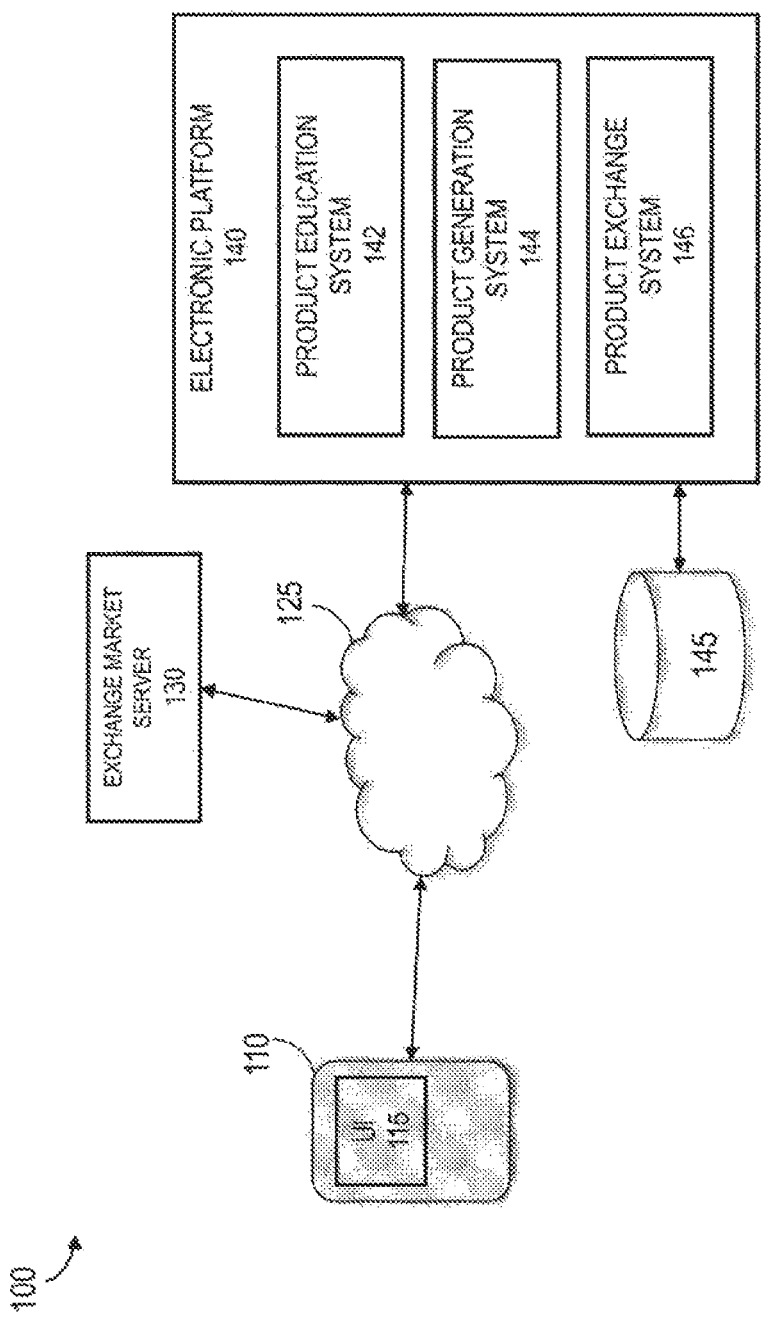
FIG. 1A is a block diagram illustrating a suitable computing environment that includes the electronic platform.

Systems and methods for managing tradable investment products, such as structured products and other tradable assets having multiple components, are described. In some embodiments, an electronic platform, such as an online computing environment is provided by one or more servers to one or more client devices, such as client devices associated with users seeking to utilize the electronic platform to trade (e.g., buy or sell) investment products, generate new or customized investment products, access information, tutorials, seminars, and/or online courses associated with investment products, share information associated with investment products, and so on. Investment products, as used herein, may include structured products, such as over the counter (OTC) derivative products, packaged products (e.g., retail financial trades, annuities, investment trusts), and so on.

In some embodiments, the electronic platform enables certification-based trading of investment products. The electronic platform provides financial advisors education and training materials on various investment products, tracks their progress through the materials, and certifies users (e.g. financial advisors) upon completion of the requisite course, to authorize the users to trade approved investment products via the electronic platform. In some cases, a management dashboard user interface provides various tools for tracking the financial advisors' certification for various investment products. For example, a manager or a supervisor can approve pending orders based on the financial advisors' certifications for the financial products directly from the dashboard.

Typically, financial advisors rely on questionnaires, brochures, catalogs and other prepared materials to choose structured products that meet the needs of their clients. However, such prepared materials quickly become out of date as a trading market moves. As a result, investment decisions may be made based on information that is out of date. The electronic platform, in some embodiments, implements a product selection method that uses a decision tree to select questions from a template based on prior user responses and updates the questions using real time pricing information and other information relating to current marker conditions. A user may traverse the decision tree, answering questions about his or her client's investment needs to discover products best suited to those needs. In some embodiments, the user may select a product and graphically interact with the inputs of the selected product to receive information about how each input affects the overall (expected) payout of the product. In some embodiments, the user may customize and save specific products for their individual clients.

In some embodiments, the electronic platform enables users to build investment products. For example, users may configure inputs and solve for different variables in real-time using locally pre-calculated data, to build investment products. In some embodiments, the electronic platform may utilize pre-fetching algorithms for pricing representative variations of a requested structured product, and interpolate those prices for different variations of the product requested by the user. In some embodiments, the electronic platform may automatically price investment products for which a user has set a target price, and notify the user when that target price is reached or when a similar product is offered.

In some embodiments, the electronic platform may perform real-time analysis on custom or pre-built structured products, pre- and post-trade. For example, in some embodiments, the electronic platform provides tools for performing scenario analysis and backtesting of custom or off-the-shelf investment products using real-time pricing data.

In some embodiments, the electronic platform enables crowdsourcing of investment products. For example, a user may place a custom investment product (generated by the platform) in an investment queue, and the electronic platform facilitates the reception of crowd sourced feedback and/or analysis from other users of the platform. In addition, custom built products placed in an investment queue may be part of a marketplace provided by the electronic platform, such that other users interested in the custom investment product may commit a notional towards the investment product. Once a minimum notional for the custom investment product is met, an issuer of the electronic product may issue the custom investment product to the users who committed the notionals.

In some embodiments the electronic platform provides a multi-issuer investment product marketplace. The marketplace may be used to buy or sell custom and/or off-the-shelf investment products issued by one or more issuers. The marketplace for investment products may be equipped with various social networking tools to display real-time buy/sell activities of users, trending investment products, tools for liking and sharing custom and off-the-shell investment products, and so on. In some embodiments, the electronic platform provides a secondary market place for selling investment products. The electronic platform may also allow users perform various trading processes, such as automatically querying and receiving RFQs from multiple issuers, filling in the associated parameters, send to trading firms, and so on.

Various embodiments of the electronic platform will now be described. The following description provides specific details for a thorough understanding and an enabling description of these embodiments. One skilled in the art will understand, however, that these embodiments may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments.

Suitable Computing Environment

FIG. 1A is a block diagram illustrating a suitable computing environment 100 that includes the electronic platform. As described herein, a user, via a browser or mobile application 115 running on a client device 110, may access an electronic platform 140 to access its various integrated functionality. The user, as described herein, may be a financial advisor or a professional who provides financial advice to individuals, such as clients of the user. In some embodiments, the electronic platform 140 may be accessible to administrators and/or various parties in the financial services industry, such as financial advisors, brokers and dealers, investment product issuers, security depositories, and so on.

The user may employ the client device 110 to connect to the electronic platform 140 via a network 125, such as a wireless network. Aspects, embodiments, and implementations of the electronic platform 140 will be described in the general context of computer-executable instructions, such as routines executed by a general-purpose computer, a personal computer, a server, or other computing systems. The integrated electronic platform 140 may also be embodied in a special-purpose computer or data processor that is specifically programmed, configured, or constructed to perform one or more of the computer-executable instructions explained in detail herein.

The electronic platform 140, in some embodiments, includes a product education system 142, a product generation system 144, and a product exchange system 146, and may include one or more local databases 145, which store data and other information associated with the management of tradable investment products, such as information utilized by the systems and methods described herein.

In some embodiments, the product education system 142, the product generation system 144, and/or the product exchange system 146 may access, retrieve, and/or otherwise receive information from an exchange market server 130 over the network 125, such as information that identifies or provides current or predicted market conditions for various investment products and/or components of investment products.

In some embodiments, the different systems of the electronic platform 140 may be integrated and/or exchange information between systems. For example, the product generation system 144 may be configured and/or programmed to generate tradable investment products in response to product request information received from a user of the electronic platform 140, the product education system 142 may be configured and/or programmed to provide online courses associated with the generated tradable investment products to the user of the electronic platform 140, and the product exchange system 146 may be configured and/or programmed to establish an information exchange environment between the user of the electronic platform 140 and other users of the electronic platform 140.

For example, in some embodiments, the product generation system 144 may build tradable investment products for the user after the user of the electronic platform 140 has completed at least one online course associated with the tradable investment products provided by the product education system 142. Following the example, the product education system 142 may provide online courses associated with tradable investment products to the user of the electronic platform 140 after determining the user of the electronic platform 140 is not certified to trade investment products generated by the product generation system 144.

As another example, the product exchange system 146 may establish a social network service between the user of the electronic platform 140 and other users of the electronic platform to facilitate a sharing of information between users that includes information identifying one or more investment products generated for the user by the product generation system 142 and/or may establish a product trading marketplace between the user of the electronic platform 140 and other users of the electronic platform 140 to facilitate a trading of generated investment products between users of the electronic platform 140.

Figure 1B:
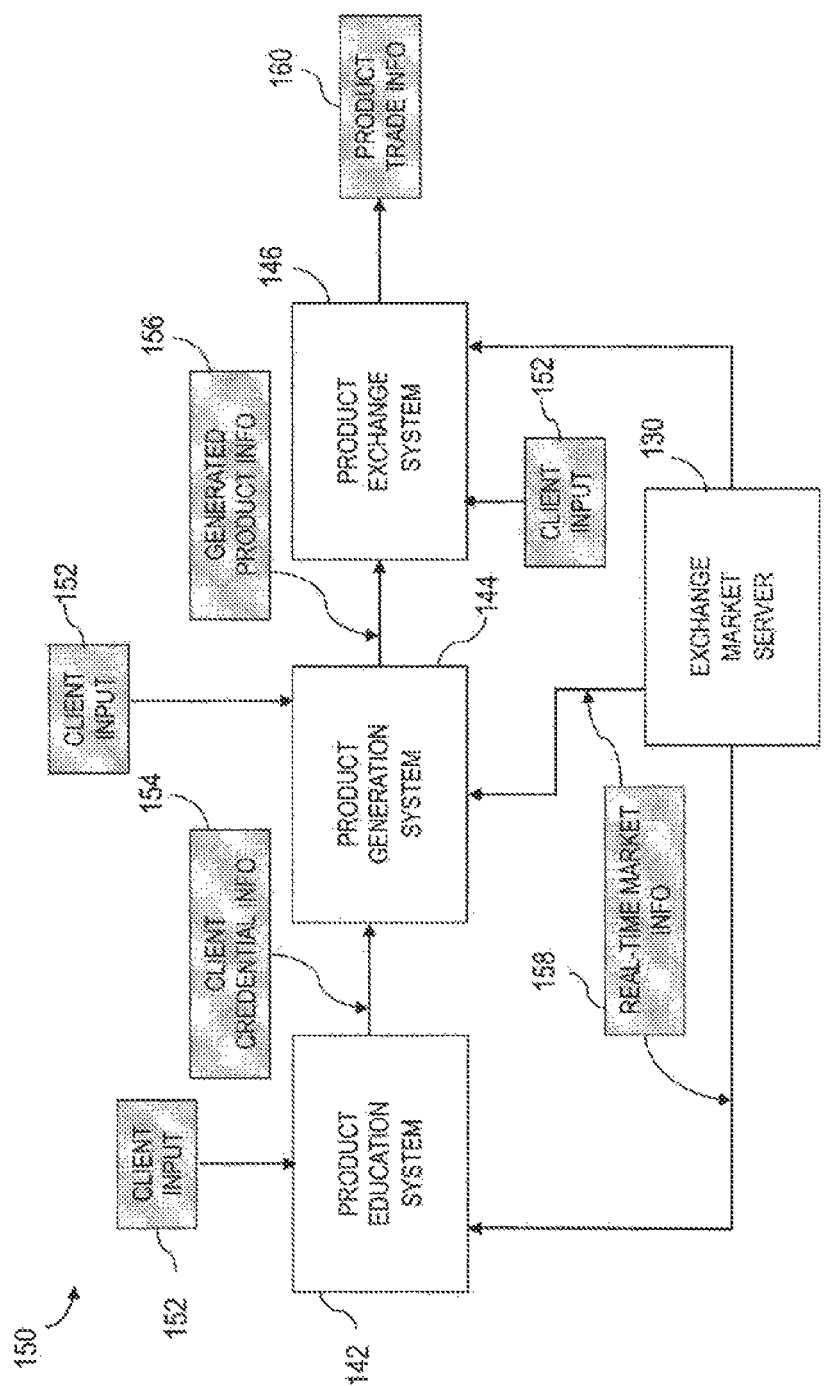
FIG. 1B is a data flow diagram illustrating an exchange of data between various components of the electronic platform.

Thus, the various systems of the electronic platform 140 may utilize information from one another when determining whether to provide certain functionality to a user of the electronic platform 140. FIG. 1B is a data flow diagram 150 illustrating an exchange of data between various components of the electronic platform 140.

As shown in FIG. 1B, the product education system 142 may receive client input 152 from the client device 110, such as user input, and generate client credential information 154 for the user that provided the input. For example, the product education system 152 may receive client input 152 indicating a selection of an online course for a specific investment product, provide a first course section that presents information to the user based about the specific investment products, provide a second course section that presents a quiz to the user that is based on the information presented to the user and/or based on real-time market information 158 provided by the exchange market server 130, and assign the user with a credential to trade the specific investment product on the electronic platform 140 in response to a successful taking of the presented quiz by the user.

The product generation system 144 may receive or access the client credential information 154, and build or generate investment products on behalf of the user. For example, the product generation system 144 may utilize the real-time market information 158 provided by the exchange market server 130 and/or client input 152 provided by the user, and select and/or build investment products for the user.

The product exchange system 146 may receive generated product information 156 that provides information about investment products generated and/or selected for the user, and generate product trade information for the generated investment products. For example, the product exchange system 146 may utilize the real-time market information 158 provided by the exchange market server 130 and/or client input 152 provided by the user, and generate product trade information to be provided to marketplaces established by the electronic platform and/or to be analyzed by the electronic platform, to be reviewed (e.g., crowdsourced) by other users of the electronic platform 140, and so on.

The electronic platform, therefore, may perform operations for providing a computing environment for trading structured investment products, including generating tradable investment products in response to product request information received from a user of the electronic platform 140, providing online courses associated with the tradable investment products to the user of the electronic platform 140 based on credentials assigned to the user of the electronic platform 140, and establishing information exchange events between the user of the electronic platform 140 and other users of the electronic platform 140 that are associated with tradable investment products generated for the user of the electronic platform 140.

Thus, the various systems of the electronic platform 140 may exchange information between one another in order to provide users with customized investment products that are based on real-time or current trading market conditions, up-to-date educational information associated with the investment products, and exchange environments that facilitate trading of the investment products, among other benefits.

Examples of the Product Education System

As described herein, in some embodiments, the electronic platform 140 includes the product education system 142, which provides tools and resources for certifying users (e.g., financial advisors) on investment products, and enables certification-based trading of investment products via the electronic platform 140. The product education system 142 may monitor information relating to each user's training activities and certifications earned on investment products. The product education system 142 may automatically approve or deny a trade request submitted by a user based on credentials assigned to the user, and/or may generate and send a trade request, along with information indicating the user's certification progress on an investment product associated with the trade request, to a manager or supervisor for approval. The manager or supervisor may then accept or reject the trade request based on the certification progress and/or other information.

The product education system 142 may track each user's certification progress, including the training items consumed, quizzes passed/failed and so on. Such tracking may enable a manager or supervisor to simply select a user's name from a management dashboard to see which investment products the user has or has not received certifications, and/or may enable the manager to view progress at the group level. For example, the manager may view how many users in his or her group have started, not started and/or completed their certifications for each product type directly from the management dashboard. In this manner, the manager may readily obtain an overview of the certification progress of users from the management dashboard.

The product education system 142 may also manage a user's ability to trade an investment product, such as by managing trading that is dependent on the user's certification progress on the investment product. For example, the product education system 142 may deny a user to trade an investment product via the electronic platform 140, unless the user has earned a certification on the investment product. Thus, the product education system 142 may enable the electronic platform 140 to facilitate orders for trades that are submitted by qualified financial advisers who have the required training and expertise on such investment products, which can range from commonly traded products (such as bonds) to complex structured investment products (such as buffered notes).

FIG. 2 is a block diagram illustrating components of the product education system 142. The product education system 142 may include one or more modules and/or components to perform one or more operations of the product education system 142. The modules may be hardware, software, or a combination of hardware and software, and may be executed by one or more processors. For example, the product education system 142 may include a training module 210, a certification module 220, and a management module 230.

In some embodiments, the training module 210 is configured and/or programmed to provide users, such as financial advisors, with education and training materials on various investment products, and track progress made by each user in consuming those materials. For example, the training module 210 may provide various certification tracks, each of which may include a set of education and training materials (e.g., videos, articles, and so on) for consumption.

In some embodiments, the certification module 220 is configured and/or programmed to assess the user's knowledge on the consumed education and training materials by presenting a quiz including a collection of questions (e.g., multiple choice questions). Based on the user's responses to the questions, and one or more rules, the certification module 220 may certify a user to trade an investment product. For example, when a user answers 90% of the questions in a quiz associated with a certification track (e.g., general training, buffered notes, and jump notes), the certification module 220 may certify the user for the certification track.

In some embodiments, the management module 230 is configured and/or programmed to provide various tools for tracking or reviewing certification status or progress for all or a group of users, and approve pending orders of investment products placed by users based on the certification status of the users on the investment products.

Figure 3:
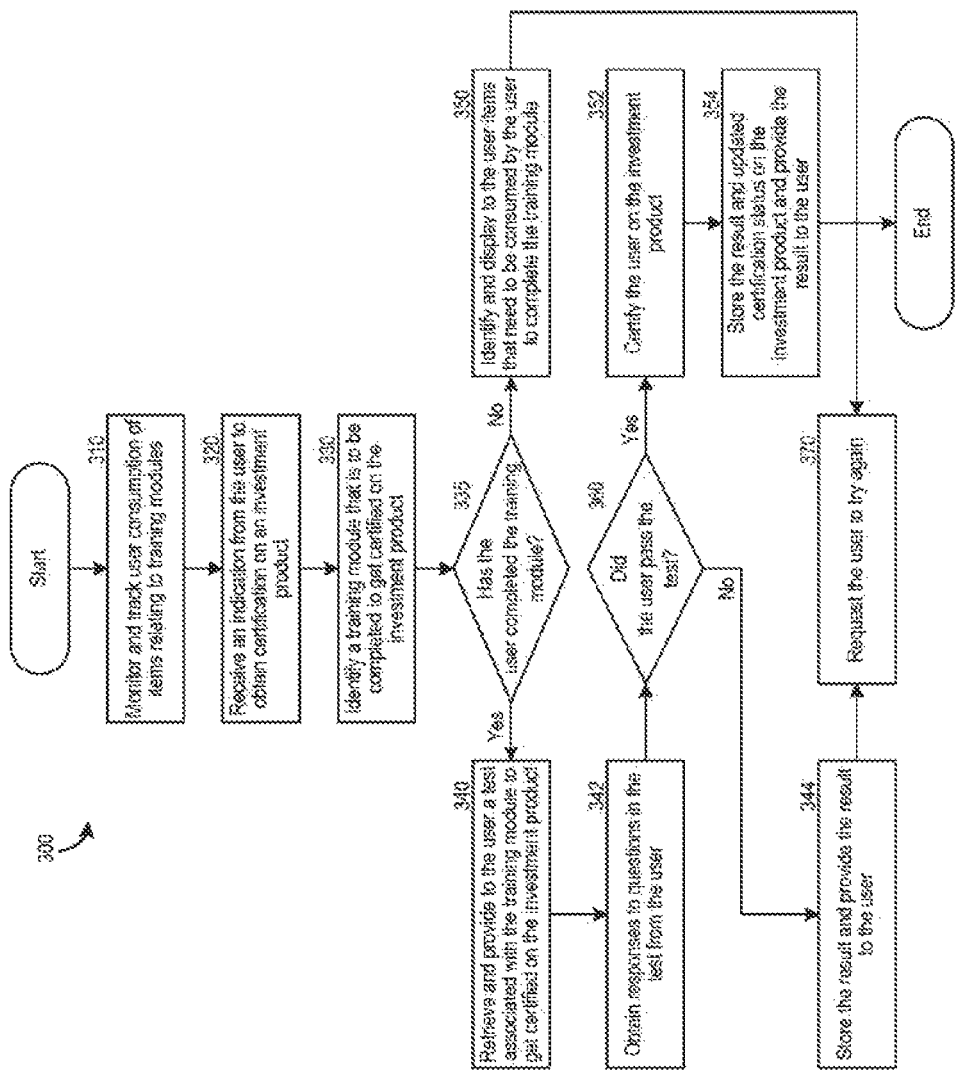
FIG. 3 is a flow diagram illustrating a method for certifying a user of the electronic platform to trade certain investment products provided by the electronic platform.

As described herein, the product education system 142 may perform various operations, processes, and methods when credentialing users and/or determining whether user are to trade investment products via the electronic platform 140. FIG. 3 is a flow diagram illustrating a method 300 for certifying a user of the electronic platform to trade certain investment products provided by the electronic platform. The method 300 may be performed by the product education system 142 and, accordingly, is described herein merely by way of reference thereto. It will be appreciated that the method 300 may be performed on any suitable hardware.

In operation 310, the product education system 142 monitors and tracks a user's progress in completing items related to a training module. In operation 320, the product education system 142 receives an indication from a user to obtain certification on an investment product (e.g., a jump note). In operation 330, the product education system 142 identifies the training module for the investment product selected or identified by the user, which may include videos, articles, and so on, to be completed by the user to receive certification on the investment product.

In operation 335, the product education system 142 determines whether the user has completed the training module. When the user has not completed the training module, the product education system 142, at operation 350, identifies a list of items of the training module that remain to be reviewed, and displays the list to the user.

When the user has completed the training module, the product education system 142, at operation 340, presents the user with a test based on the completed training module (which the user should pass in order to receive certification for the investment product). For example, the training module may include a first course section that presents information to the user based on investment products of interest to the user and capable of being generated by the product generation system 144; and a second course section that presents a quiz, to the user that is based on the information presented to the user.

In operation 342, the product education system 142 receives the user's answers to the questions in the test, and reviews the user's answers to the test. In operation 360, the product education system 142 determines whether the user passes the test. When the product education system 142 determines the user has not passed the test (e.g., has not provided a sufficient number of correct answers), the product education system 142, in operation 344, stores the test result and presents it to the user, and, in operation 370, requests the user to review the training module and retake the test, or another test based on the training module.

When the product education system 142, in operation 360, determines the user has passed the test (e.g., has provided a sufficient number of correct answers), the product education system 142, in operation 352, grants certification to the user and, in operation 354, stores the test result and presents it to the user.

FIG. 4 is a flow diagram illustrating a method 400 for performing a trade of an investment product based on credentials attributed to a user of the electronic platform. The method 400 may be performed by the product education system 142 and, accordingly, is described herein merely by way of reference thereto. It will be appreciated that the method 400 may be performed on any suitable hardware.

In operation 410, the product education system 142 receives a request from a user, such as a financial advisor, to process a trade on an investment product (e.g., a jump note). In operation 430, the product education system 142 determines whether the user meets a certification criterion for the investment product.

When the user does not meet a certification criterion (e.g., was not certified to trade the product), the product education system 142, in operation 440, denies the user's request and informs the user of the need to receive a certification on the investment product by completing necessary training modules. When the user does meet a certification criterion, the product education system 142, in operation 435, approves the request and processes the trade on the investment product.

Alternatively, after receiving, in operation 410, the request to trade an investment product, the product education system 142, in operation 420, displays information about the users request and certification status to a manager, who may then make a decision as to whether to approve or disapprove the request.

In operation 450, the product education system 142 determines whether the manager approves or disapproves the request based on a response from the manager. When the request is not approved, the product education system 142, in operation 460, notifies the user that the order cannot be processed. When the request is approved, the product education system 142, in operation 435, allows the trade to be processed.

As described herein, the product education system 142 may provide, present, display, and/or cause to be displayed various different graphical user interfaces to a user of the client device 110 in order to facilitate the reception of input from the user and present information (e.g., training or other educational information) to the user, among other things.

Figure 5A:
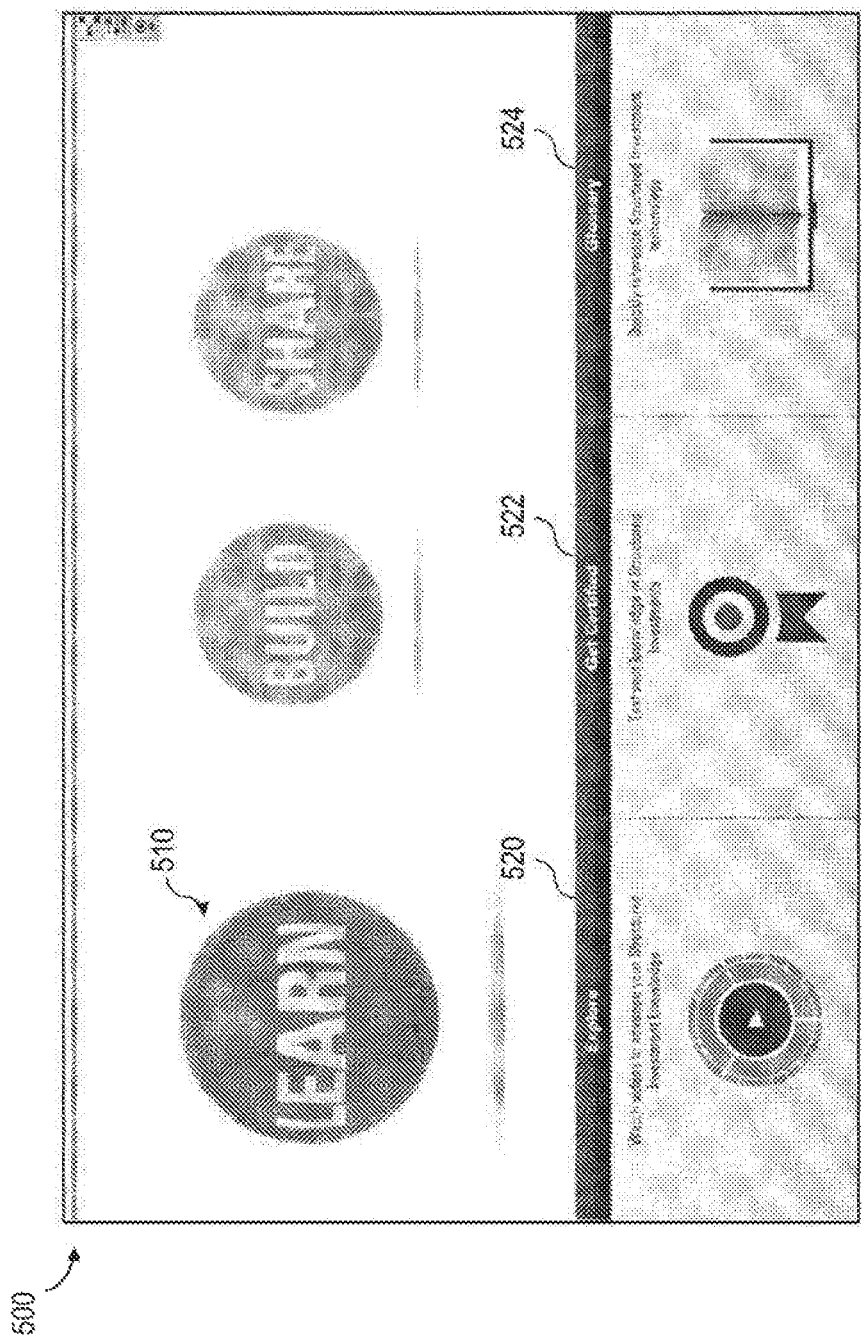
FIGS. 5A-5F are display diagrams illustrating example user interfaces provided by the product education system.

FIG. 5A depicts a user interface 500 that display, different functions provided by the electronic platform 140, including a "learn" function, represented by display element 510, that is associated with functionality provided by the product education system 142. Upon receiving a user selection of display element 510, the user interface 500 presents various user-selectable display elements, each associated with different functions provided by the product education system 142. For example, the user interface 500 displays an "explore" display element 520 that is associated with the electronic platform 140 presenting education information to the user about various investment products, a "get certified" display element 522 that is associated with the electronic platform 140 presenting online courses or seminars for various investment products tradable over the electronic platform 140, and "glossary" display element 524 that is associated with the electronic platform 140 presenting reference information.

Figure 5B:
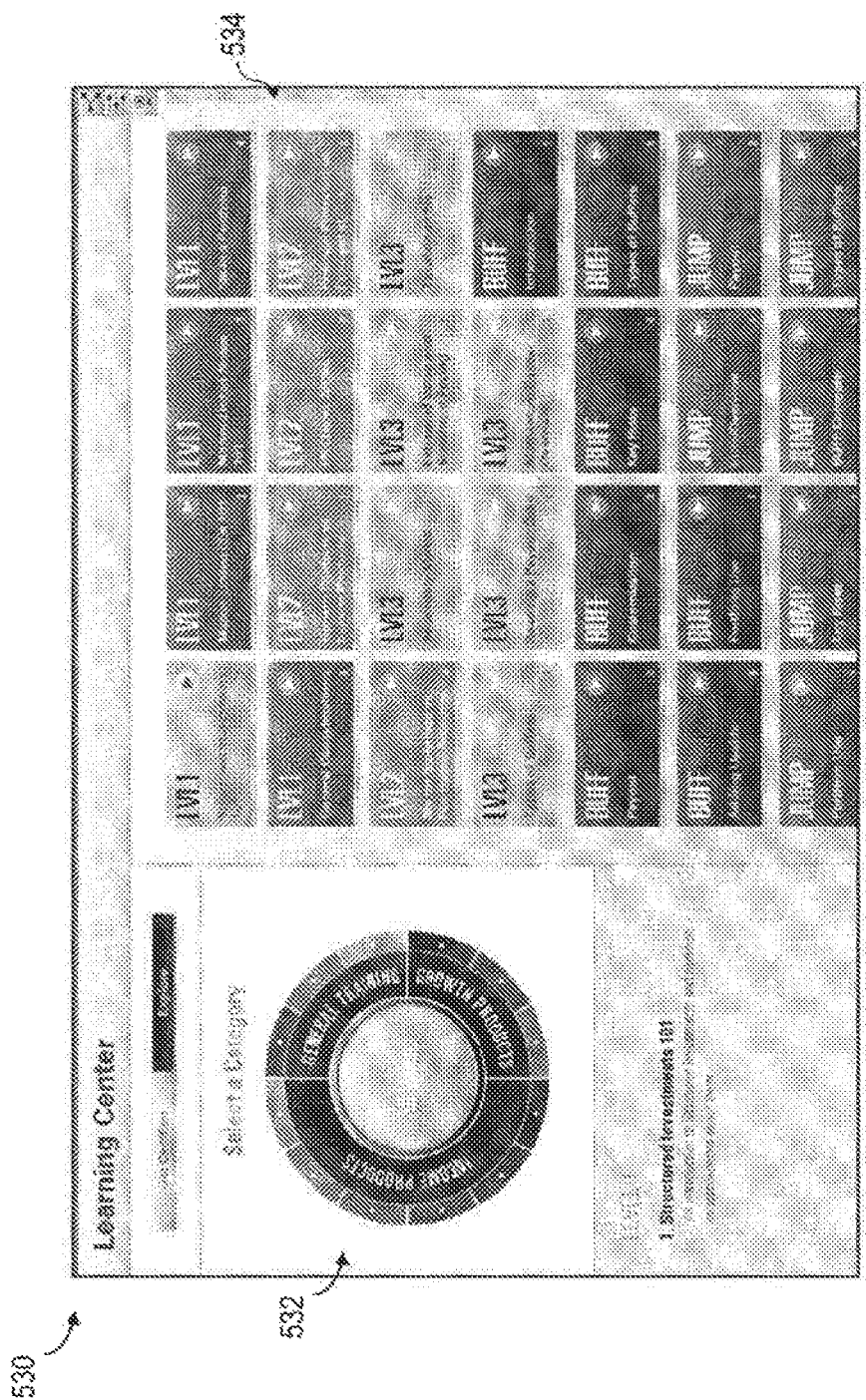

FIG. 5B depicts a user interface 530 that presents information associated with the "Explore" functions provided by the electronic platform 140. For example, the user interface 530 presents different user-selectable information categories 532 and various user-selectable training videos 534 for various certification tracks, such as levels and product types (e.g., buffer notes, jump notes, level 1, level 2 and level 3), among other tracks.

Figure 5C:
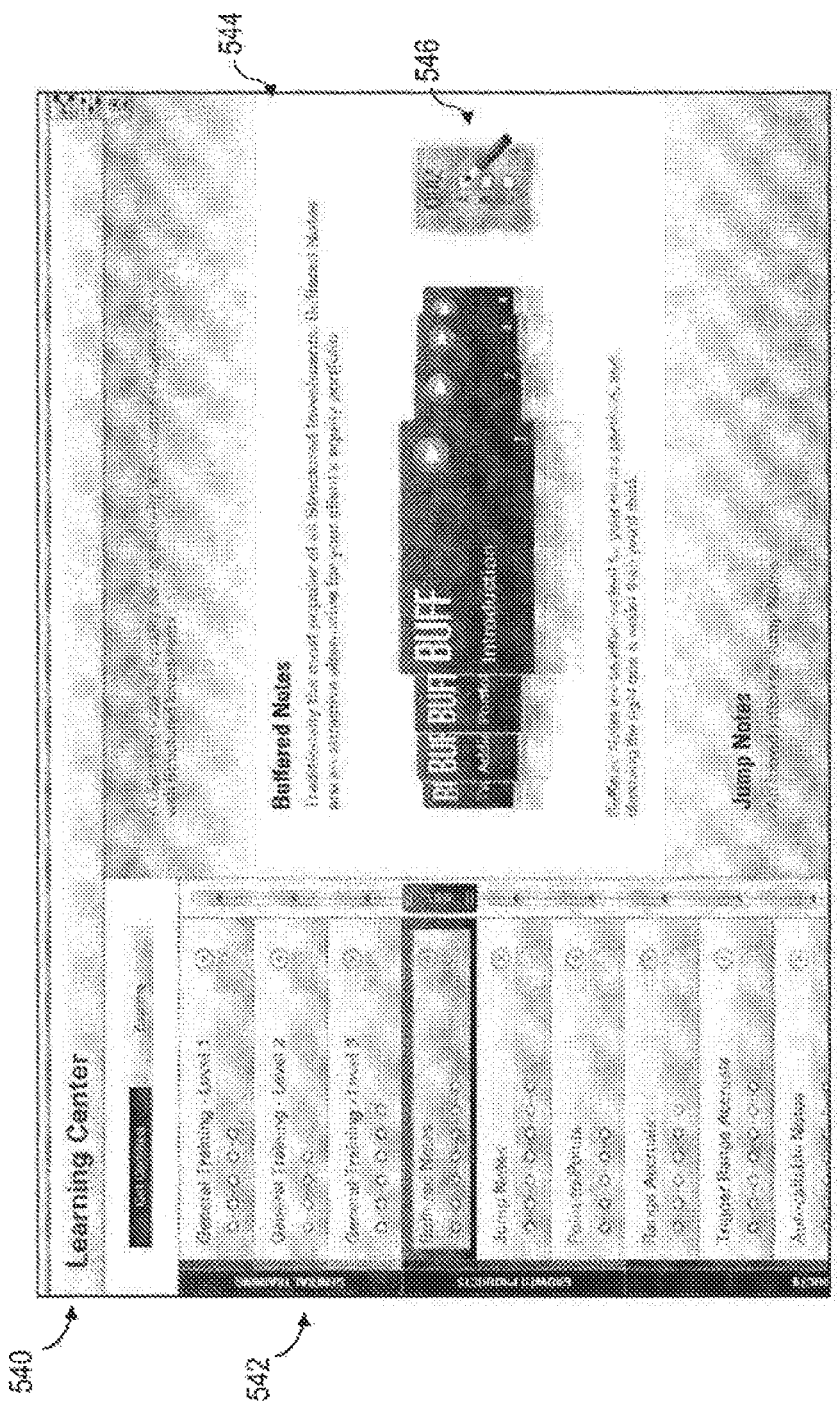

FIG. 5C depicts a user interface 540 that presents information associated with the "Get Certified" functions provided by the electronic platform 140. For example, the user interface 540 presents different user-selectable certification categories 542, such as "General Training." "Income Products," and "Growth Products." as well as certification tracks (e.g., training levels, specific types of products). The user may select any of the categories and certification tracks to see training contents (e.g., videos, notes, articles) necessary for that level of certification. The user interface 540 displays information 544 about a selected certification track ("buffered notes"), as well as a user-selectable display element 546, which, when selected, prompts the electronic platform to present a quiz or test associated with the selected certification track.

Figure 5D:
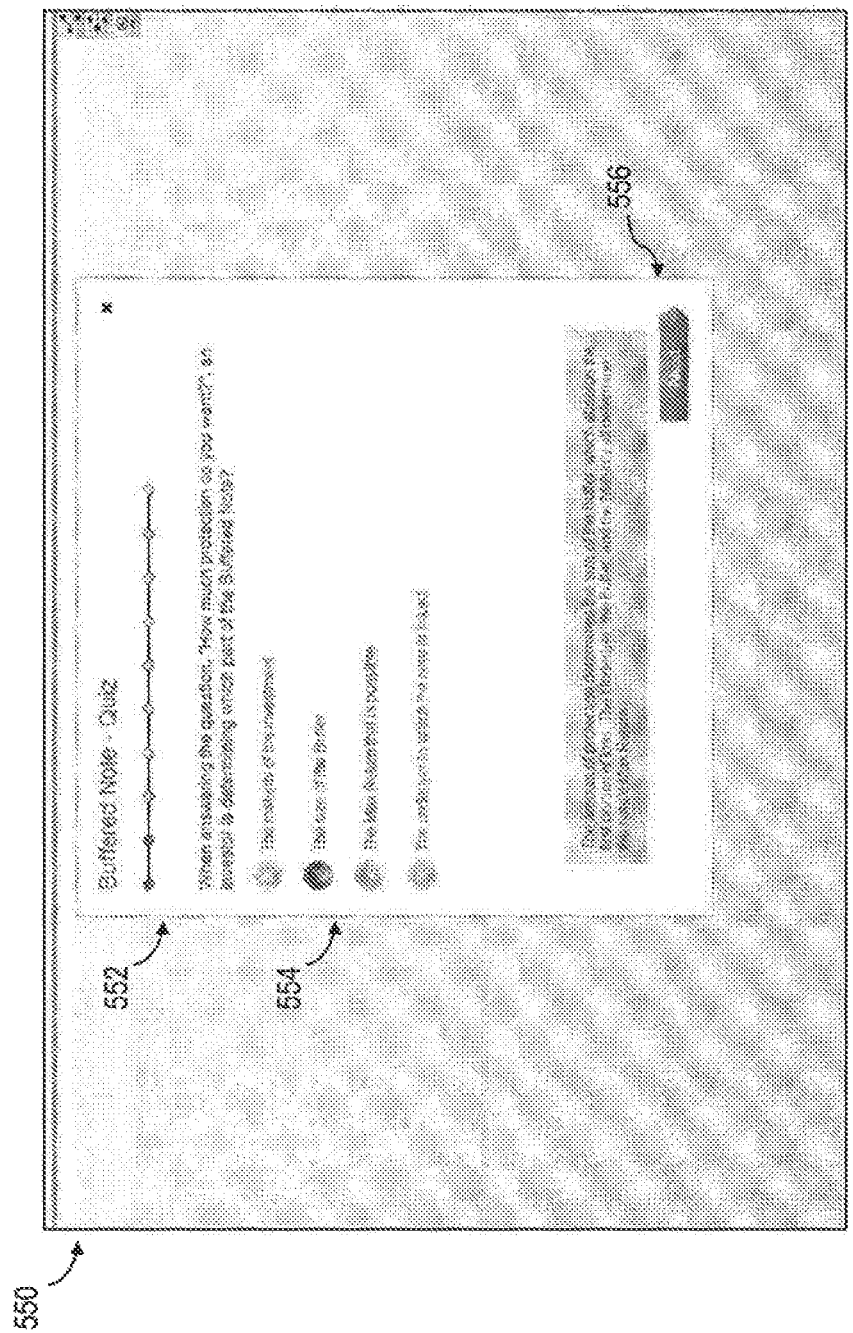

FIG. 5D depicts a user interface 550 that presents an example quiz associated with a selected certification track, including a question portion 552, a user-selectable answer portion 554, and an answer submittal portion. As described herein, once the user reviews all the relevant training contents for the chosen track, the user is presented with a quiz, or collection of questions, to get certified for the track. The certification questions may be a multiple-choice type questions, and may include a text area for the question text, a collection of radio buttons for possible answers, and a button that, when clicked, submits the selected answer.

Figure 5E:
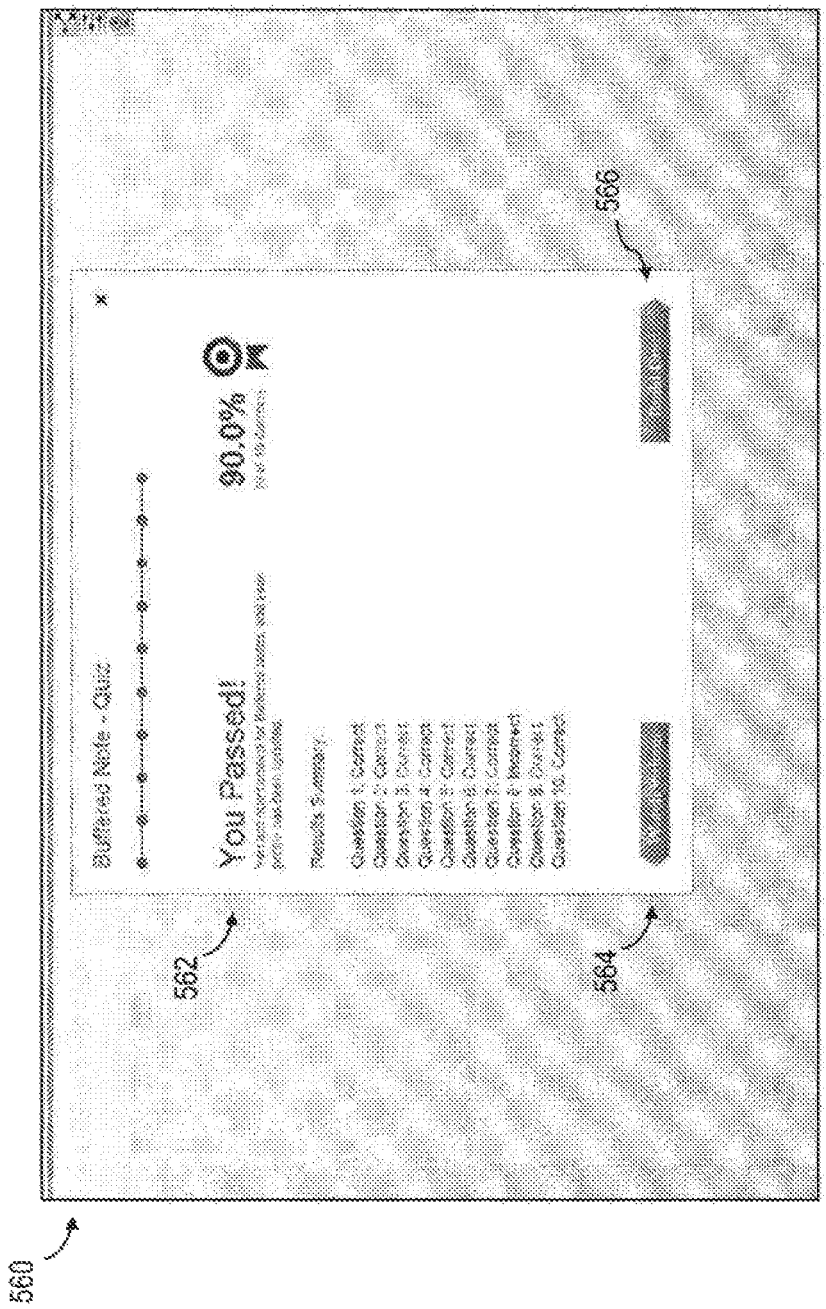

FIG. 5E depicts a user interface 560 that presents the results of a quiz taken by the user. For example, the user interface 560 displays information 562 that indicates whether the user passed the quiz, and is certified for the track, and information 564 detailing the results for each question in the quiz. Once the user completes the certification, the certification status may appear on the user's profile page, and in some embodiments, the user's manager may also receive an update regarding the certification on his or her management dashboard.

The user interface 560 also displays a user-selectable display element 560 associated with building investment products associated with the user's new certification. For example, once the user is certified, the user may select display element 560, which causes the electronic platform 140 to navigate the user to the product generation system 144 (and its various user interfaces) to being building and trading investment products via the electronic platform 140 for which the user is newly credentialed.

Figure 5F:
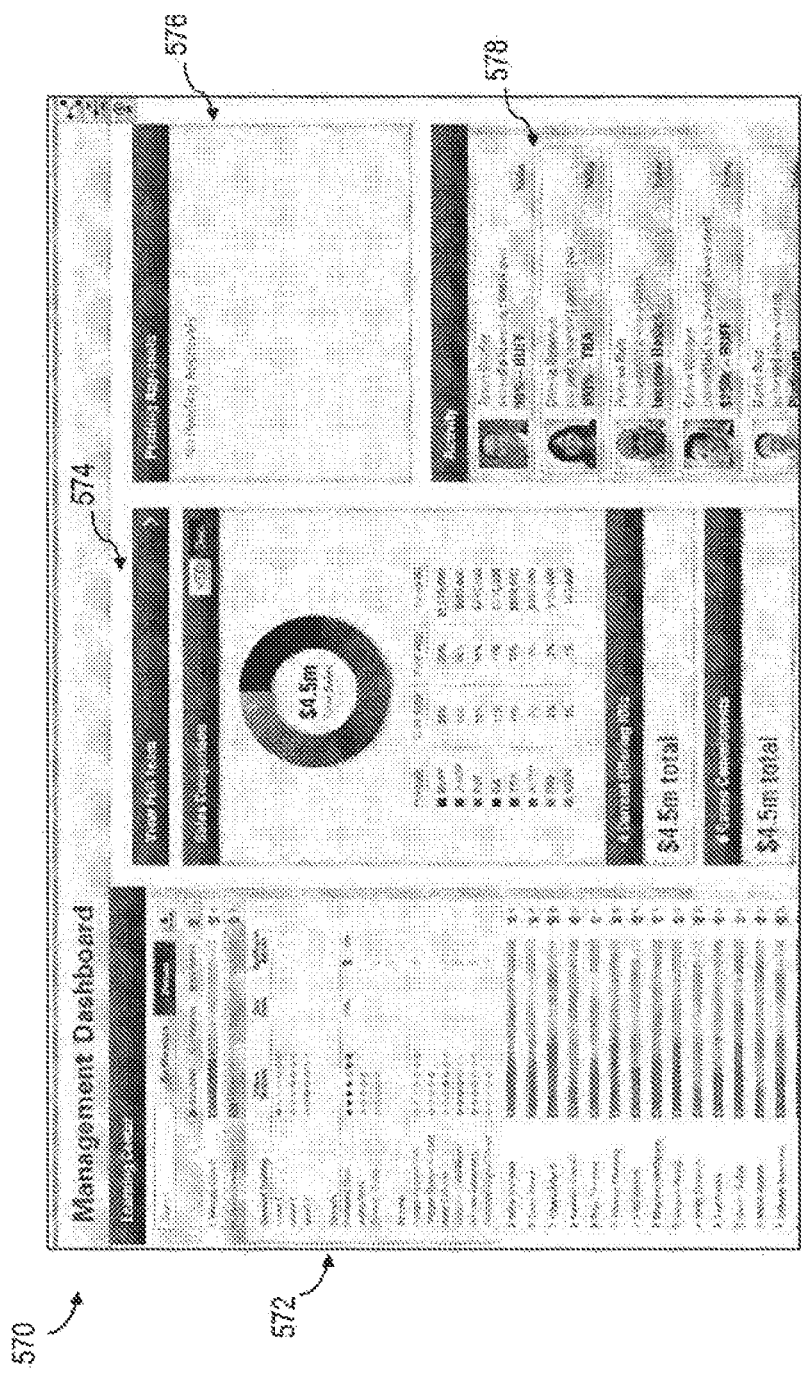

FIG. 5F depicts a management dashboard 570 for a manager or an admin user to view certification progress metrics across all relevant product types for all the users in the manager's group. In some embodiments, from the management dashboard 570, the manager may view certification progress by user in the "Learning Center" area 572 and click on an individual user's name to see which product types that individual has or has not received certifications.

The manager may also select a particular course or product type that an individual user has taken to see a list of all quizzes taken for that course by the user. The manager may then drill down into a particular quiz to see how the user performed on the quiz and which questions were answered correctly/incorrectly by the user. The manager can also view progress by product type to see how many people in the group have not started or completed their certifications for each product type. The management dashboard also contains a "View Full Team" area 574, which allows the manager to see a list of all users in the manager's group or team. The manager may see the users who are currently logged in, users who have and users who have not activated their accounts, and so on. The manager may send a message to invite the users who have nor activated their account to do so.

In some embodiments, the management dashboard 570 may include an "Activity" area 578 for displaying an activity feed. The activity feed may provide updates regarding various activities of the users in the manager's team. Such activities may include, for example, certification-related or training activities (e.g., watching a training video, taking a quiz), trading activities, and so on.

In some embodiments, the management dashboard 570 also includes a "Pending Approvals" area 706 for displaying pending approvals or other unresolved action requests (e.g., Indication of Interest (IOI), requested trades) so the manager may approve or decline the requests. The manager may select any of the displayed action requests to view details of the request and approve or decline the request, such as a trade on a product type submitted by a user in the manager's team. The manager may view the user's certification metrics to determine whether the user is certified and thus qualified to trade on the product type. For example, if the user is certified for the product type, the manager may approve the trade. Similarly, if the user is not yet certified for the product type, the manager may decline the trade, and the electronic platform 140 may send a request to the user to get certified in order to submit the trade.

Thus, in some embodiments, the product education system 142 may receive a request from a user to trade an investment product, identify a training module associated with a certification program provided by the electronic platform and associated with trading the investment product via the electronic platform, present the training module to the user, determine whether the user has completed the training module, when the determining indicates that the user has completed the training module, identify a test corresponding to the training module, present the test to the user, determine whether the user has passed the test, and certify the user to trade the investment product when the user has passed the test.

Examples of the Product Generation System

As described herein, in some embodiments, the electronic platform 140 includes the product generation system 144, which discovers, selects, builds, creates, modifies, and/or generates investment products based on various decision-tree analysis methods. For example, the product generation system 144 may utilize a decision tree and pricing data to classify investment products against a set of predefined questions, based on answers to those questions. The product generation system 144 presents a series of questions to a user to assess the user's investment objectives, risks, and/or other considerations, and identifies one or more investment products that meet those investment objectives, risks, and/or other considerations. Often, a list of investment products for classification and subsequent discovery or generation is not fixed, but rather changes dynamically based on current pricing data, such as data received from the exchange market server 130. In some embodiments, the product generation system 144 may determine pricing information for investment products using one or more pricing models and current pricing conditions.

In some embodiments, the product generation system 144 may incorporate user input. For example, each question in the series of questions may be selected based on the user's answer to the previous question, and each answer reduces a potential list of applicable investment products. Also, the product generation system 144 may utilize current pricing data, which enables the product generation system 144 to filter out potential investment products that cannot be priced given the investment objectives, risks and/or other considerations. Thus, by using the product generation system 144 provided by the electronic platform, a user may discover or generate one or more financial products that not only match the investment objectives, risks and/or other considerations specified by the user, but are also priced based on current market conditions. In some embodiments, the product generation system 144 may discover off-the-shelf investment products, may customize products for users, and/or may create combinations of off-the-shelf investment products and customized investment products.

Figure 6:
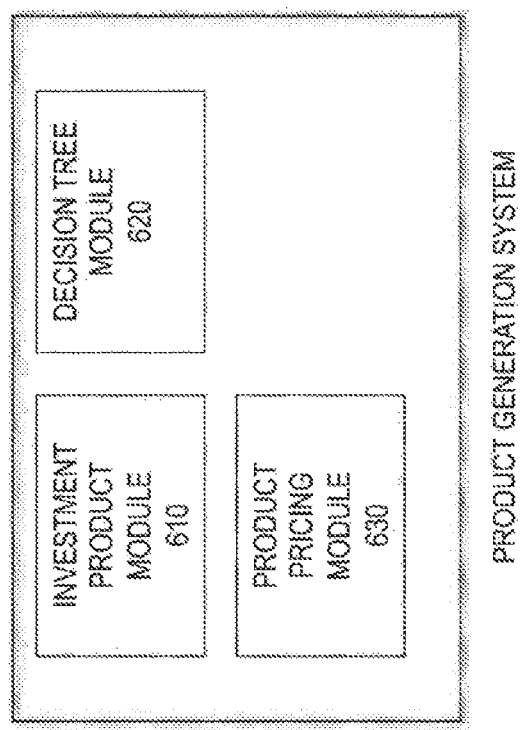
FIG. 6 is a block diagram illustrating components of a product generation system.

FIG. 6 is a block diagram illustrating components of the product generation system 144. The product generation system 144 may include one or more modules and/or components to perform one or more operations of the product generation system 144. The modules may be hardware, software, or a combination of hardware and software, and may be executed by one or more processors. For example, the product generation system 144 may include an investment product module 610, a decision tree module 620, and a product pricing module 630.

In some embodiments, the investment product module 610 is configured and/or programmed to maintain a list of investment product classifications, each associated with one or more investment product categories or classes, an updated list of investment products, and an updated list of assignments of investment products to investment product categories. In some embodiments, each classification is associated with multiple investment product classes. For example, a classification may be the investment objective, and one associated class may be growing assets and another associated class may be earning income on assets. As another example, a classification may be the level of risk tolerance, and one associated class may be small, another associated class may be medium, and yet another class may be large.

In some embodiments, the decision tree module 620 is configured and/or programmed to guide a user in traversing a decision tree built on investment product classifications to discover and identify investment products of interest to the user. For example, the decision tree module 204 manages user selections of investment product categories, and interacts with the investment product module 610

In some embodiments, the product pricing module 630 is configured and/or programmed to generate updated pricing data associated with investment products using one or more pricing models, and/or access other pricing model systems for updated pricing information. For example, the decision tree module 620 may utilize updated or current pricing information when discovering and identifying investment products of interest to the user.

Figure 7:
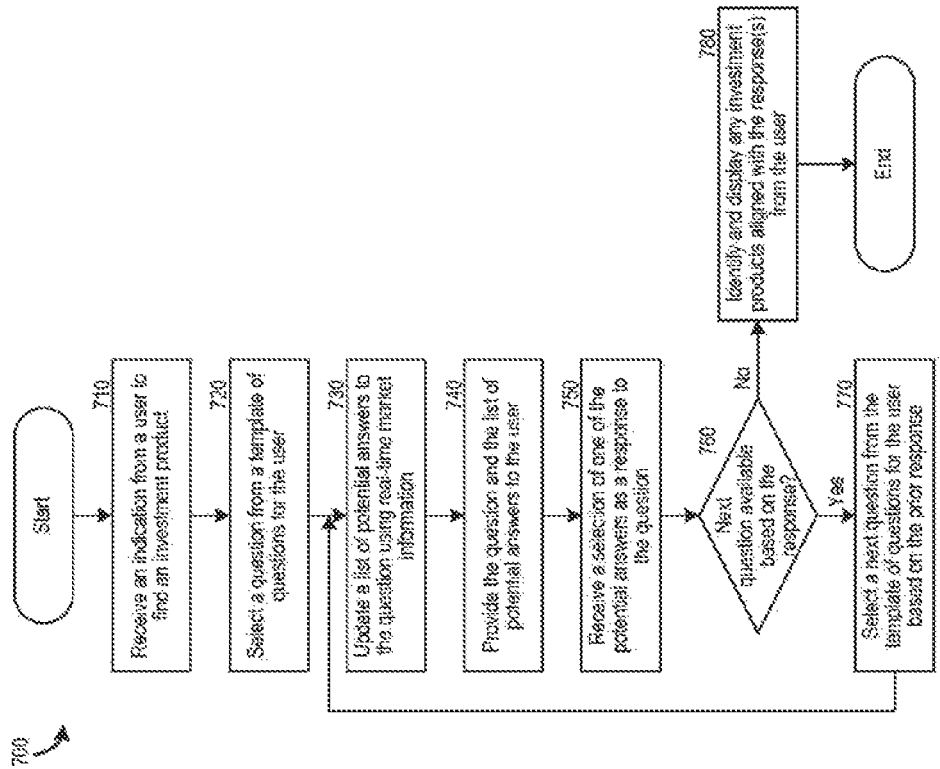
FIG. 7 is a flow diagram illustrating a method for selecting an investment product based on information provided by a user of the electronic platform.

As described herein, the product generation system 144 may perform various operations, processes, and methods when selecting and/or generating user investment products for users via the electronic platform 140. FIG. 7 is a flow diagram illustrating a method 700 for selecting an investment product based on information provided by a user of the electronic platform 140. The method 700 may be performed by the product generation system 144 and, accordingly, is described herein merely by way of reference thereto. It will be appreciated that the method 700 may be performed on any suitable hardware.

In operation 710, the product generation system 144 receives an indication from a user to find a suitable investment product. In operation 720, the product generation system 144 selects a question to present to the user. In operation 730, the product generation system 144 updates a list of potential answers to the question based on real-time market condition information, such as information received from the exchange market server 130.

In operation 740, the product generation system 144 provides the question and the updated list of answers to the user, and, in operation 750, receives a selection of one of the answers from the user. In operation 760, the product generation system 144 determines whether more questions are to be presented to the user. When more questions are to be presented, the product generation system 144, in operation 770, selects a next question to present to the user, and proceeds to operation 730 for the next selected question. When no more questions are to be presented, the product generation system 144, in operation 780, identifies and displays any investment products that include parameters that satisfy responses received from the user.

Thus, in some embodiments, the product generation system 144 selects a structured investment product for a user of the electronic platform 140 by receiving, via a graphical user interface provided by the electronic platform 140, information from a user, the information including: information associated with a user's investment criteria, information associated with a user's risk tolerance, information associated with a user's investment horizon, information associated with a user's desired investment market, and/or information associated with a user's level of investment protection, determines real-time or near real-time conditions of the investment market, and selects one or more structured investment products based on the information received from the user and based on the real-time or near real-time conditions of the investment market.

Figure 8:
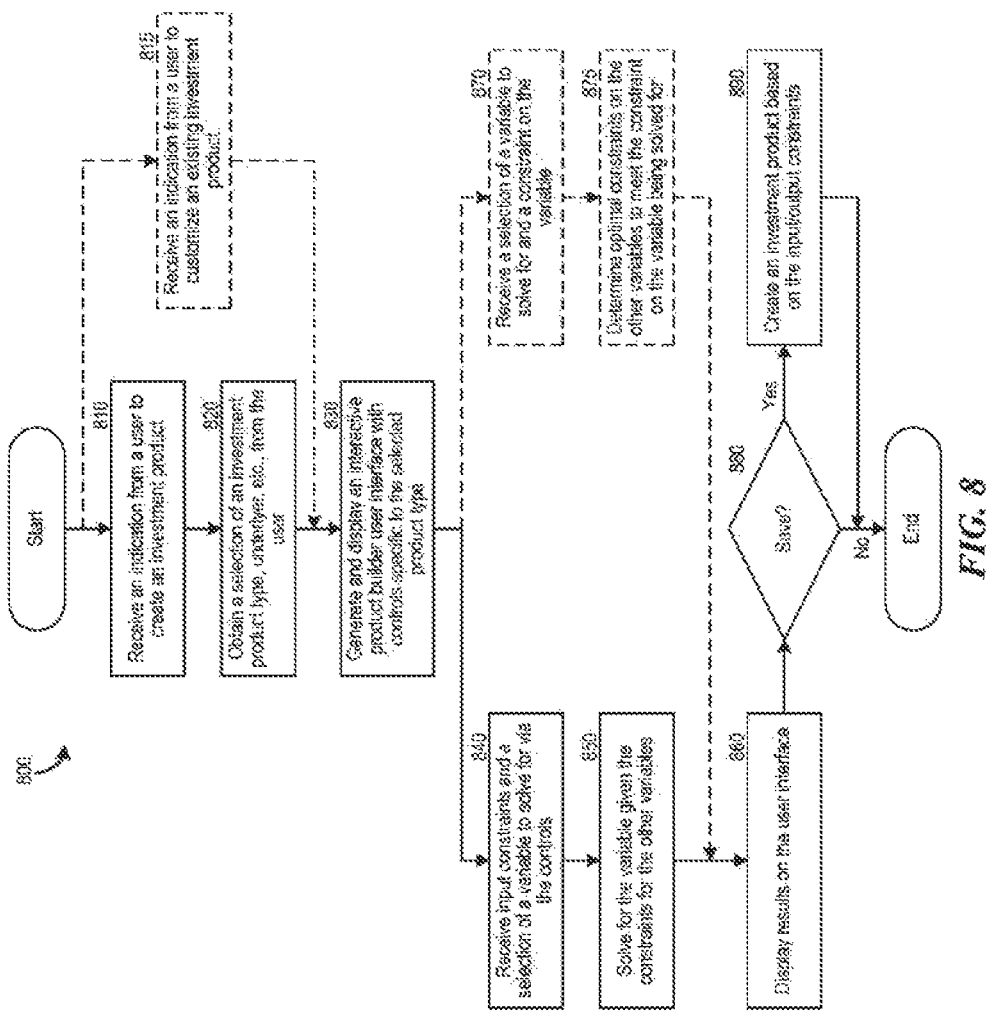
FIG. 8 is a flow diagram illustrating a method for building an investment product based on information provided by a user of the electronic platform.

FIG. 8 is a flow diagram illustrating a method 800 for building an investment product based on information provided by a user of the electronic platform. The method 800 may be performed by the product generation system 144 and, accordingly, is described herein merely by way of reference thereto. It will be appreciated that the method 800 may be performed on any suitable hardware.

In operation 810, the product generation system 144 receives an indication from a user to create an investment product. Alternatively, the product generation system 144 may, in operation 815, receive an indication from a user to customize an existing investment product.

In operation 820, the product generation system 144 obtains a selection of an investment product type (or underlayer) from the user, and in operation 830, generates a user interface that is configured to generate an investment product of the selected type. In operation 840, the product generation system 144 receives input constraints and a variable to solve for via one or more user-selectable controls of the user interface. In operation 850, the product generation system 144 solves for the variable given the input constraints, and, in operation 860, display results of the solution via the user interface.

Alternatively, in operation 870, the product generation system 144 receives a selection of a variable to solve for, and a constraint on the variable, and in operation 875, determines optimal constraints on the other variables to meet the constraint on the variable to solve for. In operation 880, the product generation system 144 determines whether to save the result, and when the result is to be saved, the product generation system 144, in operation 890, creates an investment product based on the input/output constraints.

Figure 9:
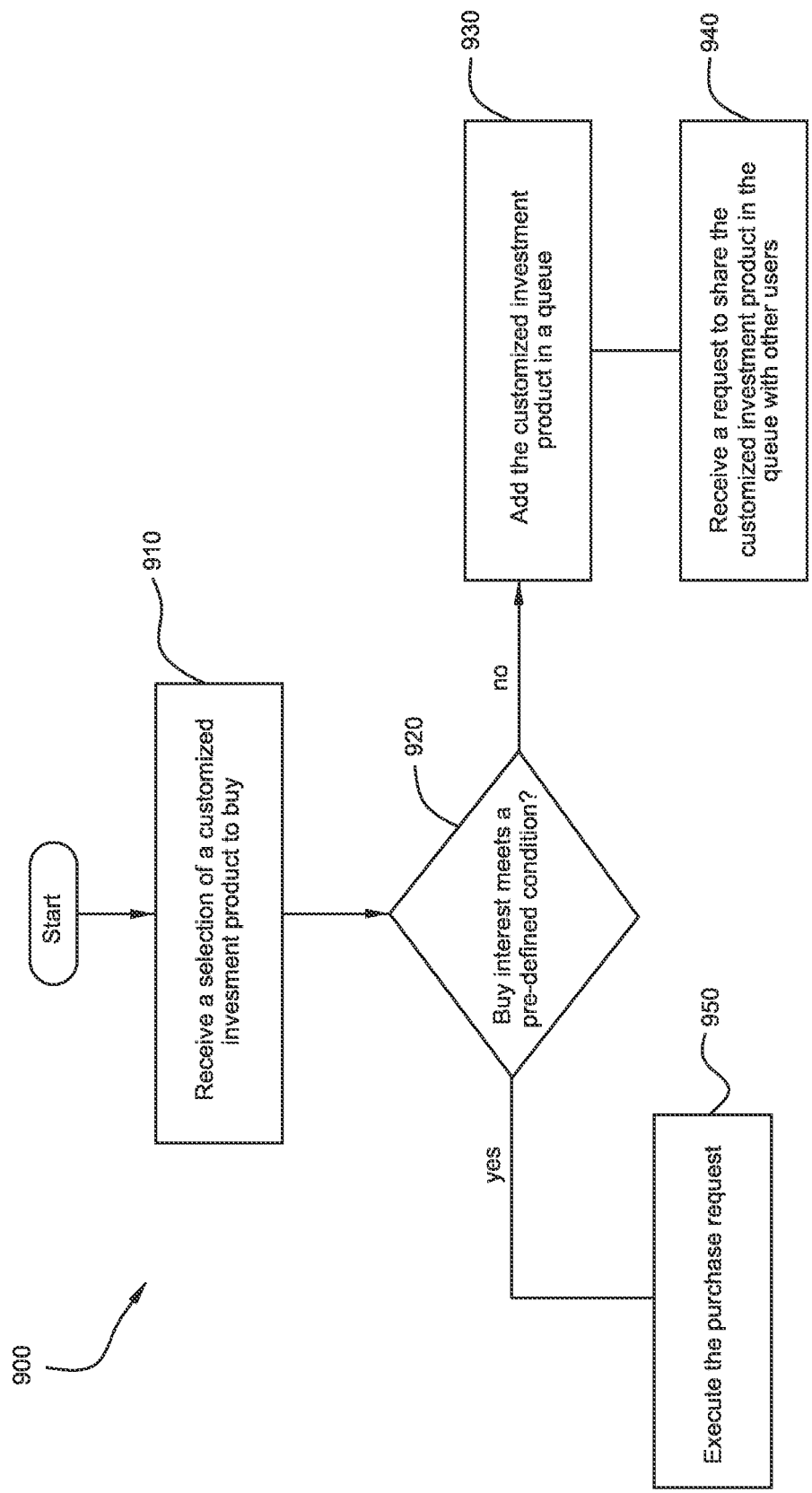
FIG. 9 is a flow diagram illustrating a method for providing a custom investment product to a user of the electronic platform.

In some embodiments (details of which are described herein), the product generation system 144 may utilize information from the product exchange system 146 when customized products for users. FIG. 9 is a flow diagram illustrating a method 900 for providing a custom investment product to a user of the electronic platform. The method 900 may be performed by the product generation system 144 and, accordingly, is described herein merely by way of reference thereto. It will be appreciated that the method 900 may be performed on any suitable hardware.

In operation 910, the product generation system 144 receives a selection of a customized investment product to trade. In operation 920, the product generation system 144 determines whether the buy interest meets a pre-defined trading condition. When the interest meets the condition, the product generation system 144, in operation 950, executes a trade request for the product, else, in operation 930, the product generation system 144 adds the customized investment product into a queue and, in operation 940, receives a request to share the investment product in the queue with other users.

As described herein, the product generation system 142 may provide, present, display, and/or cause to be displayed various different graphical user interfaces to a user of the client device 110 in order to facilitate the reception of input from the user and present information associated with selecting or generating investment products to the user, among other things.

Figure 10A:
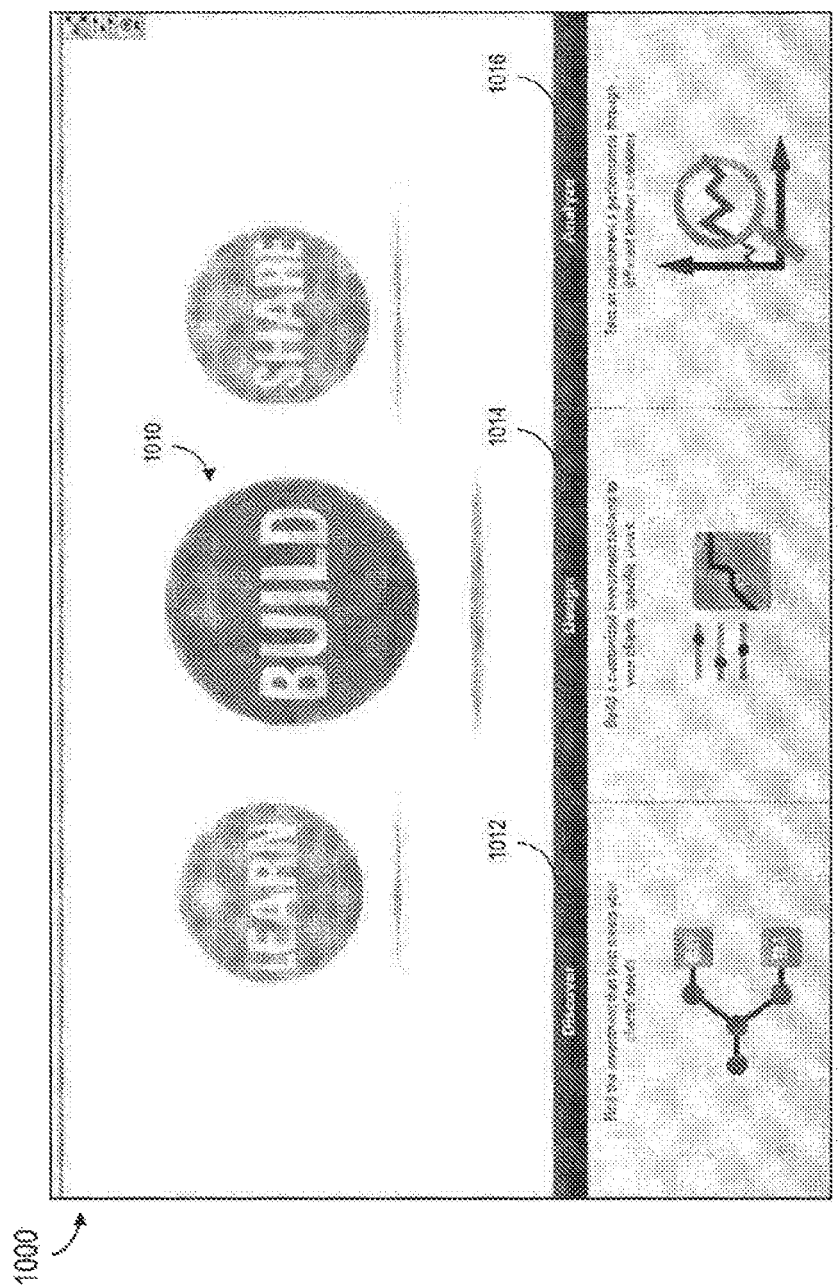
FIGS. 10A-10K are display diagrams illustrating example user interfaces provided by the product generation system.

FIG. 10A depicts a user interface 1000 that displays different functions provided by the electronic platform 140, including a "build" function, represented by display element 1010, that is associated with functionality provided by the product generation system 144. Upon receiving a user selection of display element 1010, the user interface 1000 presents various user-selectable display elements, each associated with different functions provided by the product generation system 144. For example, the user interface 1000 displays a "discover" display element 1012 that is associated with the electronic platform 140 discovering investment products for a user, a "design" display element 1014 that is associated with the electronic platform 140 creating, building, or otherwise generating investment products for a user, and an "analyze" display dement 1014 that is associated with the electronic platform 140 performing various analysis functions for a given investment product.

In some embodiments, selection of the "discover" display element 1012 causes the product generation system 144 to traverse a decision tree that traces the investment product categories. The traversal of the decision tree is communicated to the user through an investment finder wizard, or other display of questions, that takes the user through a corresponding series of question-and-answer steps to help the user identify the investment product categories or investment products that best align with his or her interests. Each node of the decision tree generally corresponds to an investment product classification covering a group of investment product categories, with, for example, the higher up the node in the tree, the larger the group.

In general, while investment product categories generally do not change much over time, the investment products that belong to each investment product category may continuously vary as investment products are created and eliminated based on market conditions, which tend to be in a state of flux. As a result, the summary or characterization of each investment product category based on the constituent financial products may change from time to time as well.

In some embodiments, the "discover" function accesses information about investment products and associated pricing data. Therefore, while each question presented by the investment finder wizard, which corresponds to an investment product classification, remains largely unchanged, the final answers, each of which corresponds to an investment product category or an investment product, depend on not only the series of answers given in response to the series of questions that have been asked, but also the real-time data gathered at the time the investment wizard is launched.

In some cases, the "discover" function may gather real-time data every time a question is asked. A final answer may even correspond to a new investment product that is nor currently offered to other users, but is created based on the series of answers given by the user, which reflect the user's investment preferences and interests. Furthermore, the "discover" function may pre-order the product classifications to preselect a decision-tree structure (excluding the leaves) and use the same structure each time. Alternatively, the "discover" function may follow a different order of investment product classifications and develop a different decision-tree structure each time. The "discover" function may determine an order arbitrarily, by selecting an investment product classification that separates the current group into multiple categories that are as close in size as possible, and so on.

Figure 10B:
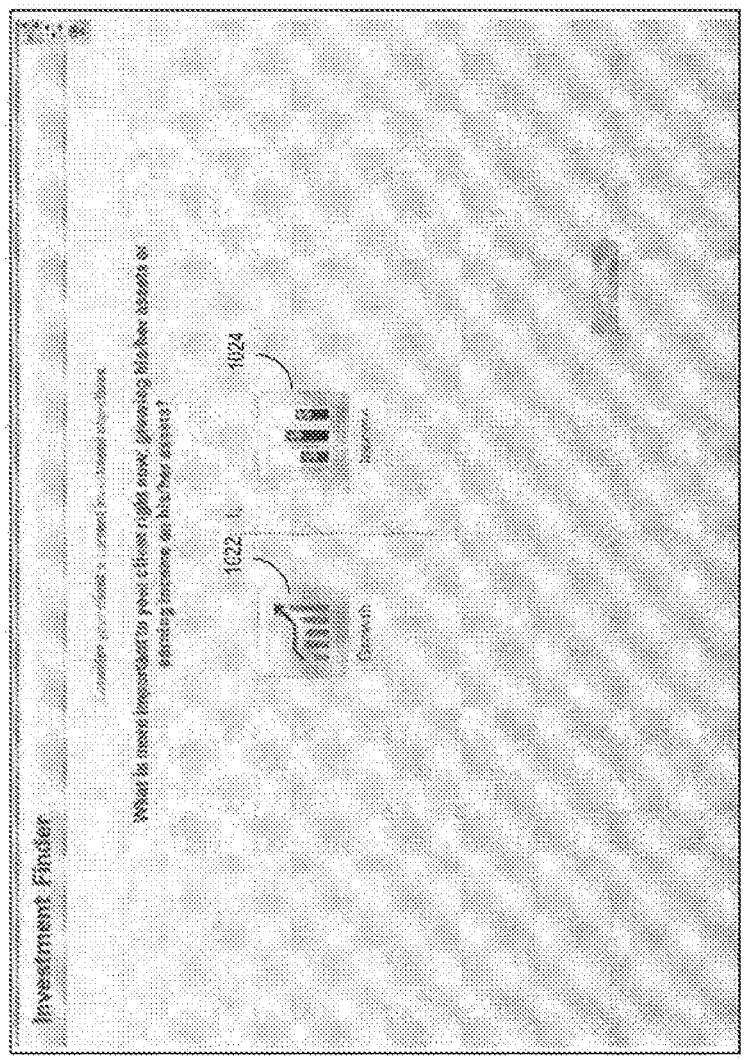

FIG. 10B depicts a user interface 1020 that presents information associated with a question about a user's investment objectives, along with user-selectable answers, such as a user-selectable option 1022 associated with a "growth" objective, an user-selectable option 1024 associated with an "income" objective.

Figure 10C:
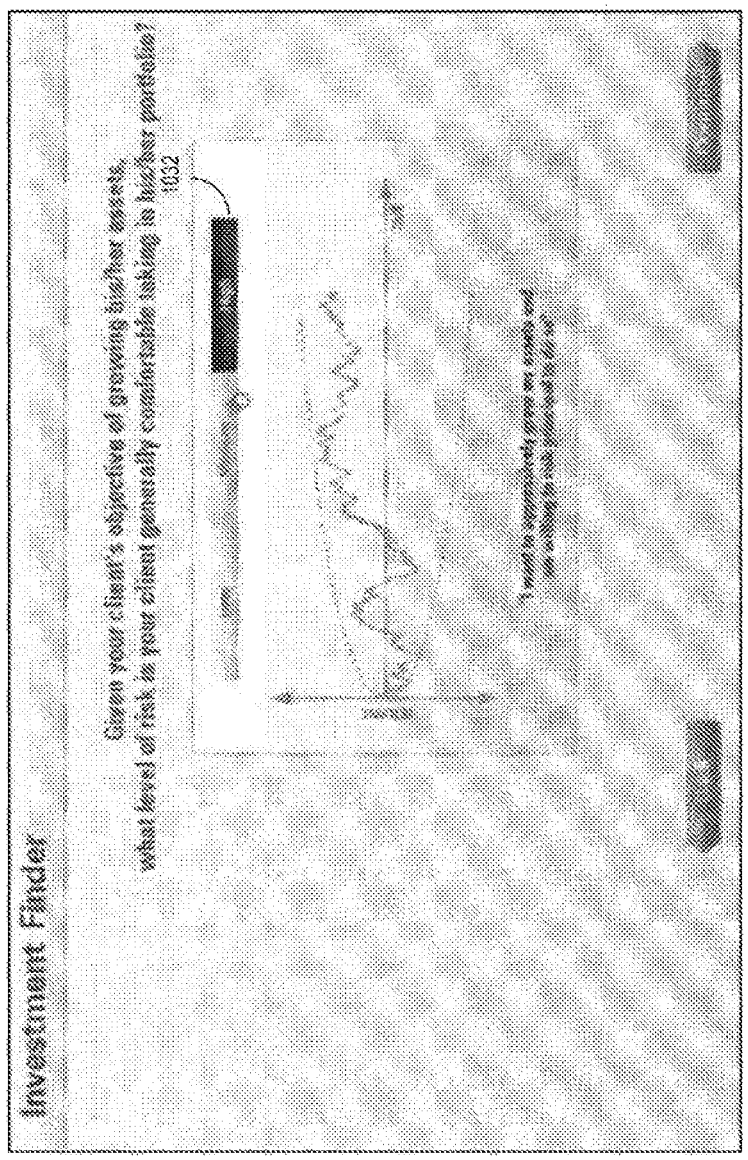

FIG. 10C depicts a user interface 1030 that presents information associated with a question about a user's investment risks, along with a user-selectable answer 1032 related to a user's risk level of high, and FIG.

Figure 10D:
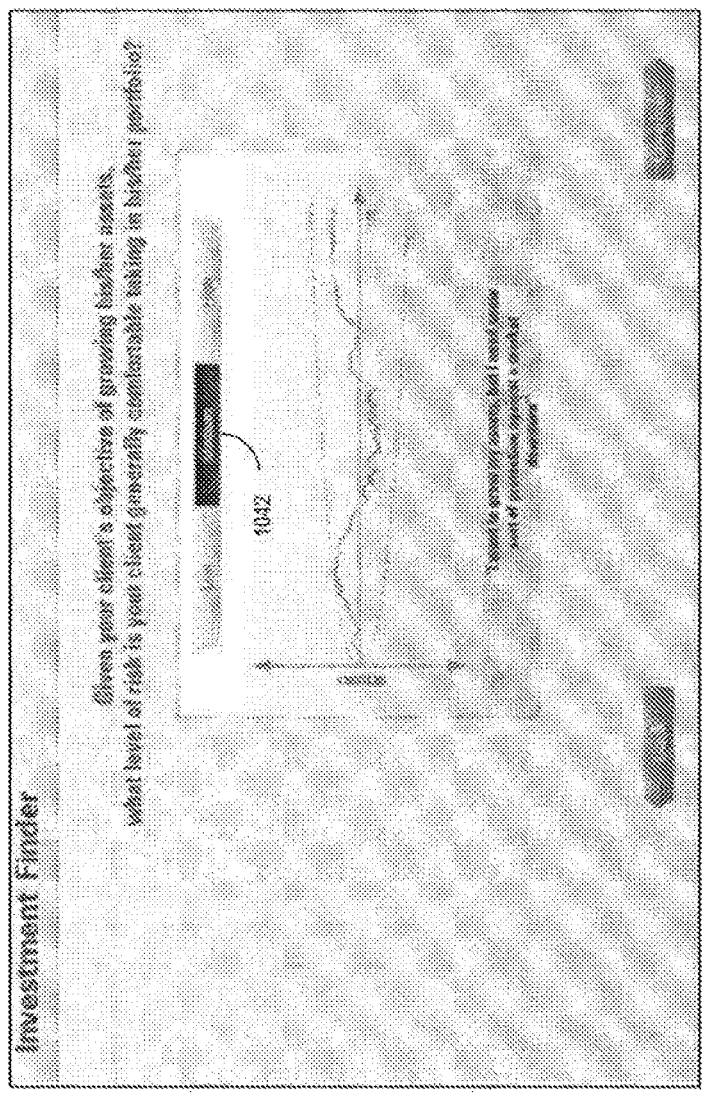

FIG. 10D depicts a user interface 1040 that presents information associated with a question about a user's investment risks, along with a user-selectable answer 1042 related to a user's risk level of medium.

Figure 10E:
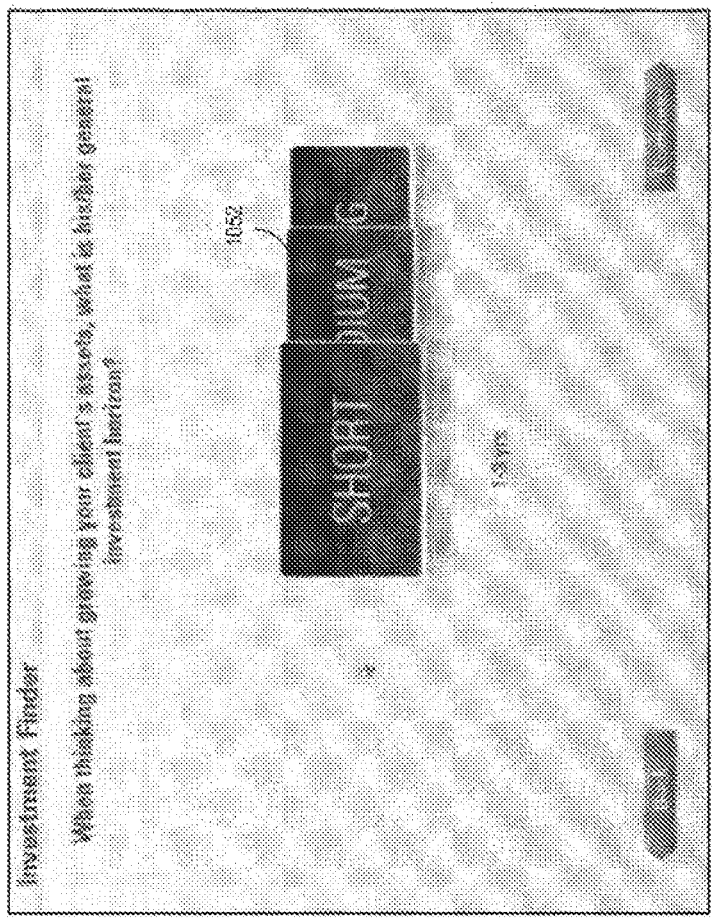

FIG. 10E depicts a user interface 1050 that presents information associated with a question about a user's investment horizon, along with user-selectable answers, such as a user-selectable option 1052 associated with a "medium" investment horizon.

Figure 10F:
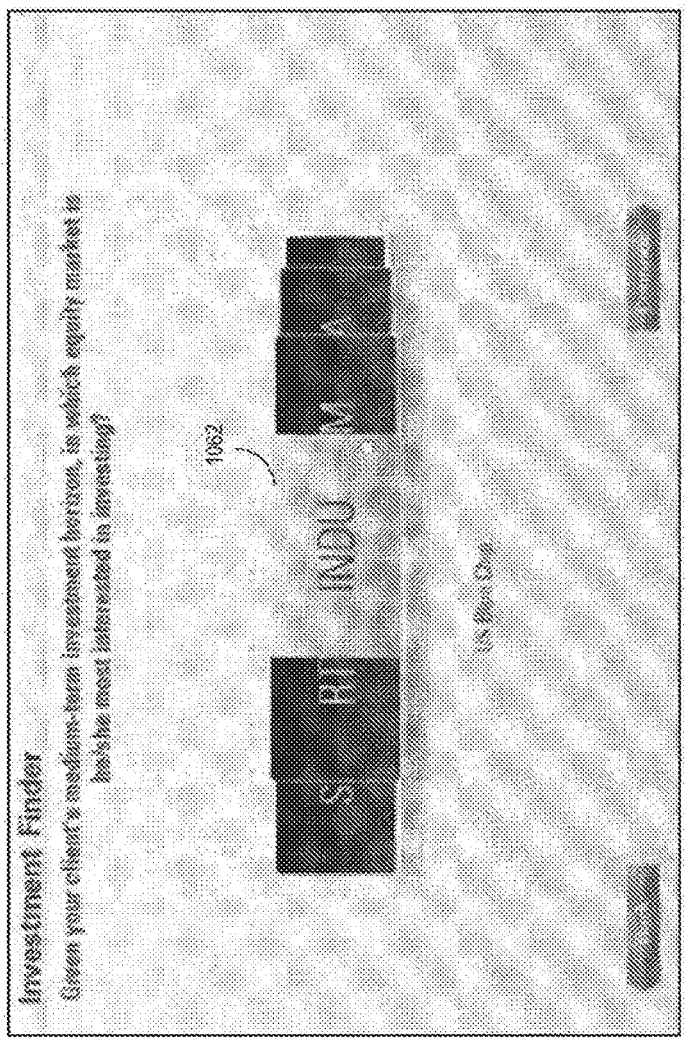

FIG. 10F depicts a user interface 1060 that presents information associated with a question about a user's markets of interest, along with user-selectable answers, such as a user-selectable option 1062 associated with the "blue chip" market.

Figure 10G:
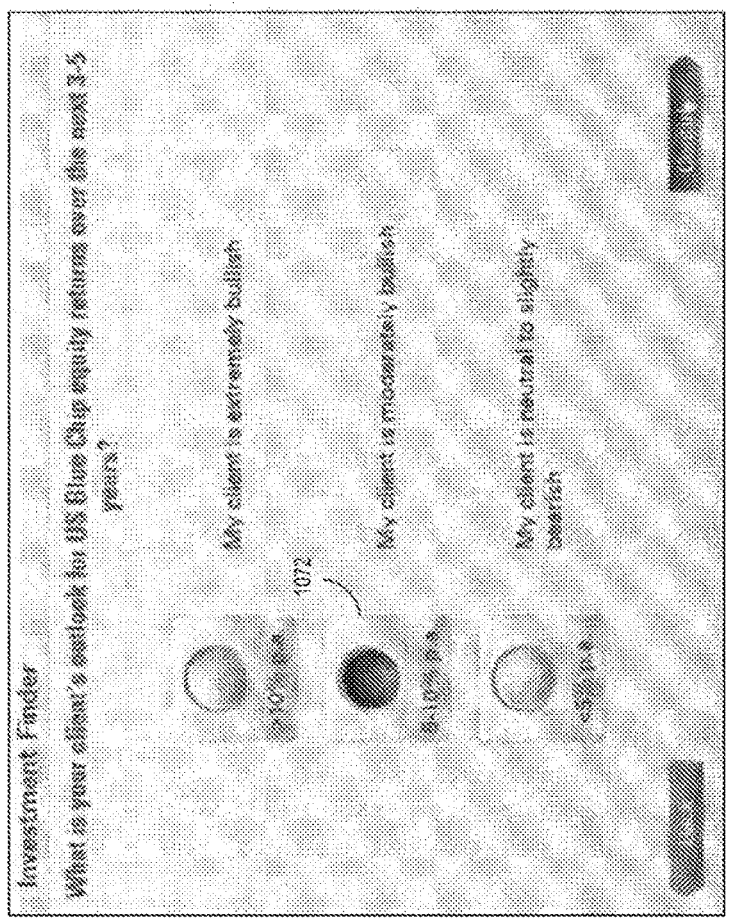

FIG. 10G depicts a user interface 1070 that presents information associated with a question about a user's market outlook, along with user-selectable answers, such as a user-selectable option 1072 associated with a "moderately bullish outlook" for the client.

Figure 10H:
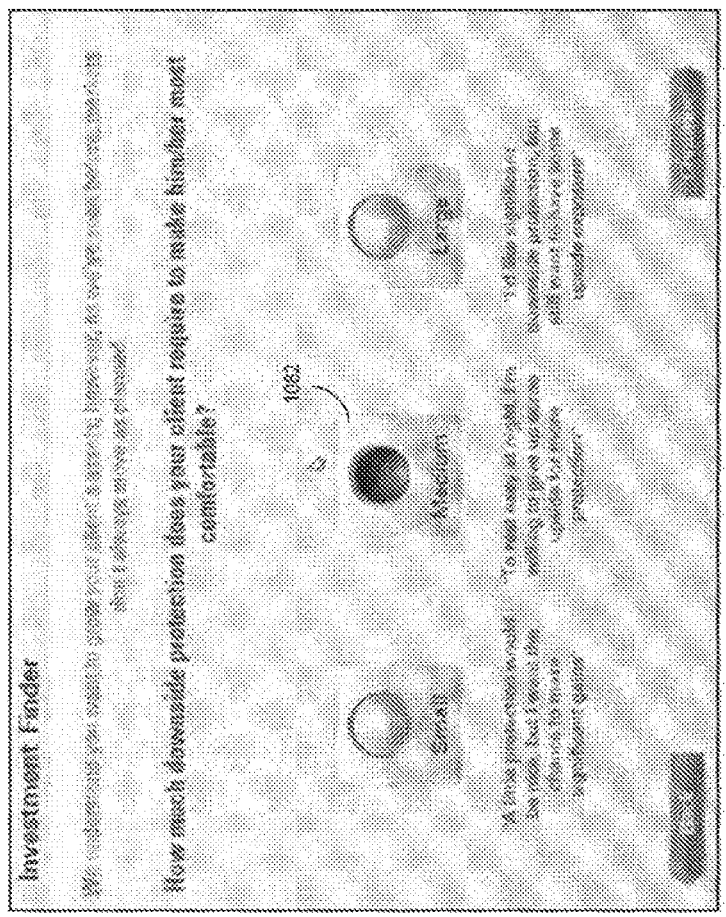

FIG. 10H depicts a user interface 1080 that presents information associated with a question about a user's downside protection, along with user-selectable answers, such as a user-selectable option 1082 associated with a "medium" level of downside protection.

Figure 10I:
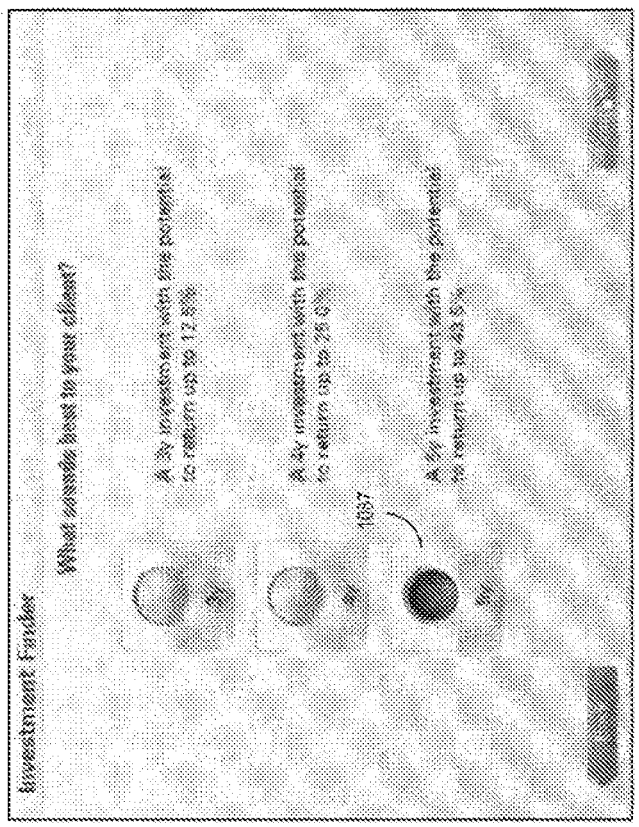

FIG. 10I depicts a user interface 1085 that presents information associated with a question about a user's preferred investment scenario, alone with user-selectable answers, such as a user-selectable option 1087 associated with a preferred scenario.

Figure 10J:
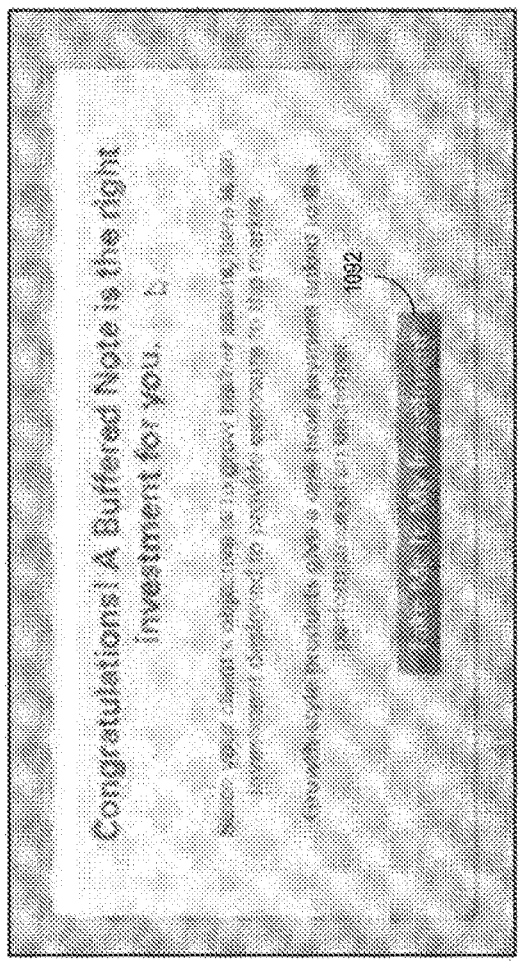

FIG. 10J depicts a user interface 1090 that presents information associated with an investment product selected for a user based on answers to a variety of posed questions (see FIGS. 10A-10I), as well as a user-selectable element 1092 which, when selected by a user, causes the electronic platform 140 to navigate the user to various areas provided by the product exchange system 146.

Figure 10K:
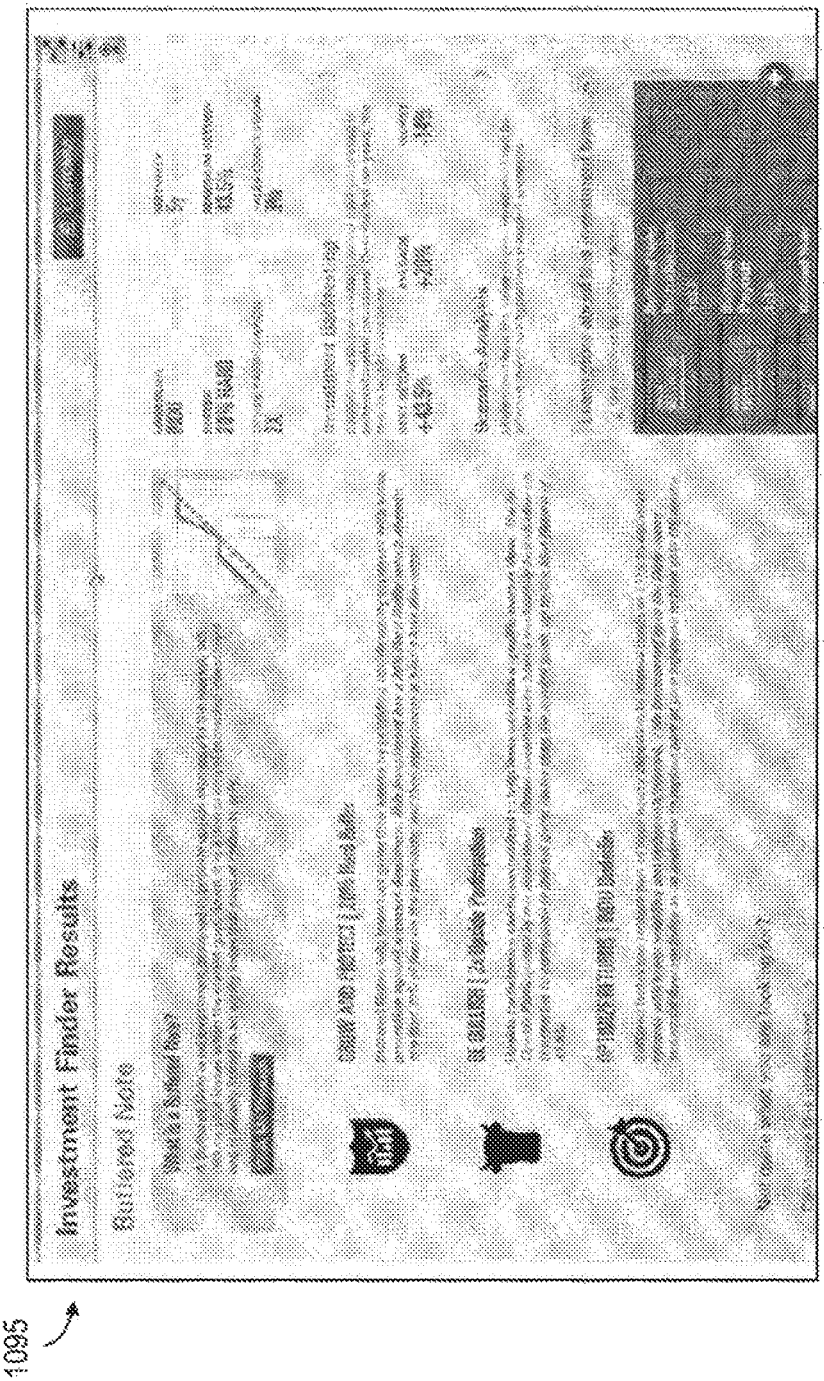

FIG. 10K depicts a user interface 1096 that presents information associated the results of the "discover" function, as depicted in FIGS. 10A-10J. In some embodiments, once the user completes all the steps, the investment finder wizard may display to the user a summary of his or her answers to the user. The investment finder wizard may also generate and display a list of suggested investment products or product categories based on the answers provided by the user. The illustrated detailed result of the "discover" function may show different types of data regarding a suggested investment product or investment product category, such as a definition, general characteristics, backtesting information, scenario analysis, related investment information, and/or education and certification programs (e.g., data provided by the product exchange system 146).

For example, backtesting allows the user to see how the suggested investment product would have performed in any past market scenario during a predetermined time span, such as the last ten years. On the other hand, scenario analysis allows the user to see how the suggested investment product may perform in a proposed market scenario (e.g., the underlier goes up by 20%), during a predetermined time span (e.g., the next ten years). The user may also save the list of suggested investment products or investment product categories for future reference. The user may then start building a customized investment product.

In some embodiments, the investment finder wizard includes questions allowing multiple answers and periodic checkpoints. The investment finder wizard may display a choice-and-consequence analysis at one or more of the periodic checkpoints before guiding the user through further steps. An administrative user may input questions and potential answers into the investment finder tool via an application programming interface (e.g., REST API).

As described herein, investments generally offer tradeoffs among their possible terms. For example, a basic bond will have coupon and maturity as two primary deal terms. Typically, the coupon will be higher as the maturity gets longer, so the investor must decide on a tradeoff between short maturity and higher yield. As part of the process of creating investments, potential investors typically want to see a range of possible deal terms. This is helpful to the investor when evaluating the tradeoffs among the various features, and deciding what deal terms are the best fit to their objectives.

However, for a dealer who sells the investments, it may be burdensome (or, impossible) to put together tables of viable deal terms for the investor, and it can be difficult to anticipate what terms the investor may be interested in. Each set of deal terms being evaluated requires the dealer to price the investment, which, in addition to usage of a pricing model, typically includes various adjustments to take into account expected trading costs and sales concessions. This process can be especially time consuming for investments with complex pricing models that are slow to calculate.

In some embodiments, the product generation system 144 enables investors to interactively, and/or with no perceivable latency, adjust deal terms and see the results. For example, the user may adjust a "slider" in a user interface corresponding to one deal term, and get pricing updated in real-time or near real-time as they drag the slider.

FIG. 11 is a flow diagram illustrating a method 1100 for building and presenting a customized investment product for a user of the electronic platform 140. The method 1100 may be performed by the product generation system 144 and, accordingly, is described herein merely by way of reference thereto. It will be appreciated that the method 1100 may be performed on any suitable hardware.

In operation 1110, the product generation system 144 receives, via an interface provided by the electronic platform 140, a request from the user of the electronic platform to perform a trade associated with a structured investment product.

In operation 1120, the product generation system 144 decomposes the structured investment product into two or more priced components of the structured investment product. Some investment products may be decomposed into parts, such that the price of the whole is the sum of the parts. Extending this to a weighted sum, the weights may vary depending on the deal terms. This decomposition may prove advantageous if the components' prices are a function of fewer deal terms than the whole investment. For example, a call spread structure is defined as long one call at a lower strike, short one call at a higher strike. This may be decomposed into two call options. The component call options have fewer deal terms than the call spread structure, the former having only 1 strike and the latter 2 strikes.

In operation 1130, the product generation system 144 generates pricing tables for each of the two or more priced components of the structured investment product. The pricing tables may include risk calculations, which are used to compute pricing adjustments, such as hedging cost.

For each deal term, a list of values the span the range being considered is selected. For example, if coupons of 0% to 10% and maturities of 1 to 10 years are to be supported, the list of coupons 0%, 1%, 2%, . . . 10% and maturities 1 year, 2 years, . . . 10 years can be made. For each component of the investment, the product generation system 144 prices and calculates any desired risks (e.g., vega, skew sensitivity, correlation sensitivity) on the Cartesian product of valid deal term values. In some cases, the Cartesian product will be smaller in size when the component uses fewer deal terms than the whole investment. Therefore, the size of the pricing tables may be reduced.

In operation 1140, the product generation system 144 pre-fetches, from pricing servers (e.g., the exchange market server) located on an information exchange network that includes the electronic platform 140, pricing information for the two or more priced components based on a variety of different deal terms.

In some cases, when the provider of pricing information is across a network (e.g., exchange market server 130 on network 125) from the client device, there typically is some network latency associated with providing real-time information. However, in cases such as a user dragging a slider, network latency may be large enough to cause perceivable latency between the user's action and pricing updates. The product generation system 144 may employ a pre-fetching strategy to minimize the effect of network latency, by anticipating the user's possible actions and requesting pricing for all possibilities in advance.

In other words, without pre-fetching certain pricing information, every time the user changes a deal term, a request would need to be sent to the electronic platform 140 for pricing. With pre-fetching, there is little or no perceivable latency when the user changes a single deal term, and there may only be slight perceivable network latency when two or more deal terms are changed.

In some embodiments, the prefetching technique is used to request pricing for every investment that differs from the user's current selection by at most 1 deal term. When the user changes 1 deal term (including repeatedly changing the same deal term), the pricing may be quickly or instantly updated, because the data has already been pre-fetched. Whenever the user modifies a deal term, another request is made to the electronic platform 140, and the pre-fetching stays up-to-date (in a sense, the user interface stays one step ahead of the user).

In operation 1150, the product generation system 144 receives, via the interface provided by the electronic platform 140, input from the user of the electronic platform 140 that identifies a set of deal terms to be applied to the two or more priced components when performing the trade of the structured investment product.

In operation 1160, the product generation system 144 interpolates the pricing tables based on the set of deal terms associated with the two or more priced components and provided by the user of the electronic platform. Given a set of deal terms, for each component, the product generation system 144 interpolates on the pricing/risk tables. The product generation system 144 may utilize standard techniques, such as multilinear interpolation or any other suitable techniques.

In operation 1170, the product generation system 144 determines a price for the structured investment product that is based on the interpolated pricing tables for the two or more priced components. The product generation system 144 may recombine the components and apply pricing adjustments to arrive at a price for the entire investment product, and/or may "solve for" one deal term, given other deal terms, and a target price.

In some cases, the product generation system 144 may sum the interpolated prices/risks for each component together (using the fact that the price of the whole investment product is the sum of its components). Pricing adjustment rules may then be applied. Some examples of pricing adjustments include hedging costs, a function of the risks, and sales concessions, a function of the maturity of the product.

The product generation system 144 may calculate an array of prices simultaneously, and select the deal terms for which the resulting price is closest to a given target price. This technique can be used to "solve for" one deal term given values for all other deal terms and a target price. For example, the product generation system 144 solves for a coupon, such that a bond prices to par, given the bond has 5 year maturity. To do so, the product generation system 144 calculates prices for an array of coupons (e.g. 0.1%, 0.2%, . . . 9.9%, 10.0%), assuming in each case that the maturity is 5 years. The product generation system 144 then searches the list of prices for the closest value to the par value of the bond (or in some embodiments, a criterion other than "closest"), and selects the corresponding coupon as the "solution".

In operation 1180, the product generation system 144 presents, via the interface of the electronic platform 140, information identifying the structured investment product and information identifying the determined price for the structured investment product.

Figure 12A:
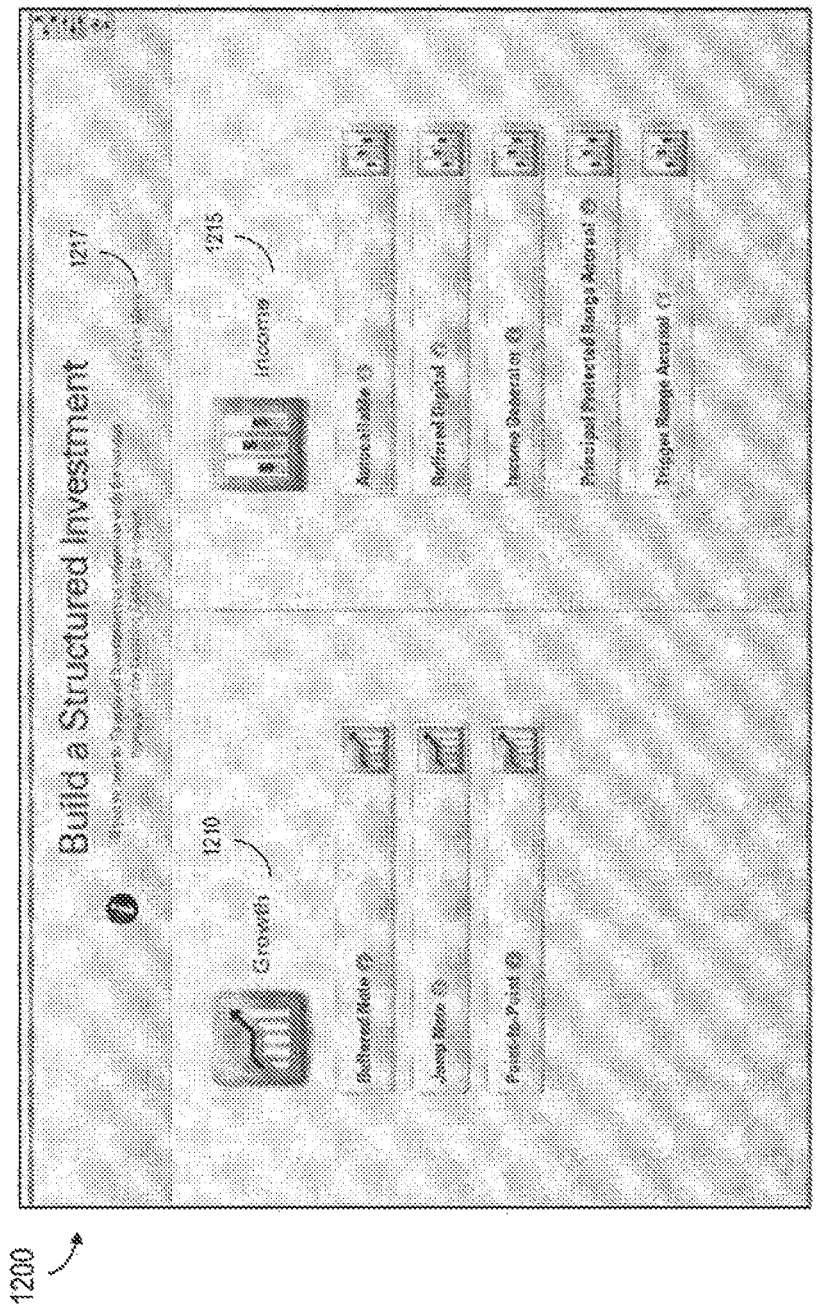
FIGS. 12A-12E are display diagrams illustrating example user interfaces provided by the product generation system when building customized investment products for users of the electronic platform.

In some embodiments, the product generation system 144 presents various user interfaces when building investment products for users. FIG. 12A depicts a user interface 1200 that presents information associated with building a structured investment product for a user. For example, the user interface 1200 presents user-selectable display elements, that, when selected by a user, cause the product generation system 144 to build investment products, such as a user-selectable element 1210 associated with building "growth" products, a user-selectable element 1215 associated with building "income" products. In addition, the user interface 1200 may present a user-selectable display element 1217 that, when selected by the user, causes the electronic platform 140 to present user interfaces rendered by the product learning system 142.

Figure 12B:
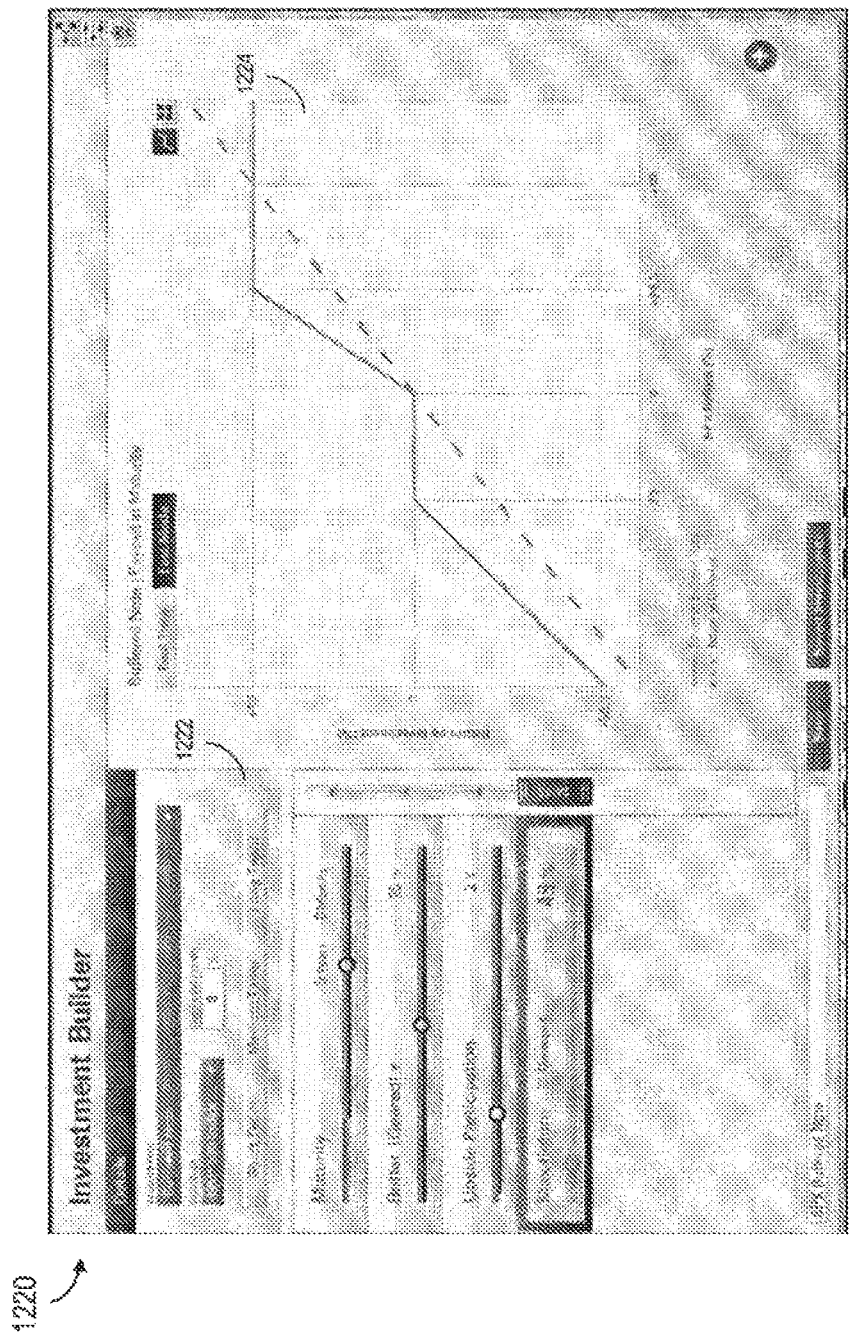

FIG. 12B depicts a user interface 1220 that presents detailed information associated with building a structured investment product for a user. As depicted by the user interface 1220, the user may see a dropdown list 1222 that may be used to select a product. The product selector dropdown 1222 may be divided into two example sections: Income and Growth. Each product belongs to one of either Growth or Income. In some embodiments, when the user selects a product type, for example, a Buffered Levered Note (BLN), the user may be presented with a popup asking to select a pre-defined solution set by selecting an Investment Horizon. The popup may include a checkbox with a label saying "Make this my default choice." If checked, after making a selection, the next time the user selects the same product type (e.g., BLN), the user is nor presented with a popup. Instead, the user may see their default choice pre-selected. Until the user makes a selection of a pre-defined solution set for Investment Horizon, the user may not be able to interact with the investment builder. When a pre-defined solution set is selected and the user changes one of the parameter values, the button representing the pre-defined solution set is no longer selected.

Once the user selects a product type, the user may use the investment builder user interface to select any underlayer from a drop down menu and define various parameters for the product type (e.g., maturity, buffer, upside participation, maximum return). The user may set a sales concession (e.g., within certain bounds). The user may also select a variable to solve for. The results are then displayed on a payoff chart 1224. The user may zoom in or zoom out on the payoff chart 1224 after the user changes one of the parameter values (e.g., by dragging a slider). The payoff chart 1224 may re-size once the user lets go of a slider. The payoff chart 1224 may resize when the data being presented does not leave enough margin, or if it leaves too much margin, in the chart 1224. The payoff chart 1224 may be available in at least two modes, a fast mode and a real-time mode.

As depicted, the user has selected a buffered note on an S&P 500 Index, five-year maturity, 25% geared buffer, 2.times, upside for gestation and the max return as the variable to solve for. If the user changes any of the input (e.g., maturity), the variable being solved for changes and the payoff chart 1224 is updated in real-time. The user may hover over the graph to get more information about what is actually going on. The user may solve for any of the parameters by sliding the solve bar.

Figure 12C:
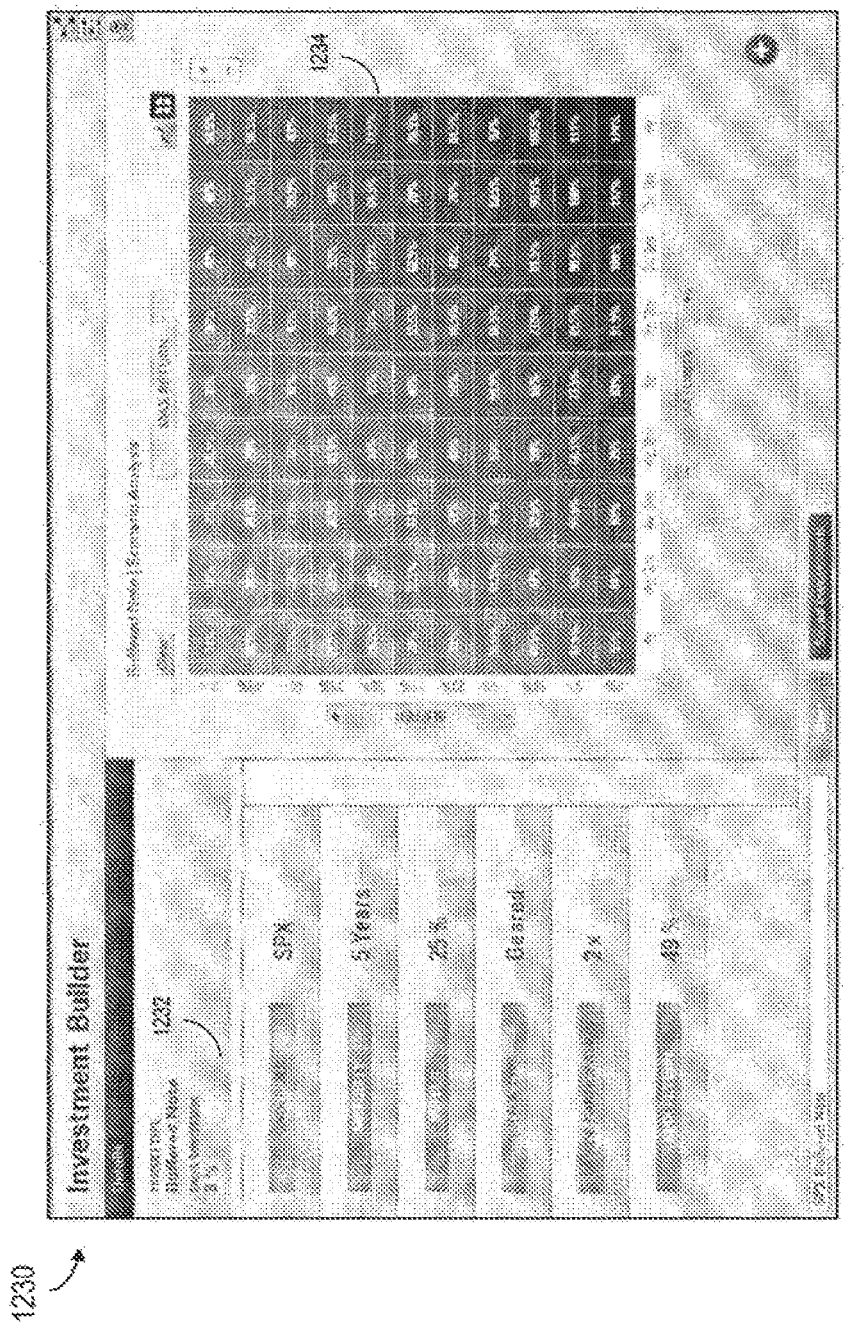

FIG. 12C depicts a user interface 1230 that presents detailed heat map associated with building a structured investment product for a user. The user may select a heat map view 1234 as shown in the user interface 1230. The heat map 1234 allows a user to select at least two variables 1232 (e.g., maturity and buffer) to see how a third variable (e.g., max return) changes. In response, the product generation system 144 may instantly price various permutations for the selected buffer note.

For example, the product generation system 144 may consider all the different maturities (e.g., one year to seven year) and buffers the user may pick and show on the heat map 1234 how the max return would change. The user may zoom into particular areas to get a granular view and pan around the heat map 1234. For example, the user may use a control next to each axis on the heat-map to zoom. Double clicking on the heat-map cell may zoom in on the heat-map, with the clicked cell being the center of the zoomed region. If the heat-map is already completely zoomed, there will be no zoom in. Using the scroll wheel on a mouse, the user may zoom in or zoom out on the hear-map. If the heat-map is completely zoomed there will be no zoom in, and if it is completely zoomed our there will be no zoom out. When zoomed in, the user may click and drag the map portion of the heat-map to pan the heat-map, sliding the range of one or both of the heat-map axes to new values. Single-clicking a cell of the hear-map may populate the parameters corresponding to the heat-map's X, Y, and Z axes with the values corresponding to that cell of the heat-map.

For example, as depicted, the max return for four years to six years is shown. The user may also pull in other variables to see how those variables would change. For example, if the user wants to look at a different underlayer, the user can select a different underlayer and the product generation system 144 may update the hear map 1234 to display in real-time all the various permutations of the investment product. The user may select any one to trade from amongst a million different iterations, all instantaneously. In the depicted example, a buffered note with a max return of 49%, buffer of 25% and 5 year maturity is selected.

Figure 12D:
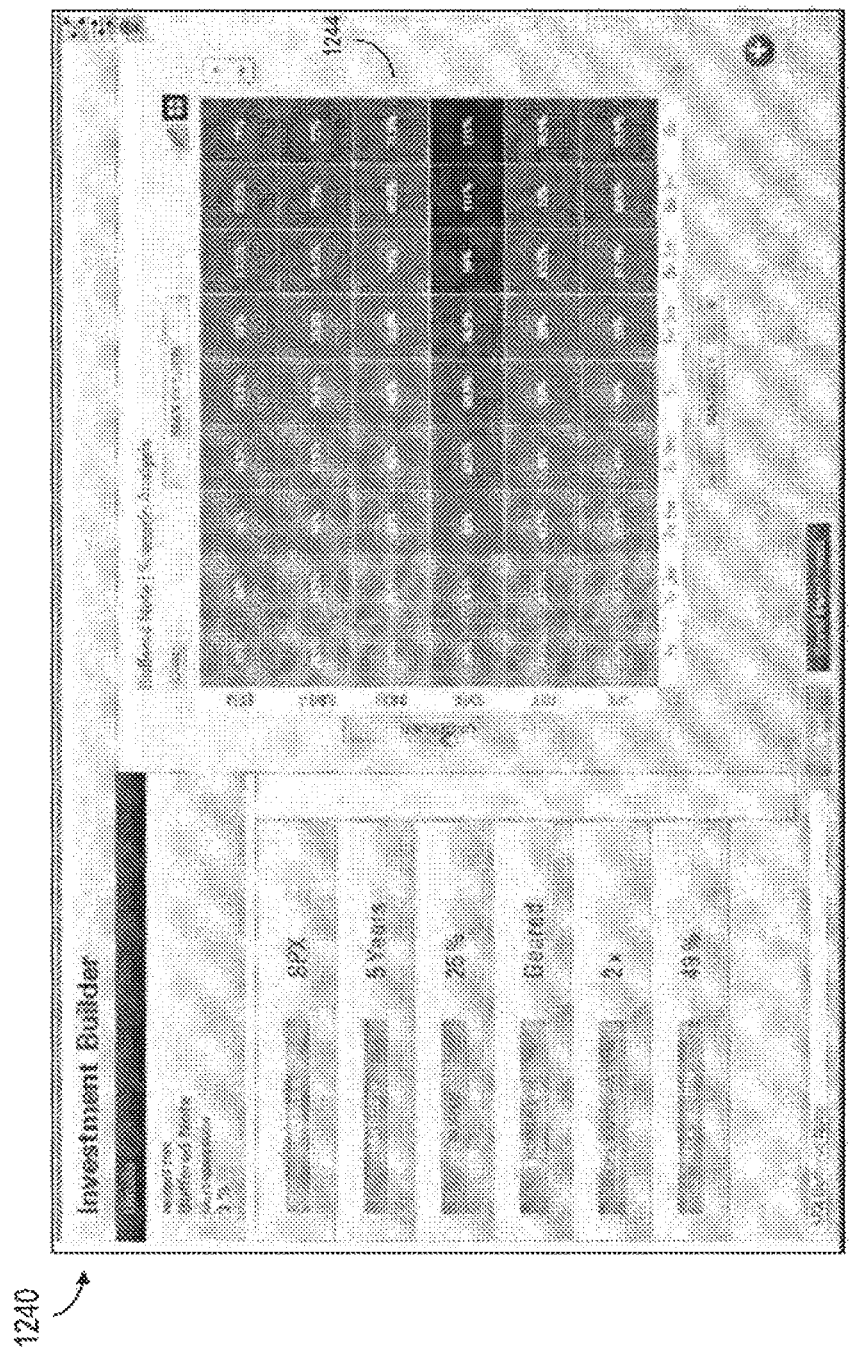

FIG. 12D depicts a user interface 1240 that presents a zoomed heat map 1244 associated with building a structured investment product for a user. For example, the user interface 1240 includes a heat map 1244 that is zoomed in to get more granular prices. The user may select any cell on the heat map 1244 to trade on the custom product corresponding to the cell.

As described herein, the product generation system 144 may employ a fast mode and/or a real-time mode for pricing. The modes may dictate how the product pricing calculations are performed. The product generation system 144 may utilize the pricing data calculated from a selected mode to generate the payoff chart and the heat map. In some embodiments, a fast mode pricing engine calculates the price for every single possible permutation of a product type (e.g., buffered levered note) on every underlayer, and stores the data for later access. The calculation may be performed ahead of time (e.g., overnight, every few hours). When the user is sliding the controls to change the input variables, the fast mode pricing engine selects from, or interpolates from, all of the different prices that have been pre-calculated to price each custom product built by the user, allowing the user to search through a very large number of combinations in a smooth, fast and a very transparent manner. The prices that are calculated may be tradable prices. Instead of pricing each and every possible product, the fast mode pricing engine prices as few instruments as possible, and recovers the prices for any combination that the user constructs at one time. In the real-time pricing mode, a real-time pricing engine calculates the prices in real-time. Each time the user changes the inputs, the real-time pricing engine calculates the prices to display to the user.

Figure 12E:
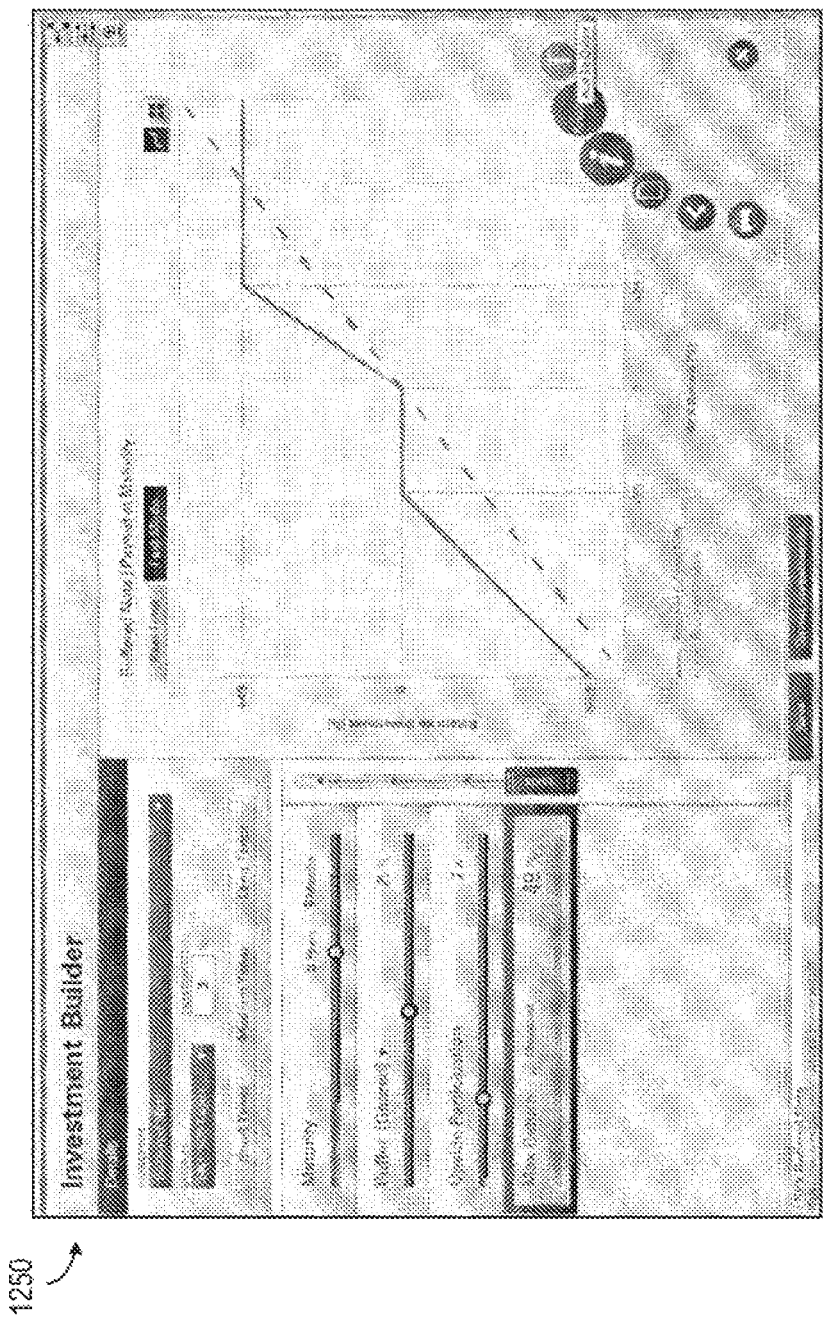

FIG. 12E depicts a user interface 1250 that presents detailed information about an investment product built for a user. Via the user interface, the user may print the page, share the product, save the product, get additional information on the product, analyze the product, add the product to a queue, and so on.

Examples of the Product Exchange System

As described herein, the electronic platform 140 may include the product exchange system 146, which performs various actions associated with investment products selected and/or generated for users of the electronic platform.

Figure 13:
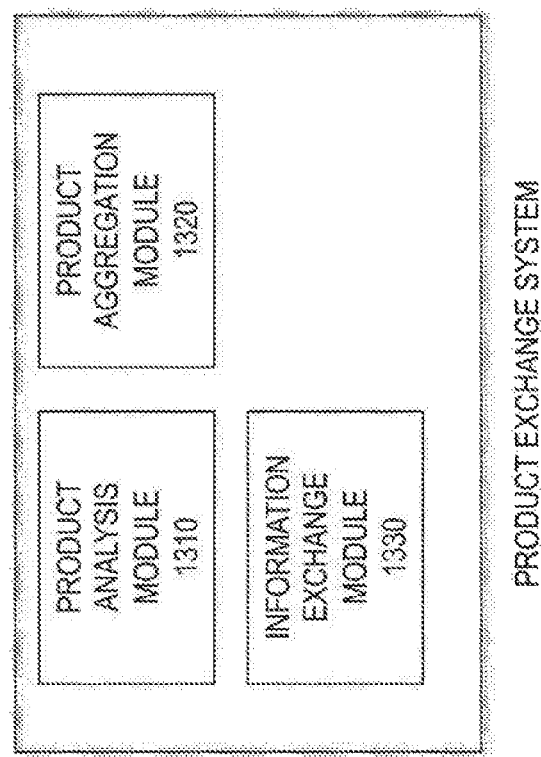
FIG. 13 is a block diagram illustrating components of a product exchange system.

FIG. 13 is a block diagram illustrating components of the product exchange system 146. The product exchange system 146 may include one or more modules and/or components to perform one or more operations of the product exchange system 146. The modules may be hardware, software, or a combination of hardware and software, and may be executed by one or more processors. For example, the product exchange system 146 may include a product analysis module 1310, a product aggregation module 1320, and an information exchange module 1330.

In some embodiments, the product analysis module 1310 is configured and/or programmed to perform various analysis functions on investment products selected and/or generated by the product generation system 144. The product analysis module 1310 may provide tools for analyzing an investment product, whether the investment is created by the user or selected from an offering. For example, the user can select investment backtesting, scenario analysis, and so on.

In some embodiments, the product aggregation module 1320 is configured and/or programmed to aggregate information for investment products provided by multiple issuers, such as information that may be displayed when investment products are selected for trading and/or placed in investment queues.

In some embodiments, the information exchange module 1330 is configured and/or programmed to facilitate the exchange of information associated with investment products between users of the electronic platform 140. For example, the information exchange module 1330 may facilitate the sharing of information, the establishment of marketplaces, the crowdsourcing of information associated with the investment products, the creation of investment queues, and so on.

Figure 14:
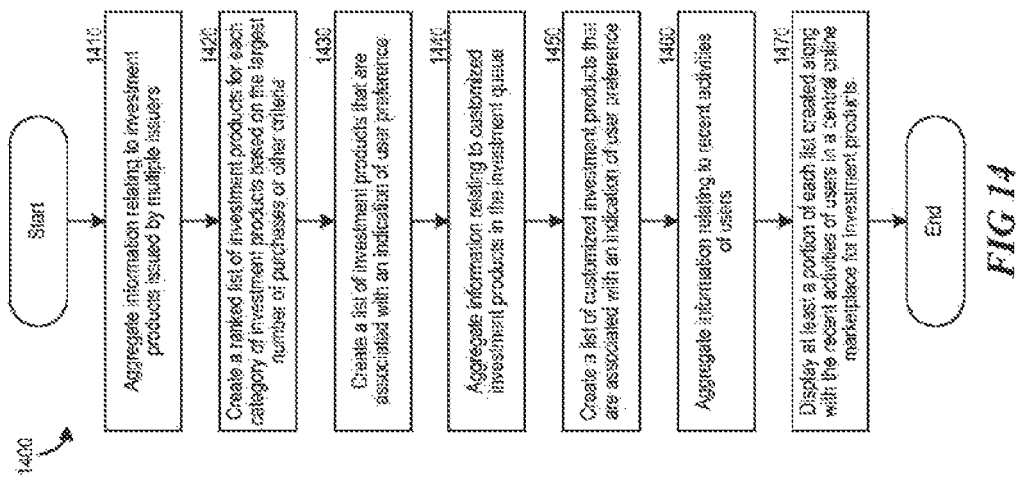
FIG. 14 is a flow diagram illustrating a method for presenting, via the electronic platform, a trading marketplace for investment products.

As described herein, the product exchange system 146 may perform various operations, processes, and methods when performing actions associated with investment products for users via the electronic platform 140. FIG. 14 is a flow diagram illustrating a method 1400 for presenting, via the electronic platform, a trading marketplace for investment products. The method 1400 may be performed by the product exchange system 146 and, accordingly, is described herein merely by way of reference thereto. It will be appreciated that the method 1400 may be performed on any suitable hardware.

In operation 1410, the product exchange system 146 aggregates information relating to investment products issued by multiple issuers. In operation 1420, the product exchange system 146 creates a ranked list of investment products. In operation 1430, the product exchange system 146 creates a list of investment products associated with a user preference.

In operation 1440, the product exchange system 146 aggregates information relating to customized investment products in an investment queue. In operation 1450, the product exchange system 146 creates a list of customized investment products associated with the user preference. In operation 1460, the product exchange system 146 aggregates information relating to recent activities of users, and, in operation 1470, the product exchange system 146 displays a portion of each list along with the activities of the users in a marketplace provided by the electronic platform 140.

Figure 15:
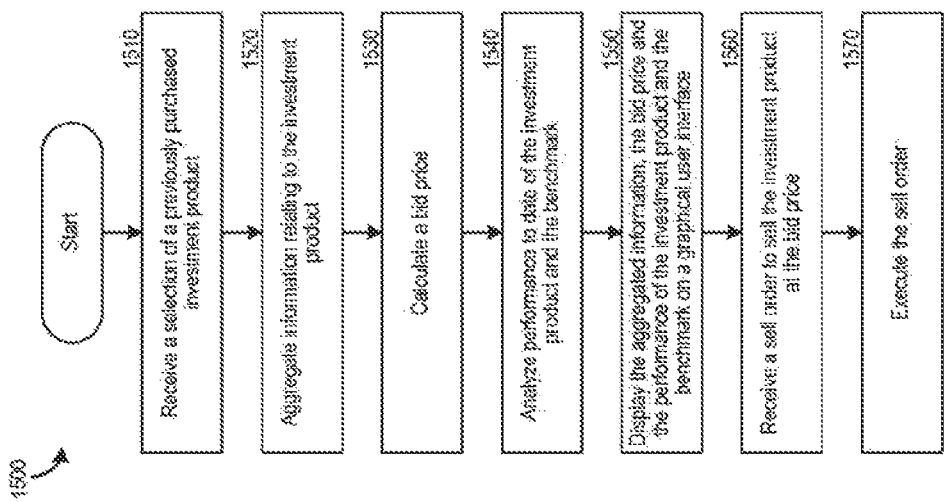
FIG. 15 is a flow diagram illustrating a method for analyzing a generated investment product via the electronic platform.

FIG. 15 is a flow diagram illustrating a method 1500 for analyzing a generated investment product via the electronic platform. The method 1500 may be performed by the product exchange system 146 and, accordingly, is described herein merely by way of reference thereto. It will be appreciated that the method 1500 may be performed on any suitable hardware.

In operation 1510, the product exchange system 146 receives a selection of a previously purchased investment product. In operation 1520, the product exchange system 146 aggregates information relating to the investment product, and, in operation 1530, calculates a bid price.

In operation 1540, the product exchange system 146 analyzes the performance to date of the investment product and a benchmark. In operation 1550, the product exchange system 146 displays the aggregated information, the bid price, and the performance via a user interface (such as those described herein). In operation 1560, the product exchange system 146 receives a sell order to sell the investment product at the bid price, and in operation. 1570, executes the sell order.

Figure 16A:
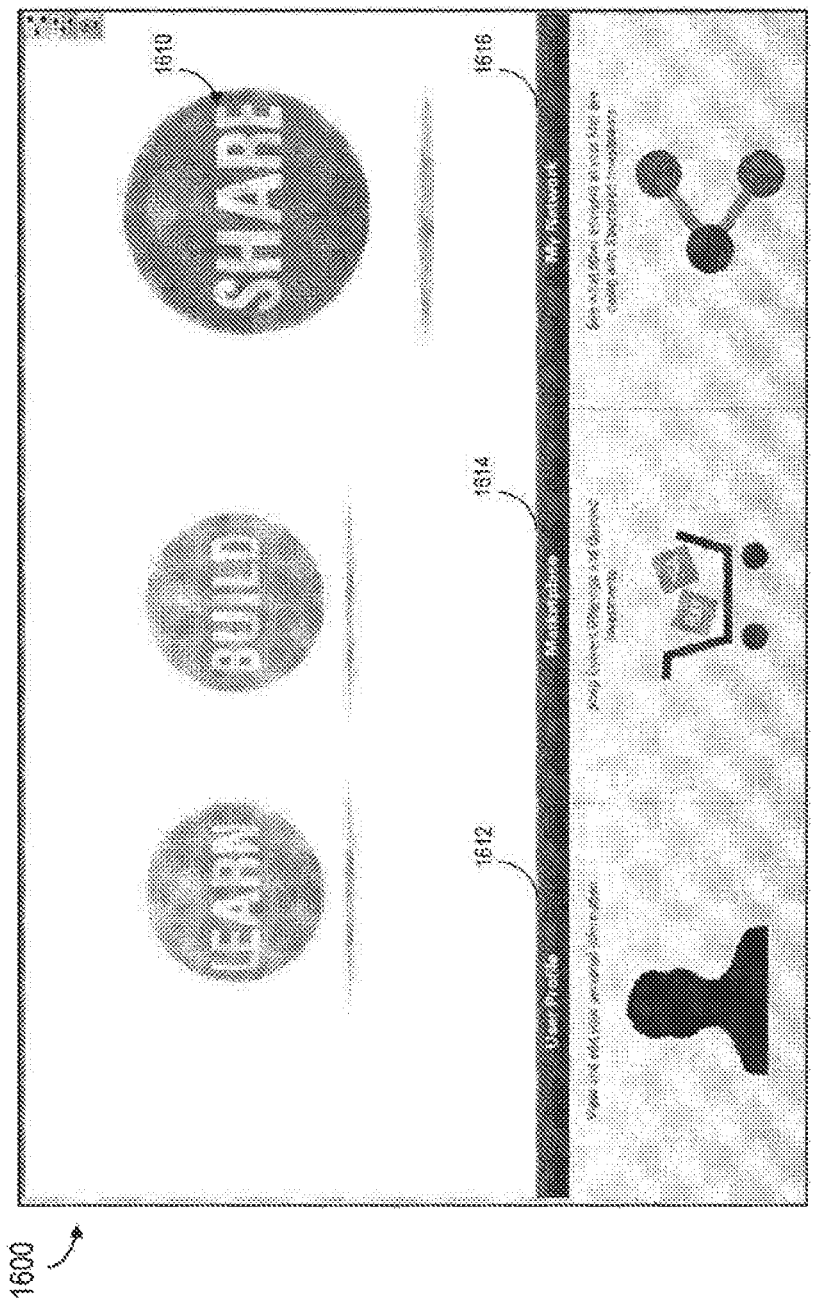
FIGS. 16A-16D are display diagrams illustrating example user interfaces provided by the product exchange system when sharing information associated with investment products.

FIG. 16A depicts a user interface 1600 that displays different functions provided by the electronic platform 140, including a "share" function, represented by display element 1610, that is associated with functionality provided by the product exchange system 144. Upon receiving a user selection of display element 1610, the user interface 1600 presents various user-selectable display elements, each associated with different functions provided by the product generation system 144. For example, the user interface 1600 displays a "user profile" display element 1612 that is associated with the electronic platform 140 facilitating the viewing and editing of user information, a "marketplace" display element 1614 that is associated with the electronic platform 140 providing a marketplace and/or investment queues for users, and a "network" display element 1616 that is associated with the electronic platform 140 performing various social network functions for a user.

Figure 16B:
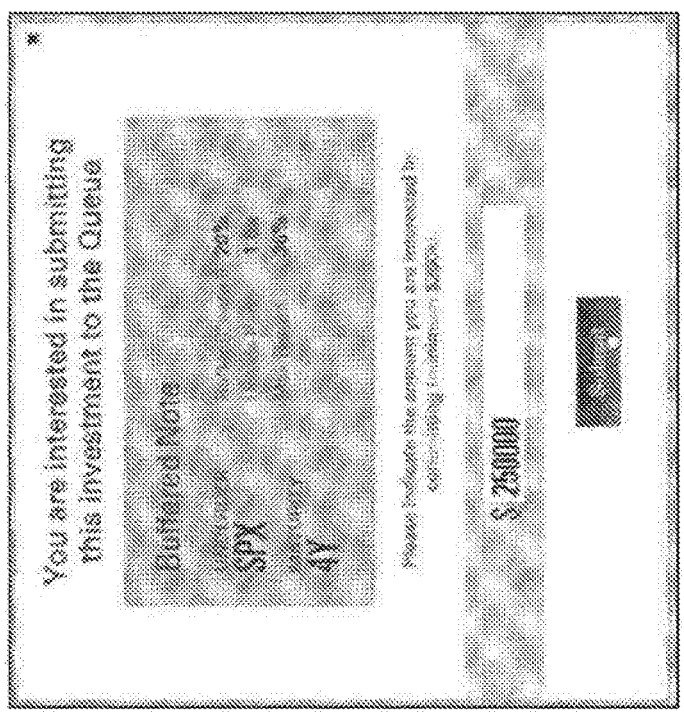
Figure 16C:
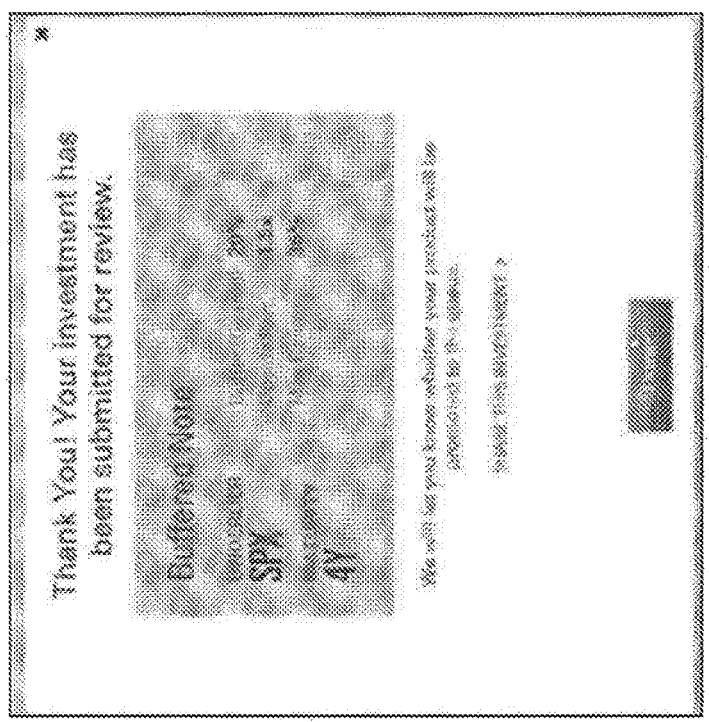

FIG. 16B depicts a user interface 1620 that presents information and display elements that facilitate user submission of generated investment products to an investment queue. For example, when the user wants to buy a product that he/she has built for a client, but does not have enough notional to meet the minimum requirements, he/she may launch that product to the "queue" to begin the creation of an "e-syndicate." When the user selects to add the product to a queue option, a queue submission form shown in user interface 1620 may be displayed. As depicted, the for, may include information on the custom product and include a prompt for a commitment amount. The user may enter the commitment amount to submit the custom product to the queue, as shown by user interface 1630 depicted in FIG. 16C.

Figure 16D:
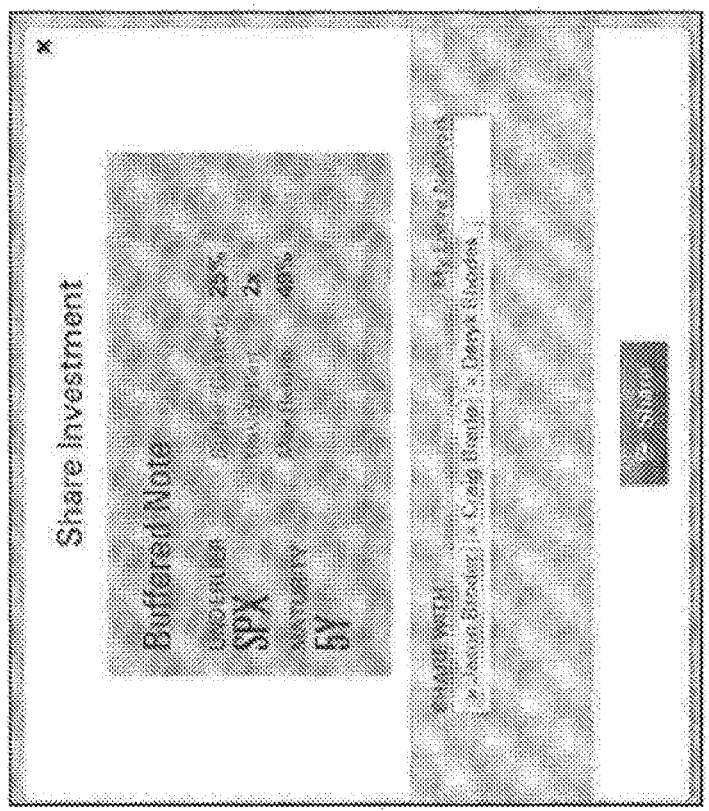

After launching a product to the "queue," the user has the opportunity to "share" the product with other people in his/her network so that other users in the user's network can see or discover the user created product and commit notional to that product (e.g., if it makes sense for their clients) in an effort to build a book via the "e-syndicate" and get it to critical mass. FIG. 16D depicts a user interface 1640 that presents information and display elements that facilitate user sharing of investment products that have been added to an investment queue.

In some embodiments, the network may include employees within the same broker-dealer. When the user selects the share option, a sharing form, as depicted by the user interface 1640, may be presented. The sharing form may include controls that allow the user to choose whether he or she wants to share the product with the entire group, or specific users in the group. Once the user shares the product with another user, a notification is sent to that user.

Figure 17A:
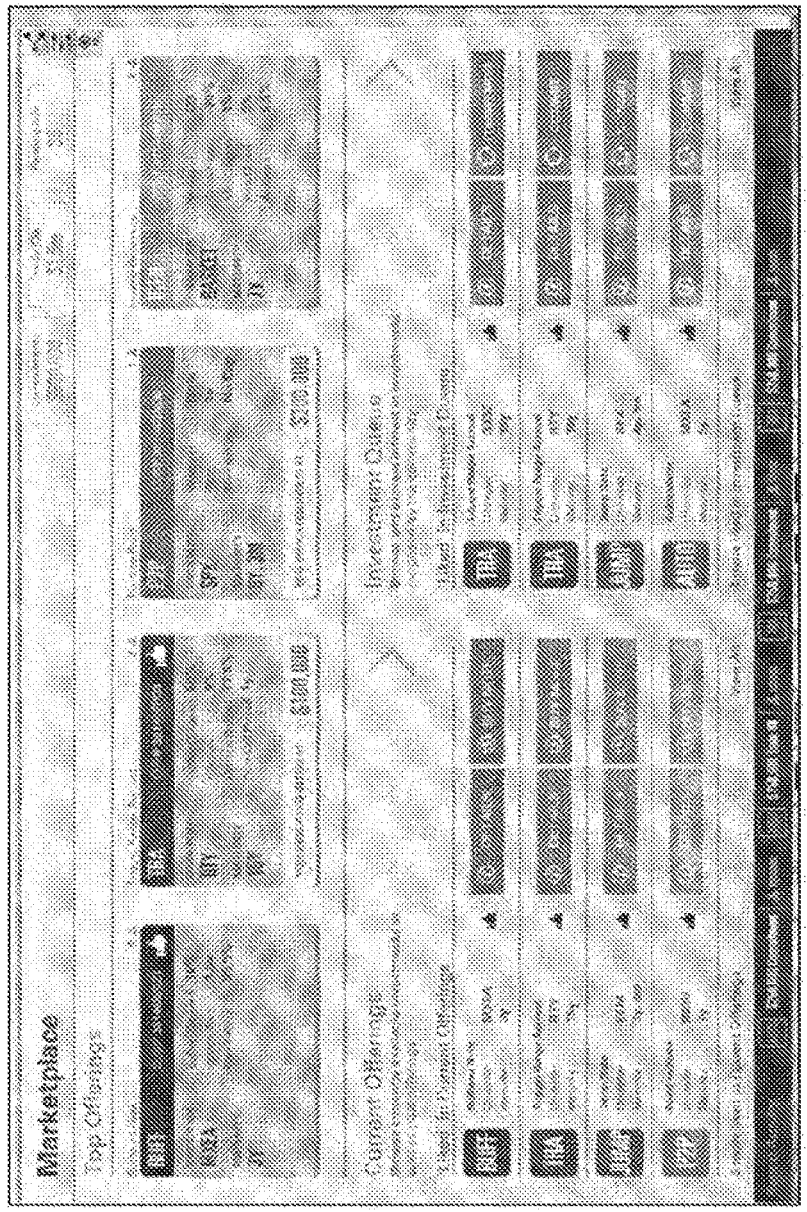
FIGS. 17A-17D are display diagrams illustrating example user interfaces provided by the product exchange system when facilitating a marketplace of investment products.

FIG. 17A depicts a user interface 1700 that presents information displaying investment products within a marketplace established by the electronic platform 140. The user interface 1700 displays various types of information, such as products that are trending under "Top Offerings," the products a user has liked or otherwise selected in the "Current Offerings," and the "Queue."

The marketplace may also show recent activity for the site, within a selected area and/or on a moving carousel. For example, the user interface 1700 may display top offerings that can include current offerings that have been hand picked by an administrator (e.g., displayed in a curated order defined by the administrator) and/or selected based on indications of interest or preference from users. The marketplace may also display lists of queued products and current offerings. The user may filter the list of current offerings by product type, maturity, underlayer, indication of interest (e.g., likes, stars), and so on. The user may "view details" for a given product in the Marketplace in Product Viewer to see specifics of the product. In some embodiments, the user may submit an 101 for an available offering, submit a commitment to anyone's queued product, and so on, from the marketplace.

Figure 17B:
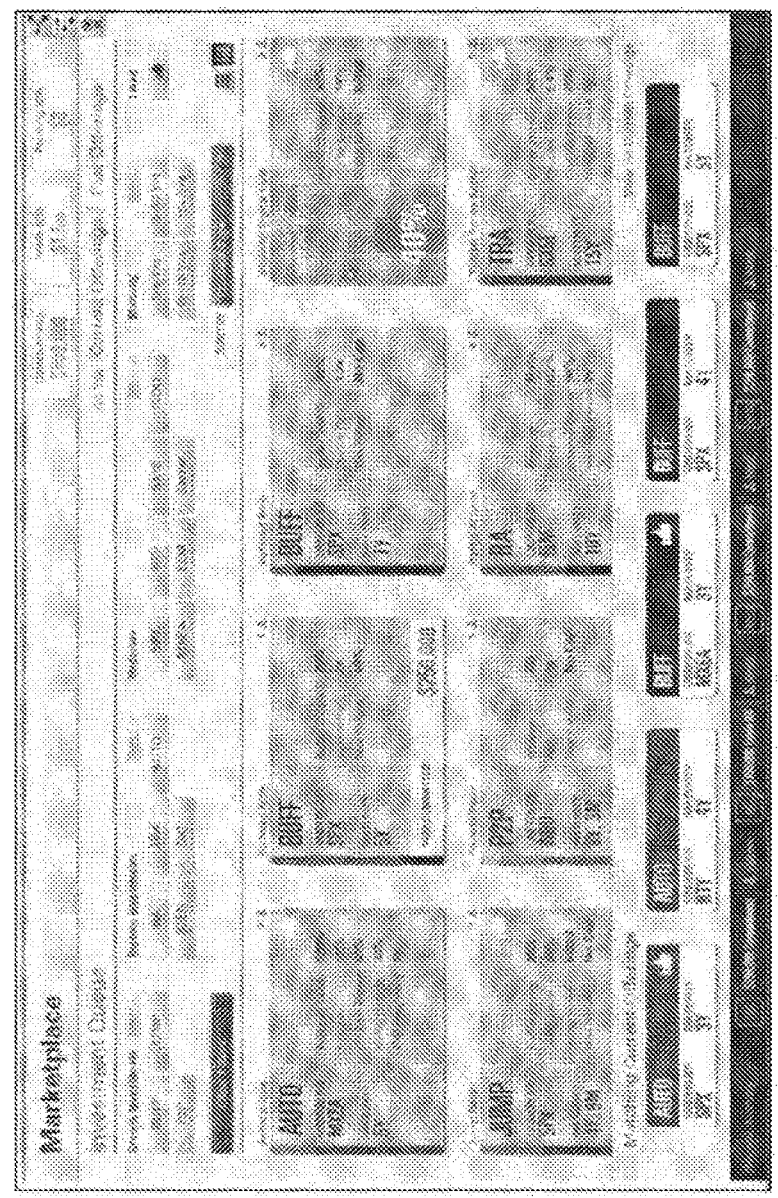

When the user clicks on the "Investment Queue" from the "Marketplace" landing page, he/she may see the products that have been added to the queue, as depicted by the user interface 1710 of FIG. 17B. For example, the "Buffered Note" (BUFF) with SPX underlayer and 5& maturity includes an indication that it was recently added to the queue from Investment Builder and the user committed $250,000. In addition to the product metadata, the tile for the queued product may also show the Eligibility Progress (e.g., 25% if the product issuer set the minimum notional to $1 mm).

Fro, here, the user may add commitments to buy the product. For example, when viewing a product in the Queue, the user may click on "Add Commitment" for that product. The user may be prompted to submit a commitment amount via a modal popup, and a confirmation message is displayed once the commitment is successfully submitted. Furthermore, other users of the electronic platform 140 may learn about the trade from the user interface 1710, and may commit to the notional, when appropriate.

Figure 17C:
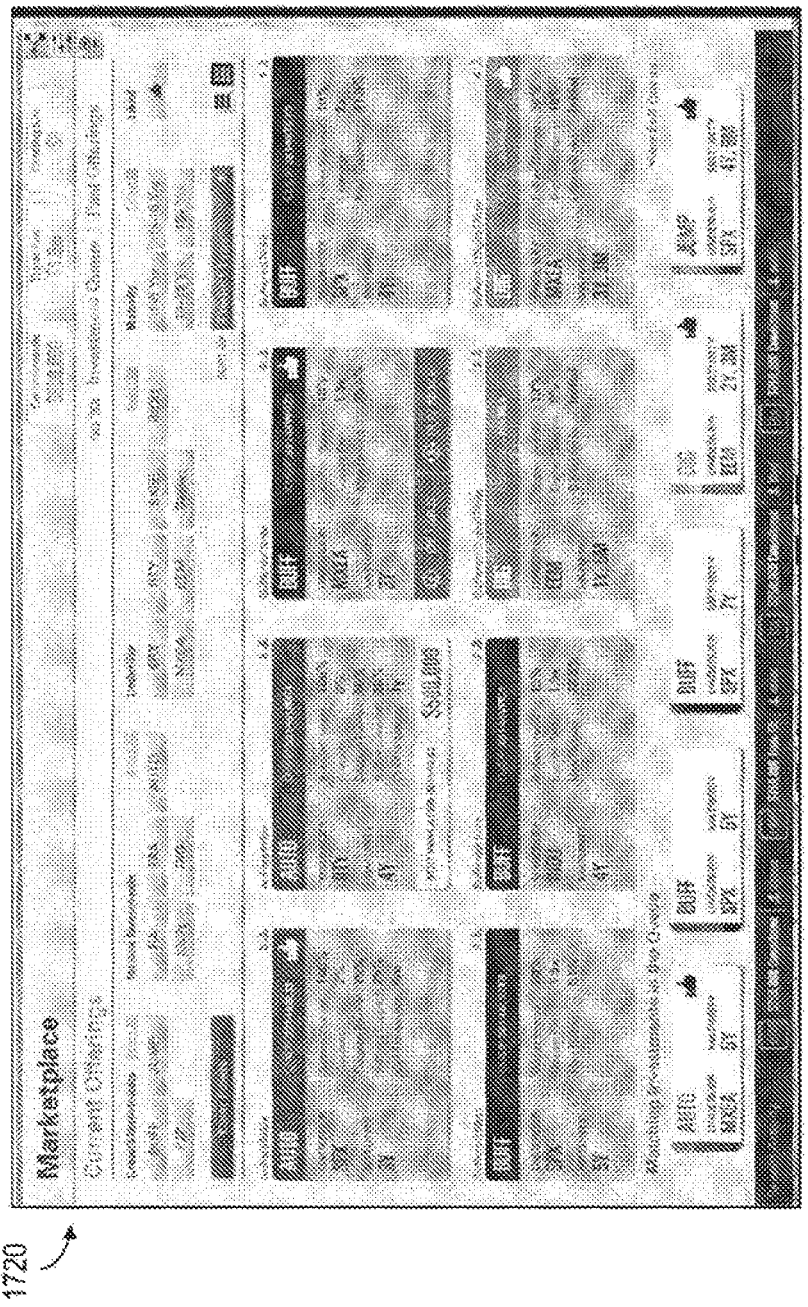

From the marketplace as depicted in F-G. 17A, the user may navigate to the "Current Offerings" interface, as depicted by the user interface 1720 of FIG. 17C. From, the "Current Offerings" page, the user may see the products one or more issuers have placed out in the market (e.g., for that month). The page may include filters to sort products by different criteria, and the user may click on the "Details" section of any product title to view details of the product, learn more about the specific structure, download the prospectus, access additional links back to the Learning Center. and so on.

Figure 17D:
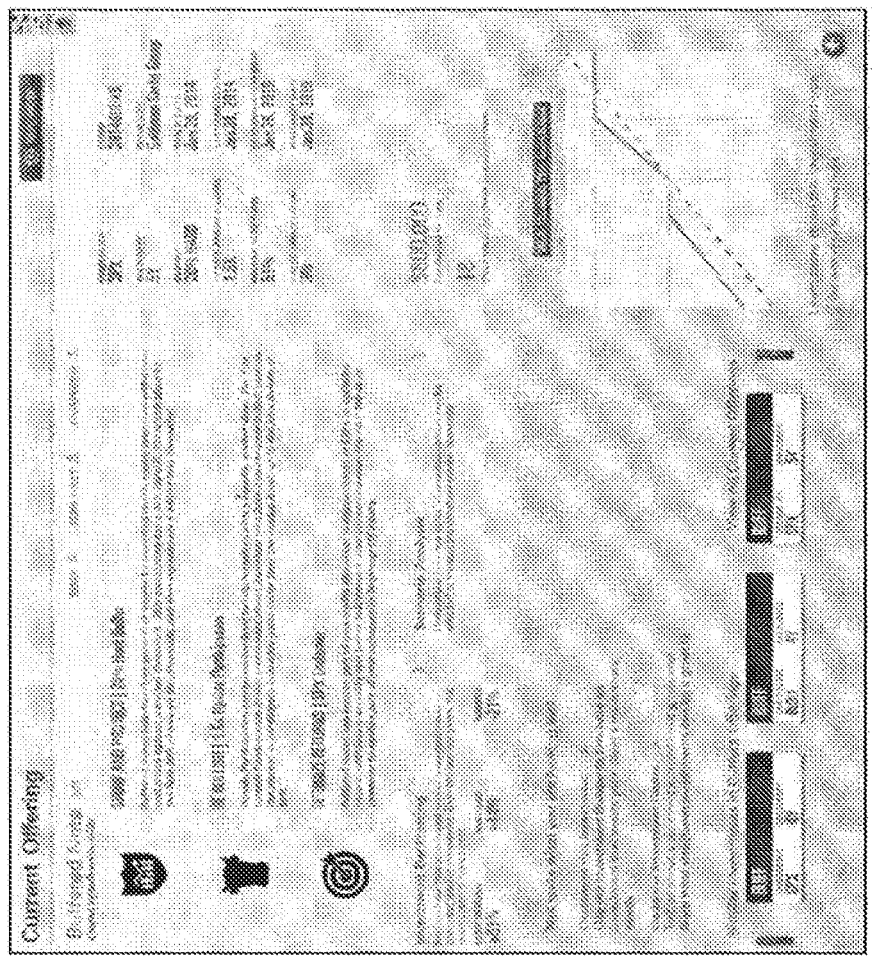

FIG. 17D depicts a user interface 1740 displaying a selected offering, such as a "buffered note," information about the offering, including analysis information, and user-selectable elements that facilitate a purchase or trade of the offering.

As described herein, the electronic platform 140 may provide various different navigation paths, across the different systems and/or user interfaces, to users. Many of the paths direct users to different analysis functions and algorithms.

Figure 18A:
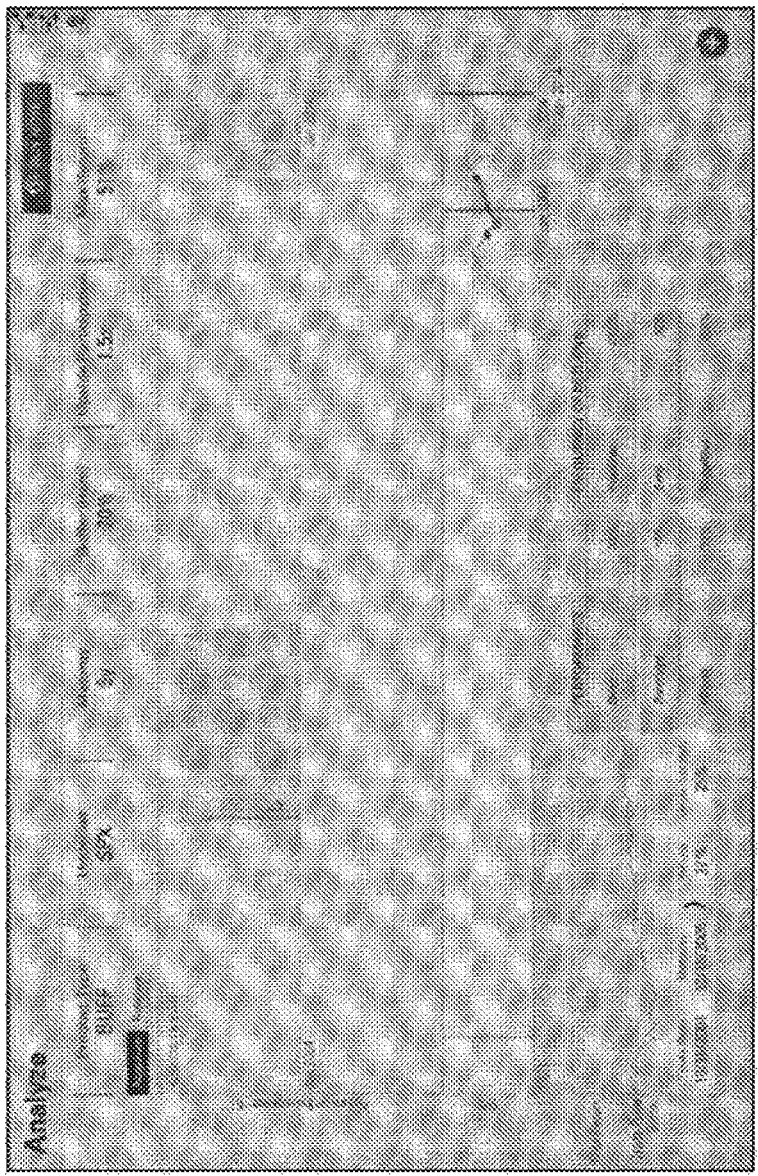
FIGS. 18A-18B are display diagrams illustrating example user interfaces provided by the product exchange system when analyzing generated investment products.
Figure 18B:
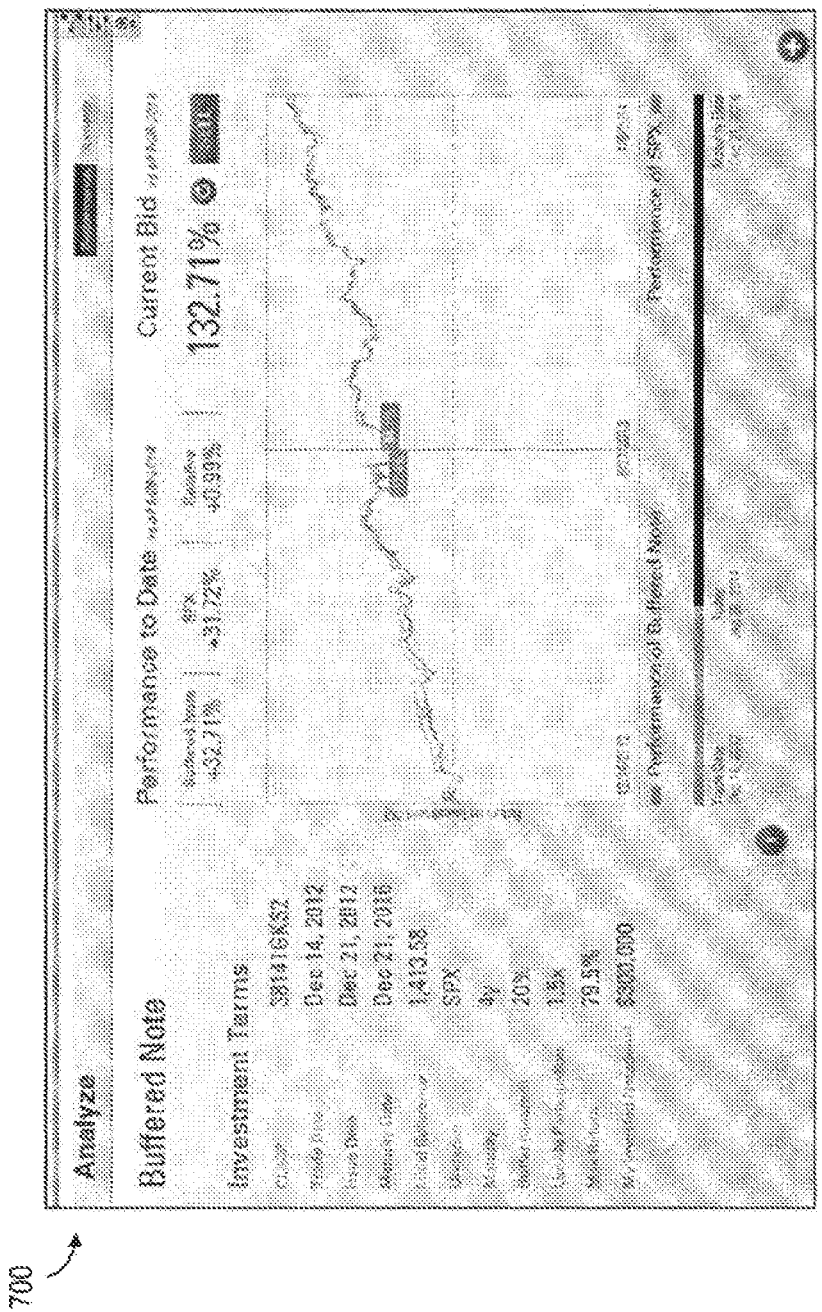

FIGS. 18A-18B depict results, shown by user interfaces 1810 and 1820, of various analysis functions that may be performed by the electronic platform 140. For example, the electronic platform 140 may present information associated with a structured investment product that is available for trading via the electronic platform 140 by receiving, via an interface provided by the electronic platform 140, a selection of a structured investment producer generated by the electronic platform, performing a backtesting analysis for the selected structured investment product, the analysis include a comparison of a theoretical performance of the selected structured investment product to theoretical performances of other structured investment products generated by the electronic platform, and presenting, via the interface provided by the electronic platform, a result of the performed analysis.

The investment backtesting tool allows the user to rake any investment from the current offering or a product the user or anybody else on the site built and backtest it to see how it would have performed in any market scenario. For example, as depicted in FIG. 18A, the x-axis shows a 10-year span and the bars in the y-axis on the upper graph show how the trade would have performed if the user had put the trade on any given day in the 10-year span versus how the market would have performed on that same day. The graph below shows, for the same 10-year span, how a straight investment in the underlying index would have performed. The graph down in the lower left shows how the market is performing. Also displayed on the same page is a summary of the statistics such as the performance for the best, the average, and the worst. The user may do the backtesting for any period in all of history that he or she wants.

The user may zoom in on a particular date while in the midst of a multi-point analysis so that the user can view theoretical return metrics that are specific to that discrete point in time. The user can adjust the timeframe over which a product's back-tested return on investment (ROD is visible. For example, the user may assess what a Buffered Levered Note product's absolute performance would have been over time (best/worst/average, % of time positive vs. negative) and what its relative performance would have been over time (best/worst/average, % of time outperforming versus underperforming). Thus, the investment backtesting tool allows the user to do a historical analysis on the fly for any product, offered by the issuer or constructed by a user, that the user chooses at any time, without latency.

In some embodiments, when back-testing a product, the user may select a theoretical trade date in the past for the product to see what the product's returns would have been at maturity based upon that theoretical trade date. Similarly, when the user selects a range of theoretical trade dates in the past for a product, the user may see what the product's maximum and minimum returns at maturity would have been and the corresponding trade dates. When back-testing a product via multi-point analysis, the user clicks on a point in the chart, the user may see what the theoretical return would have been at maturity at the selected point in time for a theoretical trade date. The user may modify the scale of the timeframe being analyzed to see a larger or smaller timespan in the performance graph, as appropriate.

In some embodiments, when the user chooses "absolute performance" mode when backtesting a product, the theoretical returns by day quoted as an absolute percentage gain or loss is provided to the user. When the "relative performance" mode is selected, the theoretical returns by day quoted as a relative percentage gain or less in relation to the underlayer's gain or loss is provided to the user. When viewing performance-to-date for a product if the "relative performance" mode is selected, the user is provided what the actual returns would be by day quoted as a relative percentage gain or less in relation to the underlayer's gain or loss. In some cases, when the "absolute performance" mode is selected, the user is provided what the actual returns would be by day quoted as an absolute percentage gain or loss. When viewing performance-to-date for a product if a point in time in the chart is selected, the user is provided what the underlayer's performance on that date was and what the bid as of previous night's close was for that date. When viewing performance-to-date for a product, the user may view the key terms of the product deal, such as when the product was traded, what the strike price was, current CUSIP, and the current bid. When viewing performance-to-date for a product, the user may request a real-rime bid price and receive the real-time bid price obtained from the issuer on demand.

In some embodiments, the scenario analysis tool allows the user to shock the environment. For example, the user may create a scenario where the user buys a note and then the underlayer goes up 20%. The user may use the scenario analysis tool to determine, for example, the bid on the note in the example scenario. The scenario analysis tool can perform these calculations for various permutations and combinations of products in an automated way in real time without latency.

In some embodiments, the investment Analyzer or the "Analyze" landing page provides post-trade services. For example, as depicted in FIG. 18B, the Analyze page displays investment terms and shows how an investment the user bought (e.g., over a year ago) (e.g., Buffered Note) has performed each day versus the performance of the actual underlayer (e.g., SPX). From the Analyze page, the user may see a current bid of the product. The user may ultimately click-to-sell the product from the Analyze landing page, without having to navigate elsewhere.

Figure 19A:
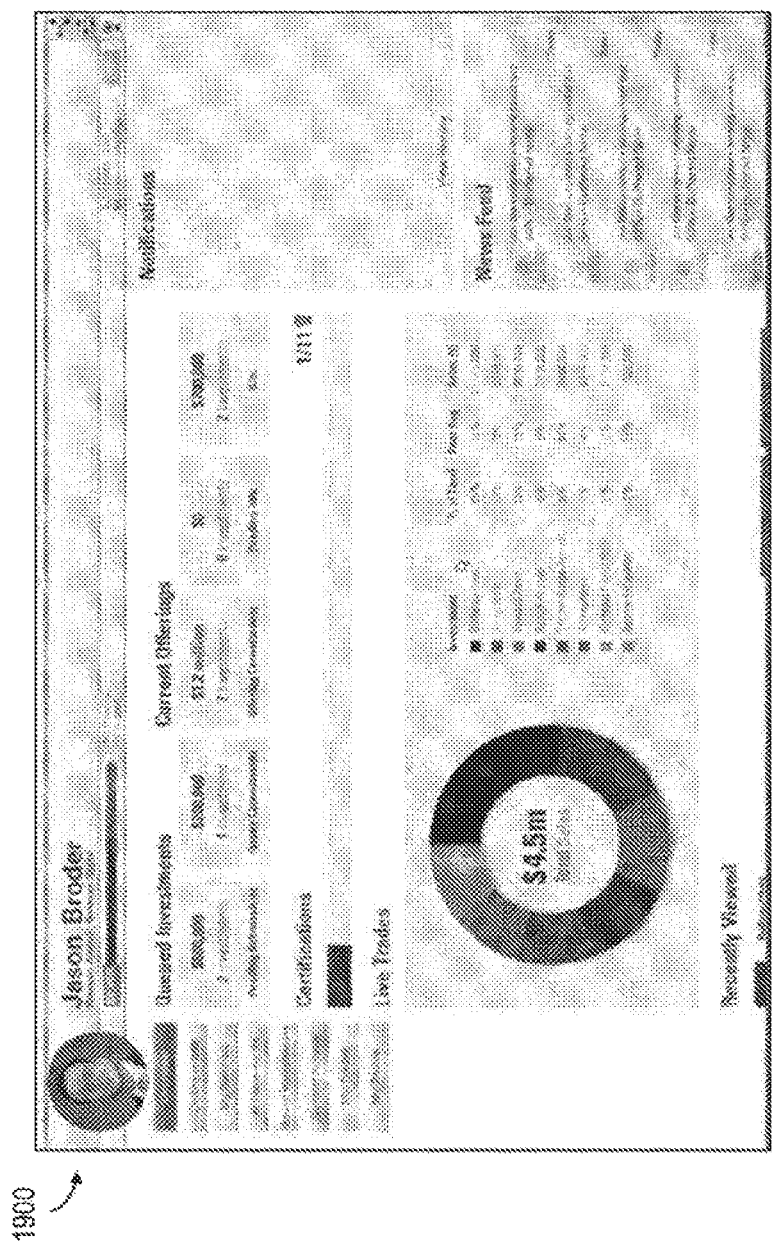
FIGS. 19A-19B are display diagrams; illustrating example user interfaces provided by the electronic platform.
Figure 19B:
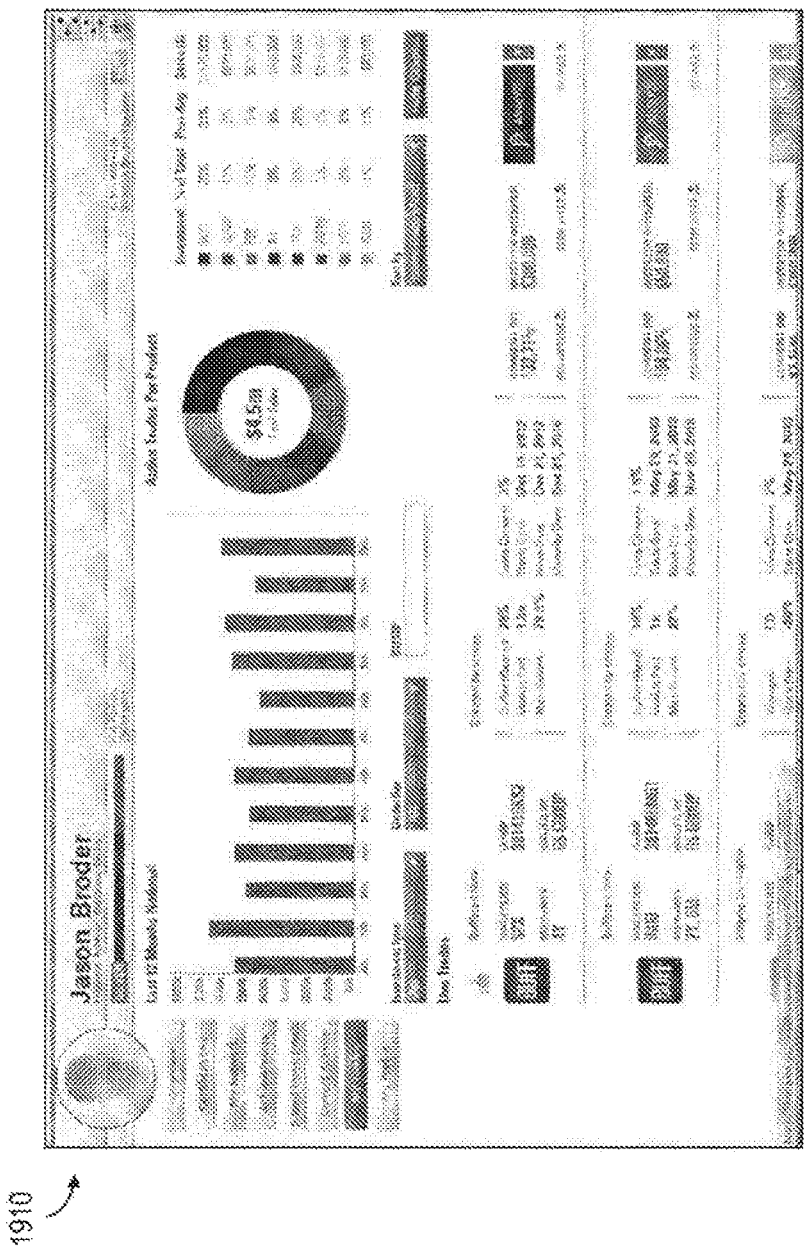

FIGS. 19A-19B depict example profile pages for users of the electronic platform 140. For example, the user interface 1900 of FIG. 19A displays general user information, such as username, email, current status level, and so on. The user interface 1900 may also display saved products and saved state in the Investment Finder tool, the certifications completed, and so on. Users may modify their details, and profile information is saved via an electronic platform profile services manager. From the dashboard, the user may access the queued investments (e.g., via a queue application widget) and other products, any notifications of products shared by other users, news or activity feeds, certifications, live trades, recently viewed products, and so on. The user may switch the dashboard into configuration mode to edit which application widgets appear on the dashboard and may customize the placement of application widgets in the dashboard.

As another example, the user interface 1910 of FIG. 19B shows the dashboard for trades where the user can track the investments bought by the user over rime via the electronic platform 140. The top of the dashboard shows the user's monthly notionals broken down by product, and the bottom shows the user the trades that are still live and how well they're performing. If the user clicks on "Analyze." he/she may dig into more details of a specific trade.

In some embodiments, the electronic platform 140 includes an investment viewer that provides the details of an investment recommended to a user by the Investment Finder so that the user can make an informed decision as to whether he or she want to invest in it. The user may also view the details of a saved or built investment and/or a current offering in the investment viewer so that user can make an informed decision before investing. Similarly, the user can also view a queued product in investment viewer so that the user may make an informed decision as to whether the user wants to commit to the queued product. The investment viewer can also display details of a previous offering, a summary of each key term of a given investment, investment type-specific terms for a given investment, investment terms populated with actual backend data from the issuer so that the user may work with real investment in the production environment, and so on. The user nay create a new product by cloning or customizing an existing queued product, current offering, or existing trade being viewed in investment viewer, such that the user can save time building his/her ideal product.

In some embodiments, when viewing a product in product viewer, or viewing a product in Investment Analyzer, or working with a product in Investment Builder, when the user clicks the link/button to "Share My Product", the user is prompted for a list of groups/users with which to share the product. The user may also share a Learning Center video with others in his/her network, among other things.

Thus, in some embodiments, the electronic platform 140 enables users to learn, build, and share information about complex investment products.

Suitable Computing System

Figure 20:
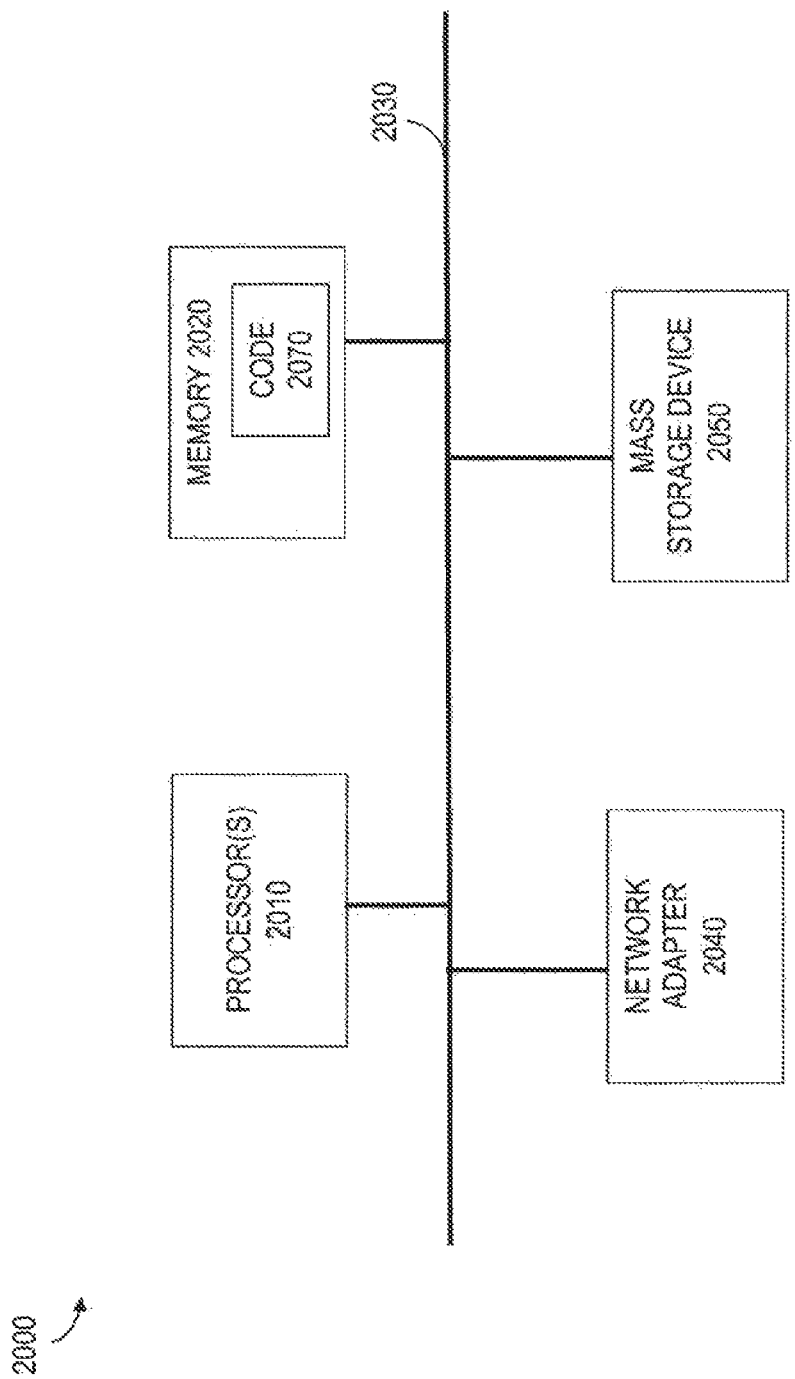
FIG. 20 is a block diagram illustrating a suitable computing architecture, which may represent any electronic device, any server, or any node of the computing environment described herein.

FIG. 20 shows a diagrammatic representation of a computer system 2000 on which any system or device disclosed in the embodiments can be implemented. The computer system 2000 generally includes a processor 2005, main memory 2010, non-volatile memory 2015, and a network interface device 2020. Various common components (e.g., cache memory) are omitted for illustrative simplicity. The computer system 2000 is intended to illustrate a hardware device on which any of the components and methods described above can be implemented. The computer system 2000 can be of any applicable known or convenient type. The components of the computer system 2000 can be coupled together via a bus 2025 or through some other known or convenient device.

The processor 2005 may be, for example, a conventional microprocessor such as an Intel Pentium microprocessor or Motorola power PC microprocessor. One of skill in the relevant art will recognize that the terms "computer system-readable (storage) medium" or "computer-readable (storage) medium" include any type of device that is accessible by the processor.

The memory 2010 is coupled to the processor 2005 by, for example, a bus 2025 such as a PCI bus. SCSI bus, or the like. The memory 2010 can include, by way of example but not limitation, random access memory (RAM), such as dynamic RAM (DRAM) and static RAM (SRAM). The memory 2010 can be local, remote, or distributed.

The bus 2025 also couples the processor 2005 to the non-volatile memory 2015 and drive unit 2045. The non-volatile memory 2015 is often a magnetic floppy or hard disk, a magnetic-optical disk, an optical disk, a read-only memory (ROM), such as a CD-ROM, EPROM, or EEPROM, a magnetic or optical card. SD card, or another form of storage for large amounts of data. Some of this data is often written, by a direct memory access process, into memory during execution of software in the computer system 2000. The non-volatile memory 2015 can be local, remote, or distributed. The non-volatile memory can be optional because systems can be created with all applicable data available in memory. A typical computer system will usually include at least a processor, memory, and a device (e.g., a bus) coupling the memory to the processor.

Software is typically stored in the non-volatile memory 2015 and/or the drive unit 2045. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory 2010 in this disclosure. Even when software is moved to the memory for execution, the processor will typically make use of hardware registers to store values associated with the software, and local cache. Ideally, this serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus 2025 also couples the processor to the network interface device 2020. The interface can include one or more of a modem or network interface. It will be appreciated that a modem or network interface can be considered to be part of the computer system 2000. The interface can include an analog modem, isdn modem, cable modem, token ring interface, satellite transmission interface (e.g., "direct PC"), or other interfaces for coupling a computer system to other computer systems. The interface can include one or more input and/or output devices 2035. The I/O devices can include, by way of example but not limitation, a keyboard, a mouse or other pointing device, disk drives, printers, a scanner, speaker. DVD/CD-ROM drives, disk drives, and other input and/or output devices, including a display device. The display device 2030 can include, by way of example but not limitation, a cathode ray tube (CRT), liquid crystal display (LCD), LED display, a projected display (such as a heads-up display device), a touchscreen or some other applicable known or convenient display device. The display device 5330 can be used to display text and graphics. For simplicity, it is assumed that controllers of any component not depicted in the example of FIG. 2 reside in the interface.

In operation, the computer system 2000 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory 2015 and/or drive unit 2045 and causes the processor to execute the various acts required by the operating system to input and output data and to store data in the memory, including storing files on the non-volatile memory 2015 and/or drive unit 2045.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the computer system operates as a standalone device or may be connected (e.g., networked) to other computer systems. In a networked deployment, the computer system may operate in the capacity of a server or a client computer system in a client-server network environment, or as a peer computer system in a peer-to-peer (or distributed) network environment.

The computer system may be a server computer (e.g., a database server), a client computer, a personal computer (PC) a tablet PC, a laptop computer, a set-top box (STB), a personal digital assistant (PDA), a cellular telephone, an iPhone, a Blackberry, a processor, a telephone, a web appliance, a network router, switch or bridge, or any computer system capable of executing a set of instructions (sequential or otherwise) that specify actions to be taken by that computer system.

While the computer system-readable medium or computer system-readable storage medium 2050 is shown in an exemplary embodiment to be a single medium, the term "computer system-readable medium" and "computer system-readable storage medium" should be taken to include a single medium or multiple media (e.g., a centralized or distributed database, and/or associated caches and servers) that store the one or more sets of instructions. The term "computer system-readable medium" and "computer system-readable storage medium" shall also be taken to include any medium that is capable of storing, encoding or carrying a set of instructions for execution by the computer system and that cause the computer system to perform any one or more of the methodologies of the presently disclosed technique and innovation.

In general, the routines executed to implement the embodiments of the disclosure, may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of computer system or computer-readable media used to actually effect the distribution.

Further examples of computer system-readable storage media, computer system-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), SD cards, among others.

Unless the context clearly requires otherwise, throughout the description and the claims, the words "comprise", "comprising." and the like are to be construed in an inclusive sense, as opposed to an exclusive or exhaustive sense, that is to say, in the sense of "including, but not limited to." As used herein, the terms "connected," "coupled." or any variant thereof, means any connection or coupling, either direct or indirect, between two or more elements; the coupling of connection between the elements can be physical, logical, or a combination thereof. Additionally, the words "herein". "above", "below", and words of similar import, when used in this application, shall refer to this application as a whole and not to any particular portions of this application. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation derails, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should nor be construed to limit the disclosure to the specific embodiments disclosed in the specification, unless the above Derailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the embodiments. Accordingly, the embodiments are not limited except as by the appended claims.

A similar alternative approach to the inventive method is detailed below.

In accordance with the invention an app could serve as a platform and could be put on mobile devices or standard computers and this would allow the client or private or small investor to type in and fixate their personal investment criteria such as risk tolerance, investment horizon, desired investment market, level of investment protection. This can be done by going through a customizing and tailoring process covering the whole product lifecycle and can be communicated by client devices associated with the users of the electronic platform.

In response to such product request information received from the client operating on the electronic platform, the software on the servers construct the product designed by the retail client, make information respecting the same available and execute the trade. Because it is highly desirable that the client have some level of sophistication, the servers provide product education to clients having the app and certify successful completion of online courses related to the tradable investment products which would be available to certified users of the inventive electronic platform. After one retail customer user of the inventive platform has created an instrument, that instrument is available to other users. This can occur, for example, when the software constituting the platform determined that other investment products managed by the electronic platform share characteristics with the product generated in response to the user's criteria. The result is a product exchange system and the establishment of an information exchange environment between users of the electronic platform.

As alluded to above, the investment instruments being designed by users are constructed from a combination of one or more selected investment products based on the information received from the user and based on the real-time conditions of the investment market. Particularly for a client using a bigger screen, there would be an option to drag and drop investment criteria on a payoff or other diagram, thus interactively and instantly displaying changing product characteristics. A heat map may be used to graphically simplify the customizing process. Such a heat map would effectively act as a number of pricing tables for each of the two or more priced components of the structured investment product. Such a hear map may be generated by interpolating pricing information for multiple sets of deal terms associated with the two or more priced components in response to information provided by the user of the electronic platform. The system may also present almost finished or already issued and traded products in an overview. The overall result of these aspects of my invention is, that the client/user defines the investment criteria himself via the online platform and does not necessarily need the help of a bank employee or financial advisor. Therefore cost can be reduced.

Does a private individual want to invest in Structured Products, this person almost always faces an almost unmanageable and too complex plethora of different structured products, names and naming conventions. First contact point is the stock market part and pages about those financial products in daily newspapers and web portals. Already here you get overwhelmed with the immense amount of different structured notes and the, as a matter of course, used technical terms. One of the little possibilities of segmentation lies therein, that the rough division of structured products is handled by separating them into Yield Optimization-/Participation-/Capital Protection Products. In the case that the interested individual or client does not have any basic knowledge about financial terms like barrier, floor, put or knock-out, the selection of an adequate product can be cumbersome. Exactly at this point the inventive platform, for illustrative purposes called Mystructuring, has its focal and starting point. Instead of tossing the client into the "jungle" of very numerous structured products and therefore finding a product "Top-Down" the inventive platform helps, advises and customizes a product just for the retail investment client according to the typed in requirements, propose an existing one or initiate the first-issuing of a new instrument.

The process of the online software aided instrument structuring is described below. After signing up with his already existing credentials or newly signed-up online-banking account, the client is provided with an educational introduction and tests on the main financial instruments and terms relating to structured products for this purpose of certifying competency to operate the inventive system.

Once certified, the client can begin the design of an attachment by typing in and fixating "step by step" one desire, requirement and investment criterion and therefore shorten the sample space for possible products. This may be done repeatedly to cause the system to select components of the structured financial instrument meeting investor criteria. In accordance with the invention, it is contemplated that the software on the servers operating the inventive trading platform will contain a wide range of investment products selected by the operator of the platform and having a range of different characteristics. These investment products would be selected for their ability to provide a range of characteristics when a number of these products are combined to form a structured product, for example a structured financial product. This enables the design of a structured product by the retail investment customer. As the product is being designed, the system may graphically display the characteristics of the product. Starting with the investment horizon and the risk appetite/attitude, the client types into a browser based platform (or, alternatively, in an app) the desired invested capital, desired barriers, strike-prices, et cetera line by line. Besides the now made constraints and criteria in the form and fashion of financial ratios and limits the inventive tool is programmed to also provide the client with the possibility displaying a desired payoff in the firm of a payoff diagram. The software provides a graphical display of the designed instrument's characteristics. The software is also capable of adjusting the criteria in both directions in real-time (namely changing the payoff-diagram graphically <-> constraints in form of text). Such adjustment may be done by clicking and dragging display characteristics on a graphic display of designed instrument characteristics.

Figure 21:
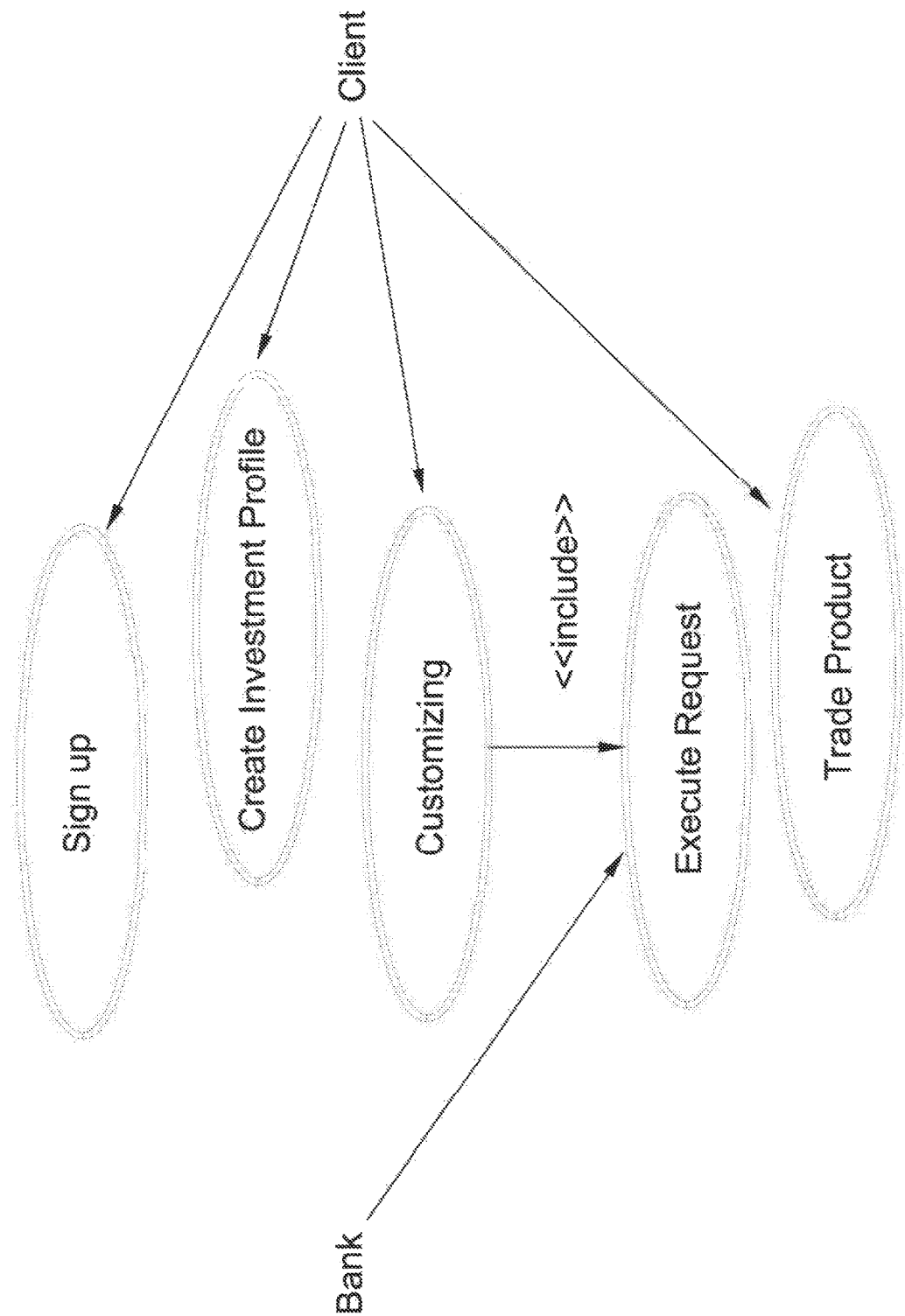
FIG. 21 is a diagram illustrating a client using the inventive platform.

Reference is now made to FIG. 21. In accordance with the invention, it is contemplated that clients using the inventive platform will be able to select between designating the particular financial product to be used in the structured product which they are designing, for example by giving a company name and other information. This may mean specifying that the instrument is to be composed partially of a Coca-Cola put or a Coca-Cola call having a particular set of characteristics which may be made available from the menu in the app used to design the structured instrument.

Alternatively, retail clients using the system may be given the option of inputting performance characteristics and the system, using an internal algorithm, selects the various components of the structured instrument being designed and constructed by the retail client. Such selection of a component by the system would be accompanied by an identification of the component, for example by company name, nature of equity, bond or other interest, and so forth.

Finally, retail clients using the system may be given the further option of removing a selected component, with the selected by the client or the system and substituting a different particular component by identifying its characteristics such as company name, and so forth.

In accordance with a further embodiment of the invention, the components of the structured product are selected by an algorithm on the system and disclosed to the retail client. If, however, the expected characteristics of such component change over time, and algorithm on the system operating the inventive structured product design and trading platform automatically picks a substitute component which is expected to perform closer to the investment criteria input by the retail customer, and the same is disclosed to the retail customer at the time of such substitution. Alternatively, disclosure may be made without taking the substitution and the retail customer given the option of switching from one component to another.

In accordance with one embodiment of the invention, after the client finishes the structuring-process by inputting investment criteria, he is told, whether his preferences are already met and represented by an existing structured product. If that is not the case, the client is then asked if a structuring proposal from the financial institution with which he is dealing should be sent. After such a proposal is created by the system it is sent to the retail client. This may be done with an instant message, text message or email, informing him that he can now invest in that product. Thus, the retail client is given the opportunity to purchase the proposed structure product. Once the proposed investment by has been purchased, for example via the Internet, the trade is confirmed and the client is sent an instant message, text message or email, confirming the trade.

The aim of the implementation of the inventive system is, to run the same as much as possible on existing IT systems. This includes the Online-Banking, client databases, derivative/risk-databases in order to prevent logical, physical and corporate-process related redundancies. Possible and thinkable is, that this platform could be a further embodiment and further option in the existing Online-Banking portals/websites so the consumer can easily choose to use the inventive platform. Therefore it would not necessarily be necessary to open up and manage new client-databases and therefore also security measures and processes as well as regulatory aspects don't have to be repeated. As an Online/Webplatform in an Internet Browser a high grade of compatibility as well as connectivity/availability would be promptly available with a minimum of investment. The Introduction of an iOS or Android App would be possible and desirable but as a first step the implementation for the browser "alone" version of the inventive system would be sufficient and further steps such as design of an may follow. As an alternative the platform could already be accessed by a smartphone's browser as a first step, given the wide availability of such devices and the fact that they are generally more available to users than personal computers or even laptops, which cannot be so conveniently kept on hand, for example in a person's pocket, at all times.

The inventive process may begin with a new client of the bank or other financial institution registering on the website as a client. The client then receives his credentials via Email (either automatically as a result of an algorithm in the system, or after a bank employee in the backoffice verifies and validates his application and does a credit check). Concurrently, for the sake of simplifying the payments, the financial institution may send an offer to open an online-banking account and/or checking account.

Once registered as a client, the client then logs into the platform using his user account and password. After his first successful log-in, the client is provided with a first tutorial on how to use the platform. The tutorial both explains and visually showcases the system.

The next step is the place the client into an investor category, at least for a particular investment session, and to remove certain investment products and derivatives from the personalized catalog and queue of the user investment session. This is done by having the client enter his investment preferences on his user device, such as an Android smartphone.

Two alternatives may be considered at this point. First, client answers a plurality of questions and sent a number of constraints. This process is meant to assess his investment criteria and preferences. Such process can be achieved using a multiple-choice question format with the client clicking on his selection. It is anticipated that questions will include multiple choices selected in order to assess loss tolerance and/or loss sensitivity, the desired range of annual performance/return (normally very structured product specific), preference between trade-off return and risk preference (for instance; defensive, low; medium, moderate; slightly higher, slightly higher; high, aggressive), annual savings potential from earned annual income (for example from employment, investments, pension, etc.), free capital assets, and investment horizon The invention also contemplates the determination of client type, for example low income, middle income, high income, high net worth individual, etc. The same may be determined on the basis of a plurality of multiple-choice questions to be answered by the prospective client.

As an alternative to a multiple-choice format, an open field may be provided for the prospective client to type in his investment criteria in plain language which would be processed by an artificial intelligence algorithm to determine a more formal presentation of such investment criteria. This more formal representation would then be displayed to the user in order to confirm that his plain language request has been understood. Use of a multiple-choice question format is preferred, because data could be more structured and easier to save, and may also be easier for a user.

In accordance with one alternative embodiment of the invention, the client begins the process by entering one constraint after another. This results in shrinking the possible selections of the available structured products. Constraints may include, for example, the investment amount, risk tolerance, investment horizon, and the other investment criteria detailed above. One possible way to implement this process is for the system to ask, for example, three to five questions such as "how much do you want to invest", "how long do you want to hold this investment", etc., for example in a multiple choice format. For example, as potential answers to the question "how much do you want to invest?", The system could present the choices "less than $1000" "$1000 to $10,000", and "$10,000 to $100,000". The next step in the process would be the input of investment criteria using plain language (to be processed by an artificial intelligence algorithm) as composed by the client user of the inventive platform, or, alternatively, dragging and dropping investment criteria options from a menu presented by the system. Such free "adding" of constraints and wishes by unconstrained selection possibilities in open fields may be preferable for many users.

Alternatively, the client may type in and provide his wishes, desires and objectives in plain language, without the use of any multiple-choice or drag-and-drop options.

In accordance with the invention, after every input of one constraint (for example, which, desire or objective), the graphic user interface responds by refreshing the relevant field. In addition, if the client input is met by an existing structured product, the field, which was previously a pale green may turn red indicating that the product cannot be made by the client because there is already a product inexistent which meets the criteria. On the other hand, if an additional constraint is added to feel may turn green again indicating that a new product may be created. If the client is agreeable to purchase the existing product, in response to the client clicking on the "structuring completed" button on his device screen, information on the same may be presented by the system. The client is then given the opportunity of making the trade by clicking on a "make trade" button on the screen. The changing of the background color from green to red may be accompanied by a text message) for example, saying whether an already typed in and provided option is covered by an already existing structured product. Such message may also include further instructions to the client.

Both of the above alternatives may have the common element that they start with one field for the entry of information or multiple choice selection, and after input by the client, another field or other input is displayed by which other investment criteria can be input and displayed.

Figures illustrate various aspects, choices, features, screens and the like of the present invention. The invention contemplates the use of a payoff diagram such as that illustrated in FIG. 23, 25 or 26. As can be seen from these figures, the payoff diagram shows the various features of the instrument involved in a format familiar to those in the investment field.

Initially, in accordance with the invention, an empty payoff diagram is displayed. The abscissa and ordinate parameters are displayed, as determined by the trading platform system algorithms. However, the client is permitted to change the same by writing in plain language suggestions which may trigger selections from a parameter database employed by the system. This would be done prior to the commencement of the structuring process.

A pallet of desired options is presented on the screen. To begin the structuring process, the client can select and move from the palette such options as Strike, Barrier, Multi-Barrier, Cap, Mid Cap, delta hedge, vega, and so forth, as a client may choose, and have it moved into the diagram. Dependent on the selection he can now draw and drop one point (coordinate) in the diagram and draw the payoff diagram (also done in real-time by the plotter) and couple it with a function or an attribute via a line or specific drawing.

It would also be desirable for the tool to automatically get the gradient, incline or slope and then, for instance, automatically compute the corresponding delta hedge ratio, and draw it into the diagram. A pop-up message would then be sent to the client in the form of a text question on the screen which suggests, for example: "Slope=4 identified" which to one of skill in the investment field would for instance mean "4 Call positions to be fixed, and composited". The client would then fix the Strike by positioning the mouse and clicking the same at the desired Strike (x,y coordinates). Input into the diagram should only be possible if financially reasonable and logical, and the same would be controlled by system algorithms.

Such algorithms would work by balancing the degree of freedom for the client (to the extent that it is connected to client satisfaction) and financial institution liability to guard against the client taking financially unreasonable risk without a sufficiently likely expected and reasonably scaled benefit.

In addition, the ability to switch between different views and palettes are desirably provided. In addition, different graphic user interfaces may be selected, for example one graphic user interface in an expert mode and the other in a standard user mode. For example, an expert user might not require any explanations. Intermediate uses may require fewer explanations than beginner users.

In accordance with the invention in a synchronous mode the system makes it possible to concurrently type in investment constraints via box type input field or by dragging from a menu of options, or directly enter a characteristic in the payoff diagram by dragging and dropping components of the desired structured product characteristic. Changes in one area (entered for instance by mouse click) should be, after confirmation that they do not have a forbidden condition which would be prevented by the system, automatically applied, put forward and displayed in real-time along with the other components of the structured product.

By clicking on a "Structuring finished" button the client is told, if the designed investment criteria provided by him and typed in are already covered by an existing structured note. Otherwise he will get the offer to be sent a request for the customized financial product/derivative requested by him, if a similar or same request has not been declined at this point in time (for example because the product does not make reasonable financial sense, or because an existing product already meets the specified investment criteria).

In accordance with a preferred embodiment of the invention, the platform would cover the whole pre-trade, during-trade and post-trade lifecycle. By this every related process could be done online exclusively by or over the platform, so that the corresponding bank could save cost, time and personnel. Optionally, one step (for instance request for new structured product) may be monitored by a bank employee.

If a request portrayed is accepted by the system, the client is informed, for example via email or text, that the structured product is up and ready for trading and execution. A direct link on the platform and an overview of all the traded financial products of the client provides the client with an overview. The trading formalities, procedures and requirements (also term sheet) are also sent to the client's email-address. The to be invested amount is either automatically charged to the client's account or a payment order is provided to him (either via Online-Banking or in writing). Over and by his platform the client can monitor, screen and follow his already bought, finished and open structured products in a summary view at any time, to allow a management function.

The inventive platform which is termed in the exemplary embodiment in this application as "My Structuring" (FIG. 22) addresses the clients' need to have more participation in the creation and structuring of financial products, and more particularly structured products combining the characteristics of more than one underlying instrument.

Figure 23:
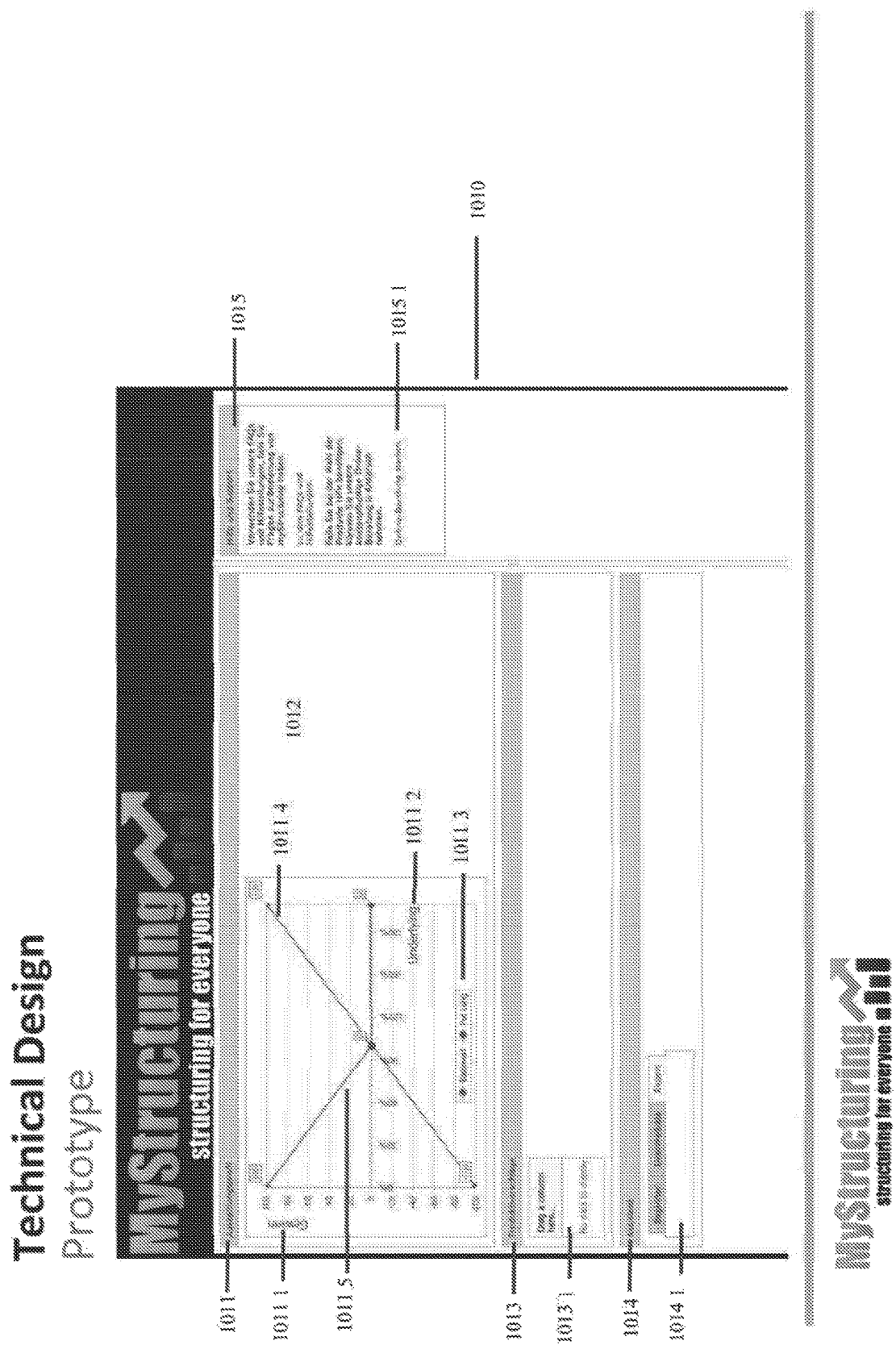
FIG. 23 illustrates a payoff diagram of a structured product.

The inventive technology offers significant benefits by making structured products available for the masses (i.e. relatively unsophisticated investors) (FIG. 23). The Online-Platform eliminates consulting costs normally necessitated by the involvement of a financial consultant located at a bank. Rather, in accordance with the invention, the cost of a life consultant is eliminated by providing an educational platform, a friendly user interface, and an algorithm providing constant feedback in response to consumer requests in the form of instrument performance, performance expectations, suggestions, directions and the like to guide the investor through the investment structuring process which is accessed online, for example through a tablet or smart phone. However, conventional consulting may be still available via fee.

Figure 24:
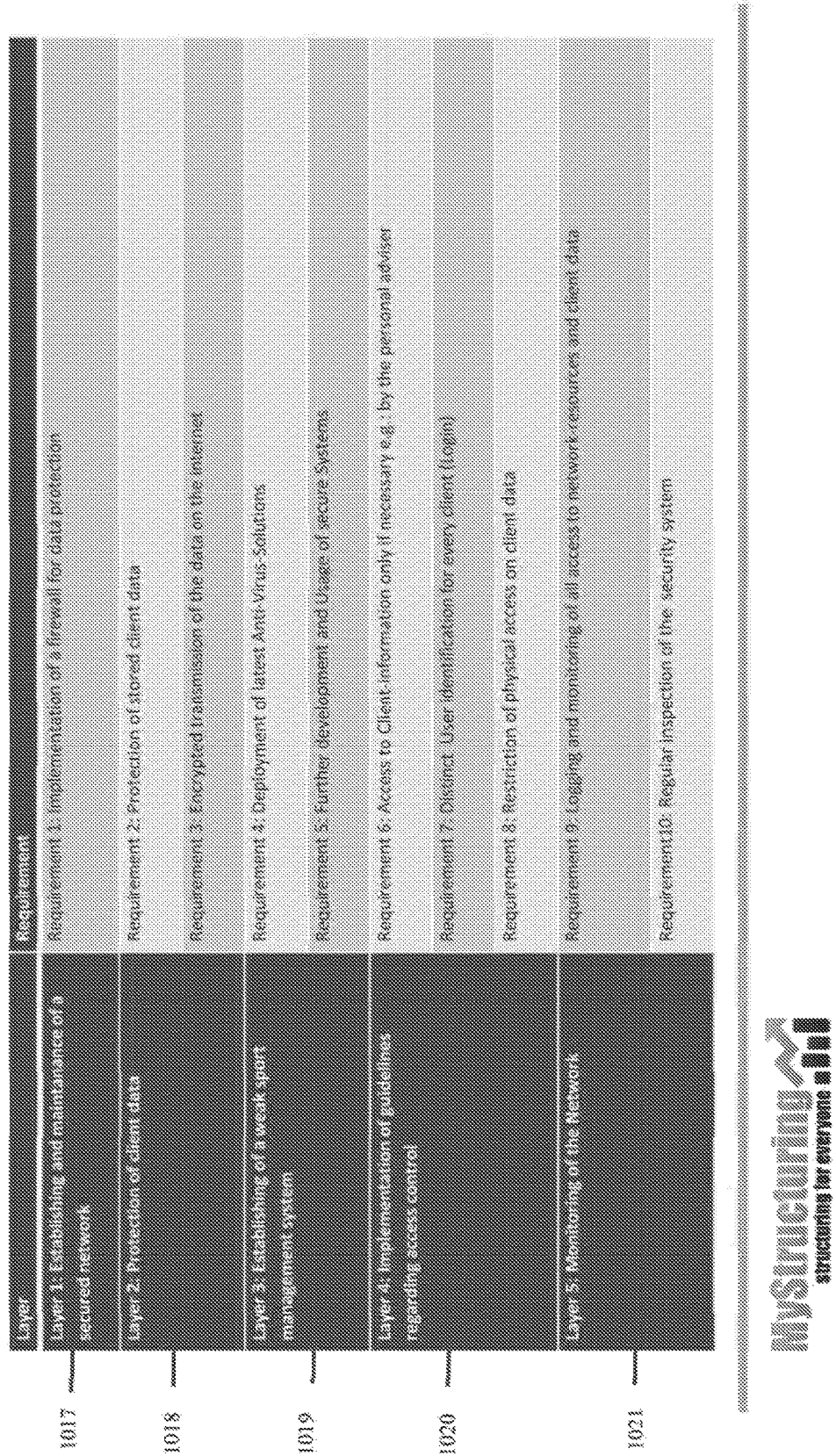
FIG. 24 illustrates overall general security measures and requirements for the online-platform.

Benefits for the bank are, that the platform can drastically reduce expenses while providing the added advantage of concurrently acquiring new clients (FIG. 24). Furthermore, the financial entity operating the inventive system, such as a bank, broker or other investment house, can identify new trends regarding structured investment products, client behavior and thereof derive customers' wishes, from the informational inputs and trades received from customers using the platform.

On the client side the benefits are, that the platform user gains access to exclusive financial services, which were only available to high net worth individuals prior to the invention (FIG. 24). Also the client can participate in investing in structured investment products with a smaller budget. The platform therefore provides and enables the client to co-determine and interact with other users and other users' on the platform to create customized, issued and traded structured products (FIG. 24).

One statement within the industry by Credit Suisse was, that the inventive online platform would enable clients to invest from CHF 10 000 to CHF 20 000 or more into the market for structured products. Also the product exchange platform's functionality would be an additional source of profit for the Bank (FIG. 25).

FIG. 22 illustrates one type of client devices 1001 needed for the access and usage of the platform, such as personal computers. Tablets or smartphones will also function well with the inventive system. A virtual (smart) contract 1002 is stored in a non-transitory computer-readable medium. Contract 1002 is generated and redacted according to regulatory needs, requirements and laws of the user's domicile. According to the client's drag & drop adjustments either on the payoff diagram or on the free fields regarding the constraints and investment criteria for his customized financial product, the contract is updated, expanded and automatically generated in the product generation system.

One embodiment of the contract is the term-sheet for structured investment products. This term-sheet can be printed as a PDF (Portable Data Format) or Microsoft file. Another embodiment of the contract is a XML (Extensible Markup Language) file or another adequate markup language file. Yet another embodiment or use of this dynamic electronic contract is to automatically fill regulatory forms like Foreign Account Tax Compliance Act ('FATCA') Forms "on the fly" as the user of the platform makes and trades his financial products. This automatic generation of contracts and forms results in dramatic cost reductions regarding front-office, middle-office and backoffice efforts normally done by bank employees. The data and records themselves are either stored in one or more centralized servers 1003, or in a decentralized distributed database network (also peer-to-peer technology). The network as well as the server and storage infrastructure is assisted, implemented and protected by cryptographic hash-tables and other cryptographic and encryption technology. In one embodiment, the online platform comes together under a brand name 1004 which is presented on screens in the graphic user interface, in this case the brand "MyStructuring".

In yet another embodiment contract 1002 is, in addition to being a dynamic electronic contract in form of an XML or PDF-file, upon-user-request platform user controlled and platform user executed computer code existing, controlled, proposed by the user or the bank or a broker or another financial entity on the distributed decentralized network. The decentralized distributed cryptographic hash-table acts and serves, including but not limited to, with the product generation system 144 and product exchange system 146 together with the exchange market server 130 on the decentralized distributed network at one or all nodes as an information-retrieval-service together with the financial product or financial derivative in form of a decentralized distributed hash-table on the decentralized distributed network storing cryptographic hash values together with the upon-request computer code promulgating the contract upon-user-request with all its legally enforceable conditions on ownership, payments, claims, due amounts or any and all other related terms regarding structured products or financial derivatives or related (escrow) ownership. In order to being able to pinpoint and locate the relevant nodes, containing and indexing the dynamic electronic contract 1002 and all investment items and criteria related to it on the network, the inventive technology enrolls and furnishes the users upon-user-request the relevant information to the relevant parties to a dynamic electronic contract 1002 on a structured product term basis pre-trade, during-trade or post-trade on proposed investment criteria, regulatory demanded collateralization figures or payoff or redemption payments or any other provision or covenant or lien to be enrolled on by the bank or the user of the platform. The inventive technology decides on its own after user-requests regarding existing dynamic electronic contracts on the network which party is furnished with the relevant information and terms regarding a contract based on the information defined in the specific relevant contract. Originating parties to a contract steer the information for a trade or proposed contract until settlement on the network and decide which information and investment terms are disseminated to whom until settlement on the network.

Prior to a proposed investment product parts or upon-user-request separate investment items or investment components or investment positions a plurality of portions of a structured product or tranche of a structured product or risk portions of a derivative or units of a trust or beneficiary of a trust, of an up-REIT or down-REIT regarding an m-REIT (mortgage Real Estate Investment Trust) or e-REIT (equity Real Estate Investment Trust), (re-)preferring of preferred stock or trust preferred securities, mark-to-market investment criterion, mark-to-model investment criterion, jump-to-default investment criterion and else related terms, seniority, thickness and granularity of a tranche, insurance policy payout investment criterion, reinsurance policy linear or non-linear risk pooling or risk reapportioning payout investment criterion of a structured product component or financial derivative, the product generation system 144, the product exchange system 146 and the exchange market server 130 enroll to the platform user a new of its kind to dare upon-user-request proposed tranche as alluded above translated into a specific structured product or derivative on the decentralized distributed network on the market investment environment.

In yet another embodiment the inventive technology enrolls a tranche to the user or users regarding a specific structured finance or structured note investment relevant by legally enforceable claims indexed on the decentralized distributed network to the relevant parties which was not upon-user-request envisioned in substantial similarity and reoccurrence in are apportioning of risk, financial tranche differentiation, interest rate swapping or else by a party relevant to the specific contract, by the parties relevant to the specific contract to an investment criterion or by upon-user-request computer code envisioned in a upon-user-request relevant to the specific dynamic electronic contract 1002. In yet another embodiment said specific contract 1002, with the relevant specific parties having an interest in said contract, is indexed, distributed and relocatable on the decentralized distributed network prior to the proposed structured product determined by the platform user id and the session id with a bank, broker, broker dealer, investment company, insurer, reinsurer, asset manager, retail customer, retail investor or other financial entity being a certified inventive technology electronic platform user.

In yet another embodiment said tranche or proposed investment criterion is cryptographically secured and encrypted upon-user-request administrating a legally enforceable dynamic electronic contract 1002 residing on the decentralized distributed network resulting in a claim or interest payment or interest rate change or swap or other related condition regarding a structured product or financial (over-the-counter) derivative located by cryptographic hash indexed in the cryptographic hash-table on the decentralized distributed network on one or all nodes on the network.

Figure 26:
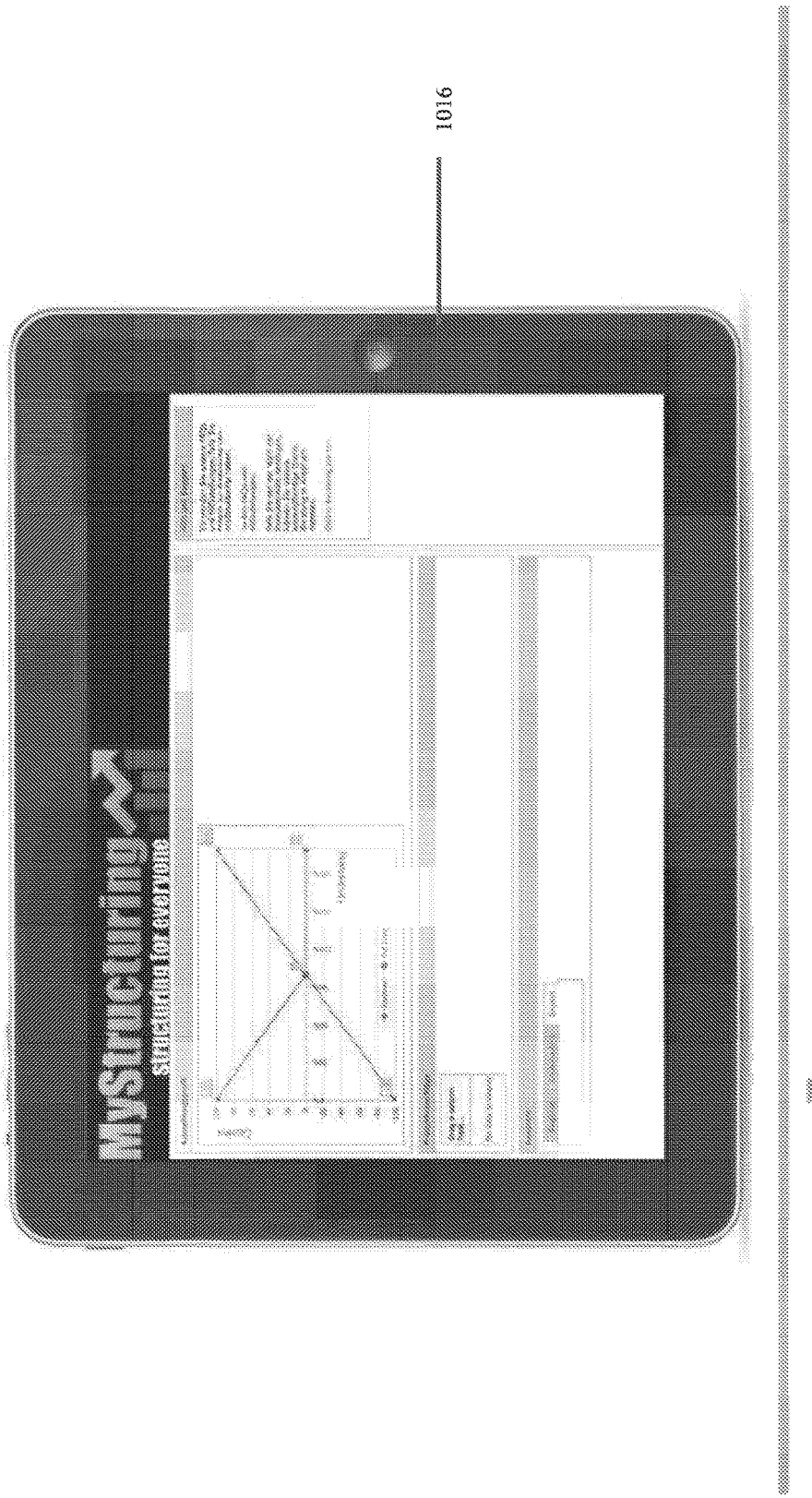

In yet another embodiment of the inventive technology front office, middle office, back office efforts and costs and personnel can be dramatically reduced because the product exchange system 146 and exchange market server 130 in concert with the decentralized distributed network enables investment component computations for and by the platform users on nodes on the decentralized distributed network so that platform users to a structured product or tranche regarding a structured product or financial derivative can explore and use specific relevant information and records without the need of having and administrating own records in separate bookkeeping or ledgers prior to the inventive technology. Many employees in the back offices at banks, insurers or other financial entities are employed in order keep the respective bookkeeping or ledgers regarding claims, due amounts, in-arrears claims, spens clauses, waterfall provisions, securities lending conditions and any other related records or information relating to structured products or derivatives up-to-date. In some cases those queries and computations even fail or are stalled. The presented inventive technology enables that parties to a structured product, financial derivative or related financial product can share the same relevant distributed information without the need of own bookkeeping and ledgers in a useful and otherwise not possible way and at the same time reduce costs, time and speed up settlement and cleating by preventing the need for different 'information silos' at many or every party by consulting the respective node or nodes on the network. This usage is possible either from a connected personal computer 1001 (FIG. 22), tablets or smartphones 1016 (FIG. 26).

Figure 29:
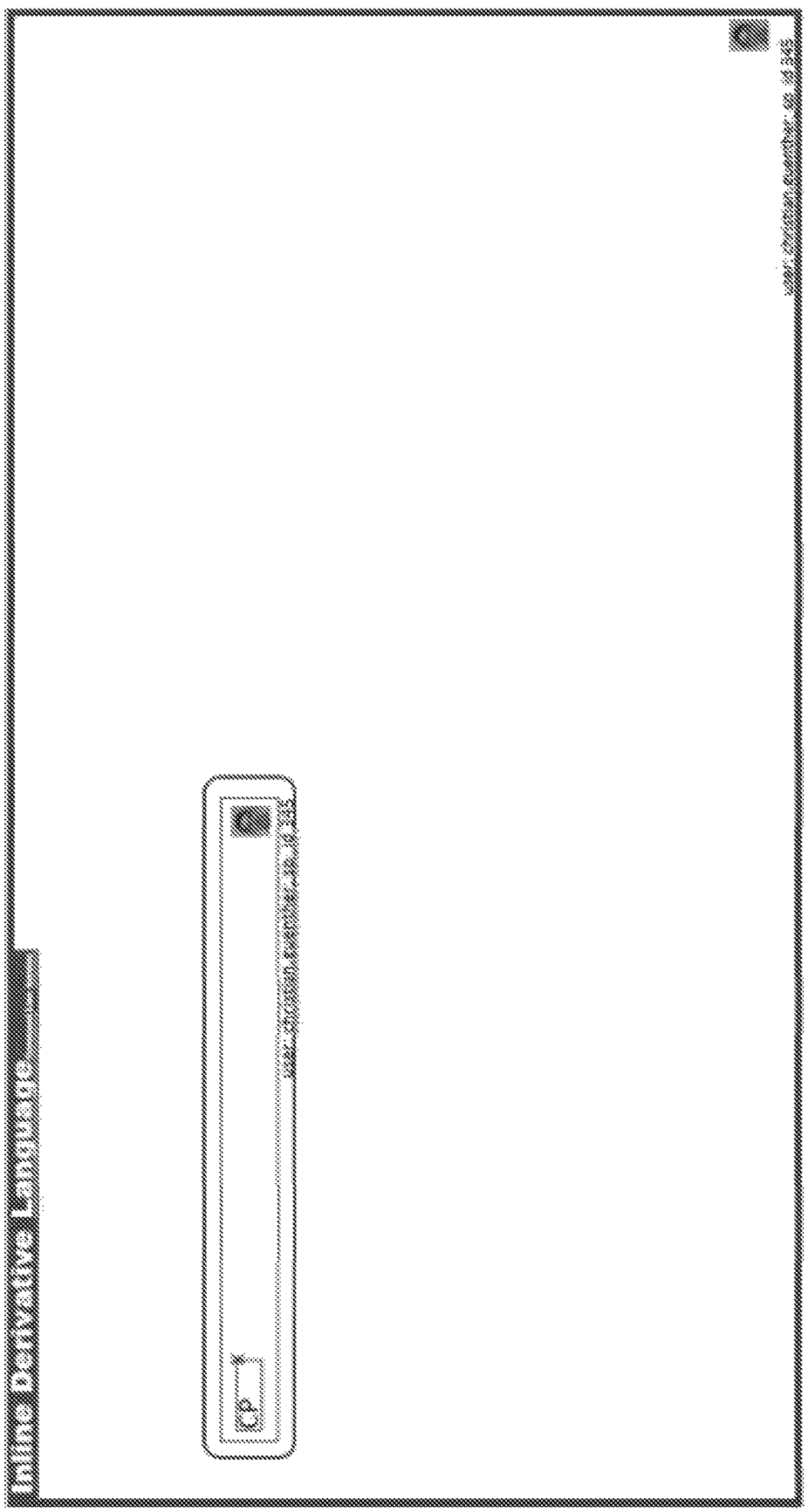

In yet another embodiment any drag and drop change on the payoff diagram (FIG. 23) or change in the in-line derivative language session (FIG. 29) or change in the hedging diagram (FIG. 47) also regarding the user's or bank's quantofx exposure as with any other investment condition identified during the session by the session id and user id is either upon user-request or otherwise platform-user-related translated into computer code in the either existing or formed structured product dynamic electronic contract 1002 if said tailored financial tranche opportunity is new of its risk and kind and has not been promulgated prior to the session id and user id, which is likewise encrypted by a cryptographic hash function and indexed on the decentralized distributed network on every node. The product generation system 142 together with the product exchange system 146 and the exchange market server 130, consults that a proposed transaction has nor been processed, settled or cleared on the decentralized distributed network for a structured product or derivative or other financial transaction on the platform or on the decentralized distributed network on any node at any time or time frame and is therefore new of its kind, in accordance with the investment criteria and terms and agreements in the legally enforceable dynamic electronic contract 1002 also represented by computer code.

Figure 35:
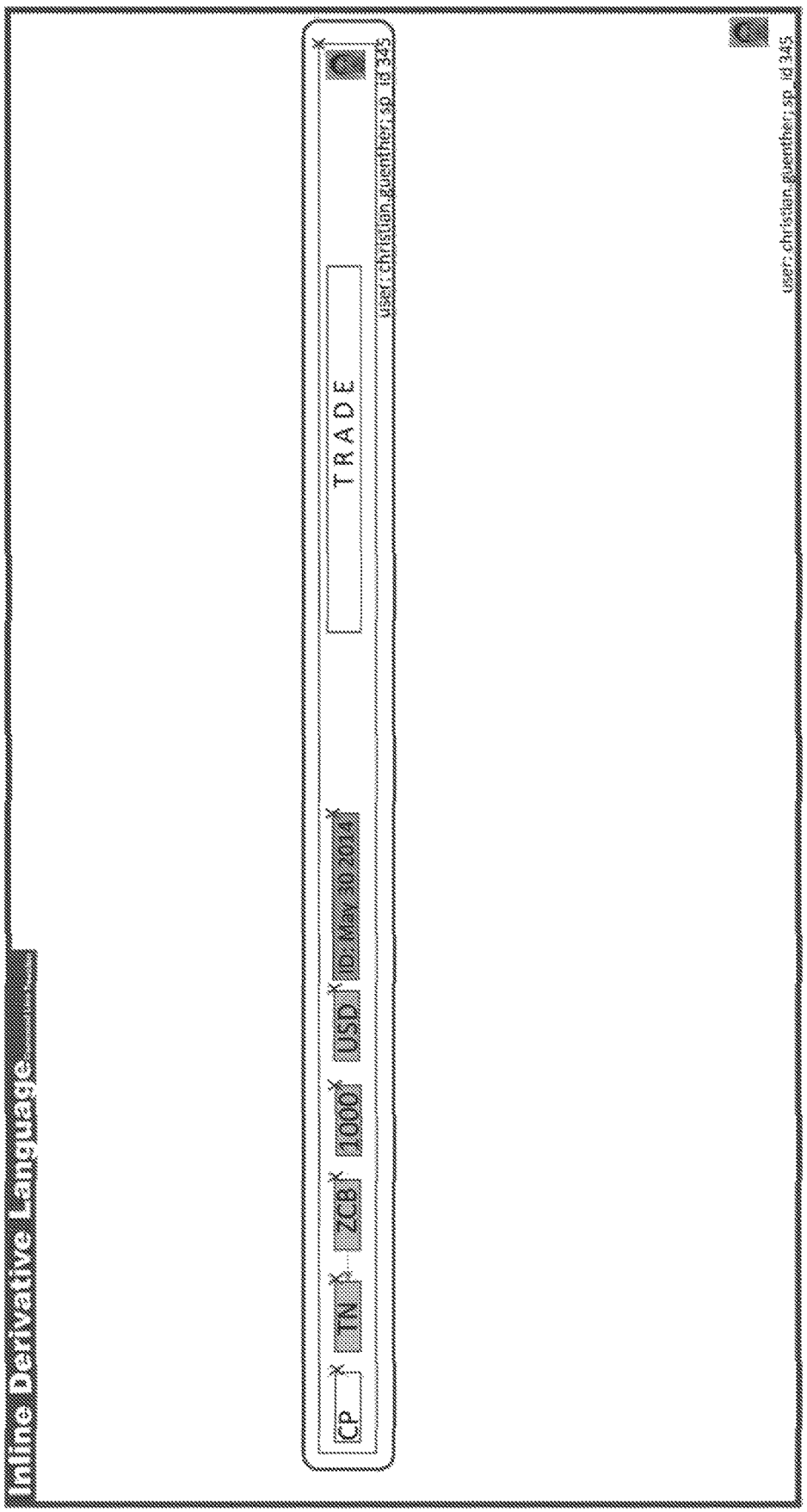

The product generation system 142, the product exchange system 146 and the exchange market server 130 ensure during a platform user session either on a personal computer 1001 or mobile device 1016 in concert with the decentralized distributed network in real-time or nearly real-time that a structured product or financial derivative is marketable according to either the investment conditions proposed in FIG. 23 or FIG. 29ff. At the same time the inventive technology adheres to applicable law or investment statues like Know Your Client (KYC) or Anti-Money-Laundering (AML) provisions according to the user's domicile by prompting the user specific messages or notifications (FIG. 34, FIG. 35). This user/client on boarding on the platform is done before a platform user can use the platform and start his certification process along with his credentials and personal details. In one embodiment the inventive platform notifies the platform user either on his mobile device or computer during his session for instance by mentioning the U.S. Department of the Treasury OFAC (Office of Foreign Asset Control) SDN (Special Designated Nationals) listings. Likewise the inventive platform in concert with the decentralized distributed network notifies the user that issuance of a structured product or structured note would lower or strain capital or posted collateral off limits which is required to adhere to certain regulation pursuant to BIS (Bank for International Settlement) Basel III or Basel IV (CET 1 and else), Federal Reserve or S.E.C. (U.S. Securities and Exchange Commission) capital requirements. In yet another embodiment the platform would advise the user that issuance or trading for instance specific exotic over-the-counter derivatives or so called 'when-issue-securities' would add to much risk to his portfolio. To that end the platform user would be required to get director override privileges by his superior or risk department head. This can be done by freezing his platform session (FIG. 34) and forwarding it either over the decentralized distributed network to his superior so his superior could take control and finish the trade (FIG. 34) or by asking his superior for a specific by the inventive platform computed one time cryptographic hash furnished on the distributed cryptographic hash table. Likewise as alluded before this streamlining of business processes taking necessary and mandatory steps into account reduces cost and lowers response times dramatically because of the complicated nature structured product deals.

In yet another embodiment proposed investment products are distributed to the designated parties/platform users over the decentralized distributed network. Proposing a structured investment embodied by a dynamic electronic contract 1002 results in the creation of a new node on the network. Designated and relevant parties on the platform to a structured investment embodied by a contract on a node on the network are furnished with the information and node by the product generation system 142, the product exchange system 146 and the exchange market server 130. In yet another embodiment this furnishing can accomplished by promulgating the specific cryptographic hash for the relevant specific node on the decentralized distributed hash-table on the decentralized distributed network. In yet another embodiment this furnishing means, that dependent on structured product or (OTC) financial derivative or any other related dynamic electronic contract 1002 deal term or investment criterion only designated parties or party are recipient of the disseminated deal terms or investment criterions. This enables either the settlement of a transaction or a trade; also a (escrow) (ex-)change of ownership via relevant node-access via cryptographic hash by the electronic platform or by the certified platform user. In yet even another embodiment this furnishing embodies deal term computation, deal term information exchange, physical exchange of goods, products, manufacture, live-stock or any other business term or business component, to be delivered product (financial, physical or any else related) or financial product or insurance policy or reinsurance policy related deal term or investment term computation, collateral aggregation or computation, computation of potential collateral potential exposure figures, upon-users request (exercising of an option) decentralized agreement between multiple platform users on collateral collection periods on the distributed decentralized database network identified, encrypted, validated, recorded by cryptographic hash. Every by the electronic platform and relevant parties to a trade or deal verified and acknowledged transaction or payment is relayed and indexed and stored at every node on the decentralized network.

Figure 33:
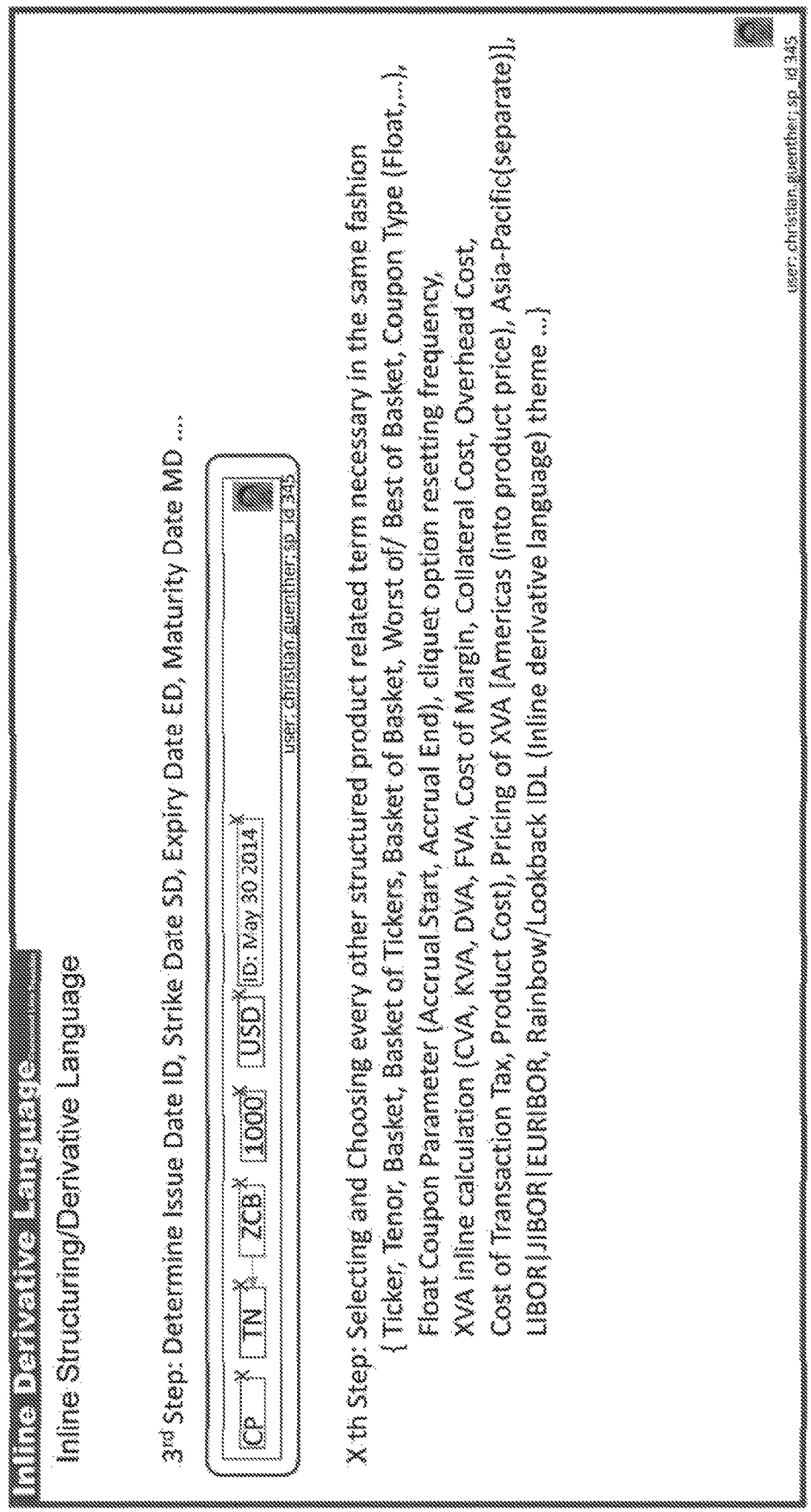
Figure 48:
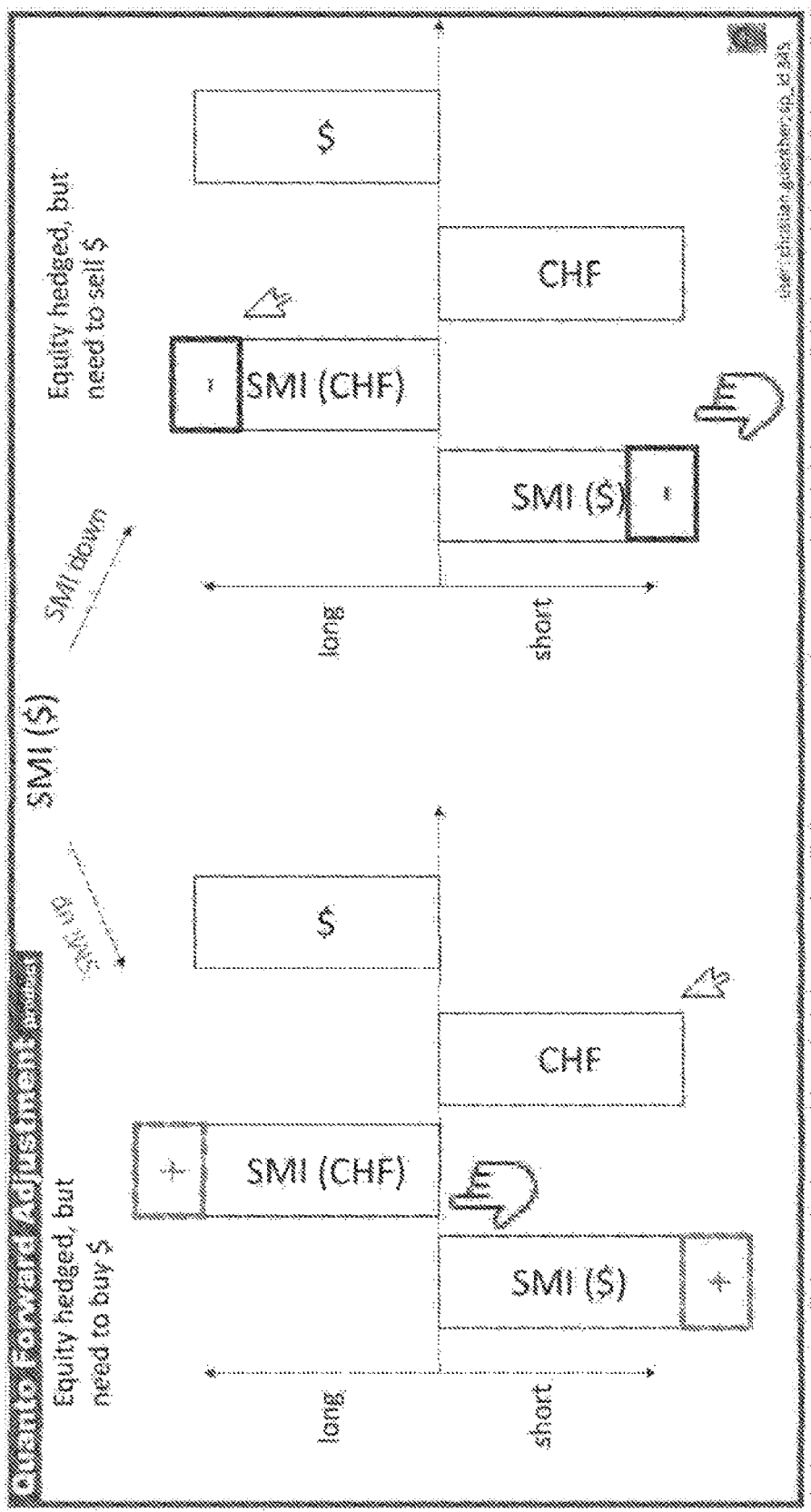

In yet another embodiment the above mentioned dependent deal term associated with a dynamic electronic contract 1002 on the electronic platform constitutes and causes changes to other dependent events and dynamic electronic contracts 1002 identified by cryptographic hash. These computation or aggregation events can be triggered in other dynamic electronic contracts 1002 on other nodes on the same or on other distributed decentralized database networks by relaying the causing transaction identified and messaged by the corresponding cryptographic hash. In one embodiment the artificial intelligence/consensus algorithm on the electronic platform on the decentralized distributed network determines by the means of a 'Bloom filter' if another change or dependent investment criterion or deal term in another dynamic electronic contract 1002 on the same or another node on the network is probably affected or not affected. In another embodiment the platform examines by a complete hash table lookup whether specific deal terms or whether a dependent structured product marked by cryptographic hash is affected. This is more time consuming but asserts integrity by doing a complete 'look-up' whether an exchange of ownership, manufacture/good delivery, inter collateral call, margin call or capital requirement or portfolio compression trade associated by a cryptographic hash has consequences. In one embodiment a dependent event can be that a change in interest rates affects payouts of a structured product or derivative or risk weighted assets on a balance sheet/portfolio of a platform user (on behalf of a Tier 1/Tier 2 bank of financial entity). In another embodiment an independent event means that a platform user upon-user-request causes a change in (escrow) ownership, change in the Strike price or Delta or Gamma or Barrier of a structured product associated with his or one or all associated dynamic electronic contracts 1002. In one embodiment one change or dependent or independent event or change in the investment criterion by the platform user or by other platform users causes only changes and alterations to one structured product or derivative or tranche. In another embodiment one change causes a plurality of changes to not only his products but also other structured products or tranches or deliveries or exchanges for crude oil against a predetermined cash or collateral amount. The electronic platform together with the product exchange system 148 and the exchange market server 130 determine either upon-user-request or upon-decentralized-network-relay that new transactions and validations occurred that affect other dynamic electronic contracts 1002. The platform users is notified on his personal computer or mobile device what the wished course of action should be. A big price movement in an underlying or failed delivery for instance could cause none, one or a plurality of changes (tear-up transaction event) to his payoff or some structured products proposed and planned changes (predefined by computer code within the dynamic electronic contract 1002) to his exposure. Certain market movements, be it independent events or dependent events from other platform users or the whole financial or stock or trade market could cause financial products to cease (Cancellation event) to exist if the user is not willed or able to adhere to margin calls or collateral calls. The electronic platform 140 notifies the platform user on his dashboard and prefetches and precomputes capital requirements resulting in proposed needed payments of changes of ownership. Be it shorting a position or going long a stock or going flat. These changes are promulgated to the user on his user interface 115 on his device 110 by the product generation system 144 and the pricing tables. The proposed changes already readily shown and prepared on his Management Dashboard 570 and also computed by the product pricing module 630. The Investment builder 1240 presents the user possible deal terms on the heatmap 1244, as a inline derivative language session string (FIG. 33), updated Circular Rehypothecation diagram with (possible option for ownership exchange or swaps) (FIG. 36) or by the means of a dynamic hedging diagram (FIG. 48). All proposed changes, changes, validated changes, portions of deal terms, mark-ups, mark-downs, PNL (Profit & Loss figures), risk figures, risk (re-)apportionings are all separately identified by cryptographic hash and stored on the platform user upon-user-request session node on the electronic platform 140, on the distributed hash table, and within one or all corresponding dynamic electronic contracts 1002 in computer code. The exchange market server 130 and the product exchange system 146 administer, validate, exchange and relay acknowledged multiparty (multi-platform-user) node (ledger) information to the other nodes in the decentralized network and the distributed hash table by annexing validated deal term collections as chunks marked with cryptographic hash to the previous validated and acknowledged and relayed chunk also marked by cryptographic hash in order to prevent data corruption, maintain a complete validated and acknowledged transaction repository either caused by independent upon-user-request events or dependent events (for instance floating rate changes) and foster multilateral bookkeeping consistency by artificial intelligence/consensus. The complete transaction repository on every node is updated and annexed with new validated and acknowledged transaction and deal term data by the relay service. These events can be caused by new trades, certain events of default (Failure to Pay or Deliver. Breach of Agreement. Credit Support Default, Misrepresentation, Default under Specified Transaction. Cross Default, Bankruptcy, Merger without Assumption, Illegality. Tax Event, Tax Event upon Merger, Credit Event upon Merger, Automatic Early Termination, Payments on Early Termination, Trustee termination. Netting of Payments, Hedge Counterparty Ratings Threshold. Pooling/Repooling of Risk) termination of financial products or ownership, cancelable provision, partial termination, extensible provision Full assignment for instance for swaption, optional early termination provisions and covenants, Full assignment for cash, altering an already issued structured product, Splitting of notional or principal. (OTC) derivative or synthetic CDO (Collateralized Debt Obligation) or a bond. The benefits of the presented inventive technology is a shared, secured, validated, distributed, decentralized and streamlined understanding of deal terms for asset transfer, exchange and change of ownership without the need for a centralized party. Multiple databases and multilateral costly (and sometimes faulty) bookkeeping can be prevented by all electronic platform 140 users operating and settling on one decentralized electronic (interoperable) platform.

In yet another embodiment repetitive computations and aggregations regarding investment criteria and risk computations like variance gamma processes volatility surface computations, binominal interest rate trees or mark-to-model or synthetic high path dependent chains of trades and transactions can be modelled or executed on one shared understanding without the need for multiple repetitive arresting reconciliation of records and data. Visibility and permissions to tranches. (partial) cash distributions, exchanges of assets, capital, financial options or delivery of air freight, soy beans, cattle or whiskey as underlying) can be assigned upon-user-request or upon-platform-user message into the dynamic electronic contract 1002 on one node on the decentralized network and then after validation by the electronic platform 140 appended to the distributed ledger. By refining or event-triggered or upon-user-request triggered client input 152 or upon-user-request client input 152 alteration identified and executed by the electronic platform 140 and the exchange market server 130 and product exchange system 146 input of public or private keys as cryptographic hash of Upper- and Lower-Barriers (or Cap-Floors) for instance in an Equity Accumulator, Cross Currency Swap or upon-user-request resetting of 'Cliquet Option resetting frequencies' double computations (analytic, numerical, perturbation, substitution other interpolation) and unnecessary double record keeping can be minimized. Also allocation efforts and allocation acknowledgements for complex transaction like for instance for Standard Syndicated Secured Loan Credit Default Swap Index Bullet Trance Transactions can be simplified and accelerated substantially. Illiquid assets like Level 3-Level 2-Level 1 assets can be upon-user-request or upon-user-request programmed as dynamic electronic contracts 1002 represented and executed by computer code and assigned with cryptographic hashes and combined with client input 152 or client credential info 154 and marked-up or marked-down substantially faster (computed and aggregated on all relevant nodes and then relayed to all nodes by appending the compounded collection of new deal terms and cryptographic hashes to the decentralized distributed database network by the electronic platform 140 and the exchange market server 130 and product exchange system 146 the product pricing module 630 for all relevant parties to an agreement or partial agreement at once or substantially in real-time) and shown in the Management Dashboard 570 (FIG. 5F). The risk of cancelled or erroneous trades because of otherwise inconsistent multiple local databases is minimized. Erroneous or failed allocations are minimized. Further capital and collateral requirements are minimized enabling more 'dry powder' and working capital as increasing CAPEX as also less fees like otherwise required amendment/assignment fees, partial termination fees, principal fees, termination fees and the like are needed. This enables simplified price discovery for market-makers and turns otherwise illiquid assets into liquid and tradable assets.

Figure 30:
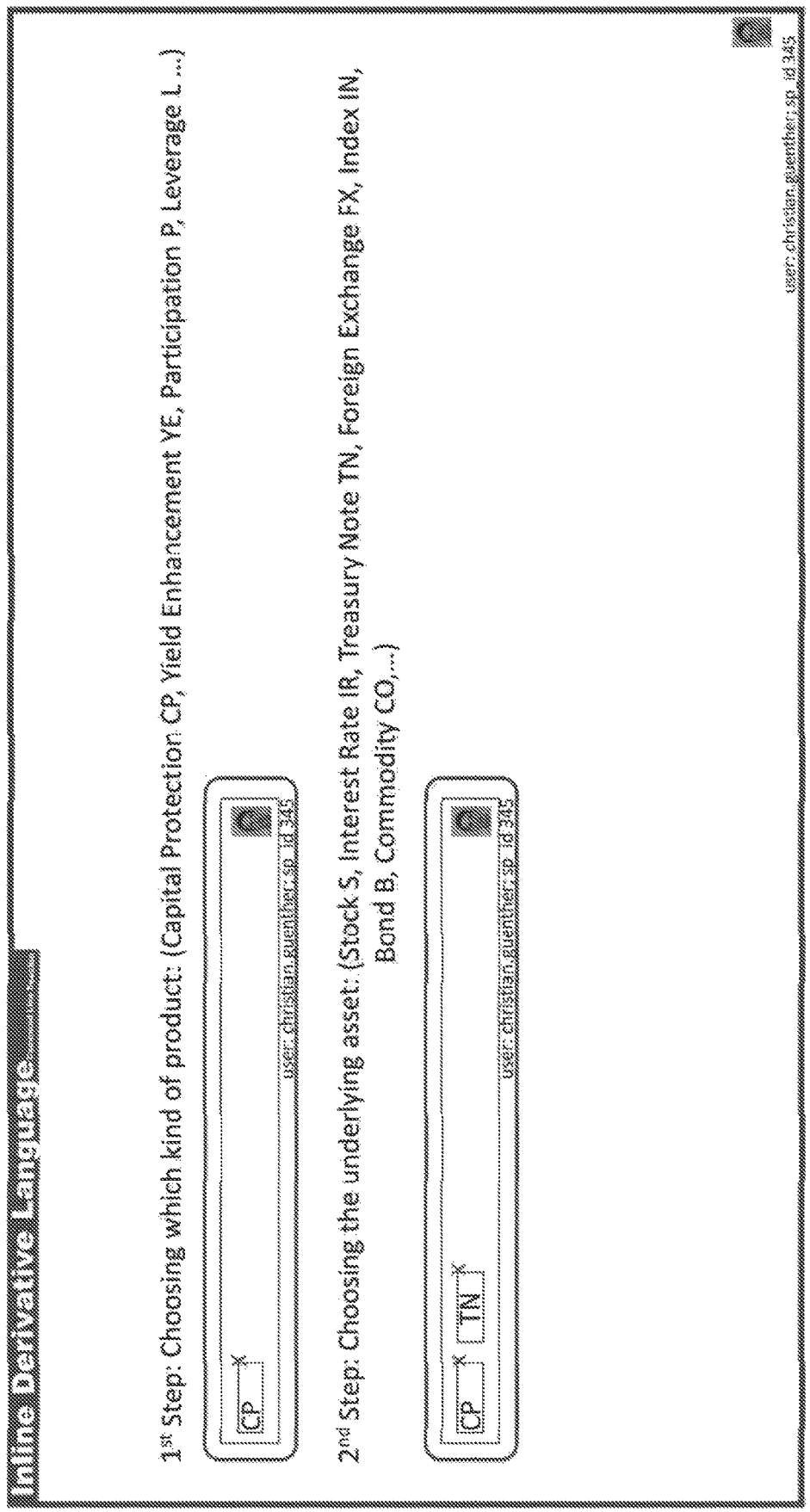
Figure 46:
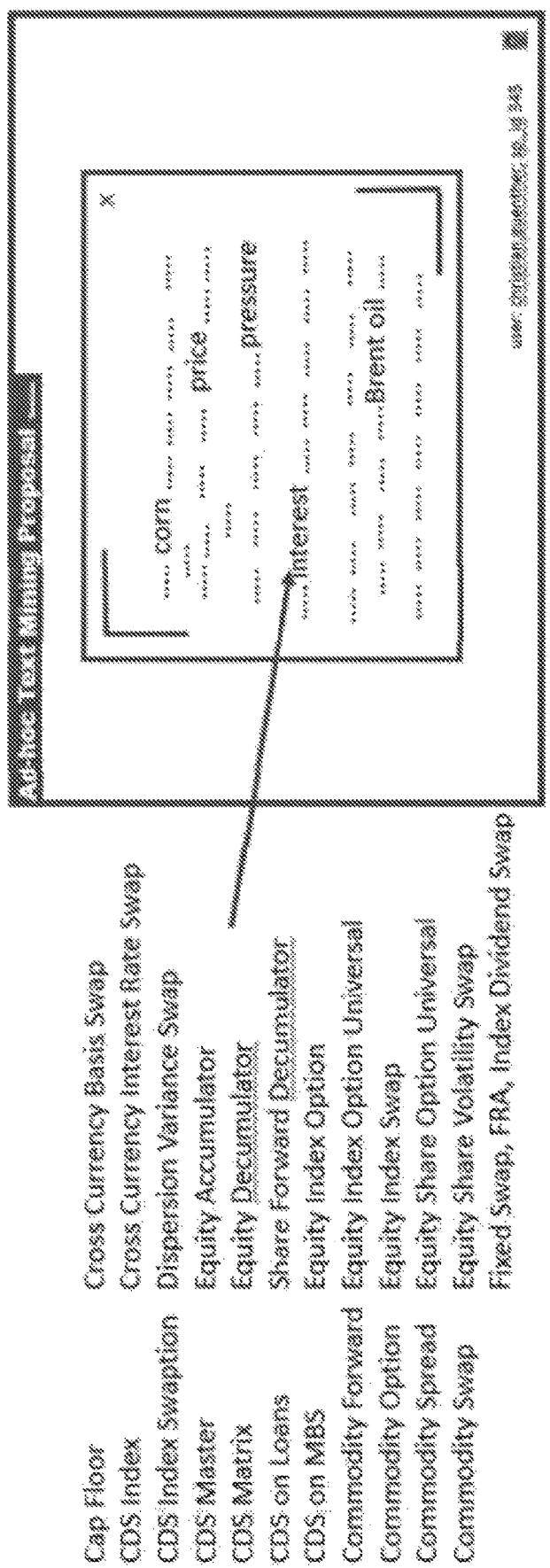

In one embodiment in regard to the specific business deal or financial transaction or computation this settlement and clearing or goods or manufacture exchange or delivery or escrow exchange or trust deed revocation (blind trust, investment unit trust, revocable trust, charitable trust fund, real estate investment trust, constructive trust, generation skipping (transfer) trust, spendthrift trust and the like) or service can comprise a payment-against-delivery transaction or payment-against-payment or exchange-against-exchange or payment-against-exchange or interest rate swapping transaction which are all likewise identified by cryptographic hash and recorded on the ledger on the distributed decentralized database network on every node by dynamic electronic contract 1002. In yet another embodiment deal terms comprise Waterfall tiers in Waterfall provisions. Said waterfall provisions can define the seniority, granularity and priority of financial or related (also in kind) distribution of cash, tranches of collateralized debt obligation or bespoke tranche opportunities or other rights or assets. In one embodiment one investment criterion or deal term comprises the first tier of a waterfall provision which defines that one or more parties to a dynamic electronic contract 1002 (here a Waterfall Provision) receive all proceeds, coupons, dividends. Repurchase-agreement payoffs, redemption payoffs till the one or more parties have received all of their invested capital. In various other embodiments various other tiers comprise the preferred return tier, the catch-up tier or carried interest tier which comprise preferred returns on capital, distribution of profits to the sponsor and carried interest to partners or parties to an agreement. In yet another embodiment said payment-against-delivery or other consensus as alluded above can comprise a dynamic electronic contract 1002 which can respectively define a deal by deal without loss carry forward, deal by deal carry with loss carry forward or a back ended carry. Clawbacks or other covenants or deal terms or investment criteria can be agreed on via the electronic platform for and by the sponsor, who is also a certified platform user, of an investment or waterfall provision and is likewise recorded on the node on the decentralized network on the shared ledger. The plurality of portions of deal terms are separately encrypted and identifiable by a cryptographic hash which is depending on the platform user, a private key or public key. In one embodiment the sponsor is the proposing platform user who furnishes the cryptographic hash, which in one embodiment is the public key, to other platform users stored on the respective node associated with a structured product proposal associated with a dynamic electronic contract 1002 on the platform investment queue. In one embodiment the private key enables the proposing platform user (or sponsor or broker-dealer or agent or fiduciary or signed member in a Master Agreement or Credit Support Annex or Schedule of an Agreement or any other Section of a Master Agreement) to resume his platform session (also identified by session id and user names and continue work on his investment product/dynamic electronic contract 1002 or waterfall provision or structured product or matching adjustment or letter of credit/bank guarantee/bill of lading component or duration matching adjustment or pricing table (in one embodiment the pricing table is a mortality table for life-insurance or reinsurance policy computations or transactions and the like) based on which also longevity swaps are computed, interpolated are adjusted or margin value adjustment or credit valuation adjustment or else (FIG. 46). In yet another embodiment deal terms or investment terms comprise facultative or treaty reinsurance (defining risk-loss structures among policyholders, transfer of insurance risk, cession of portions of obligations. Cedent insurance terms, distribution of premiums against insured or paid out claims, underwriting et cetera) in a dynamic electronic contract. When said platform user has finished his structured product or dynamic electronic contract 1002 proposal he can than compute the public key (in one embodiment representation of asymmetric cryptographic key/hash) resulting in one embodiment in a '<key, value>' pair for indexing on a or the distributed hash-tables and furnish said proposal on his node, relay it to other nodes or other distributed decentralized database networks on the electronic platform or other electronic platforms and make it visible to the designated or relevant parties to an agreement or business deal on the platform marketplace via the exchange market server 130 on the decentralized distributed database network 125 after the product generation system 144 and product exchange system 146 and product analysis module 1310 and information exchange module 1330 have validated the dynamic electronic contract 1002 for regulatory limitations, statutes for the electronic platform user pursuant to his domicile, validated digital client platform onboarding procedures. After that in one embodiment other platform users can discover, if the product is marked as discoverable and visible in the dynamic electronic contract 1002 on one node or all nodes and join a tier, a tranche, a distributed decentralized collateralization during a pending and open collateral collection/closing period. If a product proposal/margin call/collateral call/sea port delivery/airport delivery/U.S. Customs and Border Protection acknowledgment/investment platform event/U. S. Immigration and Customs Enforcement acknowledgment/truck delivery acknowledgment/Duty-free warehouse acknowledgment/customs delivery/U.S. Securities and Exchange Commission statutory request or event for a structured investment or related business transaction results in having all necessary or in the dynamic electronic contract 1002 designated and/or permitted parties to a transaction or agreement or business deal on board (on the platform user's session node) and acknowledged, the artificial intelligence/consensus within the product exchange system (FIG. 13) validates the structured asset or right, annexes the validated and acknowledged collection of deal terms to the distributed decentralized network/shared/distributed ledger in a compounded immutable chunk of cryptographic hashes and dynamic electronic contracts itself combined to one dynamic electronic contract 1002 associated by cryptographic hash (the corresponding private/public key) and relays the validated and annexed chunk/transaction collection (including all deal terms, participating nodes, participating parties, dynamic electronic contracts, all cryptographic hashes, all public/private keys on a distributed hash table) to every node on the distributed decentralized network with the dynamic electronic contract 1002 associated with the relevant other dynamic electronic contracts 1002 associated with the other relevant and associated public and private keys and distributed hash tables (distributed hash tables rapidly accelerate inter-chunk/inter-deal/inter-transaction scalability, read and write access latency and acknowledgment for validated chunks furnished on the distributed decentralized network/shared/distributed ledger). After each annex on the distributed ledger the corresponding platform user is handed a cryptographic hash fora digital collateral receipt embodied as a dynamic electronic contract 1002. The corresponding decision tree for the corresponding deal term collection for the likewise corresponding dynamic electronic contract 1002 collection for the likewise corresponding structured products, tranches, interest rate paths, attachment points, detachment points at else is generated by the decision tree module 620 in concert with the investment product module 610. The decision tree is generated and then traversed on the outset of every structured products/investment deal proposal before it is queued on the investment queue. From the root to the inner and outer nodes and then leaves of this (in yet another embodiment binary tree) tree every node is marked with the corresponding cryptographic hash identifying the corresponding deal term of a corresponding dynamic electronic contract 1002. The decision tree is a dynamical representation of all deal terms, pricing table components concurrently with the dynamic electronic contract 1002, inline derivative language session (FIG. 34), rehypothecation syndicate or 'E-syndicate' (FIG. 36 *ff*), ad-hoc text mining proposal (FIG. 46), among other exemplary hedging diagrams like a 'Quanto Forward Adjustment product hedging diagram' (FIG. 46). Every node is marked by the corresponding cryptographic hash. Therefore ownership or escrow ownership can be determined. Besides special designated platform users like Heads/Directors of Risk Management only the sponsor, lead issuer or certified and fully permitted platform user and party to all deal components are granted visibility to the complete tree. In yet another embodiment the other parties to a dynamic electronic contract 1002 represented by a decision tree which becomes a structured investment deal term tree after validation and acknowledgment by the electronic platform. Nodes, leaves and the root of the tree can be revealed on a deal by deal basis by promulgating the corresponding public key of the corresponding node by the platform (defined by deal terms, artificial intelligence/consensus or by one party (also a certified platform user) to an agreement to another party (also a certified platform user) to an agreement identified by cryptographic hash (public/private key). In yet another embodiment the above alluded pricing table is the basis upon which Monoline insurers aggregate and compute their investment criteria, spread exposures, CCR (counterparty credit risk) and deal terms. Monoline insurers and the like can likewise be certified platform users. Changes in the Rehypothecation Syndicate (FIG. 36*ff*) or 'E-Syndicate' or changes on the hedging diagram (in one embodiment for instance on the Quanto Forward Adjustment alerting the platform user's or the dynamic electronic contract's FX exposure or elimination thereof or Barriers for his via drag-and-drop by mouse click, touch-pad, key-stroke, inline-derivative language element (FIG. 30*ff*) or any other input device tangibly or functionally connected computing device. Visibility, certification, access and permission to the specific dynamic electronic contract 1002 is defined and recorded in the specific dynamic electronic contract 1002 on every node or supernode (supernode in one embodiment means special access, visibility and modification privilege (which is then relayed to all nodes) for manual assertion, creation or modification of deal terms on the distributed decentralized network; in one embodiment this is limited functionality even for certified electronic platform users in case of distress (economical or natural distress) for designated professionals (Chief Executive Officers or their Staff or Chief of Staff only or governed usage by artificial intelligence or by applicable law). In one embodiment these changes to the dynamic electronic contract 1002 are as all other validated and acknowledged transactions appended to the distributed ledger on every node and can then upon-user-request be accessed, reviewed and reported and else processed via the specific cryptographic hash (be it a public or private key) on a need to know basis. In another embodiment this special access is also orchestrated, controlled by artificial intelligence. As long as a platform session with more than one user to a session and structured product remains open the product generation system 142, the product exchange system 146 and the exchange market server 130 furnish the parties to a node of a structured product and establish the required information exchange of and on a the relevant node or nodes to an financial agreement. First to the first user then to the second than to a potential third platform user and so forth till all parties are able to trade the product determined by the inventive platform (FIG. 35).

If the same structured product, financial derivative or transaction has been processed by any other electronic platform user recorded in the decentralized distributed network the product applicant is notified right away, by a message to his mobile device or a notification on his personal computer screen during his electronic platform session. If another platform user abandons a yet to be processed, completed or settled proposal during his platform session, the second platform user moves up the proposal queue, is now allowed to send the proposal to another platform user during his session. Said platform user is notified in real-time and does not have to restart or abort or start a new structuring proposal. Concurrently with said notification a new cryptographic hash for the respective node indexing all investment terms for a dynamic electronic contract 1002 is generated for said transaction by the product generation system 144. After completing the transaction the principal and notional amount is added to the user's Management Dashboard accordingly (FIG. 5F). A platform user can be a retail investor or a bank/insurance employee or any entity represented by an agent. Each step on the electronic platform by a user is stored in one or more local databases 145.

Figure 27:
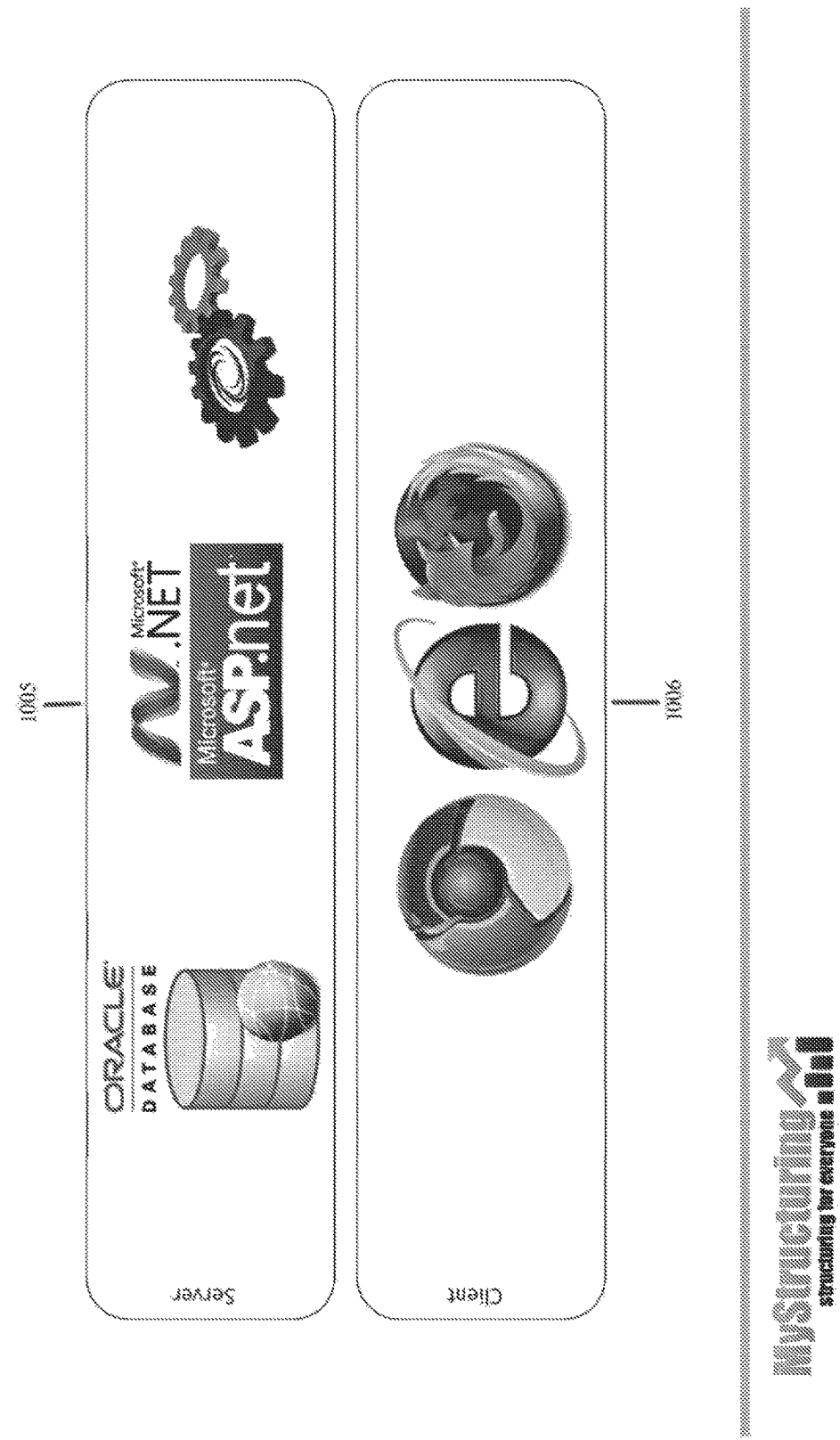
FIG. 27 illustrates another embodiment of the Client and Server relationship of the online platform.

FIG. 27 illustrates yet another embodiment of the Client and Server relationship of the online platform and suggests possible software solutions for functions of the platform discussed herein and their inherent functionalities.

Figure 28:
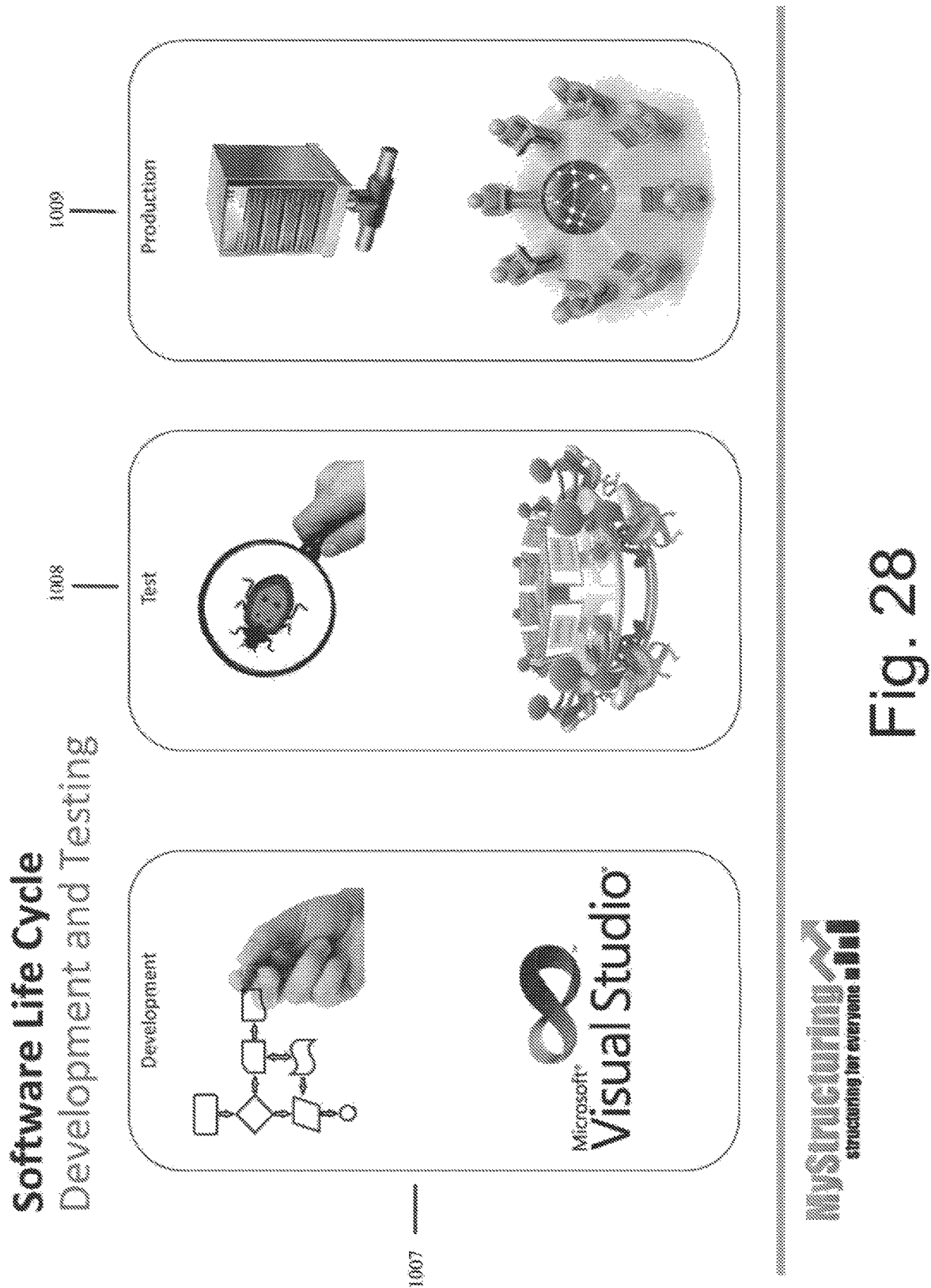
FIG. 28 illustrates a project implementation cycle during development and customization of a structured investment product.

The development and customizing of a structured investment product, similar to the software behind the online platform, goes through a project implementation cycle (FIG. 28), including steps 1007, such as the development step of the structured investment product as well as the software development behind it. The structuring processes of the present invention are comprised of a plurality of different steps. One educational course on the platform for the client introduces this "step-by-step" structuring and customizing process via Business Process Diagrams (also implemented with the tool Microsoft Visual Studio®). The software as well as the structured investment product undergoes permanent testing by the user (Clients and Software Engineers) as well as product testing on the product exchange system (1008). Production, namely the generation as well as the fixing, issuing and comparing of a structured product takes place on one or more servers as well as on the network regarding the actual trading and settlement of product. The inventive online platform is at the interface of this and enables this whole process (1009).

(FIG. 23) illustrates the payoff diagram of a structured product and its financial composition/components. Graphic user interface 1010 illustrates the platform displayed on an internet browser and enables the user to make his own investment product. Either by "drag & drop" and mouse click on the payoff-diagram (1011). Still another possibility is for the user to "text-mine" the database of structured product components maintained by the system. For example, by giving the system keywords such as health and fitness, the system will search the equity/bond/etc. database for these keywords or related words and present them as an option to the user. Additionally, typing in new product constraints by dragging a new column underneath the diagram, the user can specify his investment criteria, such as risk tolerance, desired return, and so forth.

The area indicated by 1012 is reserved for other layers namely additional functionality regarding helping the user to specify his target payoff or other tools like an instant text mining module. The whole structure of the graphical presentation is to be understood as flexible and customizable itself. The user can position and drag and drop modules 1011, 1013, 1014 and 1015 within the bowser. Below the diagram the product constraints area shown in text (1013 1). In this area of the graphical user interface the user can input his preferences by text.

According to his certification and educational level trading tips and over terms are described in the "Assistant" registers and fields (1014). The assistant is divided into 'Beginner'. 'Intermediate' and 'Expert' (1014 1). As of this selection either more or none financial information and advice is presented.

In the event that the user of the platform specifically wants to start a training or certification course he can do so and start the course selection process and then the course itself by clicking on 1015 1. According to the initial training and introductory course the user is categorized as Beginner, Intermediate and Expert. Dependent on that the column 1015 on the right of element 1010 expands downwards and shows more explanations et cetera.

FIG. 26 is yet another embodiment illustrating the online-platform on a tablet client device (1011). The rest of the description is similar to the elements described in the aforementioned paragraph.

In FIG. 24 elements 1017-1021 illustrates the overall general security measures and requirements for the online-platform.

Referring to FIG. 25, the interactive payoff-diagram is one of the focal points of the inventive technology. The diagram shown in (FIG. 23 and FIG. 26) can be adjusted in size and regarding its position within the browser, for example using a mouse or touchpad. Referring to FIG. 25, element 1025 illustrates one of the different symbols appearing on the payoff diagram as the user clicks on the different elements of his own product. The double-arrow indicates that the line (here the underlying Credit Suisse stock) can be moved. The filled circle indicates, that for instance the strike-price and the barrier can be moved. Elements 1022-1024 further describe the overall structuring process as well as the product exchange components, which are directly dependent on the changes and redaction in the payoff-diagram as well the free text field below.

In-Line Derivative Language

By the means of a command line like 'free field' the user can type in his investment criteria. Each criterion is displayed as a separate symbol ("CP" in FIG. 29). Each of those symbols can be removed by clicking on the 'X' letter. This method gives the user of the electronic platform the means to specify the investment terms for his product in a very rapid fashion. The corresponding Payout-Chart as well as every change is generated and presented to the user in real time.

There are two modes of operation for this functionality. The first is the guided Inline Derivative Language, where the user starts with a few letters for each criterion (FIG. 29) and the platform makes suggestions for each criterion via 'autocomplete' ("TN" in FIG. 30) and an appearing drop-down list. The user can then select from one of those either via his keyboard, mouse, touchpad or other type of input provided by his client device.

The second mode for the functionality is the free Inline Derivatives Language. The user types in his product category, as well as all the other investment criteria (i.e. investment criteria described in FIG. 30, FIG. 31, FIG. 32, FIG. 33). Synchronously with his input every symbol is highlighted, as appropriate, as red for defective and not accepted and green for correct and accepted by the product generation system (i.e. "TN", "ZCB" and "ID: May 30, 2014" in FIG. 34).

After all needed specifications are green and acceptable, a new prompt named 'Create new Structured Product' appears (i.e. "Create new Structured Note" in FIG. 34). After the user clicks on it and affirms his investment criteria the product together with the needed contracts (i.e. term sheets and other forms) are generated and presented. The button's naming changes to 'Trade' ("T R A D E" in FIG. 35). The user can now effectively invest in his product.

Circular Rehypothecation

FIGS. 36 through 42 illustrate the operation of a rehypothecation syndicate including authorization by the retail customer for re-hypothecation of the underlying instrument by the bank or other in the financial institution with whom he is dealing. The placement and use of the collateral is controlled by the retail customer via a graphic user interface presented by the platform to the user. At inception of the inventive re-hypothecation process, referred to herein as a "circular rehypothecation syndicate," all participating financial institutions have to satisfy the condition where the customer has borrowed from the financial institution an amount which is under 140% of the collateral posted by the client (in this example, the current platform user), although this amount may change dependent upon the current laws of the relevant domicile. For example, in the United States SEC rules and Federal Reserve Regulation T limit the amount of a clients assets which a prime broker may hypothecate to the equivalent of 140% of the client's liability to the prime broker. In many other markets, there are no such limits.

After the user has started a Circular Rehypothecation session, the Platform user can select and click on the Bank or financial entity where his initial margin collateral should be put. By doing this he gives his authorization that his collateral may be (re)hypothecated. The displayed Banks and the number of the participating financial entities is generated and updated by a syndicate generation system.

More particularly, after a predefined cycle, during the product's life span (namely till the expiration date/maturity date), the margin collateral can and will migrate to the next syndicate bank (this process cannot be changed) and disappear from the previous bank's balance sheet.

Figure 36:
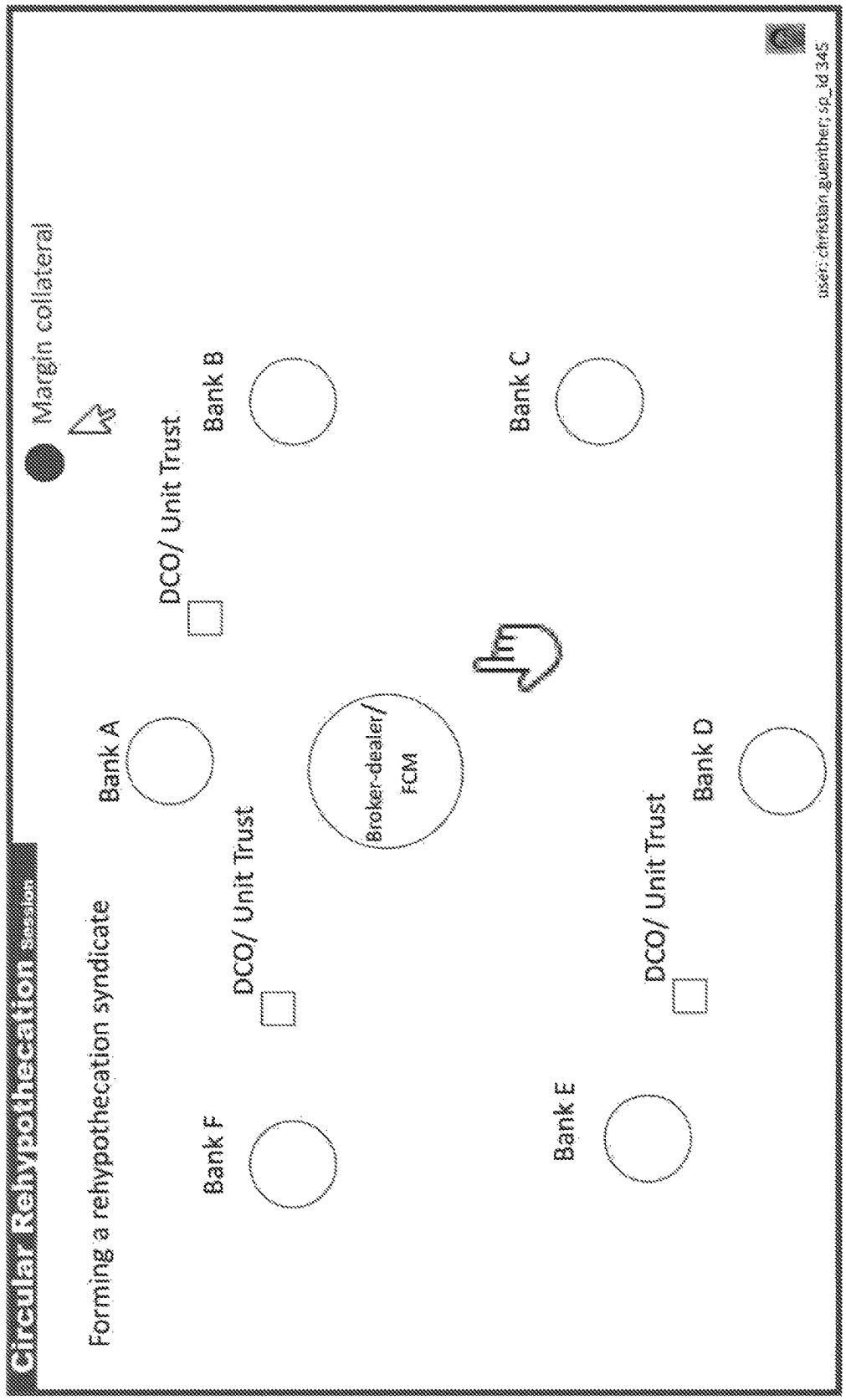
FIGS. 36-42 illustrate the operation of a rehypothecation syndicate.
Figure 37:
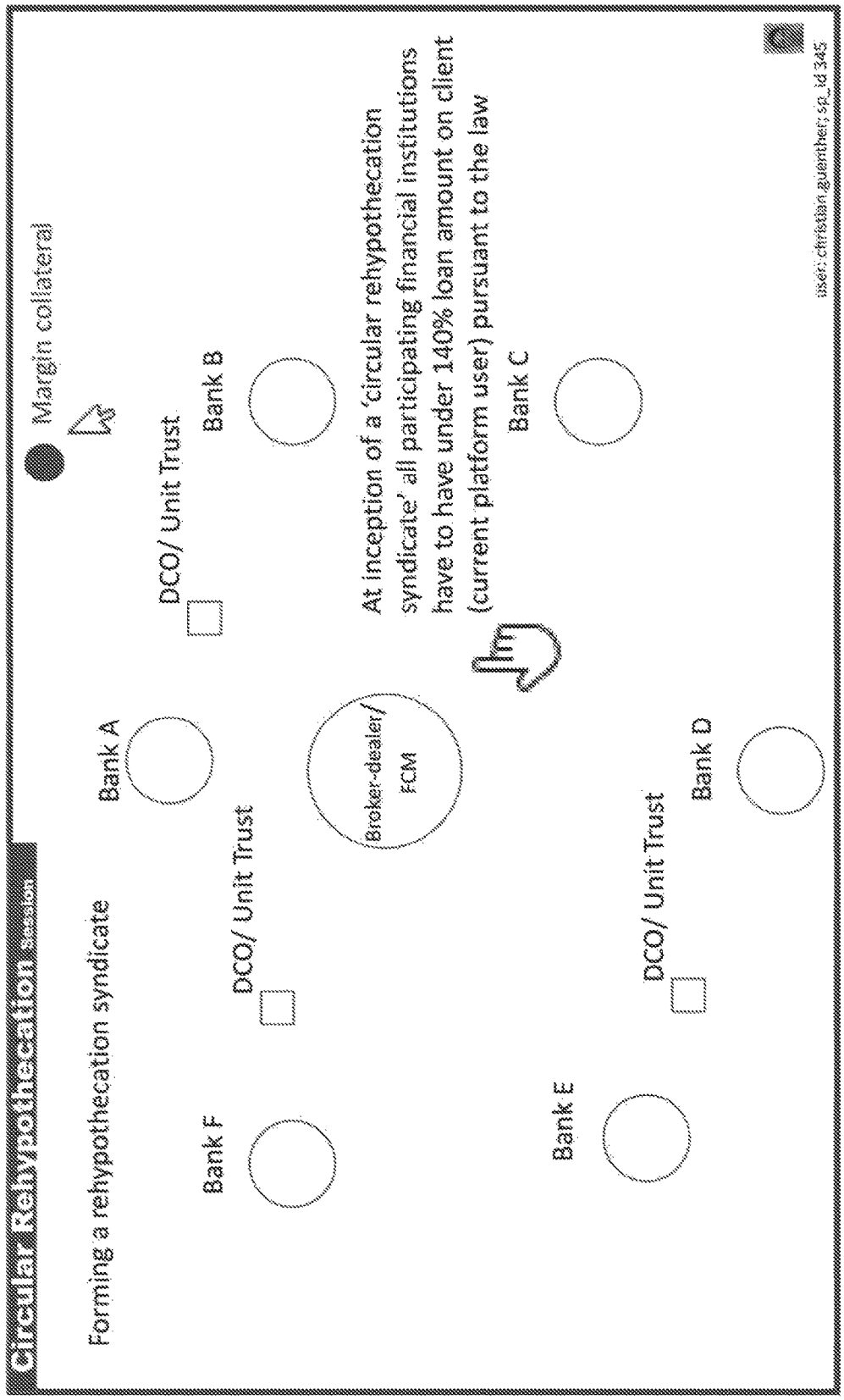
Figure 38:
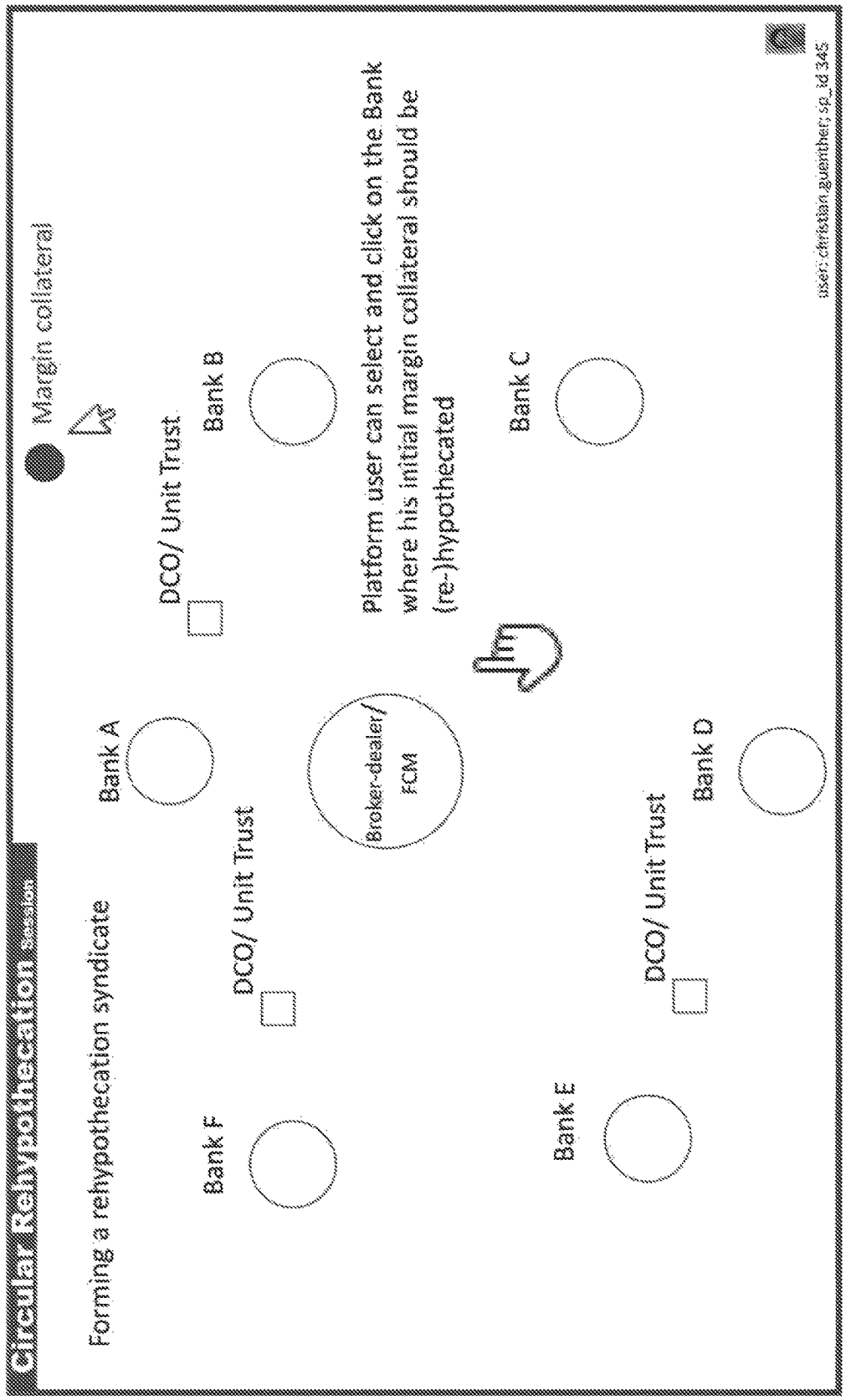
Figure 39:
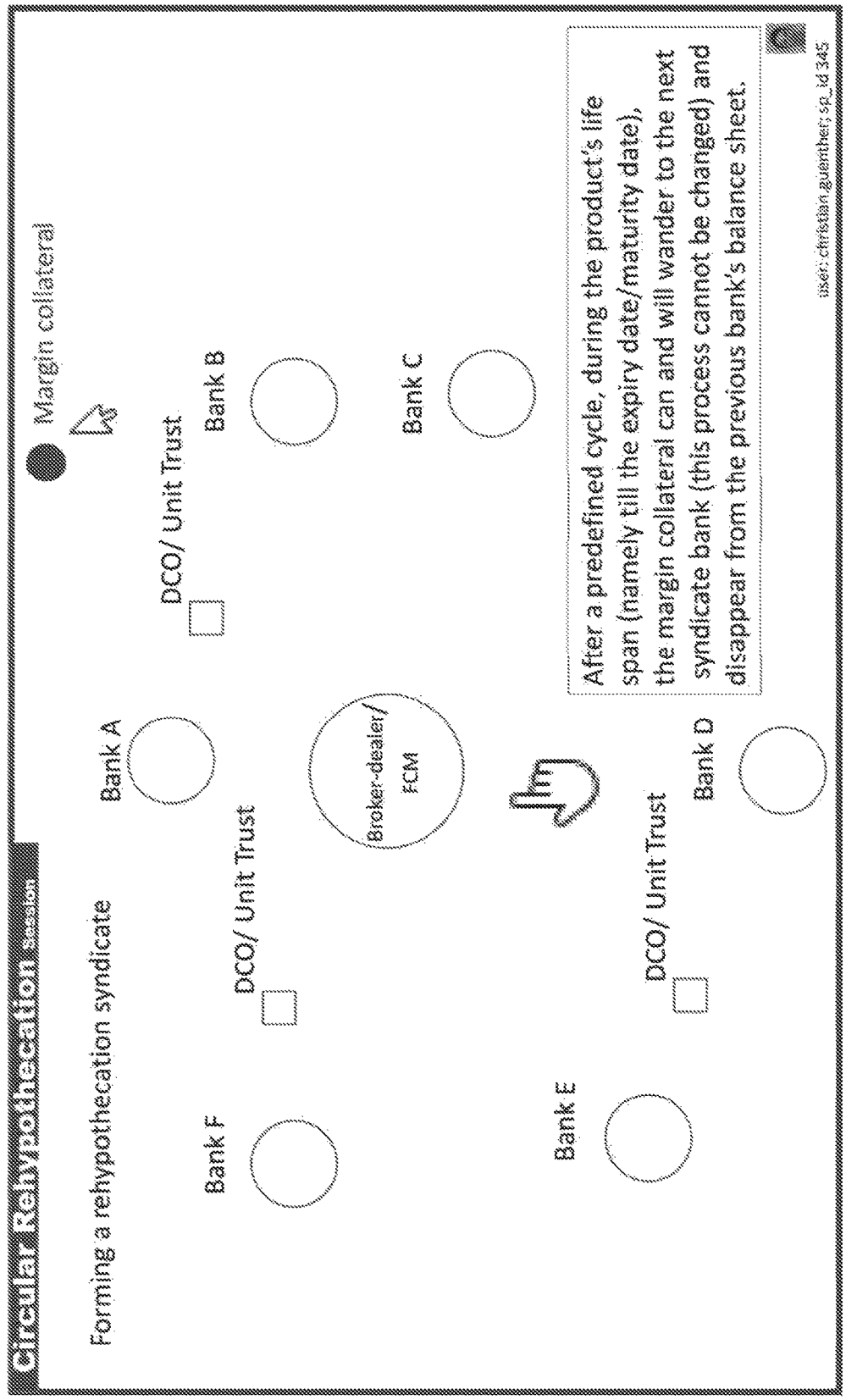
Figure 40:
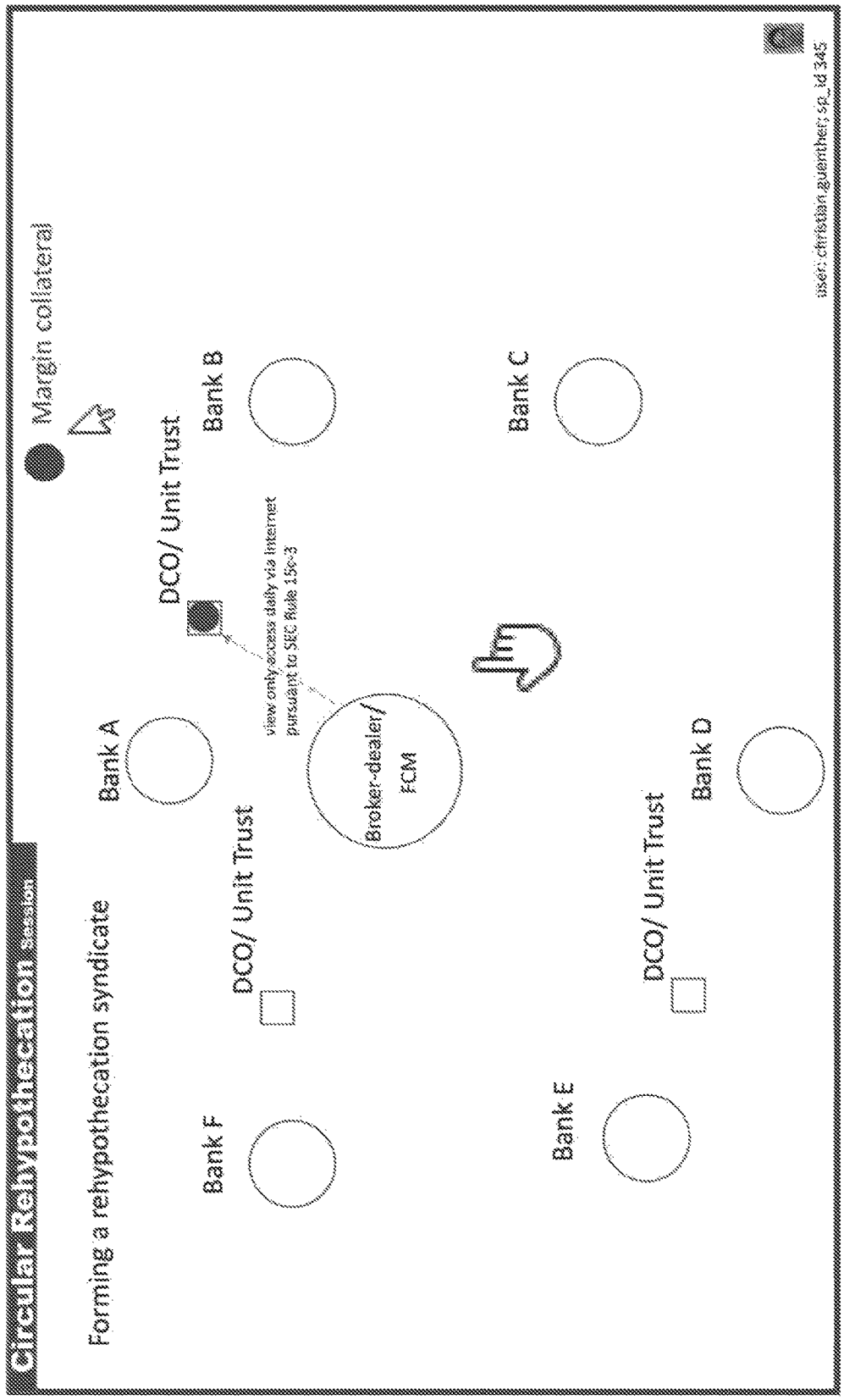
Figure 41:
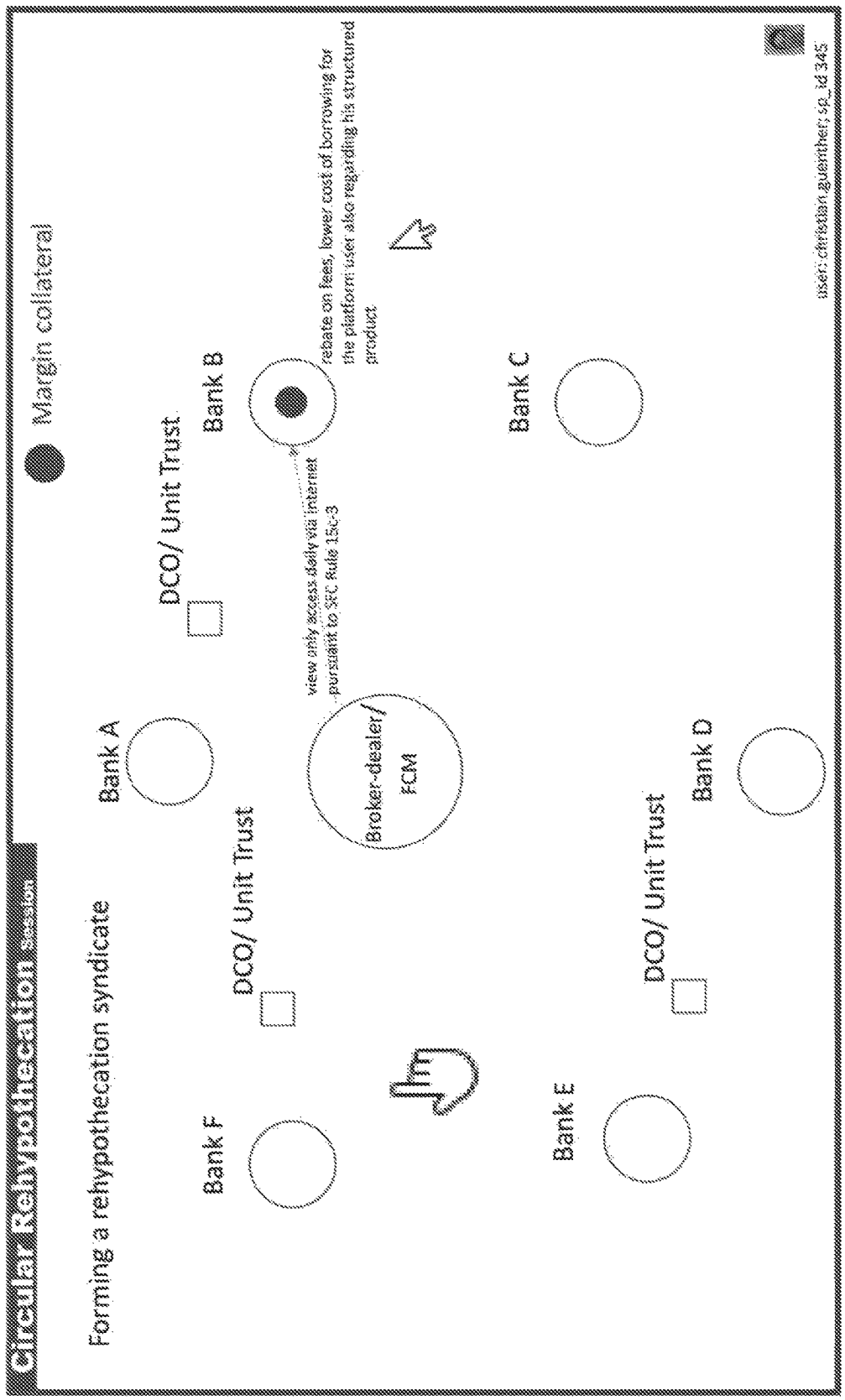
Figure 42:
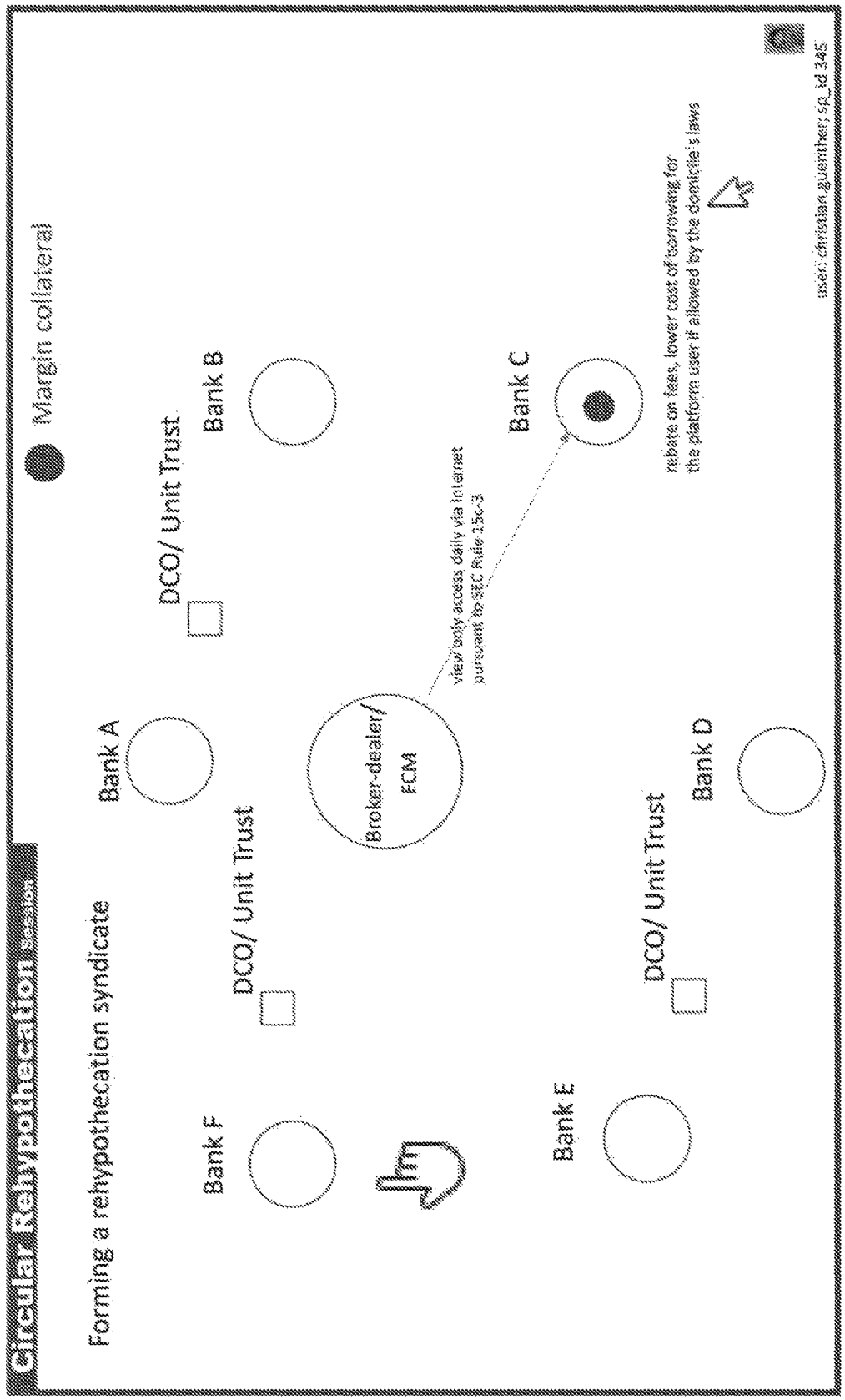

According to the bank's and user's domicile law, the platform user is usually given a rebate on fees, lower cost of borrowing, in exchange for giving the bank the flexibility to be hypothecate to other banks within its group. In this manner the banks have the advantage of generating income with the collateral. Likewise, among the cells, the banks may agree to share losses in the event of a client default or a default at one of the financial institutions within the circular syndicate. Another advantage of such a syndicate is that the members can have a direct trade execution venue and channel among each other by which they can check for best quoted/available prices eliminating the need for smart order routing on other exchanges. The same may be better understood with respect to the figures where FIG. 36 illustrates a syndicate. FIG. 37-38 describes the setting of the syndicate of FIG. 36 at that point in time immediately before the platform user makes his selection of which where to put his initial collateral, i.e. the particular bank which will hold the collateral in the first instance. However this is done with the expectation that that particular bank will move the collateral in a re-hypothecation step to other banks which will have the same right to hypothecate within the circular re-hypothecation syndicate. Subsequent hypothecation is illustrated in FIG. 39, as detailed in the figure. FIG. 40 illustrates the first step in the circular re-hypothecation cycle. The next step in the circular re-hypothecation cycle is illustrated in FIG. 41. FIG. 42 illustrates yet another subsequent possible step in the circular re-hypothecation cycle.

In accordance with the invention, it is contemplated that the collateral will move step-by-step from one bank to another in the circle in a predetermined sequence until it has returned to the bank where it was initially put by the retail customer. At that point, if the life of the instrument purchased by the retail customer is completed (i.e. the expiration date/maturity date), the syndicate is dissolved in the collateral return to the investor.

Ad Hoc Text Mining

Figure 43:
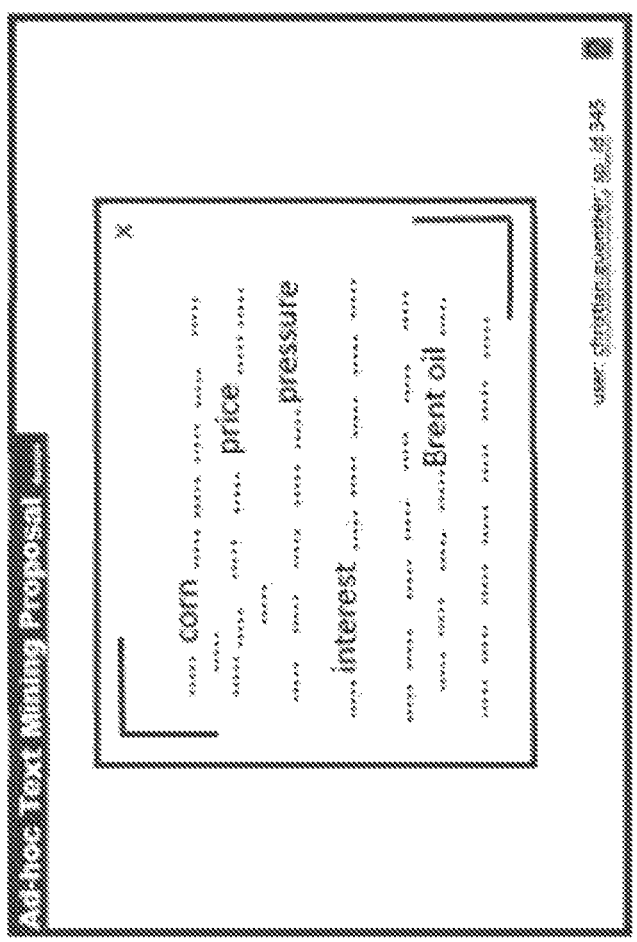
FIGS. 43-46 illustrate search results preview window in the form of a document term matrix.
Figure 44:
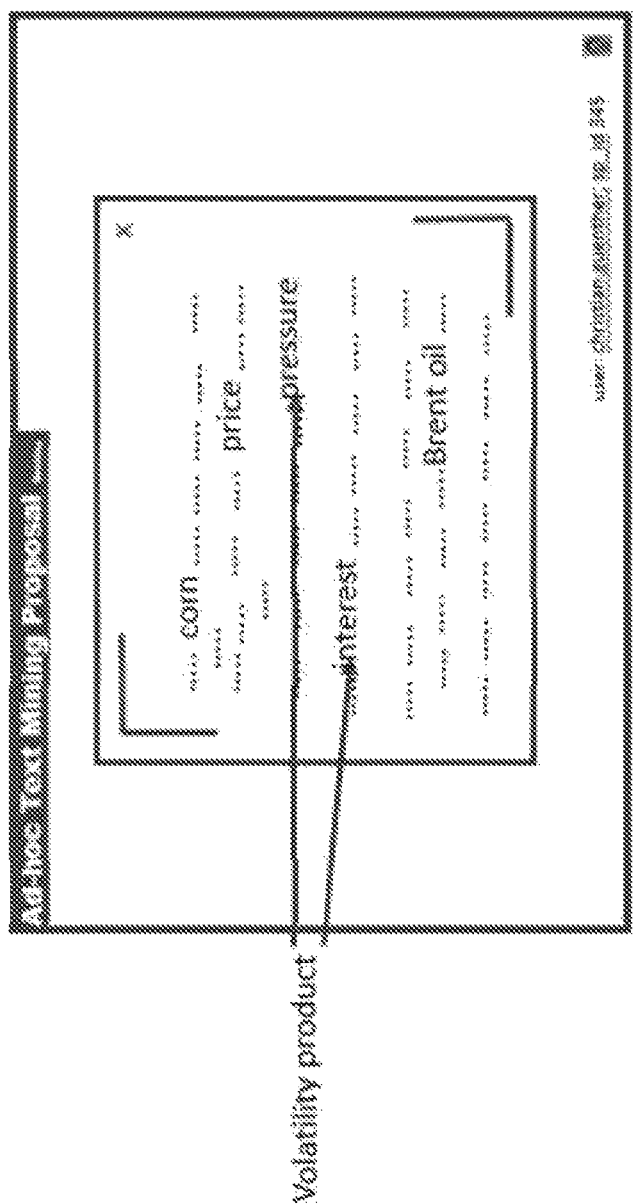
Figure 45:
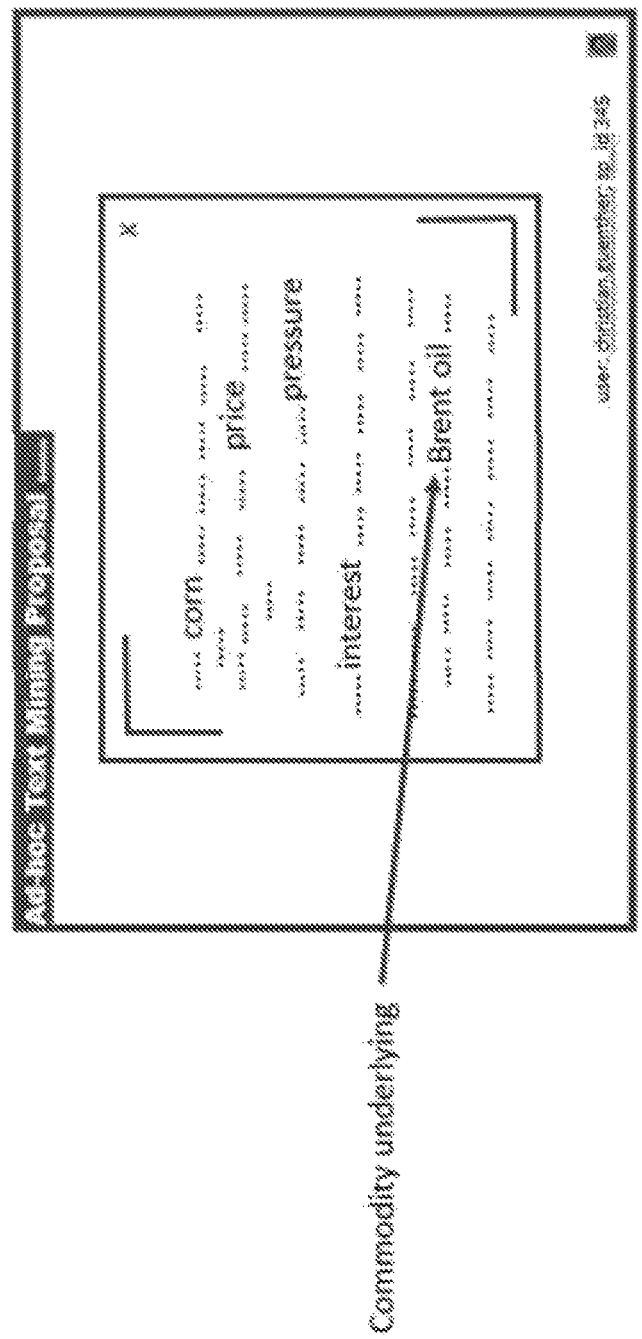

In accordance with the invention, on-the-fly text mining is enabled. More particularly, the results may be presented in a free area beside the payout diagram described above. As noted herein, text mining may take the form of the user putting in a number of keywords and a selected database being searched to present relevant results. The relevant results would include the sought after terms to the extent that the system can determine that the same are finance related, as well as finance related terms associated with the term being searched. Additionally, so-called "stop words" would be removed from the search results. Stop words may comprise such things as the words "the", "a,", insofar as these terms have minimal to no content. Search results may be provided in the preview window, for example in the form of a document term matrix, as illustrated in FIG. 43. As illustrated in FIGS. 44 and 45, depending upon the results of the search, the system may suggest one or more non-binding investment proposals. Referring to FIG. 46 the inventive platform makes investment proposals referring to the occurrence of the word "interest" (FIG. 46), namely in the form of Interest Rate Derivatives listed in FIG. 46.

Further the text mining preview indicates the general or overall so called "Open Interest" of a potential underlying, when the user hovers over one of the remain words illustrated in FIG. 43. Open Interest is the total number of outstanding future or option contracts that are held by market participants at the end of the day, thus yesterday plan the file having you roughly indicating trading activity.

Bringing the Sell-Side and Buy-Side Closer

Figure 47:
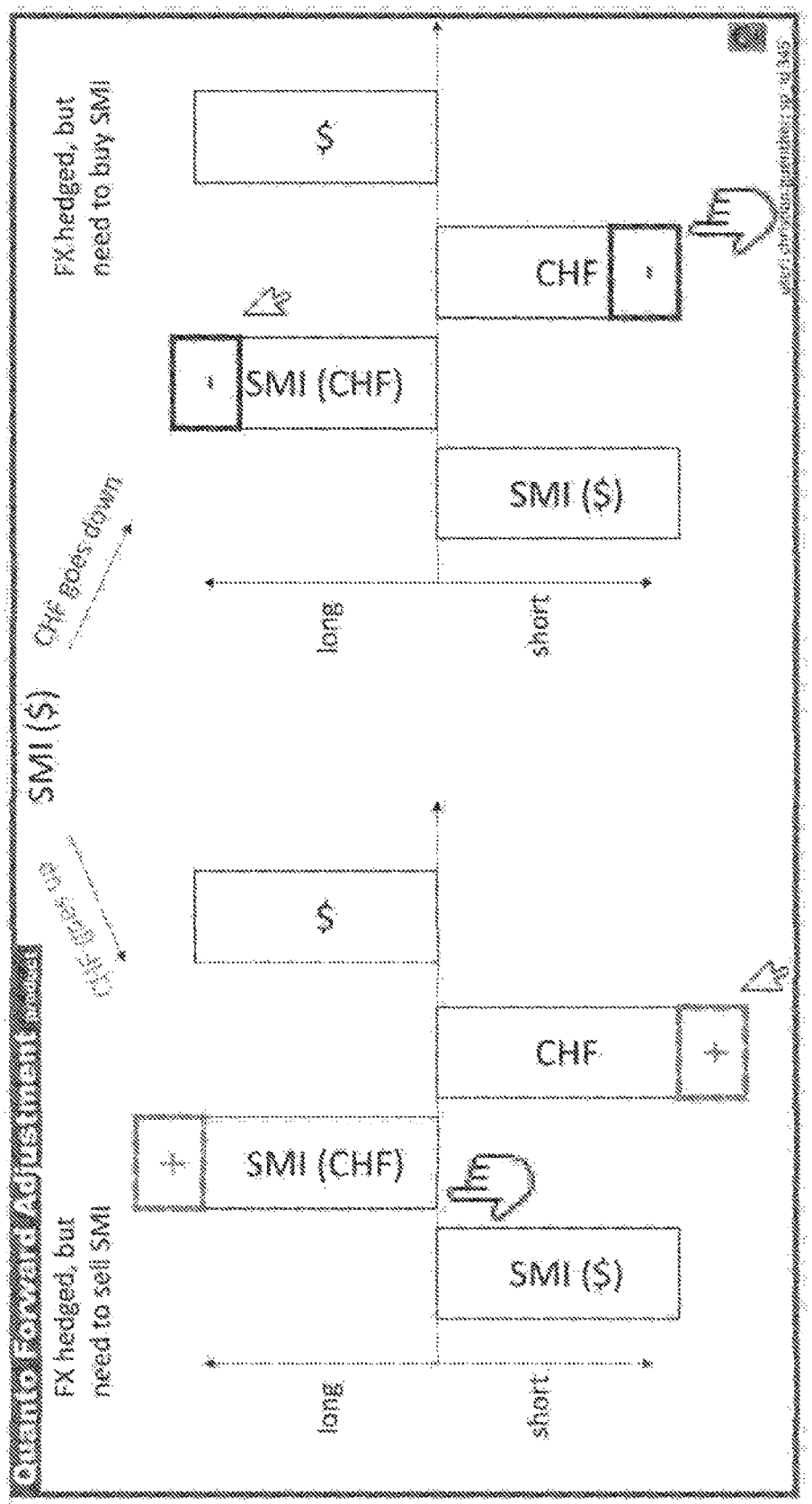
FIGS. 47-48 illustrate platform user making changes to user's investment positions.

Certain Structured Products can be very complex and difficult to understand. By providing the platform user graphically displayed investment schemes as for instance hedging diagrams the client can invest in exotic derivatives himself. The electronic platform stores prepared complex financial products schemas ready to be customized by the user. FIGS. 47 and 48 both illustrate a so called 'Quanto Forward Adjustment'. Quanto and Composite options are derivatives, which allow the final payout to be in a different currency than the underlying currency, i.e. these options are also dependent on the FX (foreign exchange) rate. I.e. a Quanto Call expressed in the payout currency, Imagine for instance selling a quanto SMI (SMI-Index) $ forward to an investor (i.e. other user of the platform), short a liability in $.

At the beginning the user is short in the SMI in S. i.e. to hedge the equity the user buys the SMI in CHF (for instance via futures) and thereby goes long S against CHF.

Provided and presented by the inventive platform and the diagrams the user can "drag & drop" his short and long positions to his liking (FIG. 47 & FIG. 48). In FIG. 47 he can react and adjust his investment positions (i.e. represented by his customized product) via graphical input regarding his FX exposure. Likewise he can do the same regarding his equity positions illustrated in FIG. 48. If he's been certified by the platform and able to he can also alter and correct his hedging ratio in the concurrent Inline Derivative Language session. Changes are directly updated to the payout-charts in real-time.

Skyline Products

A skyline query is used to mediate between conflicting objectives and investment criteria, such as high return, investment amount, payback time, marginal value adjustments, duration and tenor et cetera. This inventive step implemented, presented and executed to and by the user by the product generation and exchange system in accordance with a heat map pricing approach.

Succinctly Skyline queries return a set of points (in this context regarding finance) i.e. investment criteria that are not dominated by any other point in the data set (here: product exchange system). By requesting a skyline product the electronic platform presents the user an ad-hoc structured investment product proposal. Based on this Inline Derivative Language session proposal or payout-chart the user can either immediately invest and trade in the product by clicking on the button illustrated in FIG. 35 or further elaborate and customize this "compromise" (combination of historical best investment criteria and his preference matrix stored in the platform) structured product until he is prepared to invest.

The objects of the invention are also achieved using the following mechanisms. The number of plus signs indicate currently perceived value of the mechanisms listed below:

+++++Read/Write/Access Privilege Granting Server/Node

+ Distributed Hash Table Garbage Collection Server/Node

+++++Digital Onboarding Granting Server/Node

+++++Foreign Exchange Ledger Administration Server/Node

++++Collateral/Loan-to-Value-Ratio/(Re-)Hypothecation Ledger Administration Server/Node ++++Digital Collateral Receipt Administration/Validation Server/Node ++dynamic/real-time regulatory funds transfer pricing ledger server/Node (funds transfer pricing is when corporations balance and rebalance their liquidity of their respective country branches and business units according to regulatory needs and pool information in order to examine overall profitability).

+++Peer-to-Peer lending/services ledger administration server/Node

+++Corporate Action/Ad-hoc message ledger administration server/Node

+++++Power of Attorney (smart contract) Validation Server/Node; a smart contract is an automated legal code in in technical computer code +++++Power of Attorney (smart contract) Administration Server/Node; a smart contract is an automated legal code in in technical computer code ++Corporate Voting Administration Server/Node +++++++electronic signature/Notary services ledger administration server/Node (sequential, digitally signed and validated records of ownership)

Salary & Employment services/e-verify Form I-9 administration server/Node

+Financial Product/Structured Product/Derivatives/(pre-)clearing & (pre-)settlement validation server/Node +++++non-maturity cash flow product/revolving non-revolving credit contract validation server/Node (these products are also credit card debt)

+++++Credit Support Annex/Master Agreement Validation server/Node (credit support for derivatives structured products)

+++XVA Adjustment/Account Balance Validation Server/Node

++++Wallet Account Balance Validation Server/Node

Compliance Services ledger Validation Server/Node

++++Initial Margin/Variation Margin Account Balance Validator

++Credit Score Validator financial reporting/investment reporting/supranational reporting server/Node generation module ++++cell phone contract and telecommunication contract & alike validator +++++++++++insurance/reinsurance risk validator: cedant/reinsurer validator reinsurance agreement validator reinsurance contract validator reinsurance or insurance specific structured financial products like longevity swaps, matching adjustments at the like inpatient health insurance skyline auto-contract validator risk transfer module, income smoothing module, surplus relief module, arbitrage module proportional/non-proportional reinsurance authorization ledger server/Node+validating server/Node ++++++++++Trade Finance module: Exporter validator, Importer validator letter of credit/bank guarantee ledger server module, bill of lading ledger server module Collection and Discounting of bills ledger module Cash payment with order/Cash payment on delivery module Escrow service with order/Escrow service on delivery ledger module An embodiment provides a system software and method which relates to the field of computing technology or business process models or computer systems or distributed computer systems or computer networks relating to general purpose devices that can be programmed to carry out a set of data table or hash table or (shared) database/distributed ledger updates, validations or modifications supporting, enabling or executing public and private services, financial transactions and commercial applications. More specifically, the present invention is directed to distributed and decentralized computing in which said fully or partially decentralized distributed network is supported and encrypted by cryptographic technology, hash functions and distributed public or private keys or other related technology.

An embodiment provides a system, software and method as in any previous claim, wherein visibility to one, a plurality or all nodes of said distributed network is granted and validated by one or more granting, validation, authentication or authorization servers/nodes on a need to know basis determined by supernodes or network consensus or artificial intelligence.

An embodiment provides a system, software and method as in any previous claim, wherein said identity, visibility, validation and granting enables a distributed ledger by the means of an information exchange network assisted by peer-to-peer technology to reveal, exchange or compute information, values or assets (be it financial, physical, legal or electronic), compound, quanto, securitized or composite interest or other needed elements or components for manual, partial or automated sharing or else needed contract/transaction ascertainment, (pre-)clearing, (pre-)settlement, netting, enabling, validation, authentication or authorization of contract/commercial/business parties or contract/commercial/business elements like user identities or collateral or escrow services or risk transfer among other similar use cases An embodiment provides a system, software and method as in any previous claim, wherein said exchanged or permissioned distributed hash table/shared ledger constitutes a distributed and or decentralized accordance and conformity of agreed upon and partially or fully permanent or time-stamp-dependent or temporary promulgated facts, data, records, knowledge, statements, at-the-time to one, some or all fully known or partially spread valuations for each participating, authenticated validated node An embodiment provides a system, software and method as in any previous claim, wherein said distributed accordance can be used, revealed, applied or levered in the fields of financial transactions, individual, commercial and non-monetary or non-economic benefit, regulatory domestic and supranational requirements or commercial operations An embodiment provides a system, software and method as in any previous claim, wherein the distributed ledger administration server.

An embodiment provides a system, software and method as in any previous claim, wherein said fields benefit from dramatically reduced operational cost, impairment cost, reconciliation cost, compliance cost, capital cost or any other business restraining effort or economic hindrance.

This disclosure is directed to example implementations and embodiments of a shared platform that allows parties to an agreement to maintain a shared understanding as to the state of that agreement. Other examples are directed to a dynamic electronic document shared between two or more parties and systems and methods of managing changes to that dynamic electronic document such that states of the document are agreed by the parties.

Examples of agreements and the parties to which they may relate might include:

Cash transactions and trading, such as s simple cash Balance—wherein Bank and customer agree that the bank owes the customer a certain quantity of money on deposit (i.e. the customer has $1,000,000 in the customer's account). Other cash or currency transactions are contemplated.

Securing and equity transactions, such as a simple security under custody—CustodyBank and an investor agree that the investor owns 1000 MegaCorp shares. Other securities, equities and financial transactions are contemplated.

Swaps, derivatives, hedges and complex financial instruments, such as an interest rate swap or a bilateral derivative agreement—Banks A and B agree that they are parties to the following IRS, which means they agree to exchange the following cashflows (netted) at predetermined scheduled times with an agreed payoff formula.

Examples of other dynamic electronic documents to which parties may need to agree might include:
Status and Deliverable Reports
Consumables and Order Reports
Supply Schedules
Work Rosters
Other documents indicating a status change and the need for a party to act.

Indeed embodiments of the present invention are applicable to agreements that are translatable from legal prose to a machine readable code to indicate rights and obligations of a party with a transfer of assets, rights, or obligations.

Embodiments disclosed herein ensure that all parties remain in consensus as to the state of the agreement or document and the evolution of that state so that the parties can take necessary subsequent actions. One could argue that this is the essence of the "smart contract" and blockchain movement ensuring that the data held by different actors is and remains consistent as operations are applied to update that data.

But in example embodiments described herein, the focus on "states" of agreements is in contrast to prior-art systems where the data over which participants much reach consensus is the state of an entire ledger or the state of an entire virtual machine.

In an example implementation, a model for reaching consensus as to the state of agreements between parties starts with the smallest useful concept: a single agreement between two or more parties that requires synchronization and evolution through its lifecycle. Thus, rather than reason about the state of an entire machine or global data structure, the focus of example embodiments herein is on individual agreements.

As used herein a "state object" represents an agreement between two or more parties, which are governed by machine-readable contract code, which references and is intended to implement portions of human-readable legal prose. A state object may comprise a digital or electronic document which records the existence, content and current state of an agreement between two or more parties. A state object may be shared only with those parties who have a legitimate reason to view it. Such parties may include debtors and creditors, parties on either side of a purchase, loan, trade or other transaction, regulators, beneficiaries, or others. A state object may include reference to at least two documents, (1) contract code, which is computer code that defines the permissible operations a transaction may perform on the state object, and (2) legal prose, which are the legal terms or agreed actions applicable to the specific agreement represented by the state object (e.g., for example the standard terms for an Interest Rate Swap). A state object may also comprise a parameters document, which is a document signed by a particular issuer of an asset, which provides specialization in the case that the legal prose is generic and requires population of specific fields of data or other content, for example, currency type, currency amount, temporal limitations, etc. A state object may be referenced by cryptographic hash, including all data held within the state object.

As used herein a "transaction" is used to advance from one instance or version of a state object to the next instance or version of a state object. That is, a transaction proposes and executes changes to the state object, which may impact the obligations of the parties to the underlying agreement, and may create, as an output, a new state object. A transaction may act on multiple state objects in a single transaction. A transaction refers to a state object by referencing the cryptographic hash of the state object. Transactions may be digitally signed documents that consume zero or more state objects as "input" and produce zero or more new state objects as "outputs." A zero input transaction is an issuance, such as issuing cash to an individual. A zero output transaction includes and extinguish command to effectively terminate a state object.

Transactions may specify one or more "commands," which drive which operations are performed and inform the system what parameters are required for consensus or validation of the transaction, such as reference to the correct cryptographic hash, presence of electronic signatures, or other validation parameters. With consensus reached and the transaction validated or confirmed, the input state object to a transaction may be considered consumed. That is, it is invalid to consume the same input state objects in two different transactions. A transaction may, however, consume and produce multiple state objects of various types.

In an example embodiment a valid transaction is one which complies with mandated or relevant rules specified in the associated contract code of input or output state objects and which is digitally signed by the party(ies) expected or implied by the contract code and commands. The concept of a transaction which consumes outputs of previous transactions and creates new outputs may be analogous for explanatory purposes to the "Unspent Transaction Output (UTXO)" model of Bitcoin. In the present disclosure, however, the outputs represent the states of individual agreements between two or more parties as reflected in the state object, rather than ownership of Bitcoin reflected in a general public distributed ledger.

The holder of a state object may establish its meaning via a link to the underlying legal prose and contract code, and establish its history by examining the preceding versions and associated transactions or optionally satisfy themselves of its provenance/history by examining a signature from a notary service to vouch for its uniqueness and that the transaction does not involve a previously consumed input state object. A holder of a state object may propose a successor version of the state object by constructing a transaction and taking that proposed transaction through the process of signing and confirmation through a timestamping and uniqueness service.

As used herein, the term "private distributed ledger" refers to a ledger system comprising state objects by which access to the ledger and the state objects is restricted based on parameters of proposed transactions, contract code, or other security parameters. Access to the state objects, content within the states objects, transaction information, associated metadata, or even the ledger itself may be restricted by only sending data to those who should have it and not sending data to those who should not have it. A global or central system with permission/access control does not have to be used because each participant's set of data is limited to the data each participant is allowed to hold.

As used herein, the term "uniqueness service" is a protocol by which transactions referencing one or more state objects are prioritized, for example by reference to a date time stamp, and/or validated.

Figure 49:
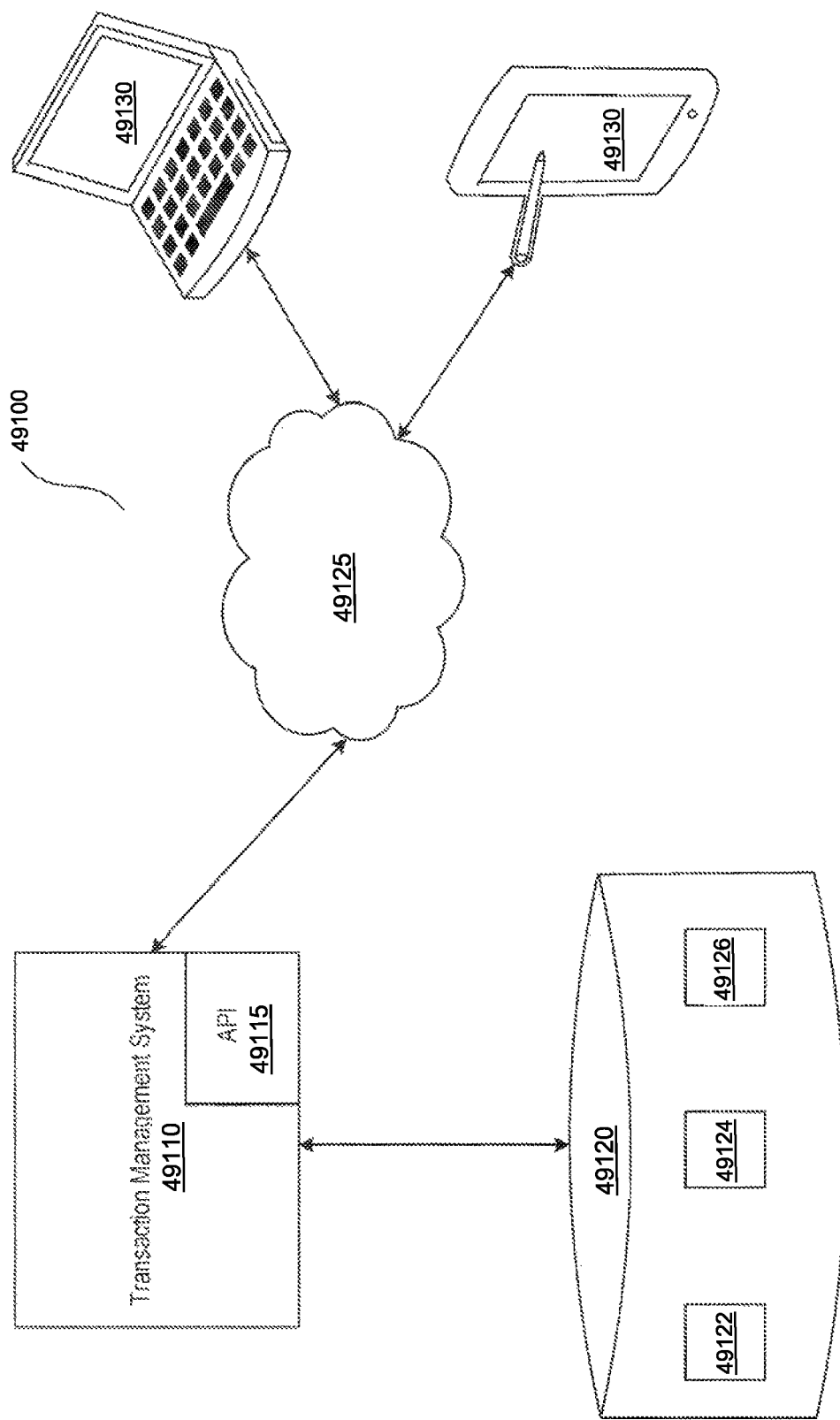
FIG. 49 is a block diagram illustrating a suitable computing environment for managing transactions using a private distributed ledger.

FIG. 49 is a block diagram illustrating a suitable computing environment or managing transactions using a private distributed ledger. The computing environment 100 includes a transaction management system 110, which provides an Application Programming Interface (API) service 115 and/or via deployable software (local or cloud-based) configured to enable users, customers, enterprise systems, and so on, to access various different transaction management functions provided by the transaction management system 110. For example, a user at a computing device 130 (such as a desktop computer, mobile device, laptop, and so on) may upload, over a network 125 (e.g., the Internet), an application or other content associated with a transaction involving a state object supported by the transaction management system. In some embodiments transaction management system may communicate with other transaction management systems, or other computer systems instead of one or more end user terminals.

The content 140 associated with the transaction may contain various different scripts or modules, such as a javascript module 145, that facilitate communicating over the network 125 to the transaction management system 110 (e.g., calling the API 115), in order to access and retrieve certain information associated with the transaction, such as state object information (including contract code and legal prose), transaction command information, ownership information, licensing or purchasing information, unique identifiers, provenance information, and so on. The transaction management system 110 may store such information via distributed ledger technology in various databases or memory, either local to the system or in various cloud-based storage services.

For example, a database 120 may include content information 122 associated with digital content items or state objects, such as information describing the content of the state object, information representing the state objects (e.g., hash values), metadata associated with the digital state items, and so on. The database 120 may also include contract data or information 124, such as information associated with rights or obligations assigned to or associated with the state objects and/or use of the digital content of the state object or transaction, and one or more private distributed ledgers, such as block chains associated with the state objects that track transactions performed with respect to the digital content items.

The database 120 may include other types of data or information, such as user information (e.g., information associated with owners or recipients of content), payment information (e.g., information associated with monetary exchanges for content), and so on.

Further details regarding the components and methods performed by the transaction management system 110 are described herein.

Figure 50:
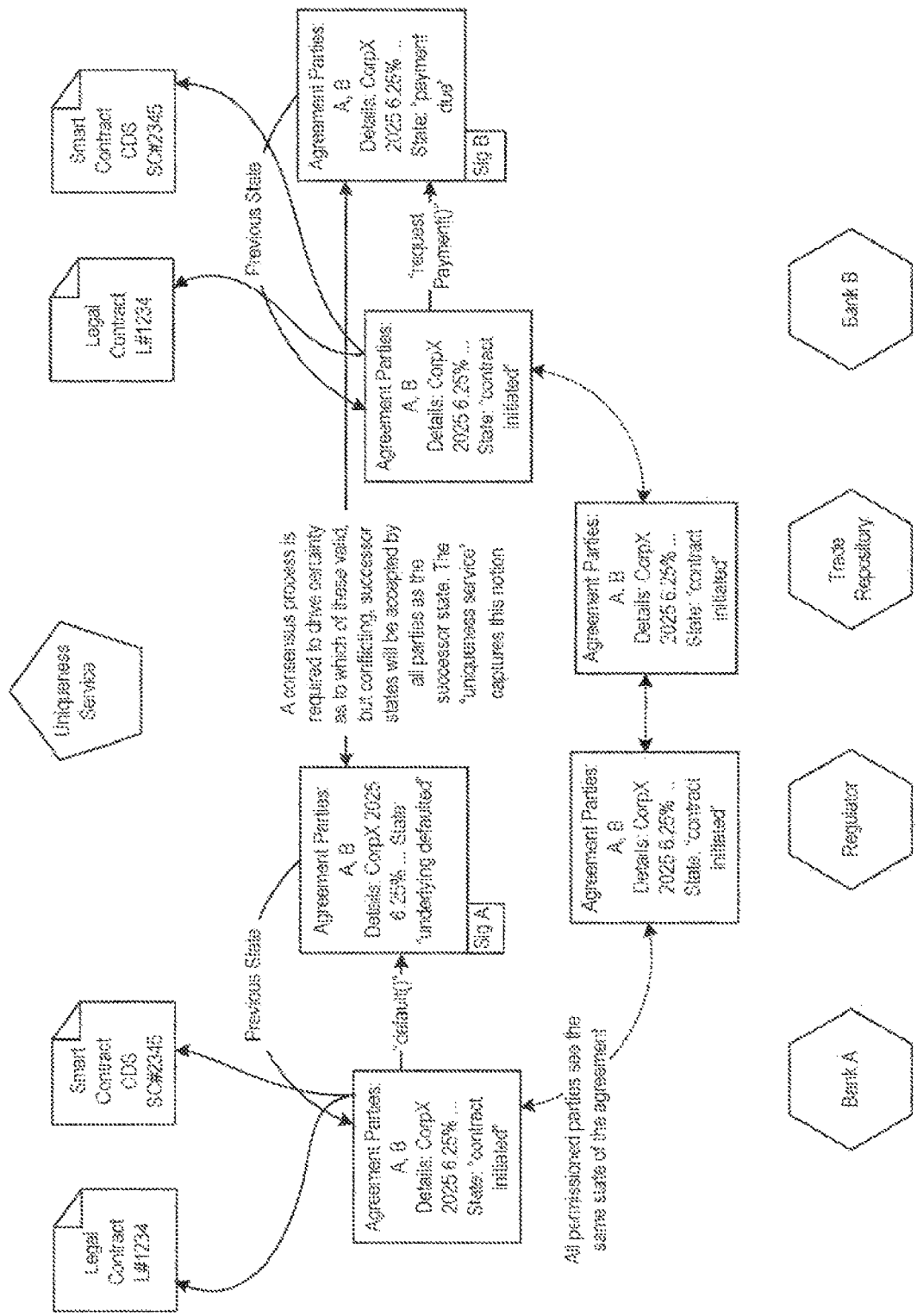
FIG. 50 is a block diagram of an example architecture in accordance with the present invention.

FIG. 50 illustrates an example architecture incorporating state objects, transactions between two parties, and a uniqueness service.

In the example illustrated in FIG. 50, the new state will flow through the process without difficulty. However, the architecture must guard against the situation that other parties may legitimately (or nefariously) propose a new transaction and hence new state objects at the same time.

Two parties can perfectly and validly decide to enter completely different states. An example would be that the buyer of a Credit Default Swap may wish to record that the underlying bond has encountered a default event, at the same time that the seller of the protection may have created a Transaction to record that a premium payment was due. If this is a possibility, then the smart contract must be designed to cope with this eventuality. A consensus method that resolves the conflict is required. But the architecture does not seek to merge conflicts. Instead, a single history relating to the object code must be resolved and provided. "Failed" updates must be reapplied to the latest version. This is similar in function to the blockchain model. However, the blockchain model resolves conflicts by replicating the entire ledger, in examples herein, a uniqueness service or notary evaluates proposed transactions and determines priority, by for example, a date-time stamp, thus ensuring that proposed transactions do not conflict and are operated on the latest version of the state object.

Therefore, for some state transitions, the ability to select between conflicting, yet valid, successor states is required. The "timestamping and uniqueness service" function provides this assurance, and is modelled as another party that participates in a state transition, otherwise known as a notary. In some examples the uniqueness service may be implemented as a blockchain (e.g. similar to the anti-double spend function of Bitcoin). In other examples the uniqueness service may prioritize between conflicting state transitions using a pre-established order or other hierarchical preference.

Figure 51:
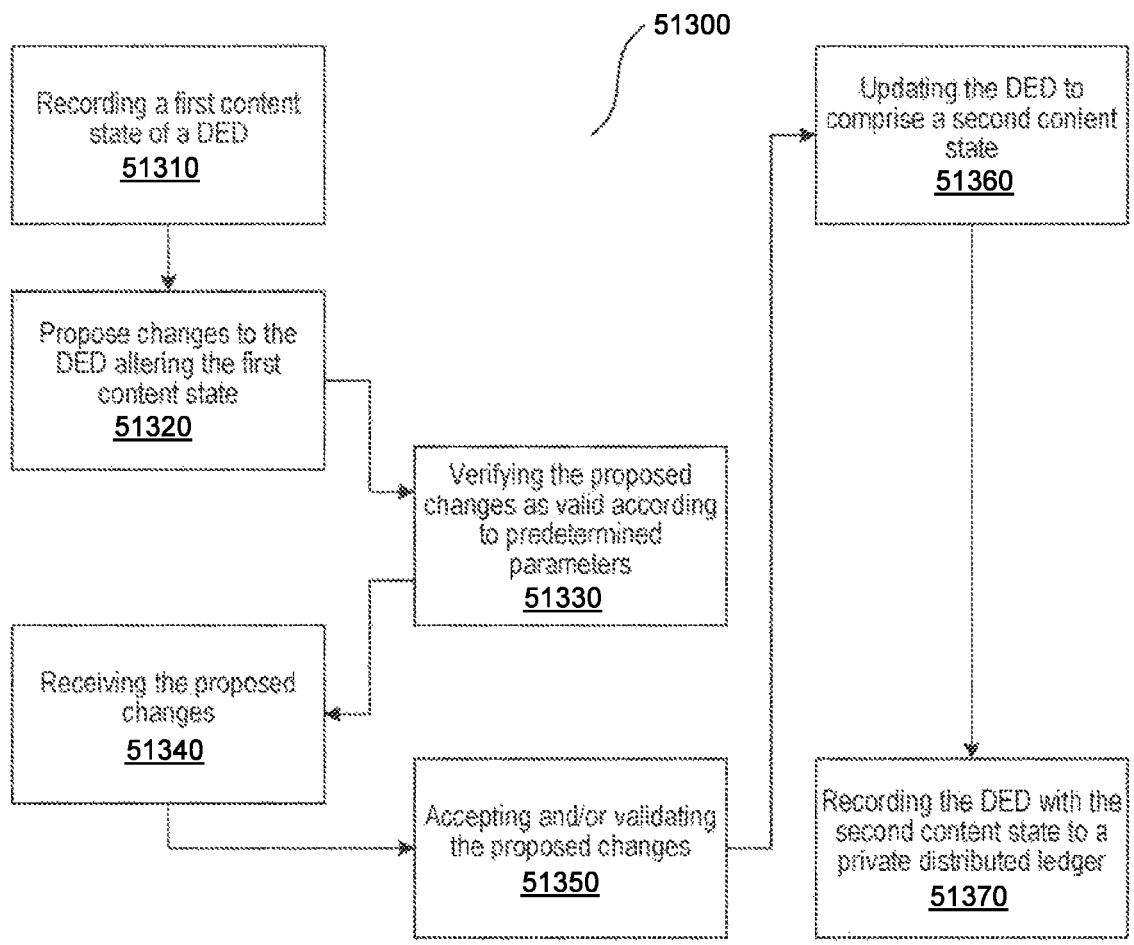
FIG. 51 is an example process of modifying a dynamic electronic document in accordance with the present invention.

With reference to FIG. 51, a method (300) of managing states of a dynamic electronic document is provided, wherein the method comprises the steps of: recording a dynamic electronic document establishing a first content state (310); proposing changes to the dynamic electronic document altering the first content state (320); verifying the proposed changes as valid (330); receiving the proposed changes (340); accepting and or validating the proposed changes (350): updating the dynamic electronic document having a second content state (360); and recording the dynamic electronic document to a private distributed ledger (370).

A dynamic electronic document may comprise a state object that in turn references a contract code and legal prose. In some embodiments a dynamic electronic document may represent any obligation between two parties including financial transactions, but it may also represent ownership of versions of a document, order and fulfillment forms, expense reports, maintenance request forms or maintenance logs, or virtually any electronic document to which two or more parties must agree to changing facts captured by the document. In recording a dynamic electronic document establishing a content state, the parties agree as to the status of the document, for example as the current status of the state object. The state object can be recorded on a private distributed ledger.

A party to the obligations referenced by the state object may propose a transaction by which the state of the dynamic electronic document are altered. In some examples a transaction proposes changes to the state object.

The transaction may be verified as including permissible changes to the state object. For example a transaction may include a command for transferring funds and require appropriate electronic signatures from the party holding the funds.

Figure 52:
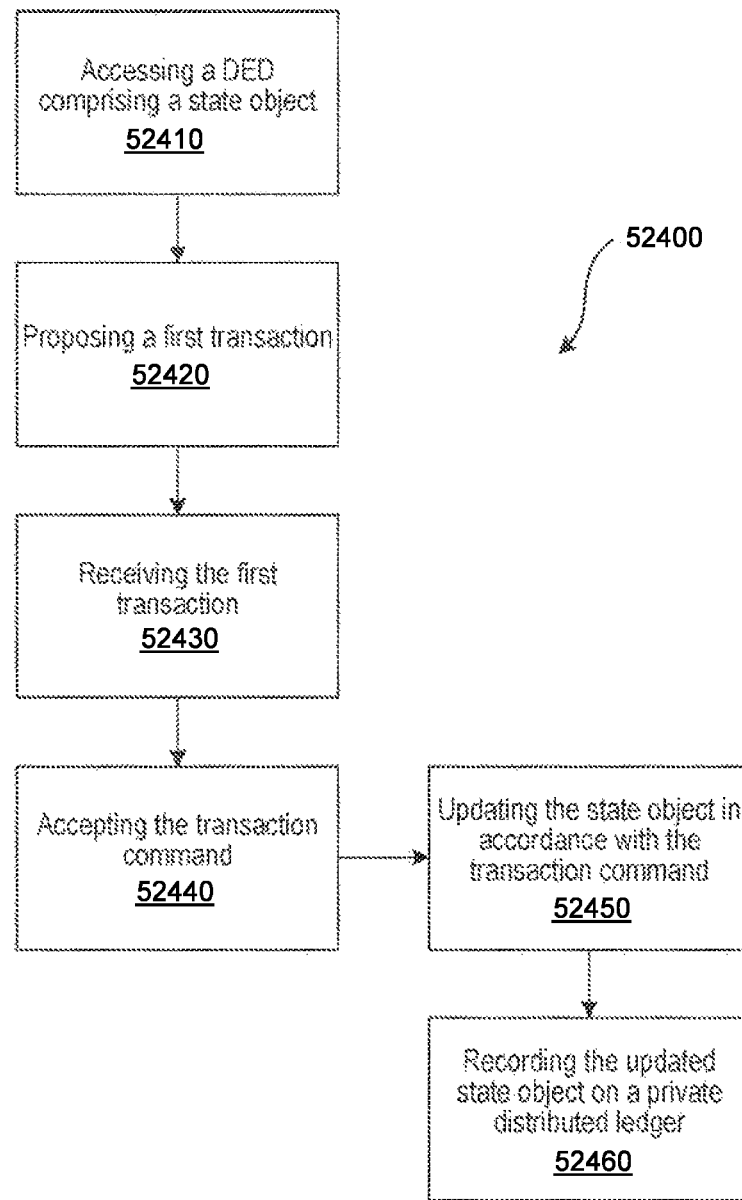
FIG. 52 is an example process of modifying a dynamic electronic document in accordance with the present invention.

With reference to FIG. 52, a method (400) for validating and communicating changes to a dynamic electronic document between a first and second user is provided. The method comprises the following steps. Accessing (410) a dynamic electronic document comprising a state object. Proposing a first transaction (420) comprising (or referencing) the state object, a transaction command, and validation protocol wherein, the state object represents the current version of the dynamic electronic document as represented on a private distributed ledger, the transaction command represents the proposed changes to the state object, and the validation protocol comprises reference to the contract code to gain consensus that the transaction is permissible under the contract code, the source of the transaction command, and/or, one or more parties to receive the first transaction. Receiving the first transaction (430) and accepting the transaction command (440). Updating the state object (450) of the dynamic electronic document to reflect the accepted proposed first transaction and recording the updated state object on a private distributed ledger (460).

Figure 53:
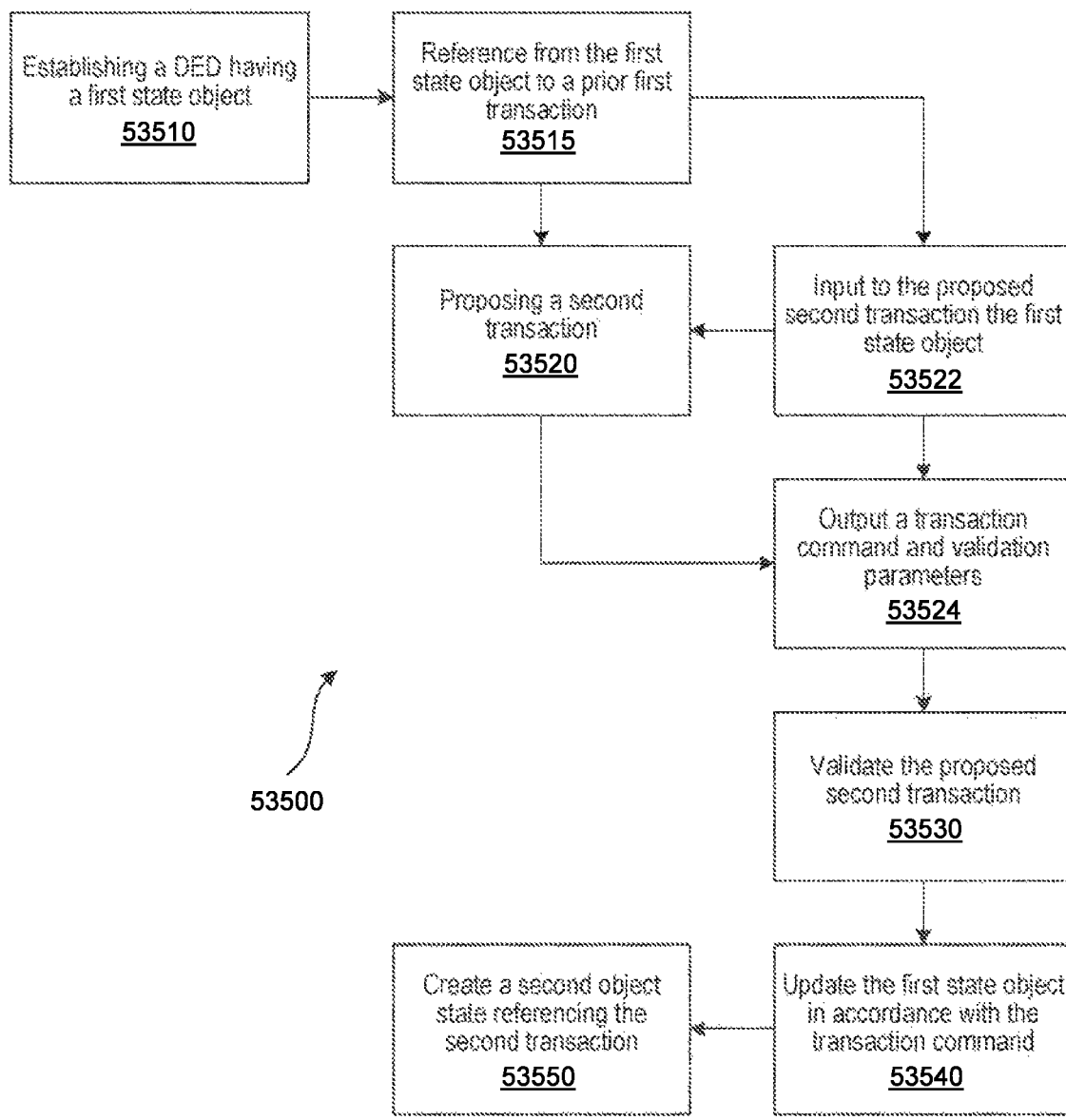
FIG. 53 is an example process of modifying a dynamic electronic document in accordance with the present invention.

With reference to FIG. 53, a method (500) for validating and communicating changes to dynamic electronic documents between multiple users, comprises the following steps. Establishing a dynamic electronic document (510) comprising a first state object. Proposing a transaction (520) comprising as an input (522) the first state object and as a transaction command (524) to alter the first state object as well as parameters required to validate the second transaction. Validating the proposed transaction (530). Updating the first state object (540) in accordance with the transaction command. A transaction creates as an output a second state object (550) referencing the prior state object and/or the second transaction on a private distributed ledger, wherein the only individuals having access to data or content associated with the first and/or second state object(s) after approval of the transaction are the individuals referenced in the state objects.

Figure 54:
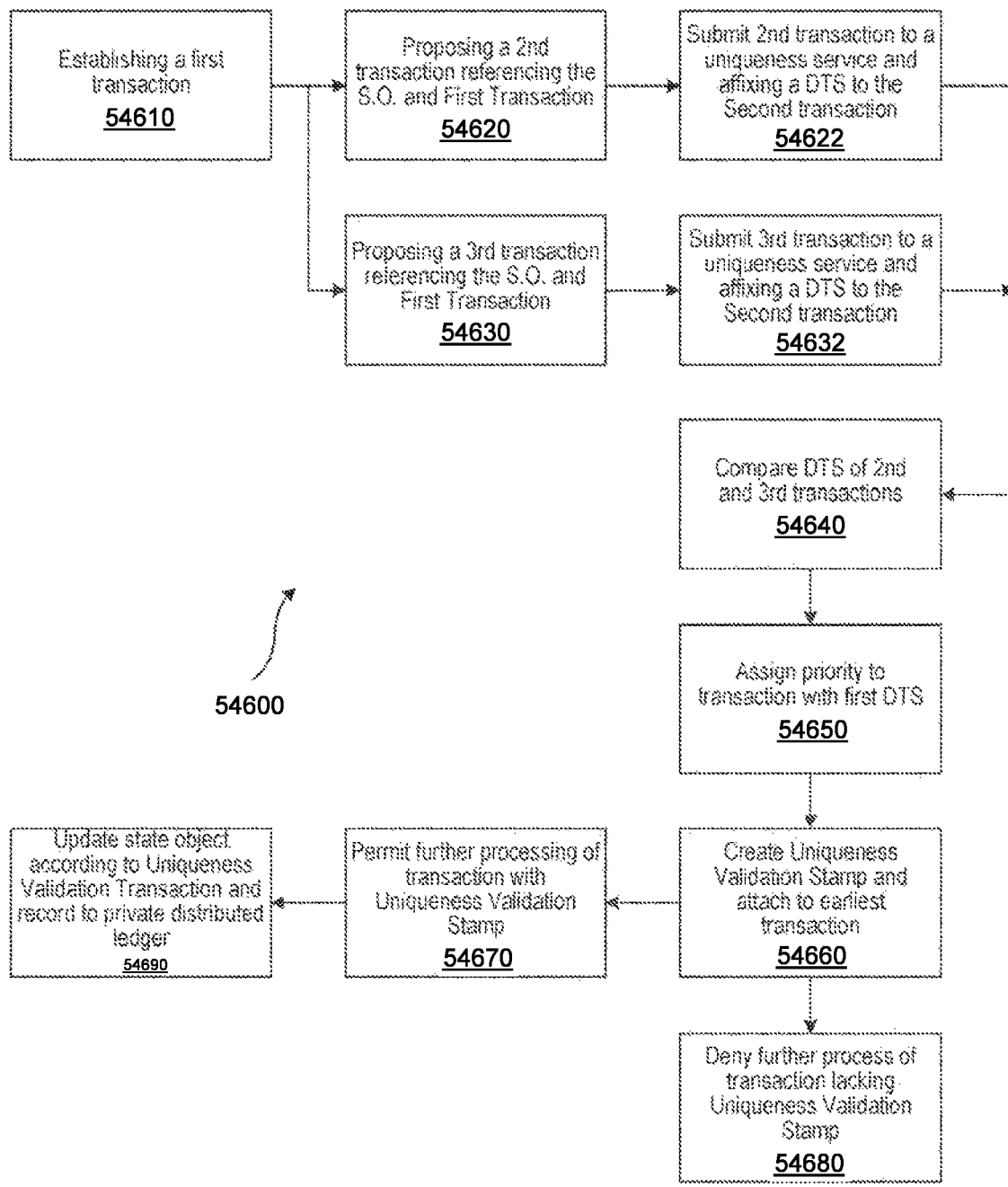
FIG. 54 is an example process of ensuring the uniqueness of a dynamic electronic document prior to issuing changes, in accordance with the present invention.
Figure 55:
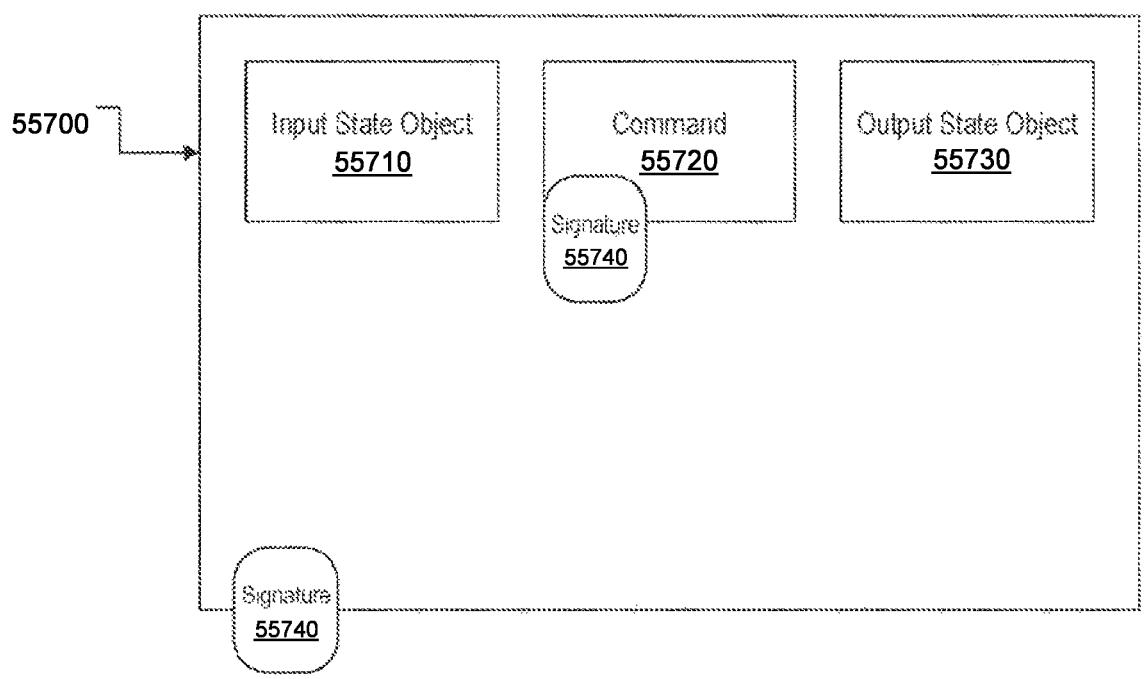
FIG. 55 is an example process of a transaction involving a state object, consistent with the present invention.

With reference to FIG. 54, a method (600) of notarizing the state of a dynamic electronic document comprises the following steps. Establishing a first transaction (610) comprising a state object. In a second transaction, referencing (620) the state object and first transaction, wherein a date-time stamp is affixed (625) to the state object and the second transaction. In a third transaction, referencing (630) the state object and the first transaction, wherein a date-time stamp may be affixed (632) to the state object and the third transaction. Determining the uniqueness of the second and third transactions (640) by comparing the date-time stamps of the second and third transactions. And assigning priority (650) to the earliest date-time stamp, thereby notarizing the earliest of the second or third transaction and creating a unique transaction (660). Permitting further processing (670) of the unique transaction. Prohibiting further processing (680) of the non-unique transaction. And updating the state object (690) on a private distributed ledger to reference the unique transaction.

In some embodiments, a proposed transaction much be submitted to a uniqueness service in order to establish the date-time stamp and priority of the proposed transaction. The uniqueness service will, in some instances have access to the state object and previous transactions. This may be undesirable as it introduces access to private or sensitive information that may only be shared between the parties obligated by the state object. As such, a transaction tear-off function is a protocol whereby information within a transaction and state object is identified by metadata tags and filtered to provide only allowable information from a transaction to be shared with the uniqueness service. In some embodiments the transaction tear-off function can be utilized with any third-party request for information about a transaction and state object, for example, regulators, auditors, beneficiaries, or credit rating agencies.

In various examples of the present invention updates to state objects are applied using transactions, which consume existing state objects and produce new state objects. There are two aspects of consensus:

1. Transaction validity: parties can reach certainty that a proposed update transaction defining output states is valid by checking that the associated contract code runs successfully and has all the required signatures; and that any transactions to which this transaction refers are also valid.
2. Transaction uniqueness: parties can reach certainty that the transaction in question is the unique consumer of all its input states. That is: there exists no other transaction, over which any parties have previously reached consensus (validity and uniqueness), that consumes any of the same states. Parties can agree on transaction validity by independently running the same contract code and validation logic. However, consensus over uniqueness requires a predetermined observer, which in many cases may be required to be independent.

In some example embodiments of the present invention consensus over transaction validity may be performed only by parties to the transaction in question. Therefore, data is only shared with those parties which are required to see it. Other platforms generally reach consensus at the ledger level. Thus, any given actor in a system sees only a subset of the overall data managed by the system as a whole. In example embodiments of the present invention, a piece of data may be considered "on-ledger" if at least two actors on the system are in consensus as to its existence and details and arbitrary combinations of actors are allowed to participate in the consensus process for any given piece of data. Data held by only one actor may be considered "off-ledger".

Example embodiments of the invention may include a "pluggable" uniqueness services, which may facilitate improved privacy, scalability, legal-system compatibility and algorithmic agility. A single service may be composed of many mutually untrusting nodes coordinating via a byzantine fault tolerant algorithm, or could be very simple, like a single machine. In some cases, such as when evolving a state requires the signatures of all relevant parties, there may be no need for a uniqueness service at all. It is important to note that these uniqueness services are required only to attest as to whether the states consumed by a given transaction have previously been consumed; they are not required to attest as to the validity of the transaction itself, which is a matter for the parties to the transaction. This means that the uniqueness services in some example embodiments do not see (or otherwise have access to) the full contents of any transactions, thereby improving privacy and scalability of the system compared with alternative blockchain designs. This design decision represents a key decision as to the acceptable tradeoffs in shared ledger architectures.

State Objects:

In an example embodiment of the present invention a state object is a digital document that records the existence, content and current state of an agreement between two or more parties. In some examples a state object is an electronic agreement between two parties to a shared distributed ledger, such as a private or public distributed ledger.

The state object may comprise a contract code file that includes machine readable instructions defining permissible actions to which the electronic agreement may be associated with and a hash identifying the contract code. The contract code may include one or more rules or contextual data that help verify if a proposed transaction involving the state object is permissible. Contract code may translate contractual language between two parties into machine readable and actionable code. The contract language may be found in a legal prose document associated with the state object.

The state object may further comprise such a legal prose document that includes human readable text describing obligations of each party and a hash identifying the legal prose document. The legal prose document may include reference to assets, holdings, currency, obligations or the like. The legal prose document may set forth the obligations of the parties with regard to such assets, etc., but may also leave certain fields blank or unspecified. For example a specific value of currency to be transferred may be left unspecified, to be filled in by parties to an agreement relating to the state object.

The state object may further include parameters or a parameters file, which helps define the current state, value, or condition of the state object. For example the parameters may define the type of currency and the amount. Or may define an interest rate. Or other variable identified but not specifically defined in the legal prose document and the contract code.

And the state object may further comprise an electronic signature or other form of acknowledgment, such as a public or private key, such that the signed state object is an acknowledgement by the parties to the agreement that the state or condition of the state object (e.g., the value of the assets and the asset type, having an associated interest rate at a particular time) is valid and the parties are in agreement to the state or status.

Embodiments of state objects as defined herein facilitates the use of a global ledger, such as a public or private distributed ledger. A distributed or global ledger represents a trusted single source of information relating to the transactions recorded thereon. However, in examples of the current invention, although the ledger is shared, it is not the case that transactions and ledger entries are globally visible. In cases where transactions only involve a small subgroup of parties the relevant data (as defined by the state object) remains purely within that subgroup.

The state object may include a reference to (at least) two documents: contract code or computer code that defines the permissible operations a "transaction" may perform on the state object; and Legal Prose or the legal terms applicable to the specific agreement represented by the state object (e.g., the standard terms for an Interest Rate Swap). The legal prose and the contract code represent the bridge from the technical domain to the legal domain.

Additionally, the state object may comprise a parameters document typically signed by a particular issuer of an asset, which provides specialization in the case that the legal prose is generic and requires population with additional specialising detail. To ensure consistency in a global, shared system where not all data is visible to all participants, secure cryptographic hashes identify parties and data. The ledger is defined as a set of immutable states.

Example: Cash

Figure 56:
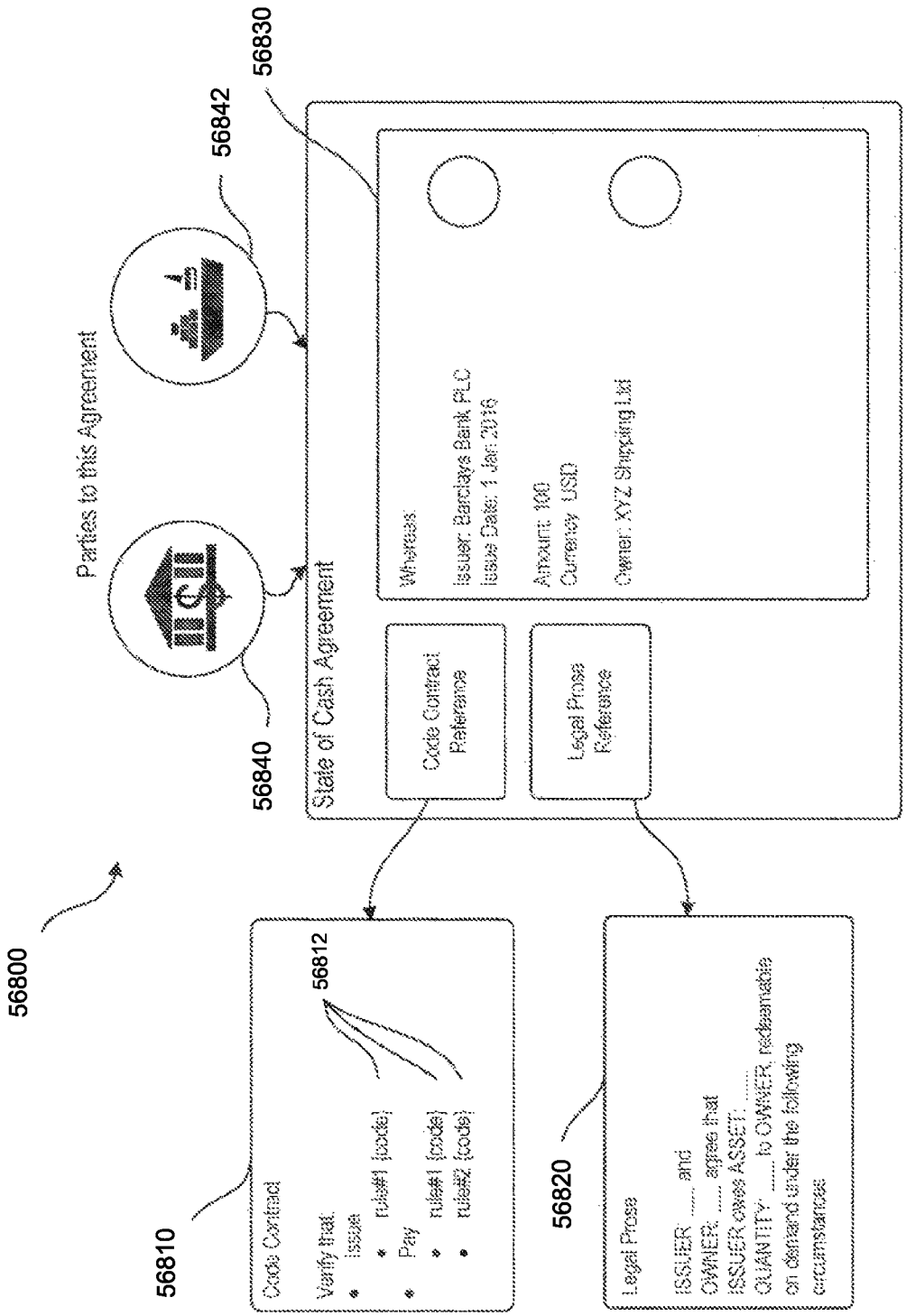
FIG. 56 is an illustrated example of a state object.

With Reference to FIG. 56, an exemplary state object 800 may comprise a contract code 810, legal prose 820, and parameters 830 referencing parties to the agreement 840 and 842.

Though state object 800 may contain arbitrary data, it may also contain at least a reference to the hash of Contract Code 810, which may be a program expressed in some byte code that runs sandboxed inside a virtual machine. State object 800 may also include a reference to the hash of a legal prose document 820, which provides legal context in a form that is recognised by a judicial or other dispute resolution system. Contract Code 810 may be globally shared pieces of business logic and may include one or more rules 812, as well as defining a verify function, which is a pure function that is able to determine whether the transition for the state object 800 is valid, regardless of which party calls the function. The verify function does not check that a transaction is in the interests of either party, only that its constraints are enforced, and nodes or parties must separately satisfy themselves the transaction is in their own interests.

In the example illustrated in FIG. 56, a stylized Cash State Object 800, represents the ownership of 100 USD. The object refers to its governing Contract Code 810 and associated Legal Prose 820. As this is a cash contract, the Legal Prose document 820 will specify the terms and conditions that pertain to a cash liability issued by one party to another: under what circumstances can the cash object be redeemed for a balance in a traditional bank account or in exchange for a wire transfer elsewhere. The legal prose document 820 may also address dispute resolution. In addition, the legal prose 820 will specify those rights, obligations and conditions associated with the contract which the parties agree will be automated through computer code, thereby explicitly delegating from the legal prose domain to the code domain.

Furthermore, and critically, the legal prose 820 may will also leave several pieces of information unspecified, such as: who is the issuer? what is the currency? The State Object contains these fields, as a parameter to the state object, in the example (we see the issuer here is ABC Bank and the currency is USD). The combination of the legal prose 820, contract code 830 and parameters 830 captured in the state object 800 plus relevant digital signatures 840 and 842 collectively define the agreement between the parties.

Figure 57:
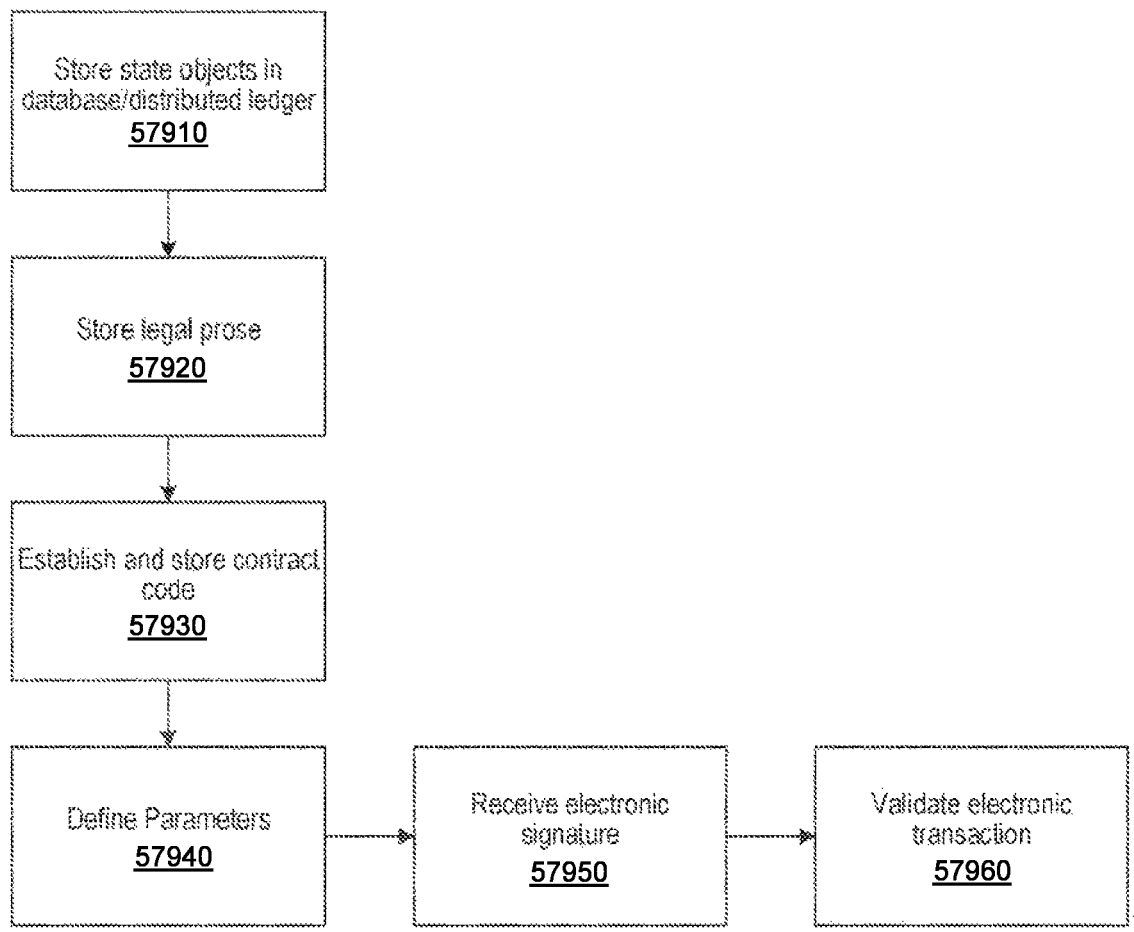
FIG. 57 is an illustrated example of a method establishing a state object.

FIG. 57 illustrates an exemplary method 900 of creating a state object defining an agreement between two parties to a distributed ledger. First a database for storing state objects is established by a processor at first node of a distributed ledger network (910). Then a legal prose document comprising human readable text describing obligations of each party and a hash identifying the legal prose document is stored on the database (920). The legal prose document includes one or more fields of undefined value. Contract code comprising machine readable instructions defining permissible actions to which the electronic agreement may be associated with and a hash identifying the contract code is then stored in database (930). The permissible actions are defined in the legal prose document. Parameters specific to the electronic agreement defining a state of the agreement are defined and stored (940). The parameters include values defining one or more of the undefined fields in the legal prose. Then the state object receives at least one electronic signature of a party to the electronic agreement (950). And with the receipt of the electronic signature, the state object is validated and established in the database (960).

Transactions:

Transactions are used to advance from one instance of a state object to the next. That is, transactions are processing of the agreement from one state object to another, for example the transfer of assets, goods, or currency from one party to another. Transactions are digitally signed documents that consume zero or more state objects as "Inputs" and produce zero or more new state objects as "Outputs". A transaction whose dependencies are valid, which is correctly signed and whose associated contracts' verify methods run successfully is considered valid. That is, consensus is reached and confirmed that the proposed transaction is permissible for the input state object. A valid transaction with a signature from its governing notary service (verification service) is considered final such that at the moment the transaction is signed by its governing notary, all its inputs are considered consumed and all its outputs become active. The notarization of a transaction provides atomicity and finality (confirmation).

In a simplified example, a transaction involves a state object having a proposed modification to an underlying asset. The proposed transaction must be validated—that is the modification must be consistent with the rules of the contract code and the asset at the heart of the state object. The proposed transaction must also be notarized or verified—that is the assets in the underlying state object cannot have previously been consumed by a different transaction. A validated and notarized transaction will consume the state object, perhaps reassign values and/or ownership, and establish an altered or new state object.

In embodiments of the present invention, it may be possible to share only portions of the state object for the verification and/or notarization of a transaction. For example verification can occur based on the transaction type without the notary, uniqueness servise or verifying protocol knowing the identity of the parties. In this manner, a transaction, and the underling state object(s) may interact with one or more smart notaries to perform the verification and notarization functions.

Figure 58:
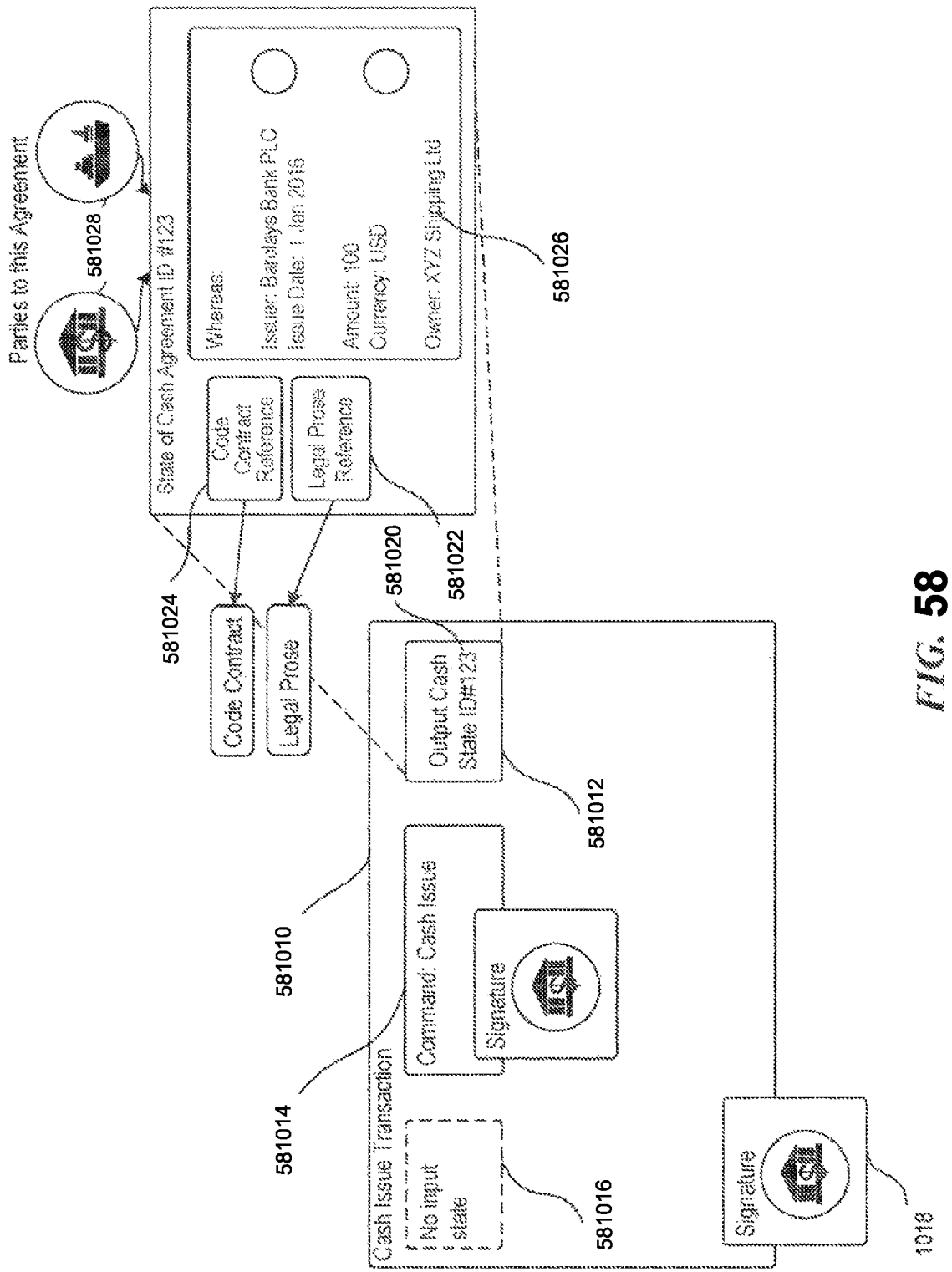
FIG. 58 is an example of a transaction involving a state object.

FIG. 58 illustrates an example of a transaction, specifically a cash issuance transaction. The transaction 1010 comprises an output state object (the newly issued cash), a command 1014 (signaling that the intent of the transaction is to issue the cash) and no inputs 1016 (since this is newly issued cash). The transaction is signed by the issuing bank 1018. The command may contain the public key of the signing party(ies). The output state object 1012 is provided a unique identification, 1020 and comprises the legal prose document 1022, the contract code 1024, a parameters document 1026. The parameters document 1026 may include specifics to field information that was intentionally left blank in the legal prose and contract code, such as the value or cash amount, type of currency, and date. The output state object may include electronic signatures 1028 representing the parties to the state object.

Once a transaction is successfully confirmed, the input state objects to a transaction are considered extinguished or consumed. It is invalid to consume the same input objects in two different transactions. For example, any attempt to finalize a subsequent transaction that attempts to consume any of the same inputs will fail at the point of validation or notarization.

Figure 59:
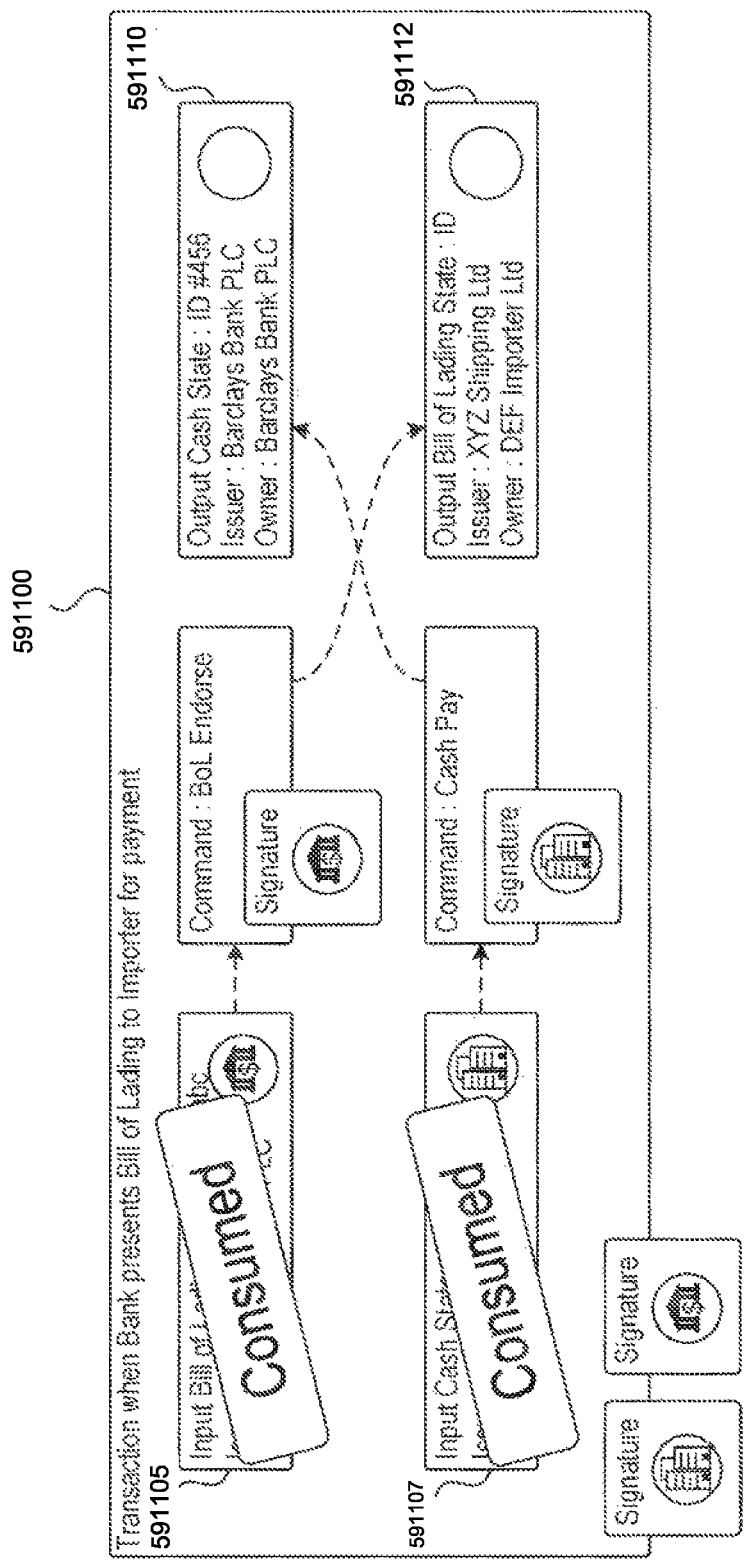
FIG. 59 is another example of a transaction involving a state object.

A Transaction may consume and produce multiple state objects of multiple types, as illustrated in FIG. 59, which shows an exchange, where two input states objects, 1105 and 1107, are consumed, and two output states objects, 1110 and 1112, are created, inside a single atomic transaction 1100. The business purpose of this transaction is to atomically pay an importer and endorse the associated bill of lading. States objects created as a result of one Transaction will ultimately be consumed in another, in an ongoing chain of transactions. So long as the input transaction is verified and validated, the parties to subsequent transactions need not perform any further diligence or trust activity to execute the transaction with a high degree of certainty and low risk.

Transaction Validation and Notarization

For a Transaction to be considered valid (and hence a candidate for finalisation): its inputs states must be from valid transactions (recursively—such as one may iterate back through state chains and inspect the uniqueness of each state and validity of each state transition); it must be electronically signed by all parties identified in the transaction's commands; and it must be accepted by the verify function of every contract pointed to by the input and output states objects.

Upon receipt of a transaction, embodiments of the invention will download (from the peer who send the transaction) any dependent transactions that are not already available locally and any associated contract code that is not already available locally and verify the dependent transactions.

The system software running on the node will then identify every contract type represented in a transaction and pass the entire transaction to the transaction validation function of each contract type. This means the transaction validation function is called by a node once for each contract type per transaction and has access to the entire transaction.

The transaction validation function determines whether the transaction is consistent with the rules associated with that contract type, that is, does the contract meet the rules established by the legal prose and contract code of the state object. In general, "simpler" contracts (such as cash) will only analyze the cash movements inside the transaction and disregard other state objects, whereas "higher order" contracts may need to analyze the entire transaction.

The transaction validation function receives information relating to the transaction and the input state objects and compares the information for consistencies and inconsistencies, then provides a confirmation or refusal to the transaction. In some embodiments the transaction validation function confirms that contract code referenced by each of the contract types referenced in the transaction. Unlike systems such as Ethereum, where all nodes must execute all business logic, the present invention focusses only on affected parties to the transaction in question. For example, the party proposing a transaction executes the necessary business logic to construct the transaction and its new output states and sends this transaction to the affected parties. These parties are not required to re-run the same business logic, which could be computationally expensive and may be proprietary. Instead, their responsibility is to verify that the proposed transaction is valid. In some cases, they will do this simply by re-running the business logic and checking the results are the same.

In some embodiments of the present invention the consensus-critical business logic is tightly specified: just the verify method(s). Verify methods, which must be pure functions, are run in a tightly-controlled sandbox: only a very limited subset of the Java libraries (which are explicitly whitelisted) can be called: any non-deterministic operations are banned, as are operations that seek to interface with the outside world. A trusted external state may be provided through Oracles.

Once the transaction is validated by confirming the contract code referenced by each of the contract types referenced in the transaction, nodes store a copy of that transaction. Thus the data stored by nodes is an index of all current state objects to which they are party along with the historical set of transactions they processed to form this view.

Beyond inputs and outputs, transactions may also contain commands, small data packets that the platform does not interpret itself, but which can parameterise execution of the contracts or rules in the contract code. Commands may act as arguments to the verify function. Commands are how the transaction creator signals their intent, for example whether the transaction is intended to issue cash or move it from one party to another. Commands can also be used to inject small amounts of information into a transaction, such as a timestamp or an interest rate via an Oracle service. A specified Oracle is expected to sign the associated Transaction to attest to the facts asserted in a Command.

Each Command has a list of Public Keys associated with it. Before invoking any verify functions, the platform ensures that the transaction has been signed by every key listed in the Commands. Thus, a verify method must check that relevant commands specify appropriate public keys, but can rely on the platform to have ensured the associated parties have signed the transaction. This means that contract business logic in verify methods may be simplified, for example the verify logic for cash issuance merely needs to check that the Issue command specifies the Public Key of the issuer. A verify method that depends on the accuracy of an asserted timestamp in a command merely needs to check that the public key of the appropriate timestamping service has been specified. The task of verifying the signature is outsourced to the platform. Public keys may be random/identity-less for privacy, or linked to a well-known legal identity via a public key infrastructure (PKI) or other technique.

Commands may be embedded inside a Transaction. Sometimes, there's a larger piece of data that can be reused across many different transactions. For this use case, Attachments may also be associated with the transaction.

Transactions can refer to zero or more Attachments by hash. Attachments are always ZIP/JAR files, which may contain arbitrary content or data that is not consumed during the execution of a transaction in the same way that state objects are.

In some example embodiments of the invention there may be nothing that explicitly binds together specific Inputs, Outputs, Commands or Attachments. Instead it's up to the Contract Code to interpret the pieces inside the Transaction and ensure they fit together correctly. This is done to maximise flexibility for the contract developer.

A valid Transaction is one which complies with relevant rules specified in the associated Contract Code and which is digitally signed by the parties expected or implied by the Contract Code and Commands.

The concept of a Transaction which consumes outputs of previous transactions and creates new outputs is different from the "Unspent Transaction Output (UTXO)" model of Bitcoin, because, the outputs of the present invention represent the states of arbitrary agreements, rather than ownership of Bitcoin.

The holder of a State object can establish its meaning via the link to the Legal Prose and Contract Code, establish its history by examining the preceding versions and associated Transactions or optionally satisfy themselves of its provenance/history by examining a signature from one or more uniqueness services or notaries.

As discussed above, transactions may sometimes need to provide a Contract with data from the outside world. Examples may include stock prices, facts about events or the statuses of legal entities (e.g. bankruptcy), and so on. The providers of such facts, Oracles, provide facts and information to the ledger by signing transactions that contain commands they recognize, or by creating signed attachments. The commands contain the fact and the signature shows agreement to that fact.

In some embodiments of the present invention, Time is also modelled as a fact, with the signature of a special kind of oracle called a Timestamping Authority (TSA). A TSA signs a transaction if a pre-defined timestamping Command in it defines a after/before time window that includes "true time" (i.e. GPS time as calibrated to the US Naval Observatory). An Oracle may prefer to generate a signed Attachment if the fact it is creating is relatively static and may be referred to over and over again.

Notarization of a Transaction

The validation method(s) of transactions described herein determine whether a transaction is valid or not, according to the legal prose and contract code of the state object as well as the presence of necessary digital signatures. But mere validation that the transaction is permissible may be insufficient for complete consensus: parties to the transaction must also be sure that any given transaction does not conflict with another equally valid transaction. For this, parties to a transaction need to know which transaction is the unique consumer of its input state object(s).

Figure 60:
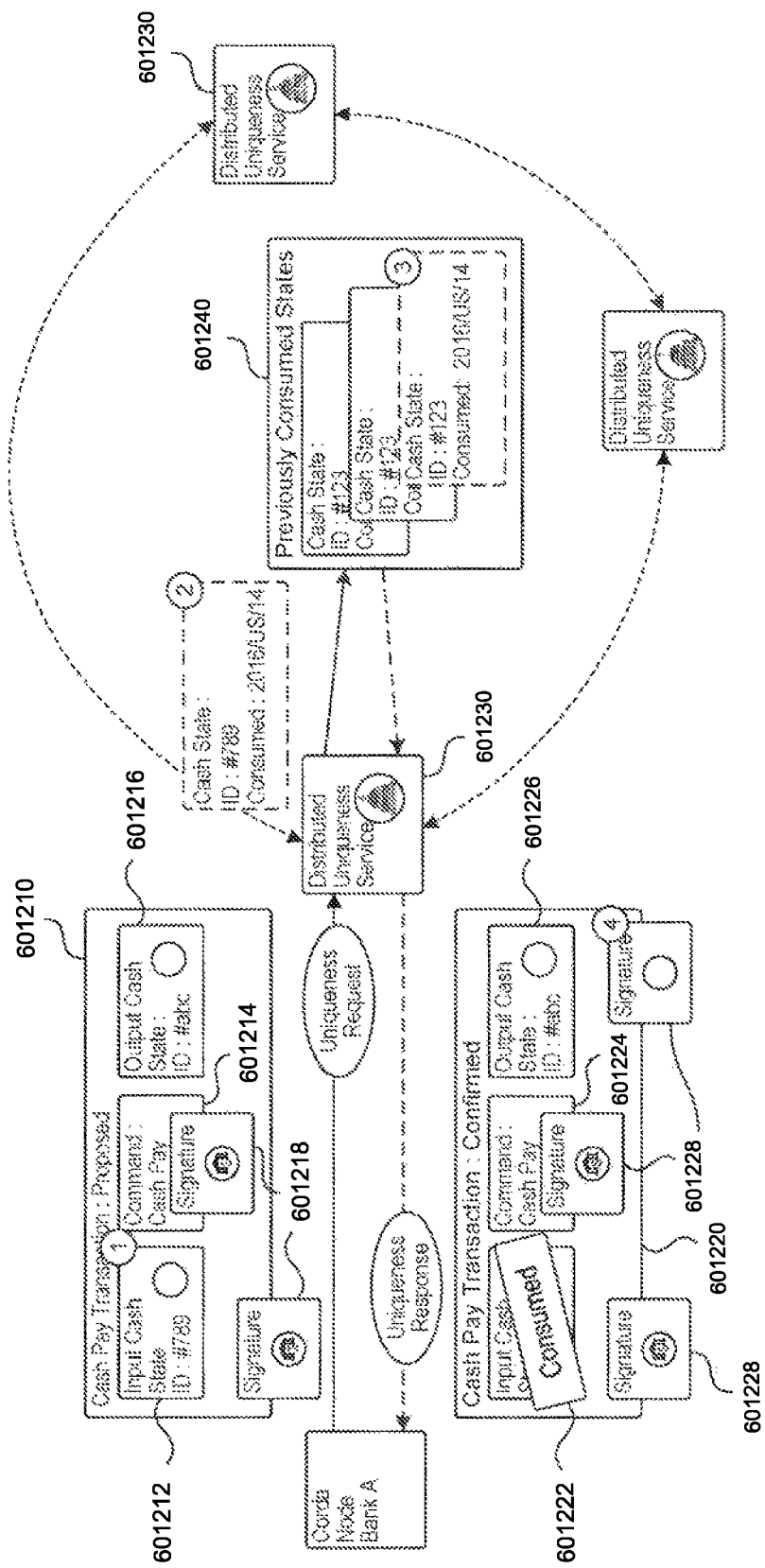
FIG. 60 is an example of a notarization service for a transaction involving a state object.

In some example embodiments, a transaction is final or confirmed or verified or notarized when signed by a Uniqueness Service (also known as a Notary Service). It is at the point of Notary signature that the transaction becomes final. FIG. 60 illustrates two valid transactions which both attempt to consume the same input. Only one transaction can become final—the Transaction that obtains a signature from the correct Notary service.

Thus, in example embodiments, consensus between parties to a transaction involves two distinct functions: Validity of Transactions is established by parties to an agreement running the relevant verify method(s). Finality or verification is established by the application of a signature from a Notary service. The Notary service can be a distributed system (eg running PBFT or practical Byzantine fault tolerance) operated by users of the system themselves or operated by one or more separate parties, perhaps with an explicitly and binding legal agreement. In some embodiments the Notary does not validate the transaction: the only information that must be provided to the Notary is a Merkle branch proving that a transaction with a specific ID (which the Notary is being invited to sign) consumes a specific set of inputs. A Transaction commits to the Notary that will be authoritative with respect to that Transaction's outputs.

As depicted in FIG. 60, two valid transactions are submitted to a notary service for verification. The first transaction 1210 comprises an input object state 1212, having ID #789, with a command 1214 to pay cash to a third party thereby creating output state object 1216. The first transaction 1210 and command 1214 have valid electronic signatures 1218.

The second transaction 1220 comprises an input object state 1222, having ID #789, with a command 1224 to pay cash to a third party thereby creating output state object 1226. The first transaction 1220 and command 1224 have valid electronic signatures 1228.

Both the first transaction 1210 and the second transaction 1220 are valid, as they conform to the contract code rules and have valid signatures. But both the first transaction 1210 and the second transaction 1220 attempt to consume the same input Cash state object, #789 only one can become final. The Distributed Uniqueness Service (or Notary) 1230 receives the second transaction 1220 first, establishes that Notary 1230 has not signed any other transaction which consumes input state #789, adds this state reference to a database 1240 associated with the notary service and (as an atomic activity) electronically signs the transaction, which the notary service then returns to the node. If the first transaction 1210 is ever sent to the Notary 1230, the Notary 1230 will refuse to sign the first transaction as input state #789 is now permanently consumed.

In example embodiments of the invention the validity of a Transaction is established by the parties to that Transaction. However, two or more Transactions could be valid and yet incompatible. For example a valid transaction that pays £100 to me and a transaction that pays the same £100 to you. Both transactions are valid and both candidates for finalization/confirmation/verification/notarization. But at most only one of the transactions may be finalized.

To arbitrate between two or more valid transactions that seek to consume the same input state(s), embodiments of the present invention require need an independent observer. This is the role of the Notary, or Uniqueness, service within exemplary systems of the present invention.

As previously described, State Objects can never be consumed more than once—this is analogous to the double-spend protection provided by Bitcoin. To ensure this, nodes may submit transactions to be signed by a Notary, also known as a Uniqueness Service. In some embodiments the Notary is responsible for two actions before it will sign a transaction. First looking up and ensuring that the Input State Objects in a presented Transaction have not been consumed by a prior Transaction. And second storing references to all Input State Objects that are to be consumed by this Transaction to ensure the Notary will never sign a subsequent Transaction which consumed any of the same state objects.

The signature of the Notary provides the recipient or beneficiary owner of a state object that is being assigned to them with certainty that it cannot have been assigned elsewhere first.

A generic method of finalization involving a transaction comprises: adding an unspent Input State Object to a proposed Transaction, which is then signed by parties to the Transaction, using a protocol. The protocol then validates that the proposed transaction is permissible according to the underlying contract or agreement. The protocol then sends the Transaction to the Notary, and the Notary validates that the Input State Object is not in its register of spent Input States Objects. The Notary adds the Input State Object to its register of spent Input States Objects. The Notary signs the Transaction and then returns the Transaction to the parties involved in the Transaction.

In some embodiments the Notary evaluates the unique identification of the input state object to the transaction and determines whether that state object has been consumed. If the state object has not been consumed the Notary records the input state object as consumed it the notary database and transmits to the system that the transaction is finalized. The transaction then creates an output state object in accordance with the parameters of the contract or agreement.

Figure 61:
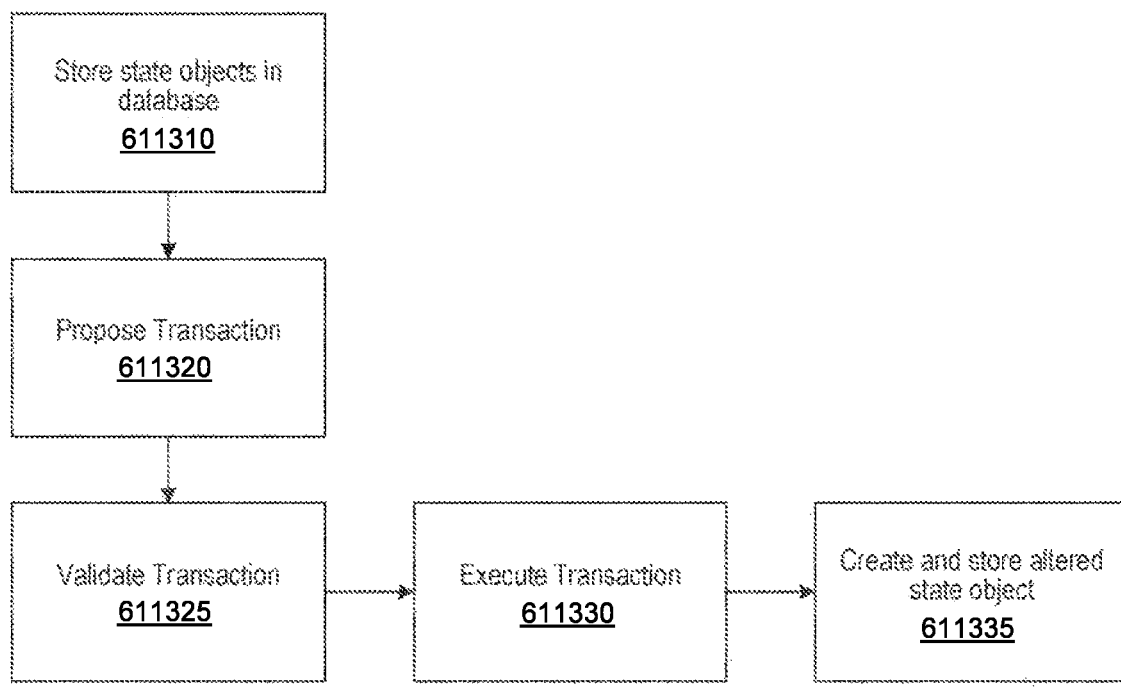
FIG. 61 is a flow chart of an example method of the present invention.

FIG. 61 illustrates a method of executing a transaction relating to an electronic agreement. The method 1300 comprises the steps of storing multiple state objects in a database at a node of a distributed ledger network (1310). Proposing a transaction between two parties that alters the state of a first state object (1320). Verifying that the proposed transaction is a valid transaction according to the rules of the first state object (1325). Executing the proposed transaction by altering the state of the first state object (1330). And storing the altered first state object in the database at a node of a distributed ledger (1335). The first state object and the altered first state object may be shared between the parties of the transaction and stored in the database while preventing access to such state objects by unrelated parties having access to the database.

Figure 62:
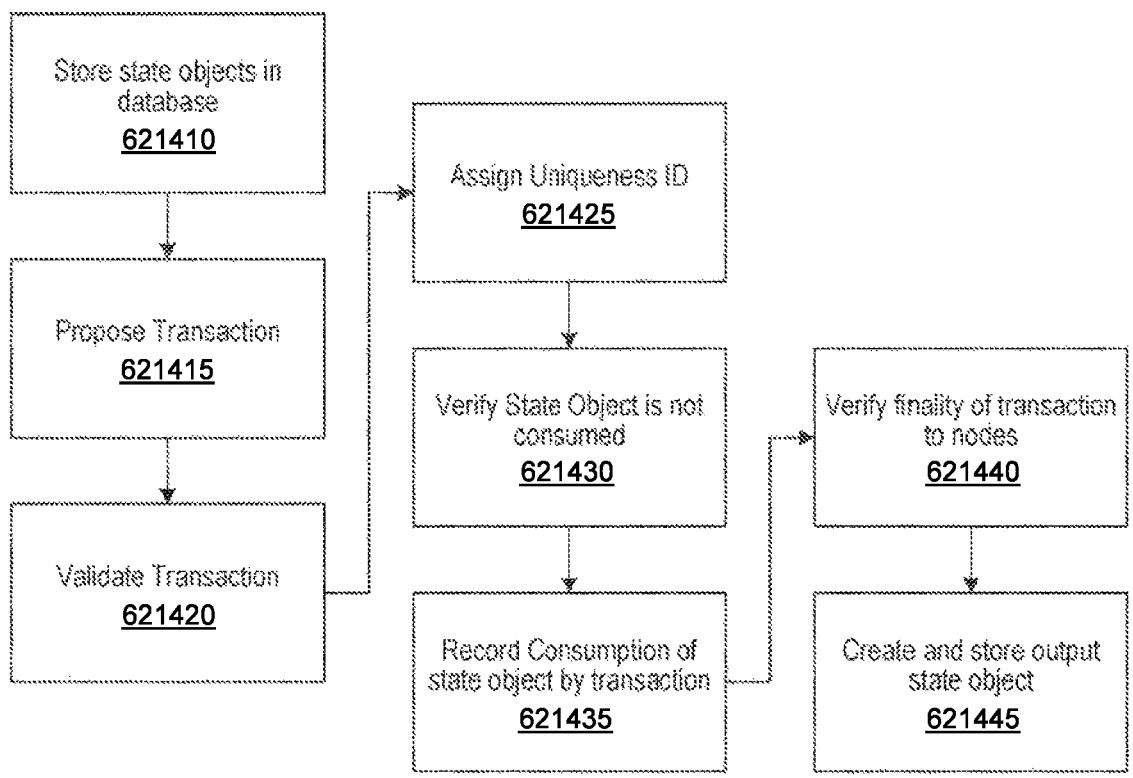
FIG. 62 is a flow chart of an example method of the present invention.

FIG. 62 illustrates a method of finalizing an electronic transaction between two parties The method 1400 comprises storing at one or more nodes of a distributed ledger one or more input state objects (1410). The input state objects may comprise a legal prose document, contract code, a parameter document and a digital signature as disclosed in other embodiments herein.

The method 1400 further comprises the step of proposing a transaction relating to the one more input state objects (1415), wherein the transaction comprises an input state object, a command, and an output state object. The output state object may also comprise a legal prose document, contract code, a parameters document, and an electronic signatures.

The method 1400 then includes the step of validating the proposed transaction (1420), wherein validation comprises referencing the command of the transaction with the parameters and rules of the input state object and confirming electronic signatures for the input state object and transaction. In some embodiment validation includes confirming the contract code referenced by each of the contract types referenced in the transaction The process of validating the proposed transaction is performed using a sub-process comprising: confirming by a party to the transaction that the transaction conforms with the contract code and parameter of the input state object, and signing by electronic signature the transaction after confirming the transaction conforms to at least the contract code of the input state object. The process of validating the proposed transaction may be performed using a sub-process comprising: screening privacy data from the transaction and input state objects, wherein privacy data includes party identity or other data marked as private, and signing the transaction by the validating protocol and establishing that the proposed transaction is valid.

The method 1400 also includes the step of assigning a uniqueness identification to the transaction (1425). The uniqueness identification may be a date time stamp and may be assigned by a uniqueness or notary service or a date time service.

The process 1400 continues with the step of verifying that the input state object has not previously been consumed by a prior transaction (1430). This may be done by submitting the proposed transaction to a notary service configured to compare the input state object of the transaction to a database of consumed state objects; determine whether the input state object has been previously consumed; record that the input state object is consumed by the proposed transaction; and electronically sign the transaction establishing that the transaction is verified.

The method 1400 further records in a database the consumption of the input state object (1435). And then verifies to one or more nodes in the distributed ledger that the transaction is finalized (1440). The notary service may electronically sign the transaction to indicate the verified transaction. And storing an output state object reflecting the outcome of the transaction (1445).

CONCLUSION

The techniques introduced herein can be implemented by, for example, programmable circuitry (e.g., one or more microprocessors) programmed with software and/or firmware, or entirely in special-purpose hardwired circuitry, or in a combination of such forms. Software or firmware for use in implementing the techniques introduced here may be stored on a machine-readable storage medium and may be executed by one or more general-purpose or special-purpose programmable microprocessors.

In addition to the above mentioned examples, various other modifications and alterations of the invention may be made without departing from the invention. Accordingly, the above disclosure is not to be considered as limiting, and the appended claims are to be interpreted as encompassing the true spirit and the entire scope of the invention.

The various embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

These computer program instructions may also be stored in a computer readable medium that can direct a computer, other programmable data processing apparatus, or other devices to function in a particular manner, such that the instructions stored in the computer readable medium produce an object of manufacture including instructions which implement the function/act specified in the flowchart and/or block diagram block or blocks.

The computer program instructions may also be loaded onto a computer, other programmable data processing apparatuses, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

The invention claimed is:

1. At least one data processing system for executing, clearing and settling transactions based on investment thresholds and conditions relayed via at least one node on a distributed network authorized in one of real-time and near real-time during an electronic platform session identifiable by session id identifiable by cryptographic hash and cryptographically secured and encrypted key-value pair prior to one of pre-execution, pre-clearing and pre-settlement certified electronic platform user associated and identifiable by cryptographic hash and encrypted session id associated with one of a proposed, associated proposed, associated transaction, financial product, investment product, structured investment product, financial derivative, tranche, asset right, transfer right, collateralization right, requirement defined in at least one other associated existing and recorded dynamic electronic contracts on a distributed ledger, and none existing associated dynamic electronic contract on at least one node on the distributed network, wherein upon certified and one of authorized user request, response, and input a newly to be associated, executed and cleared dynamic electronic contract is cryptographically proposed by an electronic platform user after the electronic platform user has been certified, authorized and one of granted visibility to portions of transactions, transaction data, nodes, pricing components identifiable by cryptographic hash dynamic electronic contracts, and programmatically upon prior, determined by at least one time-stamp, user-request and on the distributed network existing at least one pre-associated, pre-authorized dynamically, predefined and pre-authorized by artificial intelligence, acknowledged, determined and confirmed conditions and thresholds are by at least two associated or invited/granted and authorized certified electronic platform user's or users' conditions are conforming and in agreement so the transaction can be cleared and settled or that the transaction or proposal association of a dynamical electronic contract with another dynamic electronic contract or threshold or condition identified by the cryptographic hash can be canceled, uncleared or rejected; caching intermediary data, session data, hashes, private/public keys, computer-executable instructions/computer-readable instructions, key-value pairs or associated preliminary data, data-structures or information in a memory; each of said at least one data processing system comprising:
at least one memory,
at least one processor,
at least one non-transitory computer-readable storage medium,
at least one distributed computing system and the distributed network, after the electronic platform user has been certified, at least one of establishing and rejecting storing of at least one event identified by at least one of the cryptographic hash and the encrypted session id on the at least one node on the distributed network associated with at least one of the dynamic electronic contracts that is at least one of identified and matched by the cryptographic hash on the distributed ledger associated with at least one of recorded, proposed, to be executed, to be cleared, to be settled, executed, cleared and settled transaction or asset right or certified and authorized electronic platform user account status associated or cryptographically programmatically coded and encrypted based on computer-executable instructions or computer-readable instructions associated, mapped to and secured by unique cryptographic hash based on one of consumed items, unconsumed items, states, document term matrix, data table, hash-table entry, and entries with at least one of the other dynamic electronic contract on at least one other node on the distributed network, at least one financial transaction or investment products of at least one other certified and transaction by transaction or financial product by financial product or investment product by investment product or needed other associated pricing component recorded in an existing dynamic electronic contract on the at least one node on the distributed network identified by and of the cryptographic hash with matching authorization from the at least another node, the cryptographically secured and encrypted session id, the key-value pair from the authorized electronic platform user is conforming to associated and by the cryptographic hash identified and one of authorized thresholds, pricing component, conditions, authorizations and certifications.

2. The at least one data processing system of claim 1, further including one or more computer systems for enhancing confidentiality of, preventing double spending of, and ensuring authorization of transactions for changing dynamic electronic documents, the one or more computer systems comprising:
one or more computer-readable storage mediums storing computer-executable instructions for controlling a first computer system of a first user to:
access a dynamic electronic document stored on a first portion of a private distributed ledger as a first transaction, the dynamic electronic document comprising a state object having contract code and one or more parameters;
send, by the first computer system to a second computer system of a second user, the first transaction and a second transaction comprising a reference to the first transaction, a transaction command to alter a parameter of a state object, and a signature of the first user that is generated using a private key of a public/private key pair of the first user;

receive, from the second computer system, a notarized second transaction that has been validated by the second computer system executing contract code of the state object, notarized by a notary service that
ensures that output of the first transaction that is input to the second transaction has not been consumed,
uses the public key of the first user to ensure that the second transaction is signed by the first user, and
signs the second transaction using the private key of the public/private key pair of the notary service, and
stored on a second portion of the private distributed ledger; and
update, by the first computer system, the state object by storing the notarized second transaction on the first portion of the private distributed ledger wherein the first user controls access to the first portion of the private distributed ledger and the second user controls access to the second portion of the private distributed ledger; and
one or more processors for executing the computer-executable instructions stored in one or more computer-readable storage mediums.

3. The at least one data processing system of claim 2 wherein the computer-executable instructions further include instructions that control a notary computer system of the notary service to:
access a third transaction with a date-time stamp that references the second transaction;
access a fourth transaction with a date-time stamp that references the second transaction;
identify which of the third transaction or the fourth transaction has a earlier date-time stamp; and
create a notarized identified transaction based on the identified transaction.

4. The at least one data processing system of claim 2 wherein the state object is associated with legal prose outlining terms of a contract.

5. The at least one data processing system of claim 2 wherein the notarized second transaction includes a signature of the first user, the second user, and the notary service.

6. A method for enhancing confidentiality of, preventing double spending by, and ensuring authorization of transactions that change the dynamic electronic documents via the first computer system of claim 2, the method comprising:
accessing the dynamic electronic document stored on the first portion of the private distributed ledger as the first transaction, the dynamic electronic document comprising the state object having code and a parameter, the private distributed ledger not being a blockchain distributed ledger;
sending to the second computer system the second transaction comprising a reference to an output of the first transaction, a transaction command to alter the parameter of the state object, and a first signature of a first entity based on a first public/private key pair of the first entity;
receiving the notarized second transaction that has been notarized by the notary service that executes the code of the state object, ensures that an output of the first transaction has not been consumed, and adds to the second transaction a notary signature based on a notary public/private key pair, the notarized second transaction having a second signature of a second entity based on a second public/private key pair of the second entity; and
updating the state object by storing the notarized second transaction on the first portion of the private distributed ledger wherein the first user controls access to the first portion of the private distributed ledger.

7. The at least one data processing system of claim 1, further comprising a first host computer system of a node of a first party for finalizing an electronic transaction between the first party and a second party, wherein the node is the node of the private distributed ledger, the first host computer system comprising:
one or more computer-readable storage mediums for storing computer-executable instructions for controlling the one or more computing systems to:
access, by the first host computer system, a first database of the state objects of the private distributed ledger for storing the state objects to which the first party is a party, wherein the private distributed ledger is not a blockchain;
receive, by the first host computer system, the proposed transaction that is between the first party and the second party and comprises an input state object having a hash that identifies contract code having rules, a command, and an output state object;
validate, by the first host computer system, the proposed transaction to generate a validated transaction, wherein validation comprises referencing rules of the contract code of the input state object, executing by a virtual machine the contract code identified by the cryptographic hash to confirm that the proposed transaction conforms to the rules, and confirming electronic signatures for the input state object and the proposed transaction;
verify, by the first host computer system, that the input state object of the validated transaction has not previously been consumed by a prior transaction, by the first host computer system submitting the validated transaction to a notary service to the private distributed ledger, so that the notary service can return to the first host computer system a notarized transaction has been finalized based on the input state object not being in a notary database of consumed state objects that is maintained by the notary service, the input state object being added to the notary database, and the proposed transaction being signed with an electronic signature of the notary service to generate the notarized transaction;
receive, by the first host computer system, the notarized transaction; and
store, by the first host computer system, the output state object of the notarized transaction in the first database; and
one or more processors for executing the computer-executable instructions stored in the one or more computer-readable storage mediums.

8. A method performed via the one or more data processing systems of claim 7, having the first host computer system of the node of the first party for finalizing the electronic transaction between the first party and the second party, wherein the node is the node of the private distributed ledger, the method comprising:
accessing, by the first host computer system, the first database of the state objects of the private distributed ledger for storing the state objects to which the first party is a party, wherein the private distributed ledger is not a blockchain;
receiving, by the first host computer system, the proposed transaction that is between the first party and the second party and comprises the input state object having the cryptographic hash that identifies the contract code having the rules, the command, and the output state object;

validating, by the first host computer system, the proposed transaction to generate the validated transaction, wherein validation comprises referencing the rules of the contract code of the input state object, executing by the virtual machine the contract code identified by the cryptographic hash to confirm that the proposed transaction conforms to the rules, and confirming the electronic signatures for the input state object and the proposed transaction;

verifying, by the first host computer system, that the input state object of the validated transaction has not previously been consumed by a prior transaction, by the first host computer system submitting the validated transaction to the notary service to the private distributed ledger, so that the notary service can return to the first host computer system the notarized transaction has been finalized based on the input state object not being in the notary database of consumed state objects that is maintained by the notary service, the input state object being added to the notary database, and the proposed transaction being signed with the electronic signature of the notary service to generate the notarized transaction;

receiving, by the first host computer system, the notarized transaction; and storing, by the first host computer system, the output state object of the notarized transaction in the first database.

9. The method of claim 8 wherein prior to submitting the validated transaction to the notary service, the validated transaction is stripped of privacy data such that the notary service is prevented from accessing privacy data associated with the validated transaction or the input state object.

10. The at least one data processing system of claim 7 wherein prior to the validated transaction being submitted to the notary service, the validated transaction is stripped of privacy data such that the notary service is prevented from accessing privacy data associated with the validated transaction or the input state object.

11. The at least one data processing system of claim 1, further comprising a first computing system of a first node of a first entity for ensuring privacy of a dynamic electronic document, the first node being a node of a private distributed ledger, the first computing system comprising:

one or more computer-readable storage medium storing a first data store of the first entity that include the dynamic electronic document having state, having machine-readable instructions of a smart contract for performing permissible actions applicable to the dynamic electronic document, and having identifications of the first entity and a second entity, the first entity and the second entity having permission to access the dynamic electronic document, the dynamic electronic document being signed by the first entity using a private key of the first entity, the dynamic electronic document stored in a second data store of the second entity such that the first entity and the second entity control access to the dynamic electronic document, the first data store and the second data store being part of the private distributed ledger wherein the private distributed ledger is not a blockchain;

computer-executable instructions for controlling the computing system to:

generate, by the first computing system, a proposed change to the state of the dynamic electronic document, the proposed change identifying an output state for the dynamic electronic document and identifying an input state for the dynamic electronic document, the proposed change being signed using the private key of the first entity;

executes the machine-readable instructions of the smart contract to validate the proposed change;

send, by the first computing system, the validated proposed change to a second computing system of a second node of the second entity so that the second computing system can return to the first computing system a signed validated proposed change that is signed by a private key of the second entity, the second node being the node of the private distributed ledger;

send, by the first computing system, the signed validated proposed change to a verification service to the private distributed ledger to verify that the signed validated proposed change is signed by the first entity and the second entity and that the input state is not in a register of consumed input states maintained by the verification service, to sign the signed validated proposed change to generate a verified proposed change, and to return the verified proposed change to the first computing system;

store, by the first computing system, the verified proposed change in the first data store to record a new state for the dynamic electronic document; and send, by the first computing system, the verified proposed change the second computing system so that the second computing system can store the verified proposed change in the second data store; and one or more processors for executing the computer-executable instructions stored in the one or more computer-readable storage mediums.

12. A method performed by the first computing system of the first node of the first entity for ensuring privacy of the dynamic electronic document of claim 11, the first node being the node of the private distributed ledger, the method comprising:

creating, by the first computing system, the dynamic electronic document having state, having machine-readable instructions of the smart contract for performing permissible actions applicable to the dynamic electronic document, and having identifications of the first entity and the second entity, the first entity and the second entity having permission to access the dynamic electronic document, the dynamic electronic document being signed by the first entity using a private key of the first entity, the dynamic electronic document stored in the first data store of the first entity and the second data store of the second entity such that the first entity and the second entity control access to the dynamic electronic document, the first data store and the second data store being part of the private distributed ledger wherein the private distributed ledger is not a blockchain;

generating, by the first computing system, the proposed change to the state of the dynamic electronic document, the proposed change identifying the output state for the dynamic electronic document and identifying the input state for the dynamic electronic document, the proposed change being signed using the private key of the first entity;

executing, by the first computing system, the machine-readable instructions of the smart contract to validate the proposed change;

sending, by the first computing system, the validated proposed change to the second computing system of the second node of the second entity so that the second computing system can return to the first computing system a signed validated proposed change that is signed by the private key of the second entity, the second node being the node of the private distributed ledger;

sending, by the first computing system, the signed validated proposed change to the verification service to the private distributed ledger to verify that the signed validated proposed change is signed by the first entity and the second entity and that the input state is not in a register of consumed input states maintained by the verification service, to sign the signed validated proposed change to generate the verified proposed change, and to return the verified proposed change to the first computing system;

storing, by the first computing system, the verified proposed change in the first data store to record a new state for the dynamic electronic document; and sending, by the first computing system, the verified proposed change the second computing system so that the second computing system can store the verified proposed change in the second data store.

13. The at least one data processing system of claim 1, further comprising one or more computing systems of a first node of a first entity for conducting a transaction relating to a state object, the first node being the node of the distributed ledger that is not a blockchain, the one or more computing system comprising:

one or more computer-readable storage mediums for storing a state object having state, and having identifications of the first entity and a second entity, the first entity and the second entity having permission to access the state object, the state object being electronically signed by the first entity;

the proposed transaction to change the state object, the proposed transaction identifying an output state for the state object and identifies an input state for the state object, the proposed transaction being electronically signed by an entity that proposed the transaction; and computer-executable instructions for controlling the one or more computing systems to:

receive a verified transaction that has been verified by a verification service, the verification service verifying by ensuring that the input state is not in a register of consumed input states maintained by the verification service and electronically signing the proposed transaction to generate a verified transaction; and store the verified transaction as part of the distributed ledger to record the change to the state object; and one or more processors for executing the computer-executable instructions stored in the one or more computer-readable storage mediums.

14. A method performed by the first computing system of the first node of the first entity for conducting the transaction relating to the state object of claim 13, the first node being the node of the distributed ledger that is not a blockchain, the method comprising:

accessing the state object having state, and having the identifications of the first entity and the second entity, the first entity and the second entity having permission to access the state object, the state object being electronically signed by the first entity;

accessing the proposed transaction to change the state object, the proposed transaction identifying the output state for the state object and identifies the input state for the state object, the proposed transaction being electronically signed by the entity that proposed the transaction;

receiving the verified transaction that has been verified by the verification service, the verification service verifying by ensuring that the input state is not in the register of consumed input states maintained by the verification service and electronically signing the proposed transaction to generate a verified transaction; and storing the verified transaction as part of the distributed ledger to record the change to the state object.

15. The at least one data processing system of claim 1, wherein the distributed network is a decentralized peer-to-peer network.

16. The at least one data processing system of any of claims 1 or 15, wherein a notary service or notary service server, client or node or authorized, certified and step-by-step access-controlled by cryptographic hash notarization application on the electronic platform associated with one or more dynamic electronic contracts on at least one node authenticates execution, clearing or settlement steps or intermediary associated steps during at least one user's identified by cryptographic hash electronic platform session identified by one of cryptographic hash and session id associated with the distributed network.

17. The at least one data processing system of claim 16, wherein authentication or uniqueness of a transaction on the decentralized distributed network is validated by signing the to be cleared or settled transaction or investment product or financial product with a cryptographic hash, wherein the cryptographic hash is a private or public key.

18. The at least one data processing system of claim 1, wherein at least a partial portion of intermediary investment, financial, legal or asset rights associated with at least one dynamic electronic contract, electronic platform session, user, authentication, authorization, notarization, uniqueness, cryptographic, encryption, confidential, certification, execution, clearing, settlement associated information, electronic platform steps or data is stored, added, updated, removed, canceled, rejected, marked as pending, pending for approval on at least one of ad hoc per session, cryptographic hash, and matching authorization generated decentralized distributed hash table.

19. The at least one data processing systems of claim 1, wherein the clearing and/or settlement functionality is omitted for individual deals between electronic platform users to one of an agreement and a dynamic electronic document, transaction execution is achieved by one of individual deals, individual investment products, individual financial products, and individual transactions defined, customized and exchanged by individually by the party on a client device generated dynamic electronic documents identified by the cryptographic hash and signed directly and via file exchange transmission between the electronic platform users directly identified by cryptographic hash certified client devices connected to the distributed network, and the at least one processor further comprising validating the at least one associated transaction, and storing the at least one individual dynamic electronic document via file exchange on a separate node on the distributed network or at a level of individual (electronic platform) users in a memory and at least one storage device connected to at least one client device or at least one local database per certified on at least one client device user or non-certified user, wherein a party can generate and send another party for an individual deal/transaction a link to the individually generated and stored dynamic electronic document.

20. The at least one data processing systems of claim 1, the at least one processor further comprising updating changes to a previously notarized transaction, investment, financial product between at least a first and at least a second electronic platform user, wherein at least one of the first and second electronic platform user is certified, through new cryptographic hash identifying changes to a dynamic electronic document, session id, and dynamic electronic document through individual file exchange encrypted and secured through associated cryptographic hash.

21. The at least one data processing system of claim 1, further comprising the at least one processor generating and sending at least one direct individual encrypted transaction message between the at least two electronic platform users; validating uniqueness of changes to at least one dynamic electronic document and legitimacy of participation of the parties/electronic platform users to the transaction by signature with a generated key and sending a generated encrypted link to the legitimate parties/electronic platform users; and distributing the generated dynamic electronic documents via file exchange between the legitimate parties.

22. The at least one data processing system of claim 1, wherein a generated cryptographic hash uniquely identifies one of a party to an agreement and the electronic platform user.

23. The at least one data processing system of claim 1, wherein the cryptographic hash uniquely identifies the session-id of an electronic platform session.

24. The at least one data processing system of claim 1, wherein the cryptographic hash uniquely identifies the proposed transaction or transaction request or altered transaction request.

25. The at least one data processing system of claim 24, wherein total number of transaction requests during the session-id or associated with one of a proposed dynamic electronic document and a dynamic electronic document identifiable, secured, and encrypted by the cryptographic hash is associated with a threshold for granting generation of a transaction file.

26. The at least one data processing system of claim 1, wherein the cryptographic hash uniquely identifies a proposed dynamic electronic document.

27. The at least one data processing system of claim 1, wherein the cryptographic hash uniquely identifies a proposed change to a dynamic electronic document.

28. The at least one data processing system of claim 1, wherein the cryptographic hash uniquely identifies a link to one of the proposed transaction, a completed transaction, and a dynamic electronic document.

29. The at least one data processing system of claim 28, wherein an encrypted and secured link identifiable by the cryptographic hash is stored in one of the memory, the node of a distributed network, a local database, a cloud-service, and a cloud-environment.

30. The at least one data processing system of claim 29, further comprising the at least one processor provides validation of one of the transaction, a transaction request, an altered transaction request and the proposed transaction, and storage of associated state objects associated with one of the dynamic electronic document and proposed dynamic electronic document achieves and authorizes distribution of transaction and resources for distributed storage on one of the cloud-environment and between one cloud-environment and a second cloud-environment.

31. The at least one data processing system of claim 30, wherein notarization and the transaction request validated based allocation of resources achieves a validated distributed ledger.

32. The at least one data processing system of claim 1, wherein by the cryptographic hash encrypted and secured link to a dynamic electronic document a proposed dynamic electronic document is sent by a user to one of the transaction and agreement to at least another user for file exchange.

33. The at least one data processing system of claim 1, wherein a copy of one of a dynamic electronic document, and a proposed dynamic electronic document encrypted and secured and identifiable by the cryptographic hash is a data file.

34. The at least one data processing system of claim 1, wherein a copy of one of a dynamic electronic document, and a proposed dynamic electronic document encrypted and secured and identifiable by the cryptographic hash is an executable file.

35. The at least one data processing system of claim 1, wherein the public and private key are the same.

36. The at least one data processing system of claim 1, wherein one of a dynamic electronic document, a proposed dynamic electronic document, an agreement, a transaction request, a file, and a link contains one of privacy data and confidential data; and further comprising the at least one processor displaying the associated dynamic electronic document identifiable, secured and encrypted by the cryptographic hash on at least one certified computing system after receiving the associated dynamic electronic document identifiable, secured and encrypted by the cryptographic hash over the distributed network via one of the node, a database, a local database and cloud-based storage service.

37. The at least one data processing system of claim 36, wherein visibility to one of privacy data and confidential data one of associated with and contained in one of the dynamic electronic document, the proposed dynamic electronic document, the agreement, the transaction request, the file, and the link is granted only to any of certified users, legitimate users, and legitimate parties over the distributed network.

38. A method for allowing a certified party or user via the session-id and transaction number and identified by the cryptographic hash secured, and an encrypted associated electronic platform user to establish a dynamic electronic document via the at least one data processing systems of claim 1.

* * * * *